US010776007B2

(12) United States Patent
Kunimatsu et al.

(10) Patent No.: US 10,776,007 B2
(45) Date of Patent: Sep. 15, 2020

(54) MEMORY MANAGEMENT DEVICE PREDICTING AN ERASE COUNT

(71) Applicant: TOSHIBA MEMORY CORPORATION, Minato-ku (JP)

(72) Inventors: Atsushi Kunimatsu, Chiba (JP); Masaki Miyagawa, Musashino (JP); Hiroshi Nozue, Tokyo (JP); Kazuhiro Kawagome, Kokubunji (JP); Hiroto Nakai, Yokohama (JP); Hiroyuki Sakamoto, Ome (JP); Tsutomu Owa, Kawasaki (JP); Tsutomu Unesaki, Hachioji (JP); Reina Nishino, Yokohama (JP); Kenichi Maeda, Kamakura (JP); Mari Takada, Tokyo (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 92 days.

(21) Appl. No.: 14/938,589

(22) Filed: Nov. 11, 2015

(65) Prior Publication Data

US 2016/0062660 A1    Mar. 3, 2016

Related U.S. Application Data

(63) Continuation of application No. 13/351,582, filed on Jan. 17, 2012, now abandoned, which is a (Continued)

(30) Foreign Application Priority Data

Jul. 17, 2009  (JP) ................. 2009-169371
Mar. 4, 2010  (JP) ................. 2010-048328

(Continued)

(51) Int. Cl.
  G06F 3/06    (2006.01)
  G06F 12/02   (2006.01)
  (Continued)

(52) U.S. Cl.
  CPC ............ G06F 3/0604 (2013.01); G06F 3/061 (2013.01); G06F 3/0631 (2013.01);
  (Continued)

(58) Field of Classification Search
  CPC ........................... G06F 12/00; G06F 12/0246
  See application file for complete search history.

(56) References Cited

U.S. PATENT DOCUMENTS 5,737,742 A    4/1998 Achiwa et al.
6,687,804 B1 * 2/2004 Kosaki ................. G06F 3/0607
                                          711/115
(Continued)

*Primary Examiner* — Charles Rones
*Assistant Examiner* — Tian-Pong Chang
(74) *Attorney, Agent, or Firm* — Oblon, McClelland, Maier & Neustadt, L.L.P.

(57) ABSTRACT

A memory management device of an example of the invention controls writing into and reading from a main memory including a nonvolatile semiconductor memory and a volatile semiconductor memory in response to a writing request and a reading request from a processor. The memory management device includes a coloring information storage unit that stores coloring information generated based on a data characteristic of write target data to be written into at least one of the nonvolatile semiconductor memory and the volatile semiconductor memory, and a writing management unit that references the coloring information to determines a region into which the write target data is written from the nonvolatile semiconductor memory and the volatile semiconductor memory.

25 Claims, 88 Drawing Sheets

Related U.S. Application Data continuation of application No. PCT/JP2010/053817, filed on Mar. 8, 2010.

(30) Foreign Application Priority Data

| | | | |
|---|---|---|---|
| Mar. 4, 2010 | (JP) | | 2010-048329 |
| Mar. 4, 2010 | (JP) | | 2010-048331 |
| Mar. 4, 2010 | (JP) | | 2010-048332 |
| Mar. 4, 2010 | (JP) | | 2010-048333 |
| Mar. 4, 2010 | (JP) | | 2010-048334 |
| Mar. 4, 2010 | (JP) | | 2010-048335 |
| Mar. 4, 2010 | (JP) | | 2010-048337 |
| Mar. 4, 2010 | (JP) | | 2010-048338 |
| Mar. 4, 2010 | (JP) | | 2010-048339 |

(51) Int. Cl.
*G06F 12/06* (2006.01)
*G06F 12/00* (2006.01)

(52) U.S. Cl.
CPC .......... *G06F 3/0638* (2013.01); *G06F 3/0653* (2013.01); *G06F 3/0679* (2013.01); *G06F 12/0223* (2013.01); *G06F 12/0246* (2013.01); *G06F 12/06* (2013.01); *G06F 12/00* (2013.01); *G06F 2212/1016* (2013.01); *G06F 2212/1036* (2013.01); *G06F 2212/205* (2013.01); *G06F 2212/7201* (2013.01); *G06F 2212/7202* (2013.01); *G06F 2212/7208* (2013.01)

(56) References Cited

U.S. PATENT DOCUMENTS

| | | | |
|---|---|---|---|
| 6,807,106 B2 | 10/2004 | Gonzales et al. | |
| 6,831,865 B2* | 12/2004 | Chang | G06F 12/0246 365/185.33 |
| 7,020,762 B2 | 3/2006 | Sprangle et al. | |
| 7,032,087 B1* | 4/2006 | Chang | G06F 12/0246 711/103 |
| 7,174,437 B2 | 2/2007 | Kaczynski | |
| 7,519,792 B2 | 4/2009 | Koufaty | |
| 7,861,122 B2* | 12/2010 | Cornwell | G06F 11/073 711/103 |
| 8,078,923 B2* | 12/2011 | Nagadomi | G06F 11/1068 714/706 |
| 8,122,220 B1 | 2/2012 | Montierth et al. | |
| 8,135,900 B2 | 3/2012 | Kunimatsu et al. | |
| 8,261,041 B2 | 9/2012 | Kunimatsu | |
| 8,612,692 B2 | 12/2013 | Yasufuku et al. | |
| 8,645,612 B2 | 2/2014 | Kunimatsu et al. | |
| 2003/0112692 A1 | 6/2003 | Gonzalez et al. | |
| 2005/0132128 A1 | 6/2005 | Lee | |
| 2007/0285980 A1 | 12/2007 | Shimizu | |
| 2008/0071939 A1* | 3/2008 | Tanaka | G06F 11/3419 710/18 |
| 2008/0082736 A1* | 4/2008 | Chow | G06F 12/0246 711/103 |
| 2008/0104357 A1* | 5/2008 | Kim | G06F 12/0246 711/170 |
| 2008/0114930 A1 | 5/2008 | Sanvido et al. | |
| 2008/0189512 A1* | 8/2008 | Hansen | G06F 9/30014 712/1 |
| 2008/0215800 A1* | 9/2008 | Lee | G06F 3/0613 711/103 |
| 2009/0043831 A1* | 2/2009 | Antonopoulos | G06F 3/0614 |
| 2009/0049234 A1 | 2/2009 | Oh et al. | |
| 2009/0132621 A1 | 5/2009 | Jensen et al. | |
| 2009/0132778 A1 | 5/2009 | Danilak | |
| 2009/0144545 A1* | 6/2009 | Dhuvur | G06F 21/552 713/165 |
| 2009/0150599 A1 | 6/2009 | Bennett | |
| 2009/0327586 A1 | 12/2009 | Kuo | |
| 2009/0327602 A1* | 12/2009 | Moore | G06F 3/0616 711/114 |
| 2010/0100663 A1* | 4/2010 | Kao | G06F 12/0246 711/103 |
| 2010/0257306 A1* | 10/2010 | Kawaguchi | G06F 3/0616 711/103 |
| 2010/0231233 A1 | 11/2010 | Obr et al. | |
| 2010/0293337 A1 | 11/2010 | Murphy et al. | |
| 2010/0306580 A1* | 12/2010 | McKean | G06F 12/0246 714/6.13 |
| 2012/0030413 A1 | 2/2012 | Miyagawa et al. | |

\* cited by examiner

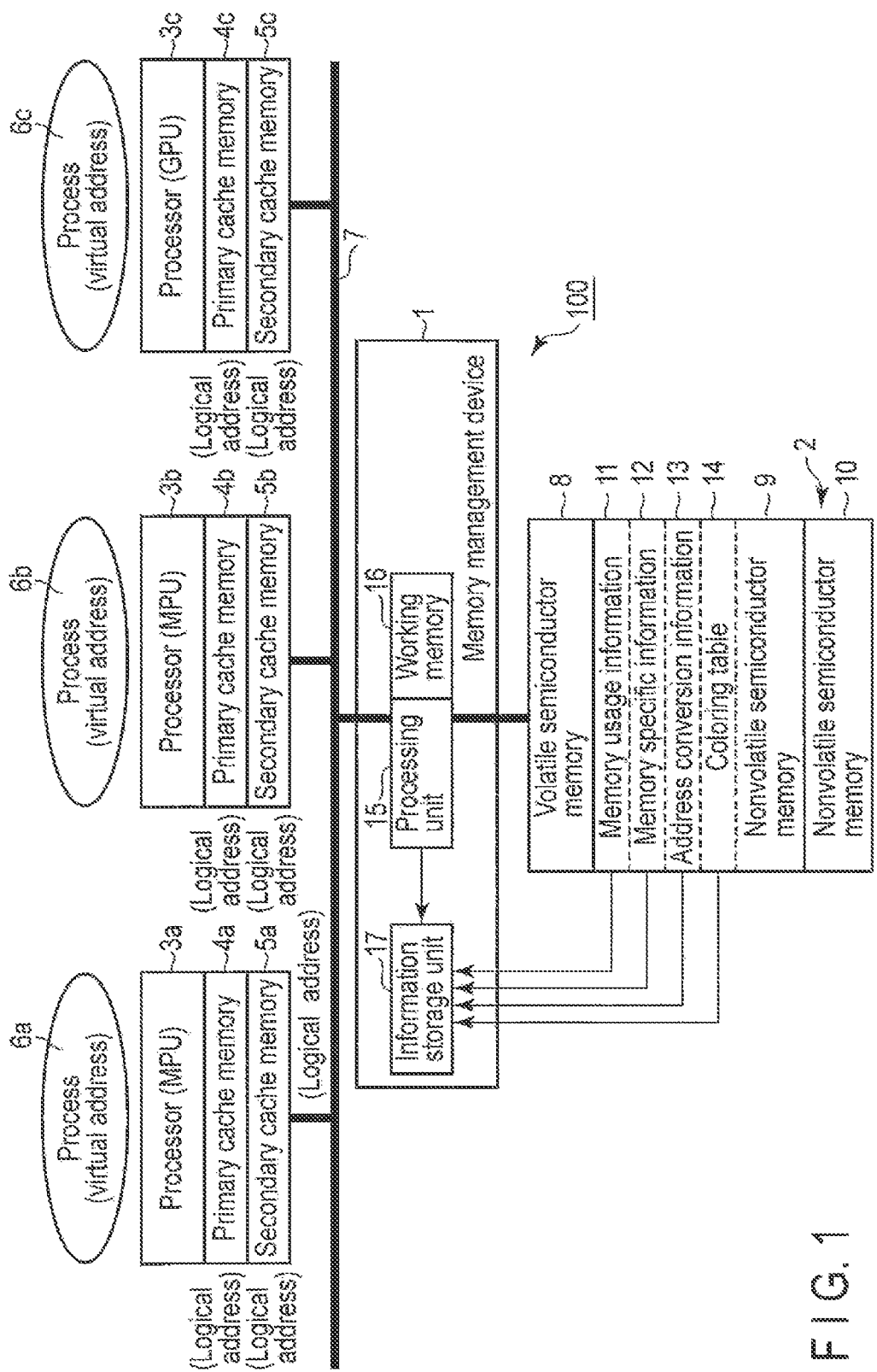
F I G. 1

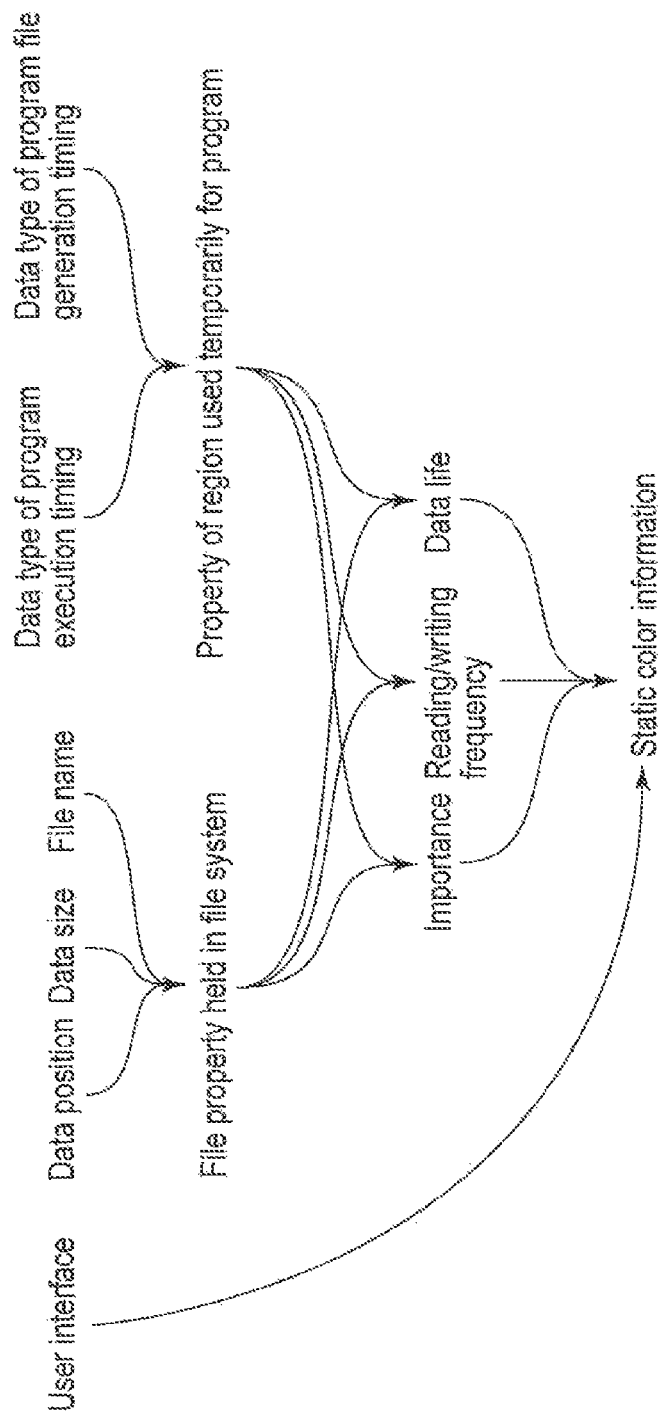
F I G. 6

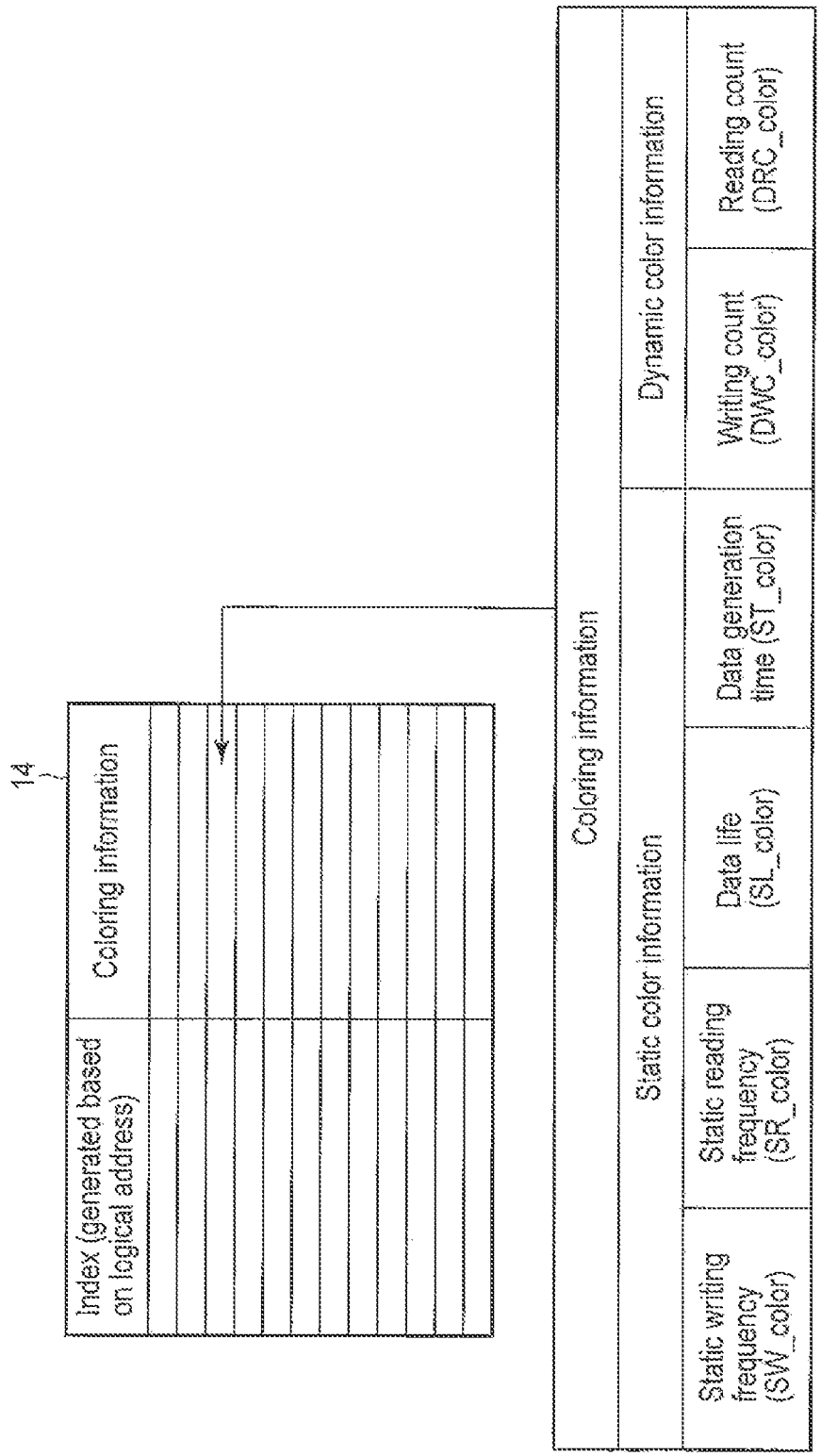
F I G. 8

| Data format | Data life | SW_color | SR_color | Notes |
|---|---|---|---|---|
| Data dynamically secured by kernel (region dynamically secured by kernel stack/device driver and the like) | SHORT(S) | 5 | 5 | Frequency of reading/writing during system activation is considered to be high |
| Text region of kernel (including statically secured data) | LONG(L) | 1 | 5 | Frequency of reading during system activation is considered to be high |
| Data dynamically secured by process | S | 4 | 4 | Data no longer needed when process ends of regions dynamically secured by process. Reading and writing frequently occur during process execution. Data itself is discarded when process ends. |
| Stack region of program | S | 4 | 4 | Region (stack region) used by auto variable and the like of data dynamically secured by process. Reading and writing frequently occur during process execution. Data itself is discarded when process ends. |
| Text region of program | L | 1 | 4 | Reading frequently occur during process execution. While process is suspended or after process ends, frequency of reading quickly falls. |
| System file (SYS, dll, DRV) | L | 1 | 3 | Frequency of reading of file referenced by OS is considered to be always high during system activation. |

FIG. 9

| Data format | Data life | SW_color | SR_color | Notes |
|---|---|---|---|---|
| Music data (MP3) | L | 1 | 2 | File referenced by process is accessed during execution of process. Number of users who use a program having function to edit music file is small and frequency of writing is considered to be low. |
| Animation data (MPEG2) | L | 1 | 2 | File referenced by process is accessed during execution of process. Number of users who use an animation editing program is small and frequency of writing is considered to be low. |
| Text file (txt) | L | 3 | 3 | File referenced by process is accessed during execution of process. Number of users who use a program to edit text is large and frequencies of both writing and reading are assumed to be higher than media files. |
| Browser cache file | L | 1 | 3 | File referenced by process is accessed during execution of process. Number of users who use a Web browser is large and access frequency is assumed to be equal to or higher than media files. |
| File arranged in directory with low access frequency (such as Trash) | L | 1 | 1 | |

F I G. 10

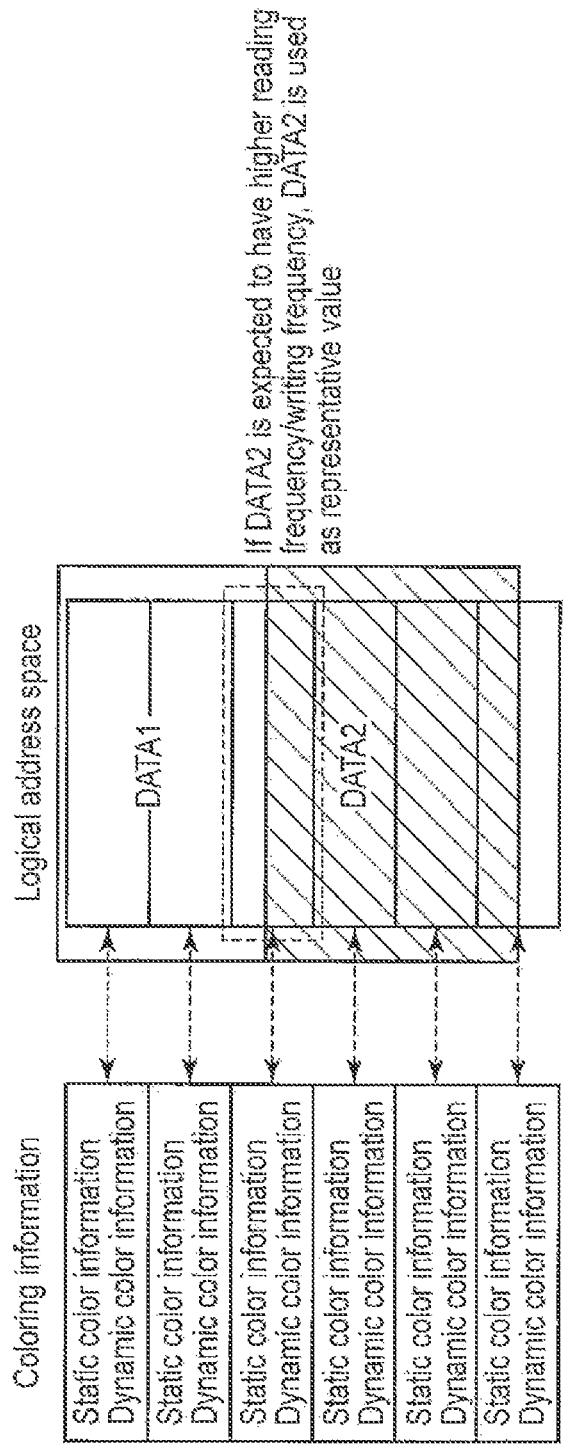
F I G. 13

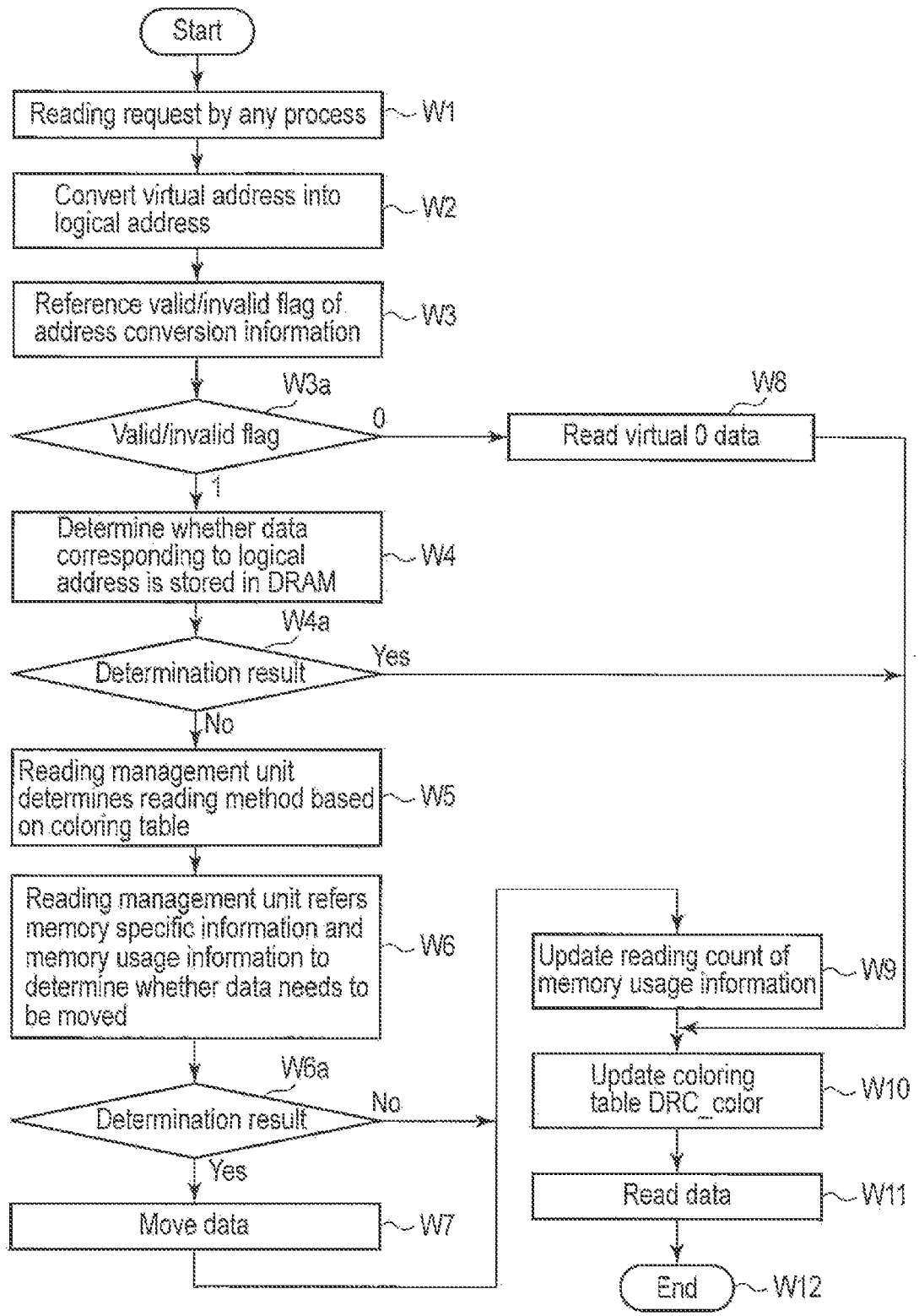
F I G. 16

| Coloring information | | Wear-out rate |
|---|---|---|
| SW_color | DW_color (Writing count/sec) | |
| 5 | High | Less than 10% |
| 5 | Intermediate | Less than 10% |
| 5 | Low | Less than 20% |
| 4 | High | Less than 20% |
| 4 | Intermediate | Less than 30% |
| 4 | Low | Less than 40% |
| 3 | High | Less than 40% |
| 3 | Intermediate | Less than 50% |
| 3 | Low | Less than 60% |
| 2 | High | Less than 70% |
| 2 | Intermediate | Less than 70% |
| 2 | Low | Less than 80% |
| 1 | High | Less than 90% |
| 1 | Intermediate | Less than 90% |
| 1 | Low | Less than 100% |
F I G. 2 0
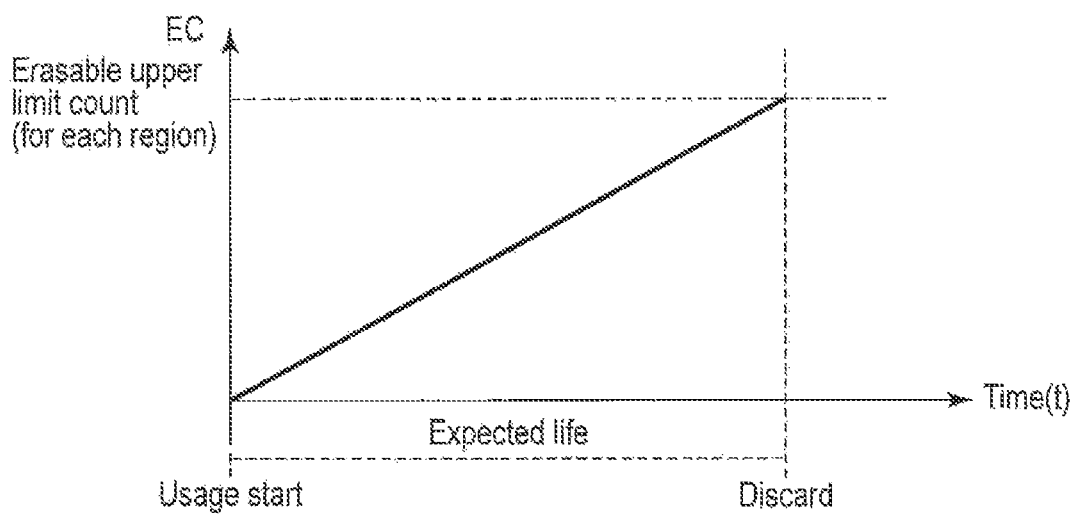
F I G. 2 1

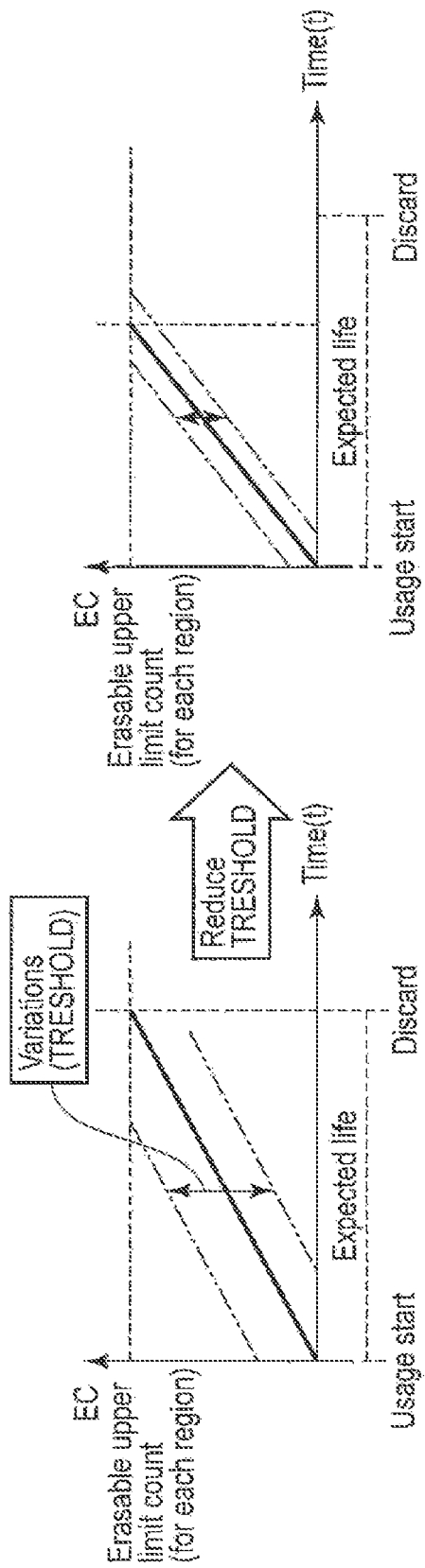
F I G. 22

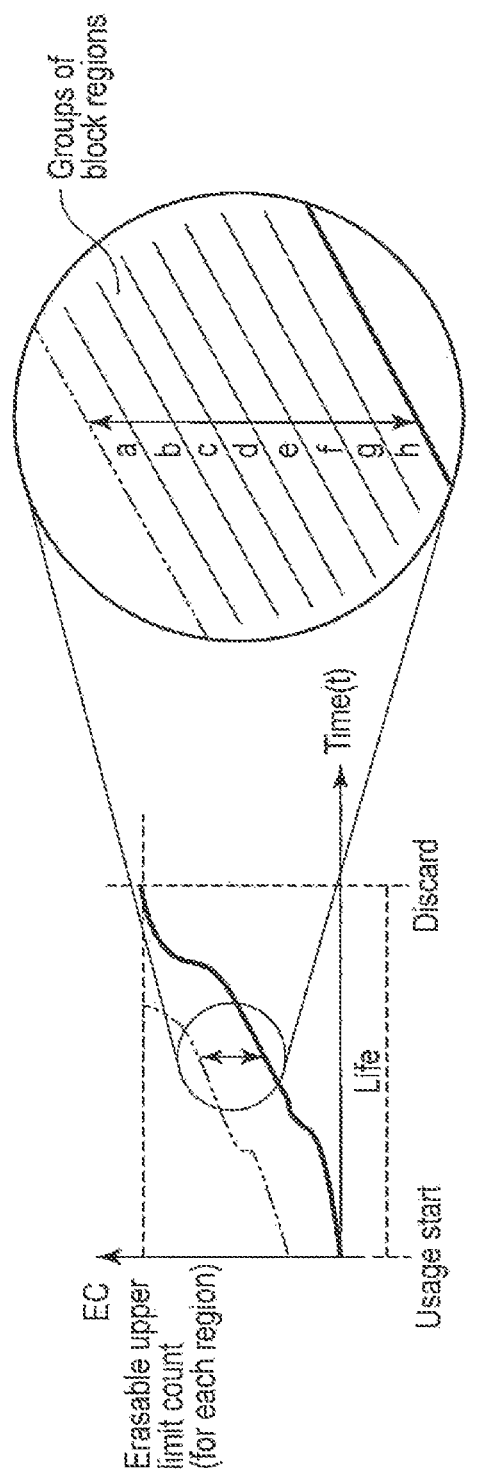
F I G. 23

| Group | EC upper limit | EC lower limit |
|---|---|---|
| a | Less than currently minimum EC + THRESHOLD | Currently minimum EC + THRESHOLD × 7/8 or more |
| b | Less than currently minimum EC + THRESHOLD × 7/8 | Currently minimum EC + THRESHOLD × 6/8 or more |
| c | Less than currently minimum EC + THRESHOLD × 6/8 | Currently minimum EC + THRESHOLD × 5/8 or more |
| d | Less than currently minimum EC + THRESHOLD × 5/8 | Currently minimum EC + THRESHOLD × 4/8 or more |
| e | Less than currently minimum EC + THRESHOLD × 4/8 | Currently minimum EC + THRESHOLD × 3/8 or more |
| f | Less than currently minimum EC + THRESHOLD × 3/8 | Currently minimum EC + THRESHOLD × 2/8 or more |
| g | Less than currently minimum EC + THRESHOLD × 2/8 | Currently minimum EC + THRESHOLD × 1/8 or more |
| h | Less than currently minimum EC + THRESHOLD × 1/8 | None |

FIG. 24

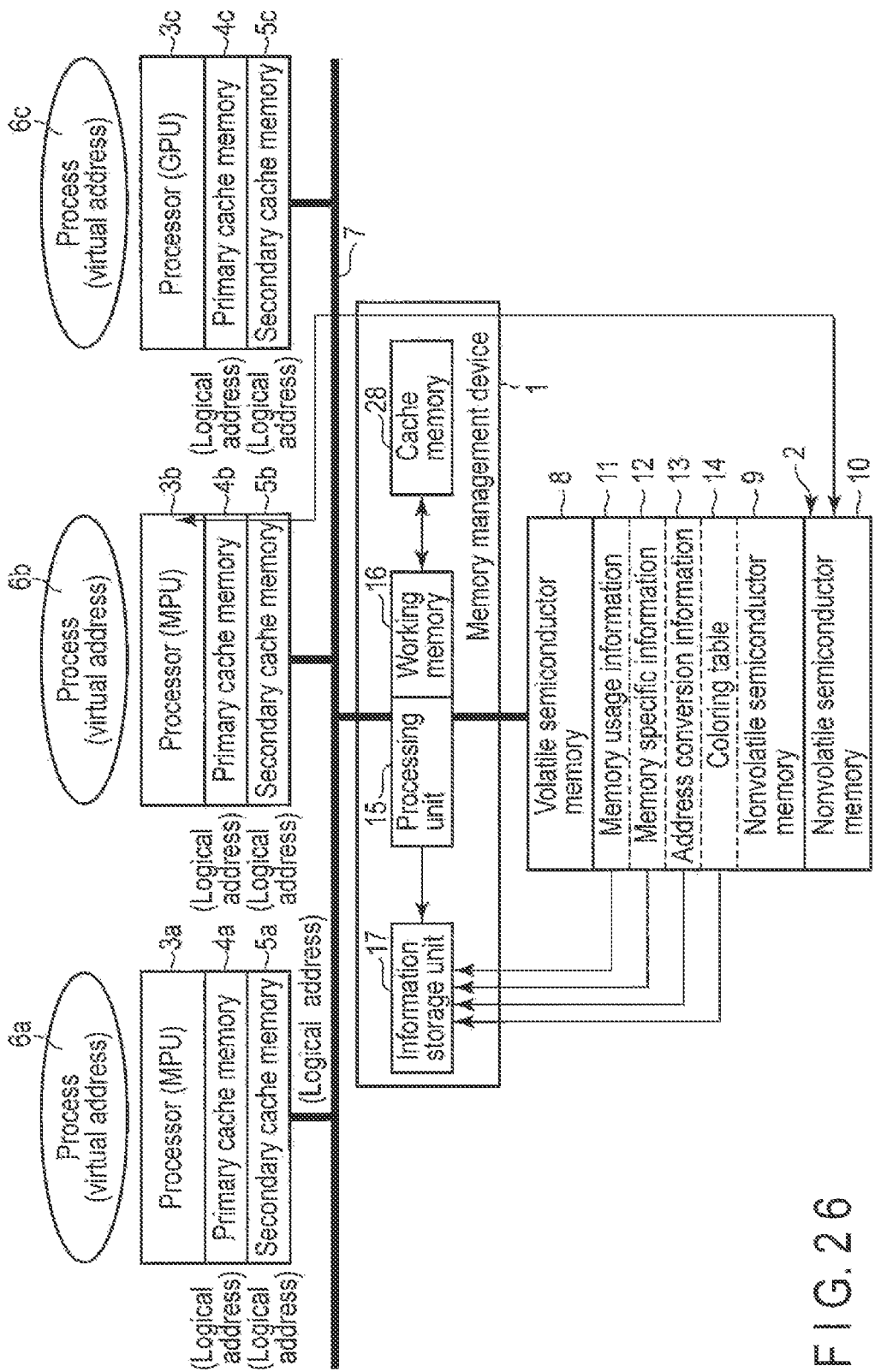
F I G. 26

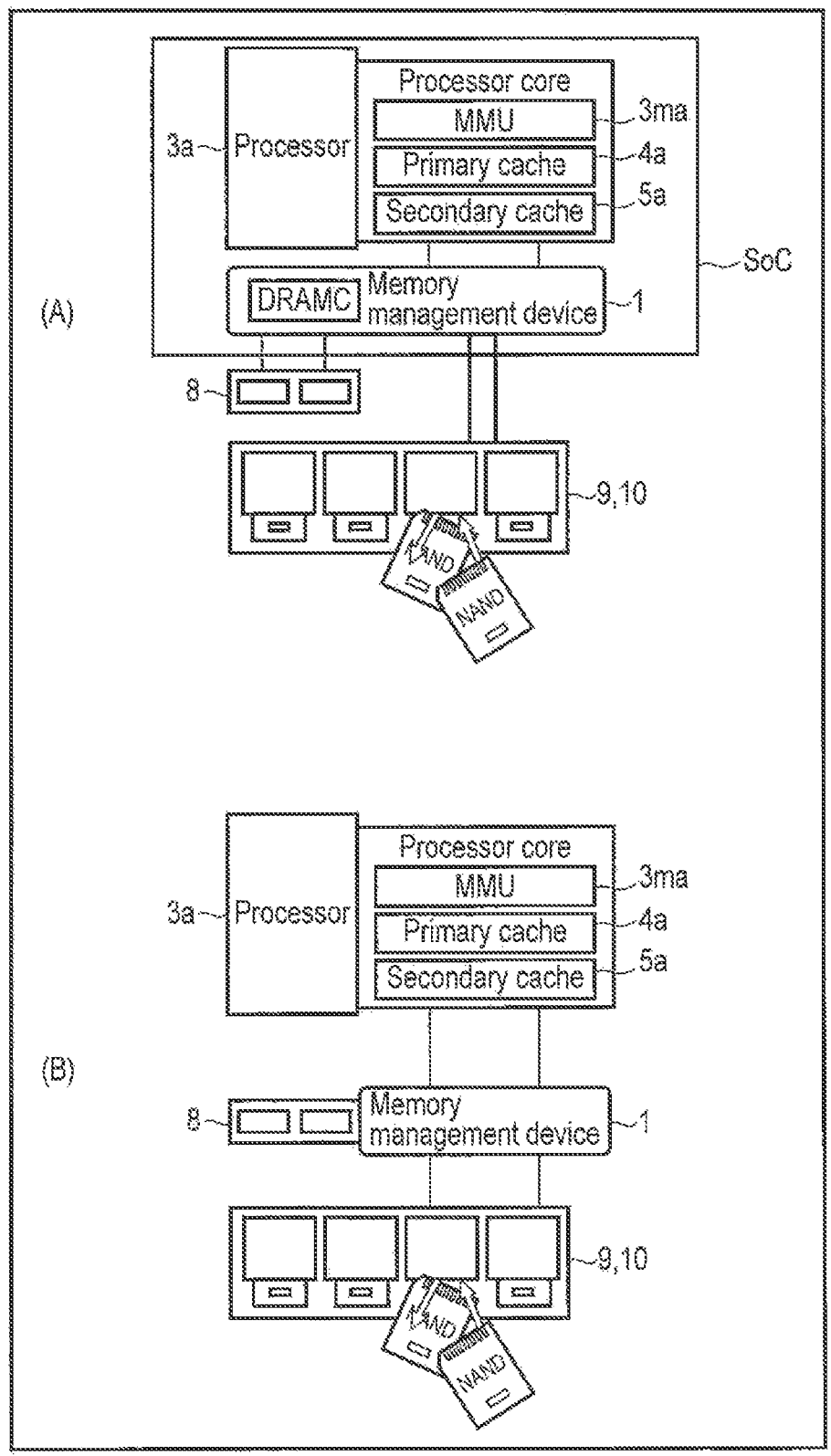
F I G. 27

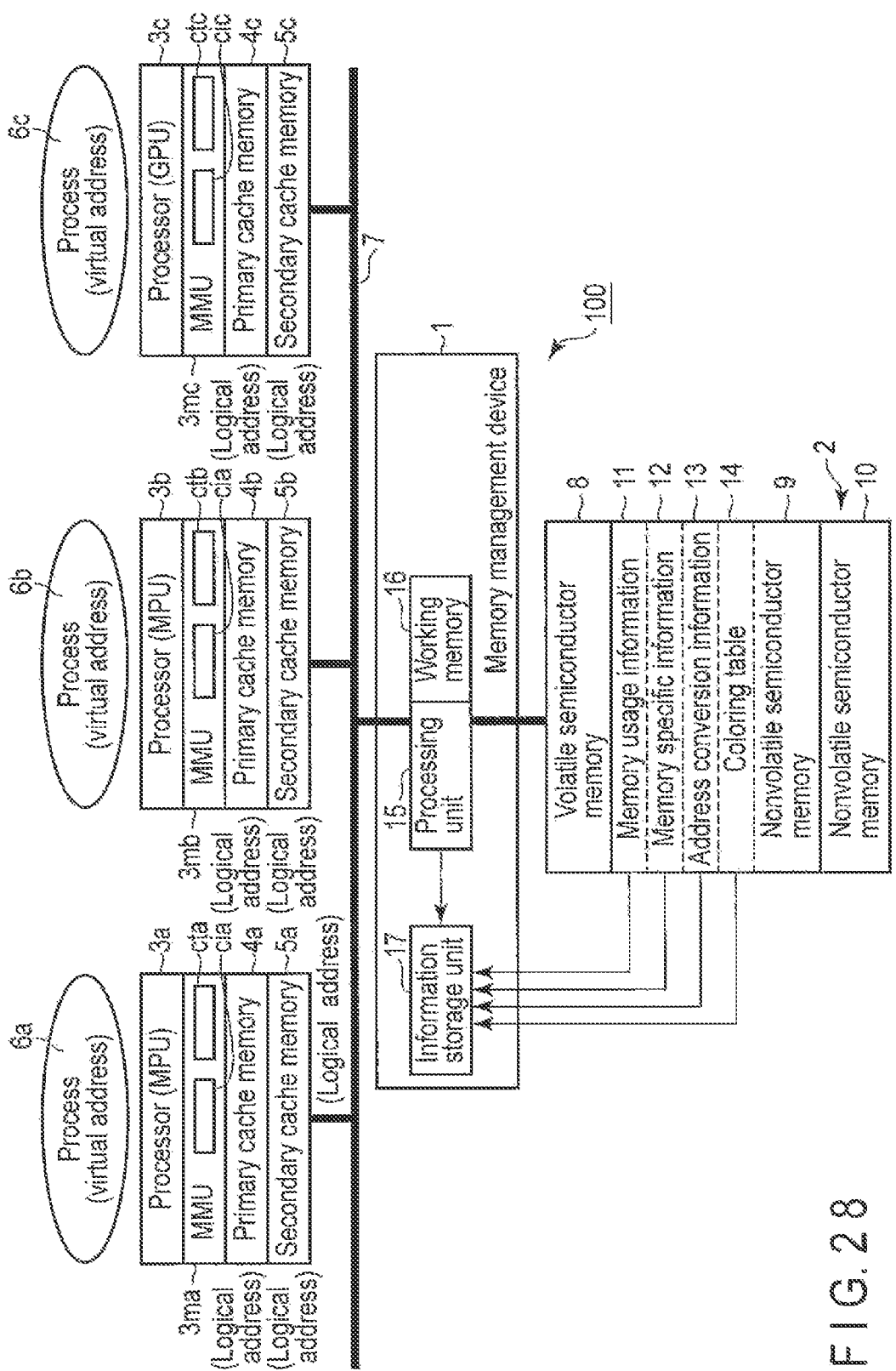
F I G. 28

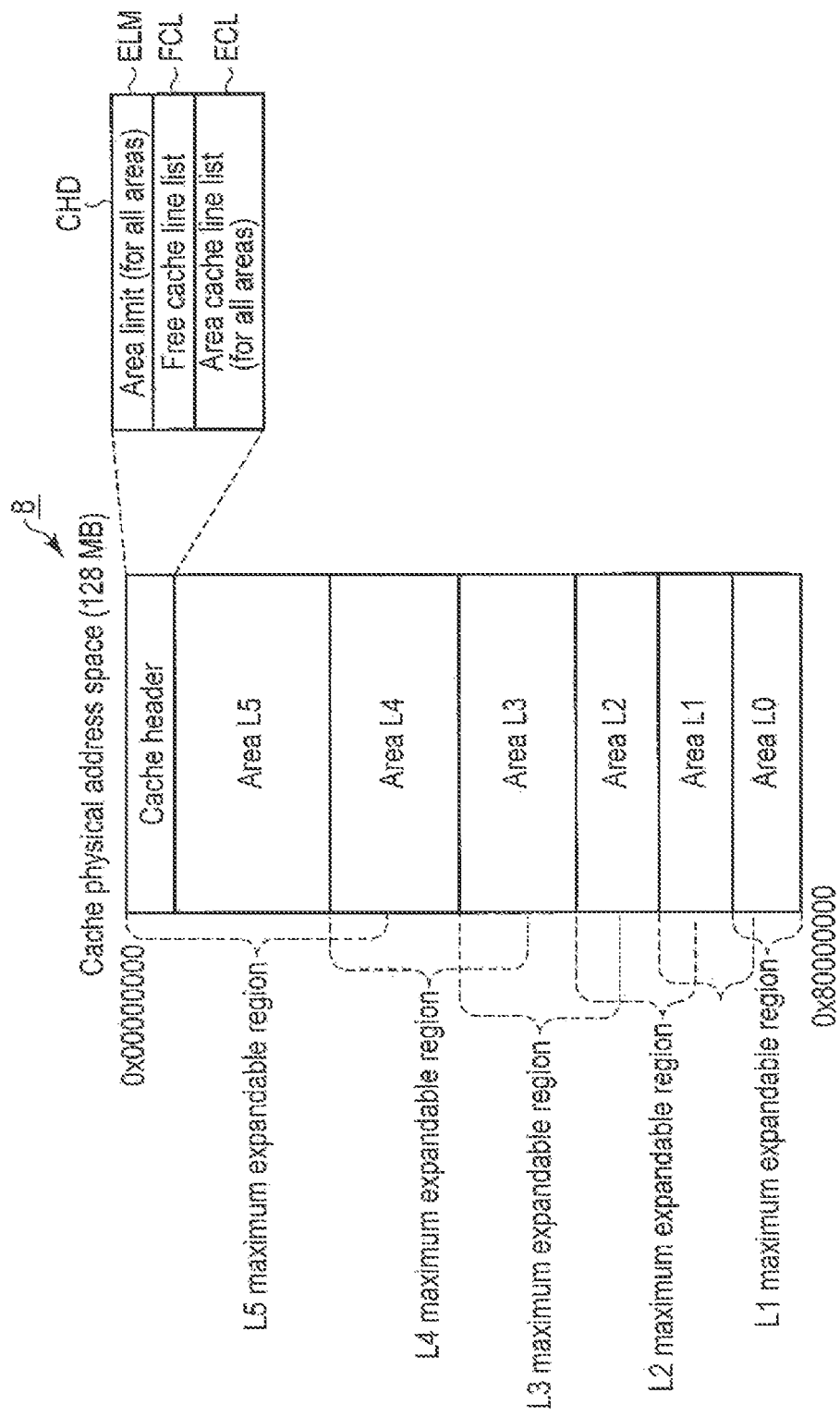
F I G. 30

(a) (Reading access prioritized)

| Data life | SR_color | DR_color | Area | CET |
|---|---|---|---|---|
| S | - | - | AreaL5 | |
| | 5 | High | AreaL5 | |
| | 4 | Intermediate | AreaL4 | |
| | | Low | AreaL3 | |
| L | 3 | High | AreaL3 | |
| | | Intermediate | AreaL4 | |
| | | Low | AreaL3 | |
| | 2 | High | AreaL2 | |
| | 1 | High | AreaL1 | |
| | | | AreaL0 | |

(b) (Writing access prioritized)

| Data life | SW_color | DW_color | Area | CET |
|---|---|---|---|---|
| S | - | - | AreaL5 | |
| | 5 | High | AreaL5 | |
| | 4 | Intermediate | AreaL4 | |
| | | Low | AreaL3 | |
| L | 3 | High | AreaL3 | |
| | | Intermediate | AreaL4 | |
| | | Low | AreaL3 | |
| | 2 | High | AreaL2 | |
| | 1 | High | AreaL1 | |
| | | | AreaL0 | |

F I G. 31

(a)

(Reading/writing access determination) CET

| Data life | SR_color+SW_color | Area |
|---|---|---|
| S | - | AreaL5 |
| L | 7 or more | AreaL5 |
| | 6 or more | AreaL4 |
| | | AreaL3 |
| | | AreaL3 |
| | 4 or more | AreaL4 |
| | | AreaL3 |
| | | AreaL2 |
| | 3 or more | AreaL1 |
| | 2 | AreaL0 |

(b)

(Reading/writing access determination : W=weighting factor; 0≤W≤1) CET

| Data life | SW_color*W+ SR_color*(1-W) | Area |
|---|---|---|
| S | - | AreaL5 |
| L | 7 or more | AreaL5 |
| | 6 or more | AreaL4 |
| | | AreaL3 |
| | | AreaL3 |
| | 4 or more | AreaL4 |
| | | AreaL3 |
| | | AreaL2 |
| | 3 or more | AreaL1 |
| | 2 | AreaL0 |

FIG. 32

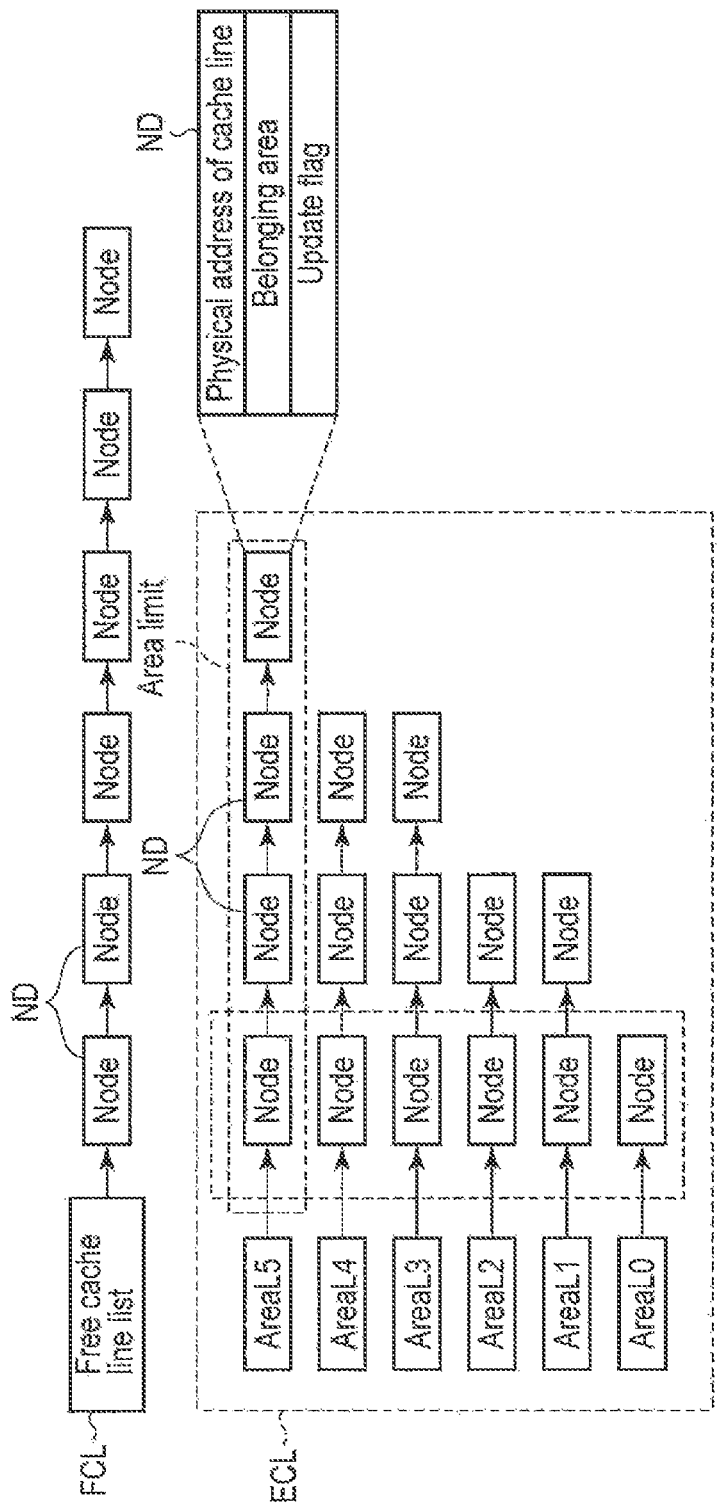
F I G. 33

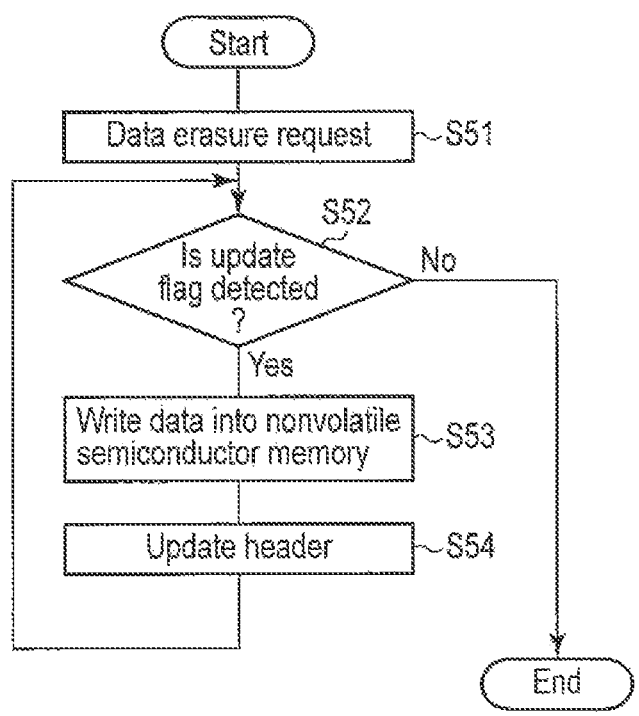
F I G. 35

| Value | Meaning |
|---|---|
| 0 | (Initial value is 0) Indicates that this logical address is not mapped to nonvolatile semiconductor memory or has been erased after being mapped |
| 1 | Indicates that this logical address is mapped at least to nonvolatile semiconductor memory |

Truth value of valid/invalid flag in data in nonvolatile semiconductor memory of address conversion information (second embodiment)

FIG. 36

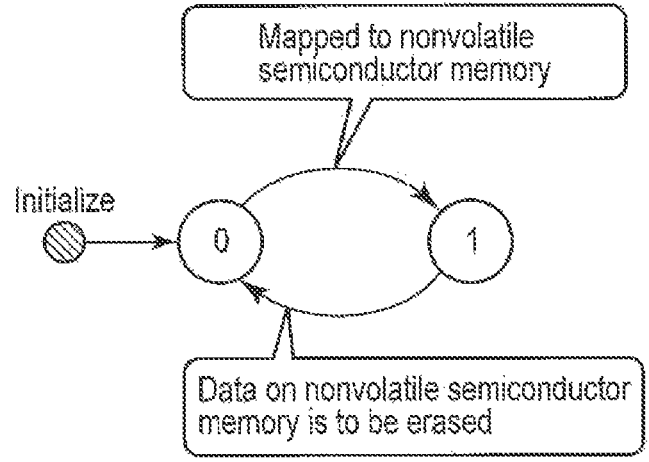

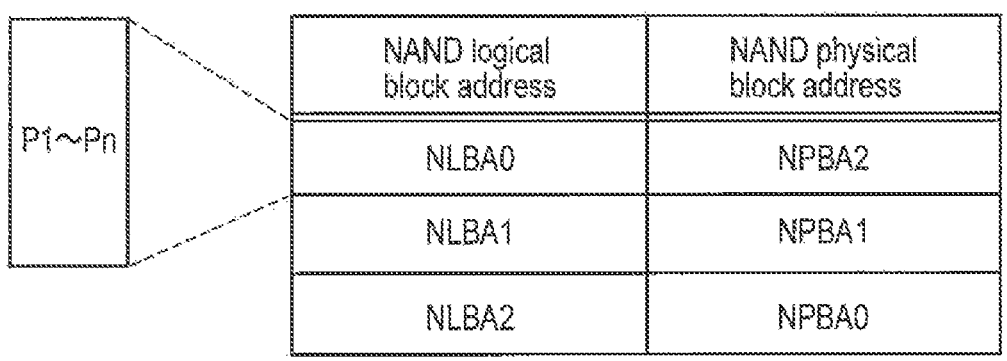
F I G. 47

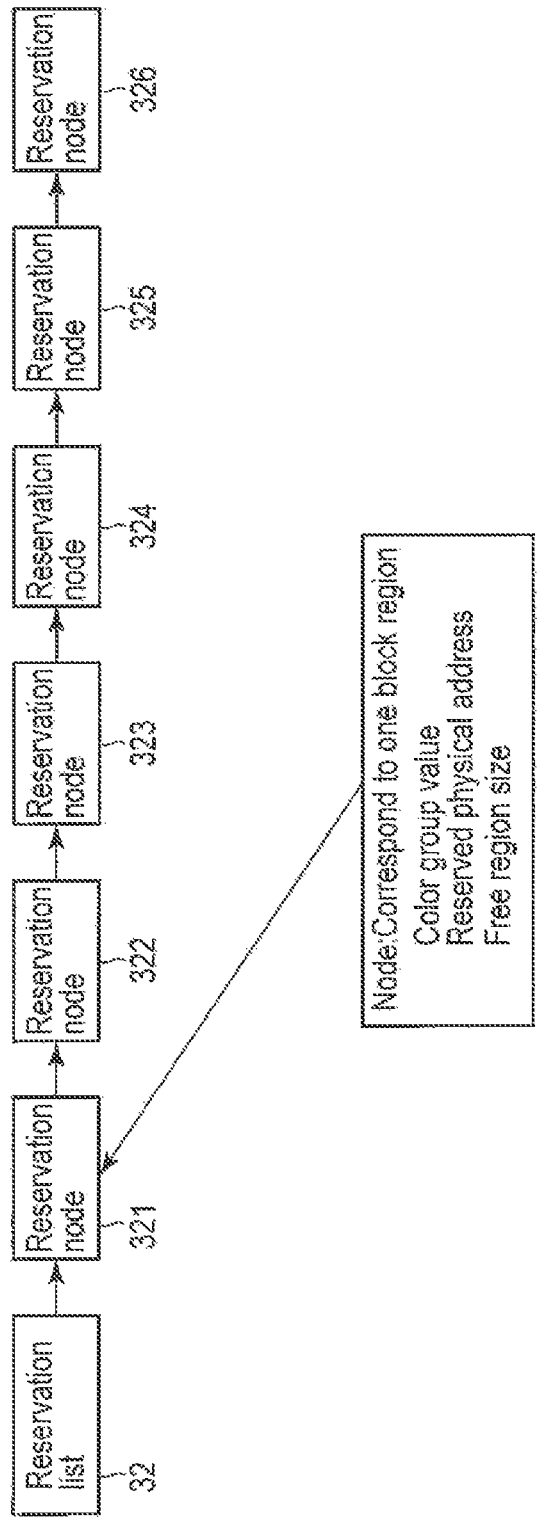
F I G. 48

State 1

| Logical address | Physical address of volatile semiconductor memory | Physical address of nonvolatile semiconductor memory (NAND logical address) | Valid /invalid |
|---|---|---|---|
| 0x0010_0000 | | | |
| | | | |
| | | | |
| | | | |
| | | | |

State 2

| Logical address | Physical address of volatile semiconductor memory | Physical address of nonvolatile semiconductor memory | Valid /invalid |
|---|---|---|---|
| 0x0010_0000 | | 0x0030_0000 | |
| | | | |
| | | | |
| | | | |
| | | | |

State 3

| Logical address | Physical address of volatile semiconductor memory | Physical address of nonvolatile semiconductor memory | Valid /invalid |
|---|---|---|---|
| 0x0010_0000 | | 0x0030_0000 | |
| 0x0030_0000 | | | |
| | | | |
| | | | |
| | | | |

State 4

| Logical address | Physical address of volatile semiconductor memory | Physical address of nonvolatile semiconductor memory | Valid /invalid |
|---|---|---|---|
| 0x0010_0000 | | 0x0030_0000 | |
| 0x0030_0000 | | 0x0040_0000 | |
| | | | |
| | | | |
| | | | |

F I G. 5 0

| Index (generated based on logical address) | Data specific access frequency information |
|---|---|
| | |
| | |
| | |
| | |
| | |
| | |

~14

| Coloring information | | | | | |
|---|---|---|---|---|---|
| | Static color information | | | Dynamic color information | |
| Pre-reading hint information "0"/"1" | Static writing frequency (SW_color) | Static reading frequency (SR_color) | Data life (SL_color) | Data generation time (ST_color) | Writing count (DWC_color) | Reading count (DRC_color) |

PRH

F I G. 53

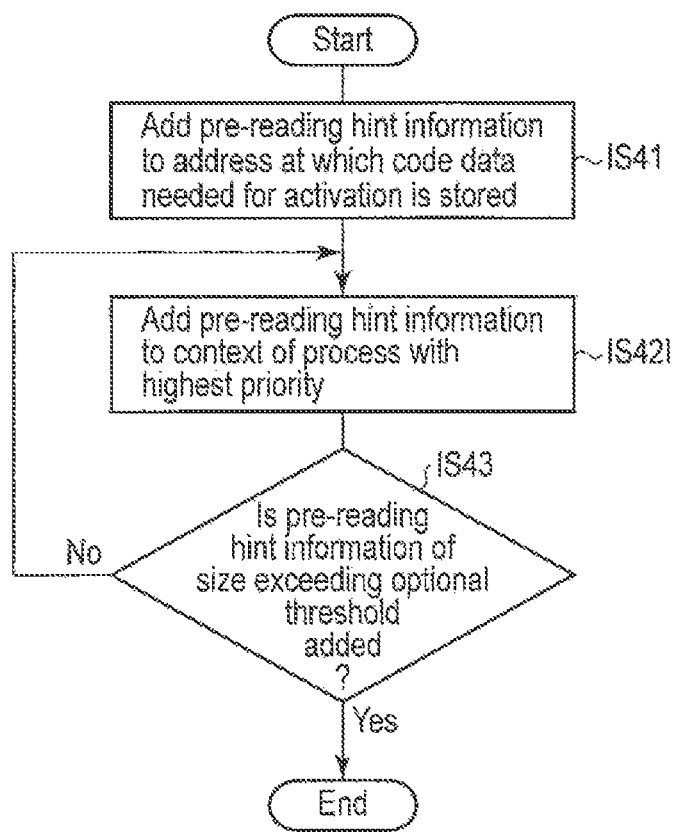
F I G. 54

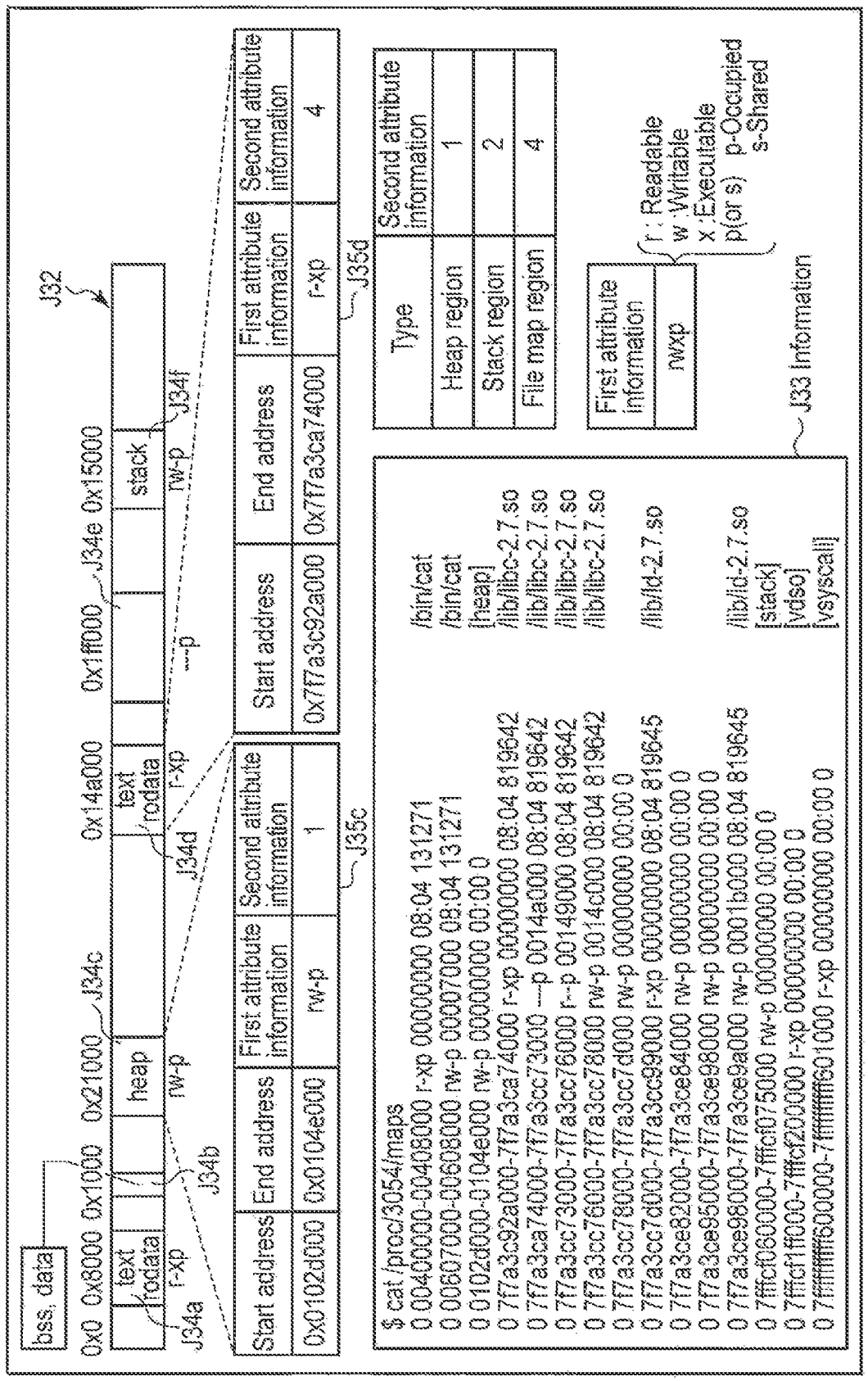
F I G. 56

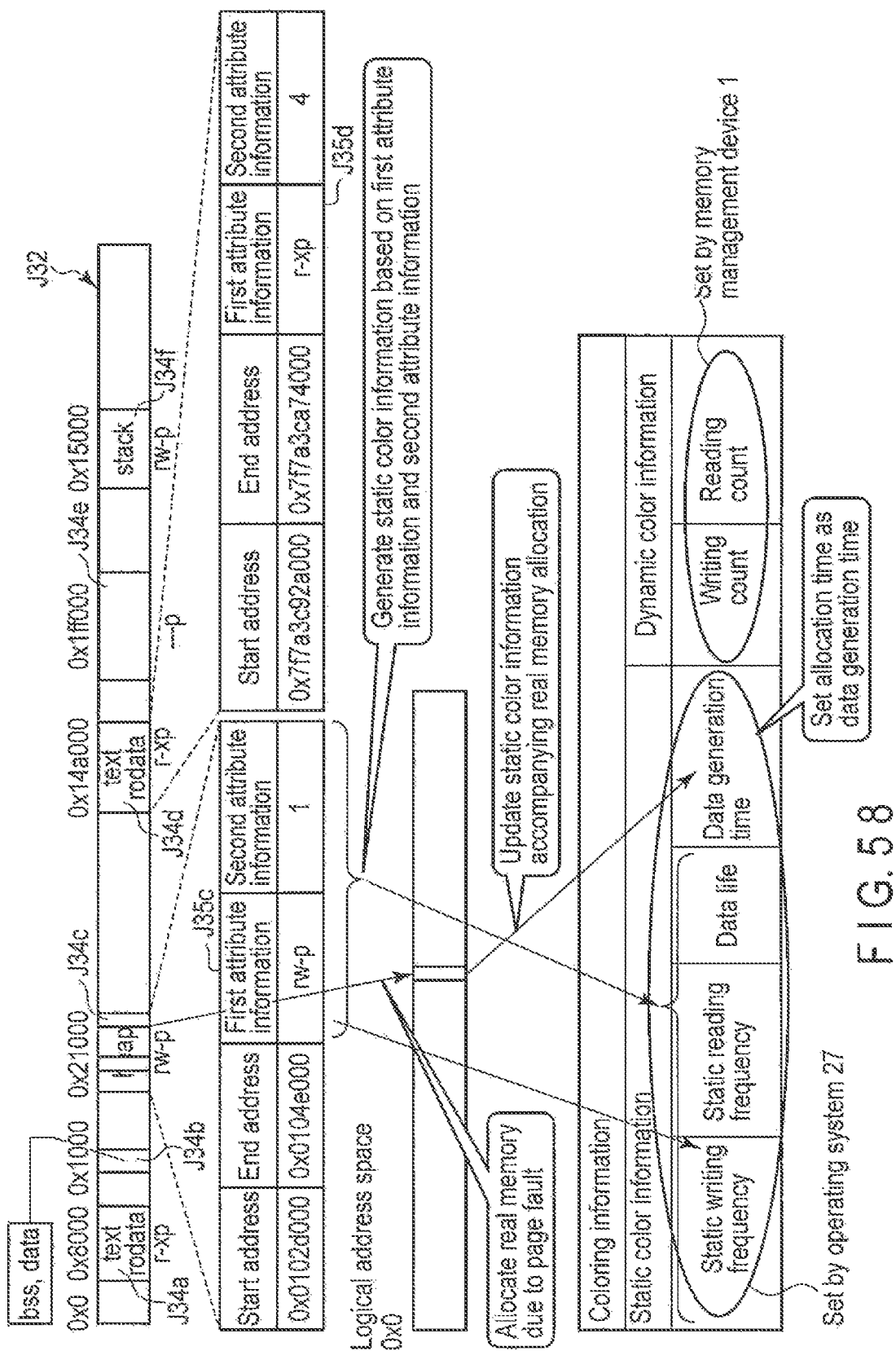
F I G. 58

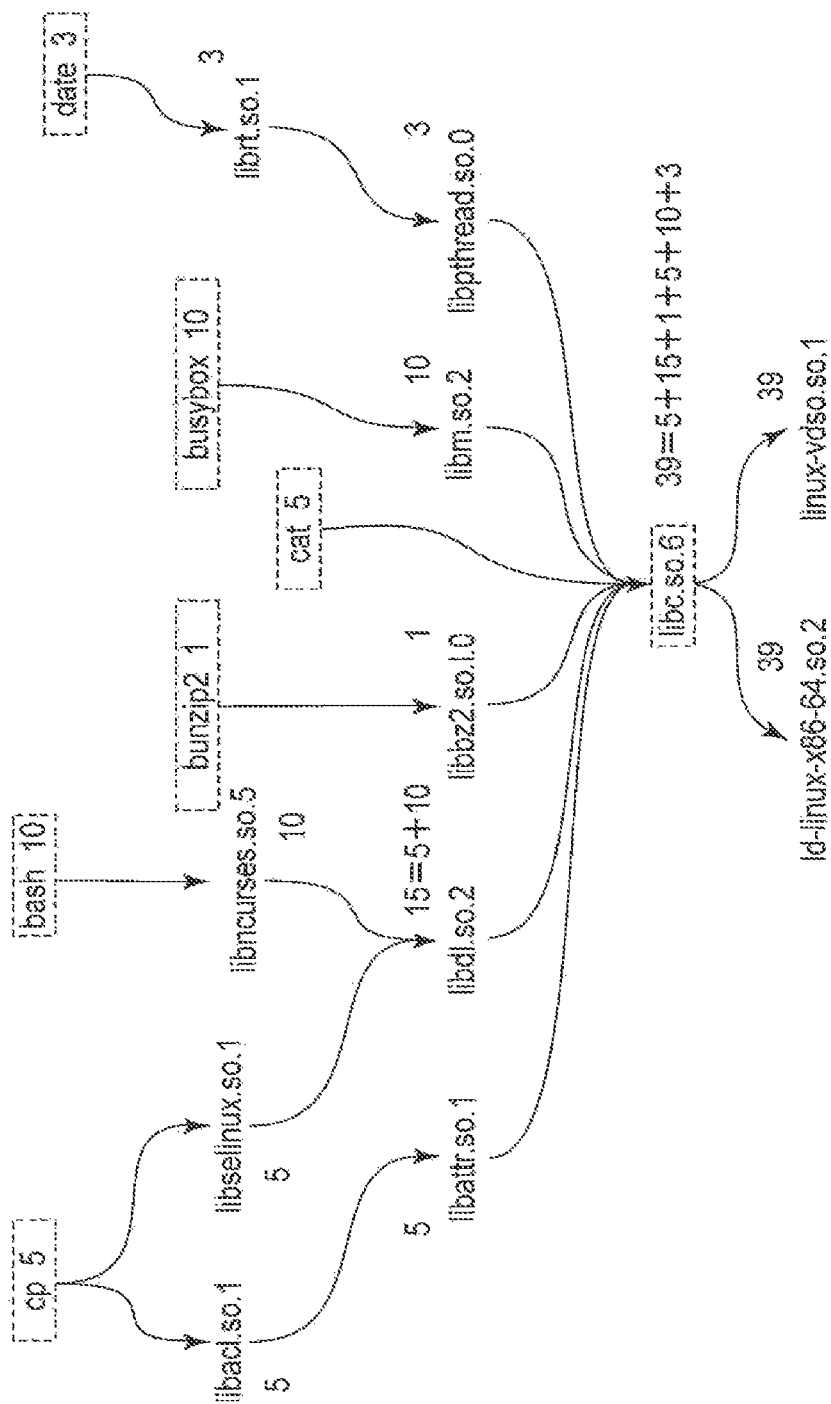
F I G. 59

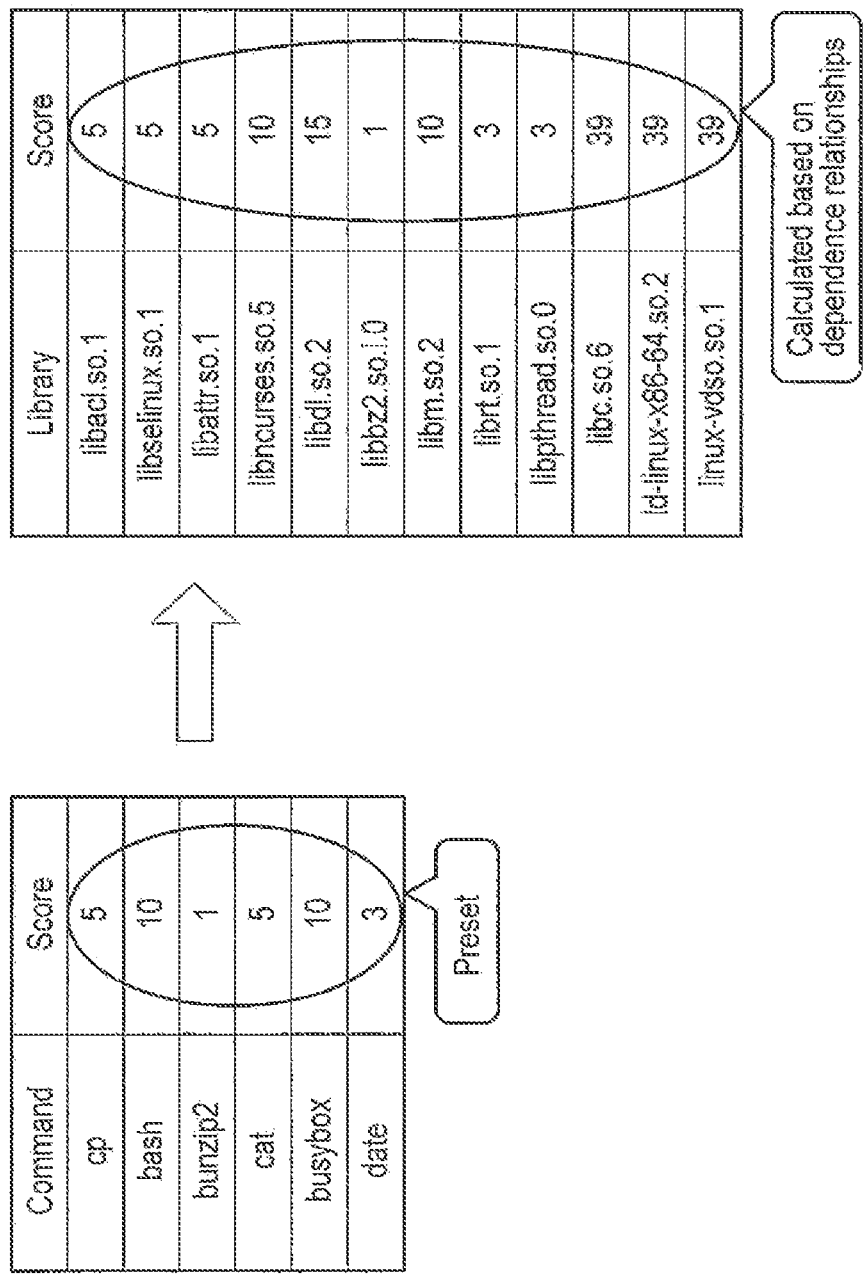
F I G. 60

|  | Total | cp | bash | bunzip2 | cat | busybox | date |
|---|---|---|---|---|---|---|---|
|  |  |  |  |  |  |  | Preset |
|  |  | 5 | 10 | 1 | 5 | 10 | 3 |
| libacl.so.1 | 5 | 5 |  |  |  |  |  |
| libselinux.so.1 | 5 | 5 |  |  |  |  |  |
| libattr.so | 5 | 5 |  |  |  |  |  |
| libncurses.so.5 | 10 |  | 10 |  |  |  |  |
| libdl.so.2 | 15 | 5 | 10 |  |  |  |  |
| libbz2.so.1.0 | 1 |  |  | 1 |  |  |  |
| libm.so.2 | 10 |  |  |  |  | 10 |  |
| librt.so.1 | 3 |  |  |  |  |  | 3 |
| libpthread.so.0 | 3 |  |  |  |  |  | 3 |
| libc.so.6 | 34 | 5 | 10 | 1 | 5 | 10 | 3 |
| ld-linux-x86-64.so.2 | 34 | 5 | 10 | 1 | 5 | 10 | 3 |
| linux-vdso.so.1 | 34 | 5 | 10 | 1 | 5 | 10 | 3 |

Calculated based on dependence relationships

Total = Σ (Score of dependent commands)

F I G. 61

```
$ egrep "gfp_allowed_mask|nr\node_ids|nr_online_nodes
|page_group_by_mobility_disable|oom_killer_disabled|totalram_pages|totalreserve_
pages" mm/*c | egrep read_mostly
mm/page_alloc.c:unsigned long totalram_pages __read_mostly;
mm/page_alloc.c:unsigned long totalreserve_pages __read_mostly;
mm/page_alloc.c:gfp_t gfp_allowed_mask __read_mostly = GFP_BOOT_MASK;
mm/page_alloc.c:int nr_online_nodes __read_mostly = 1;
mm/page_alloc.c:int page_group_by_mobility_disabled __read_mostly;
mm/page_alloc.c:bool oom_killer_disabled __read_mostly;
```

 Brought together in data.read_mostly section

```
ffffffff817b2c10 D gfp_allowed_mask
ffffffff817b2c14 D nr_nodes_ids
ffffffff817b2c18 D nr_online_nodes
ffffffff817b2c1c D page_group_by_mobility_disabled
ffffffff817b2c20 D oom_killer_disabled
ffffffff817b2c28 D totalram_pages
ffffffff817b2c30 D totalreserve_pages
ffffffff817b2c38 D highest_memmap_pfn
ffffffff817b2c40 D zone_reclaim_mode
```
Virtual address      Symbol

FIG. 63

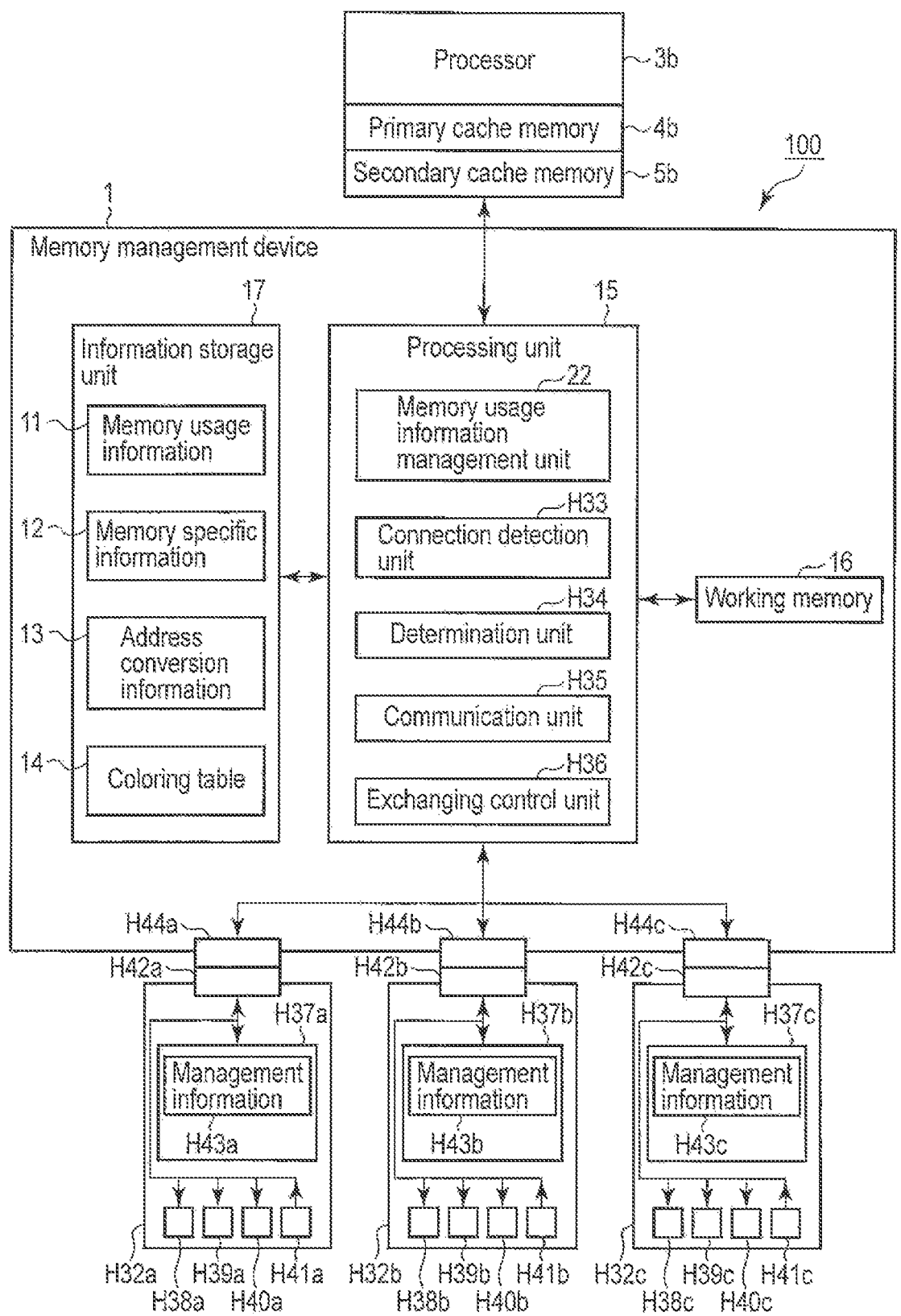
F I G. 66

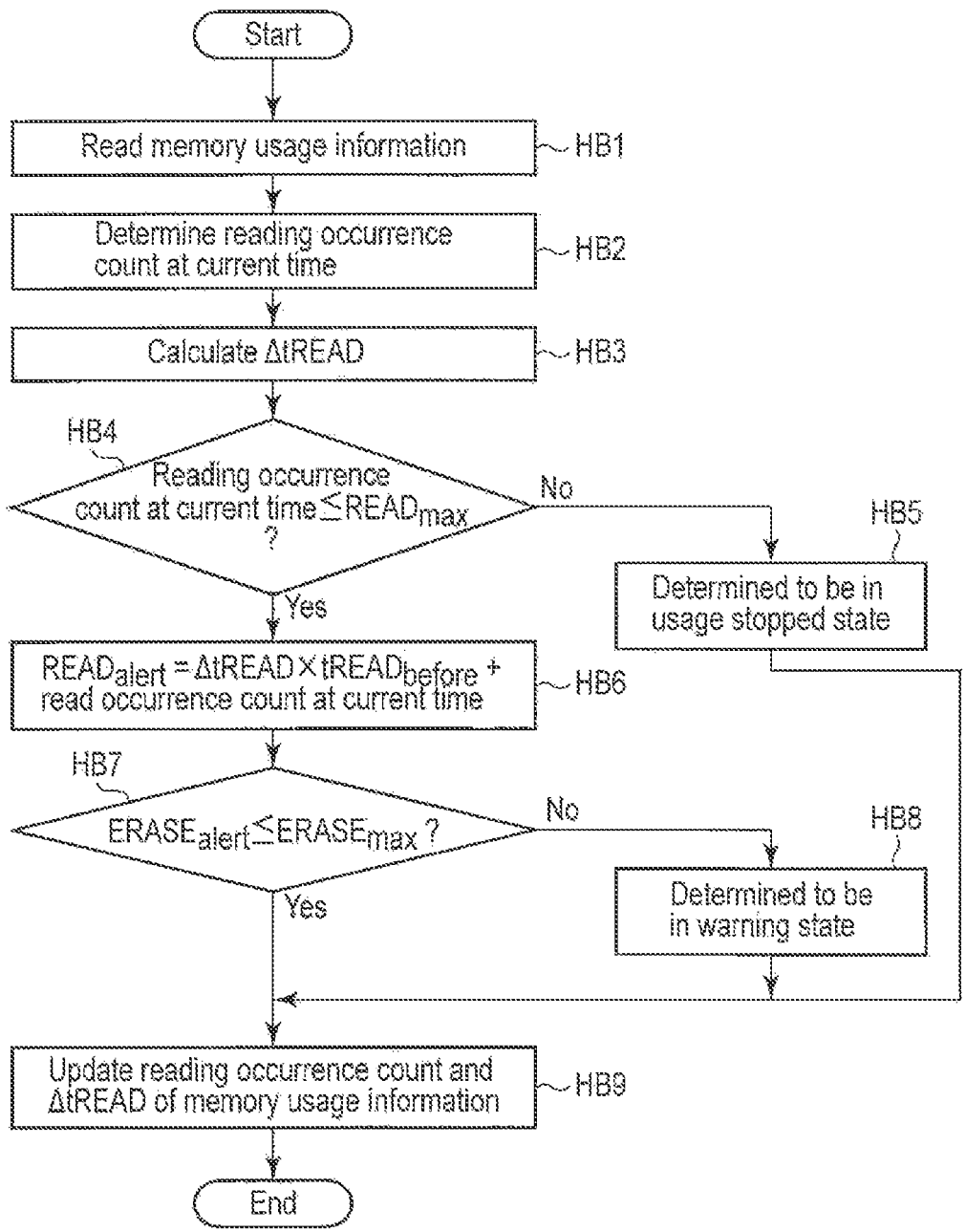
F I G. 71

| Erasure count | Reading occurrence count |
|---|---|
| $\Delta tERASE$ | $\Delta tREAD$ |
| $ERASE_{max}$ | $READ_{max}$ |
| $tERASE_{before}$ | $tREAD_{before}$ |
| Erasure start time | Read start time |

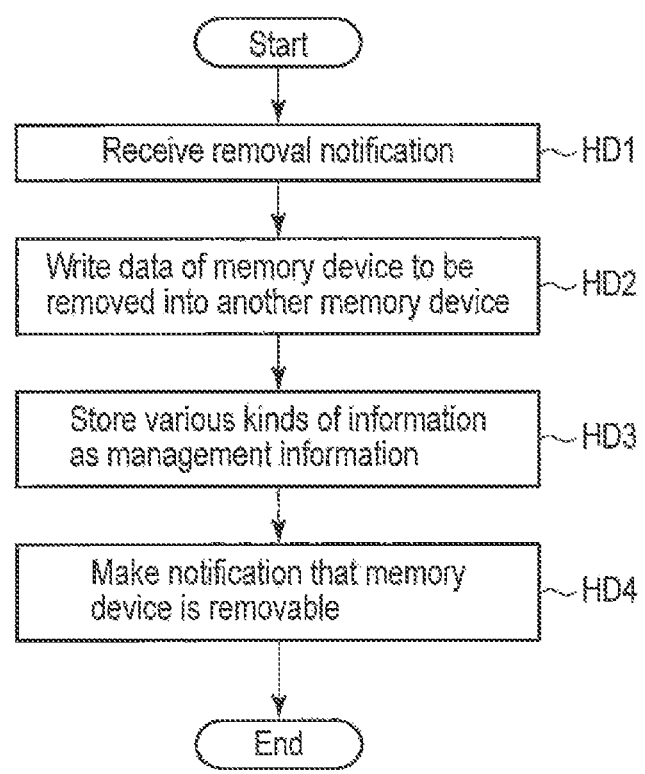
F I G. 74

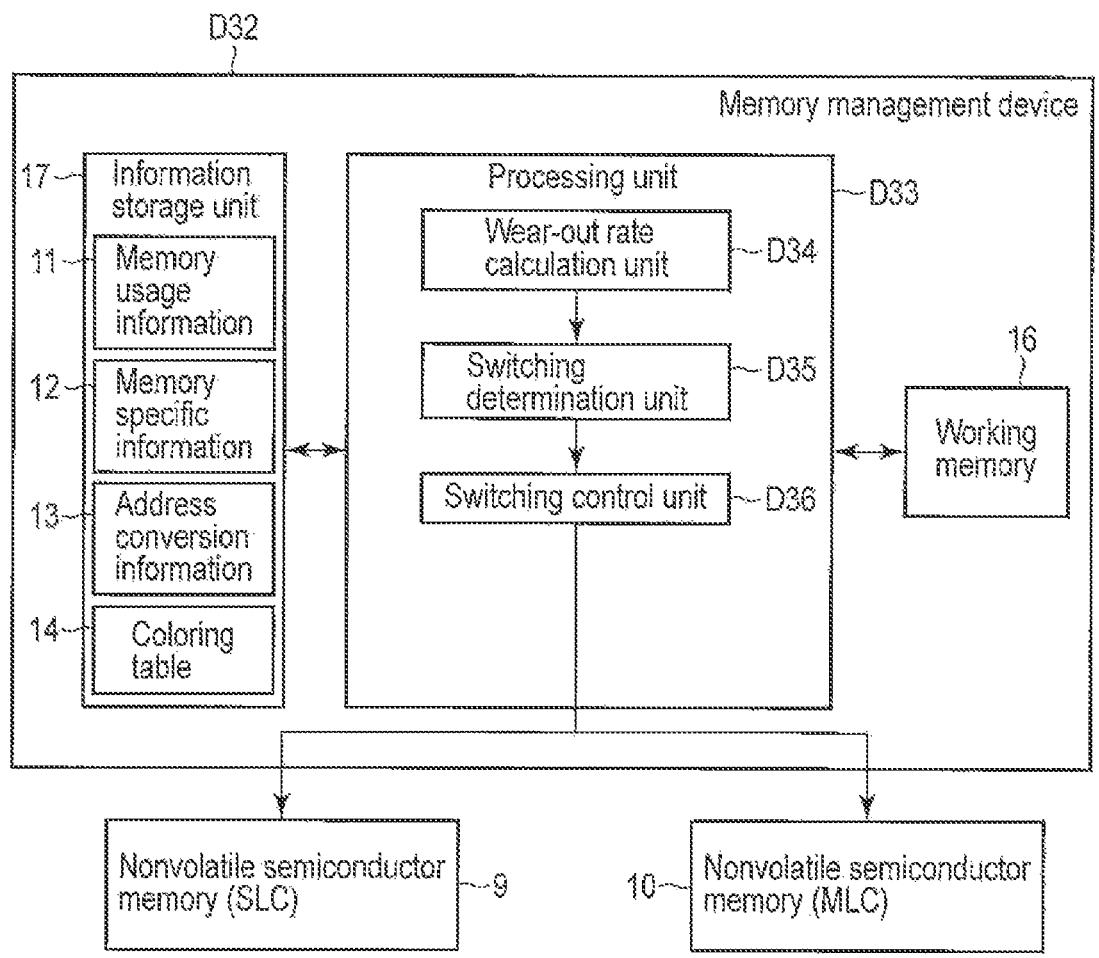
F I G. 7 8

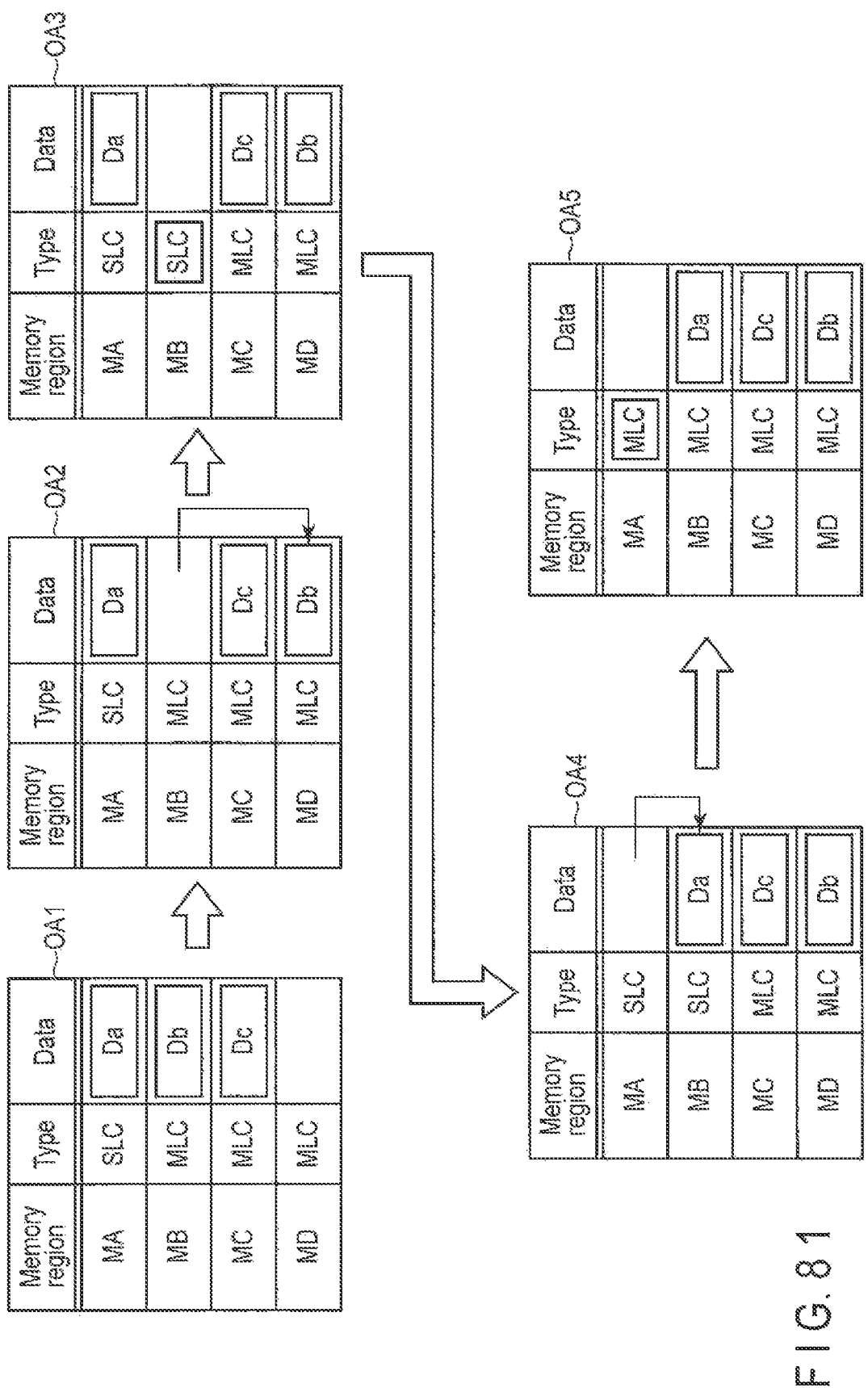
F I G. 81

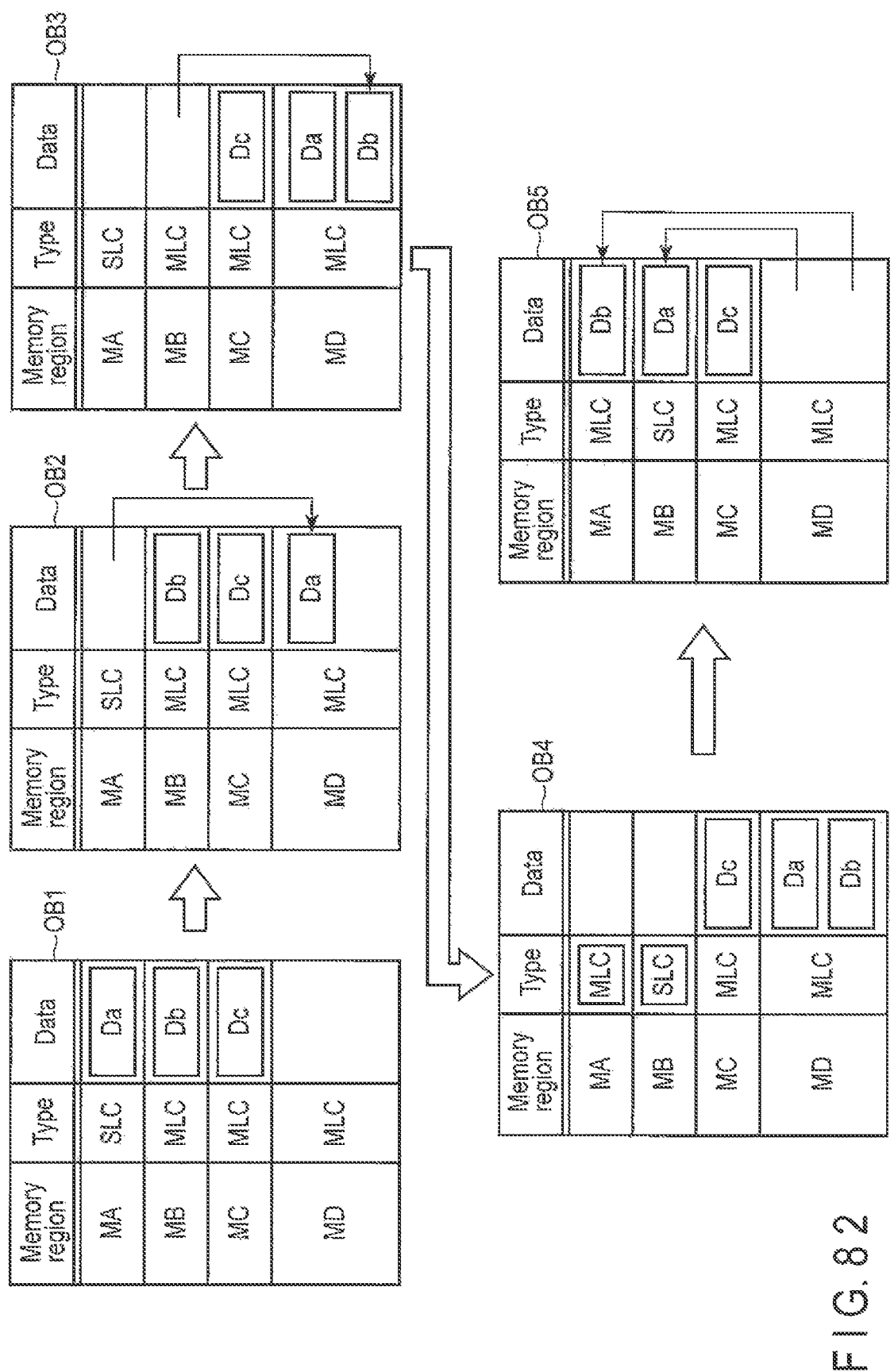
F I G. 82

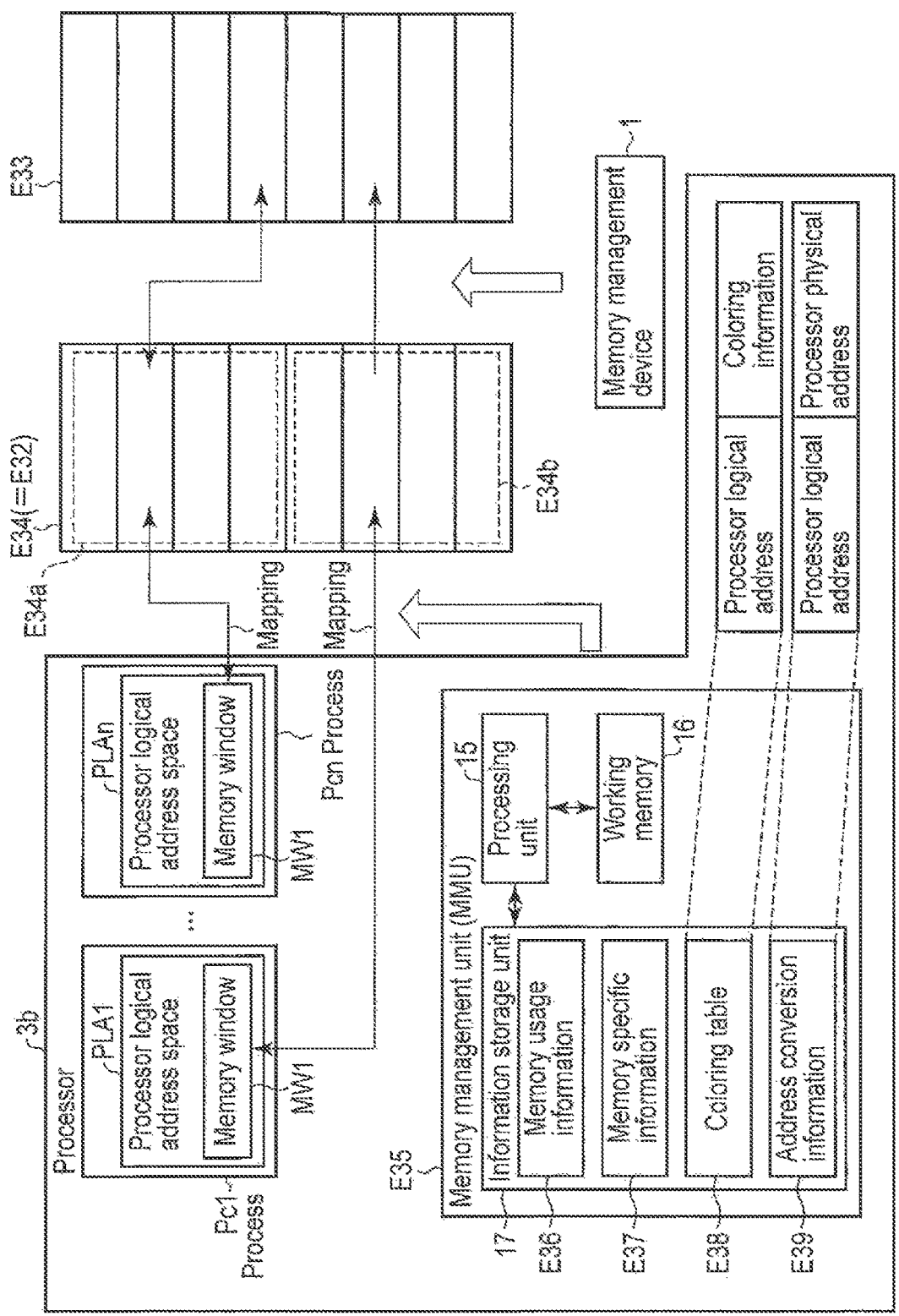
F I G. 83

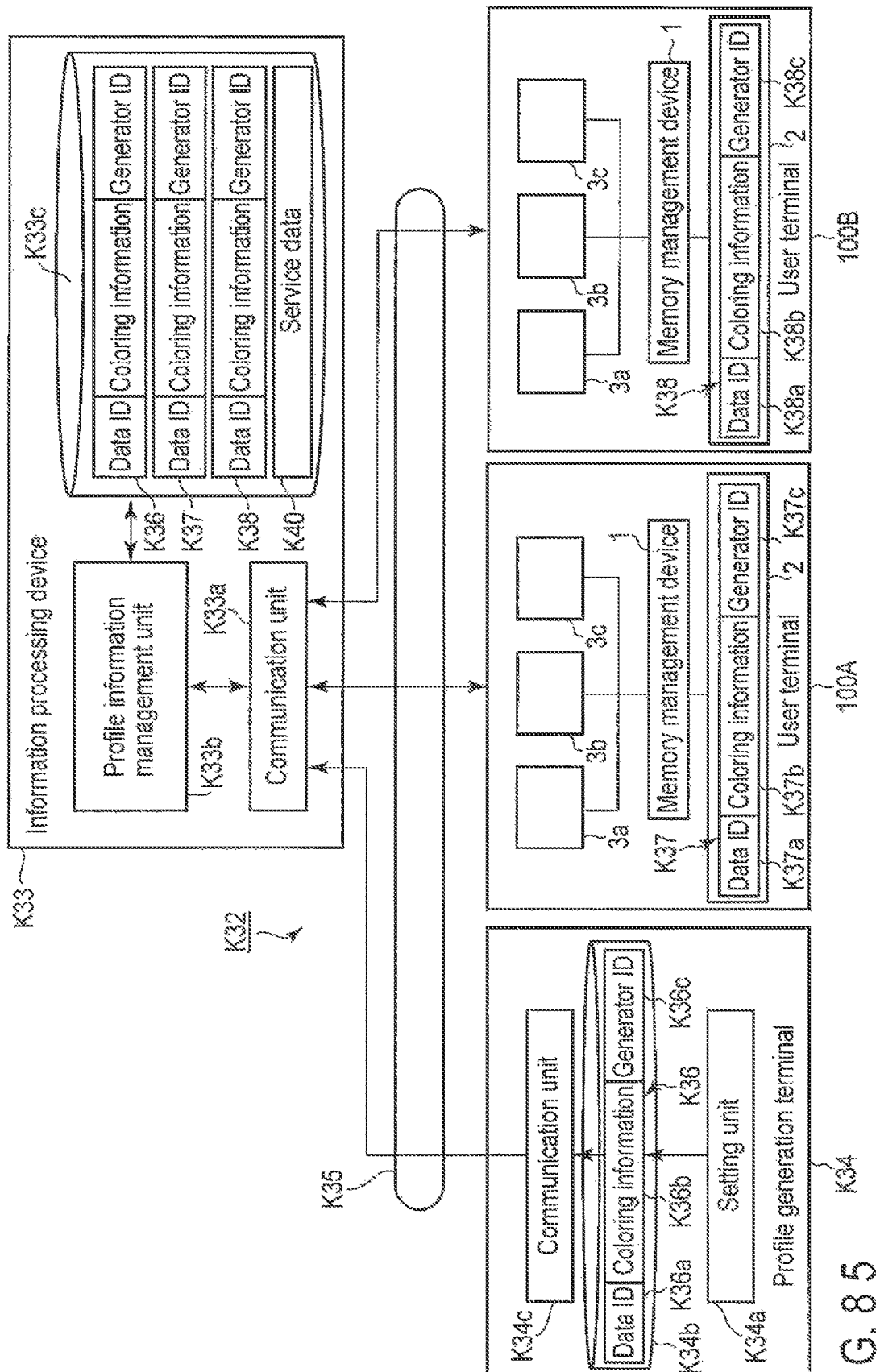
F I G. 85

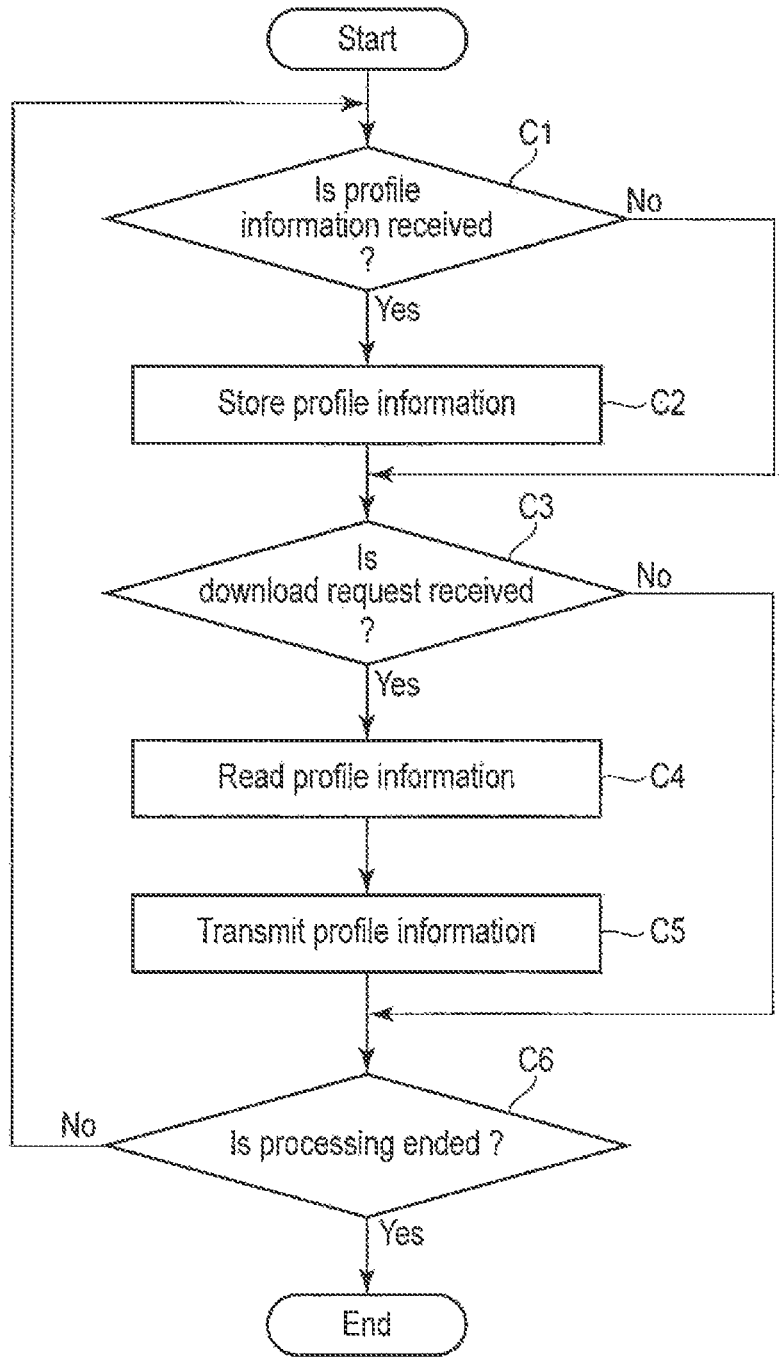
F I G. 86

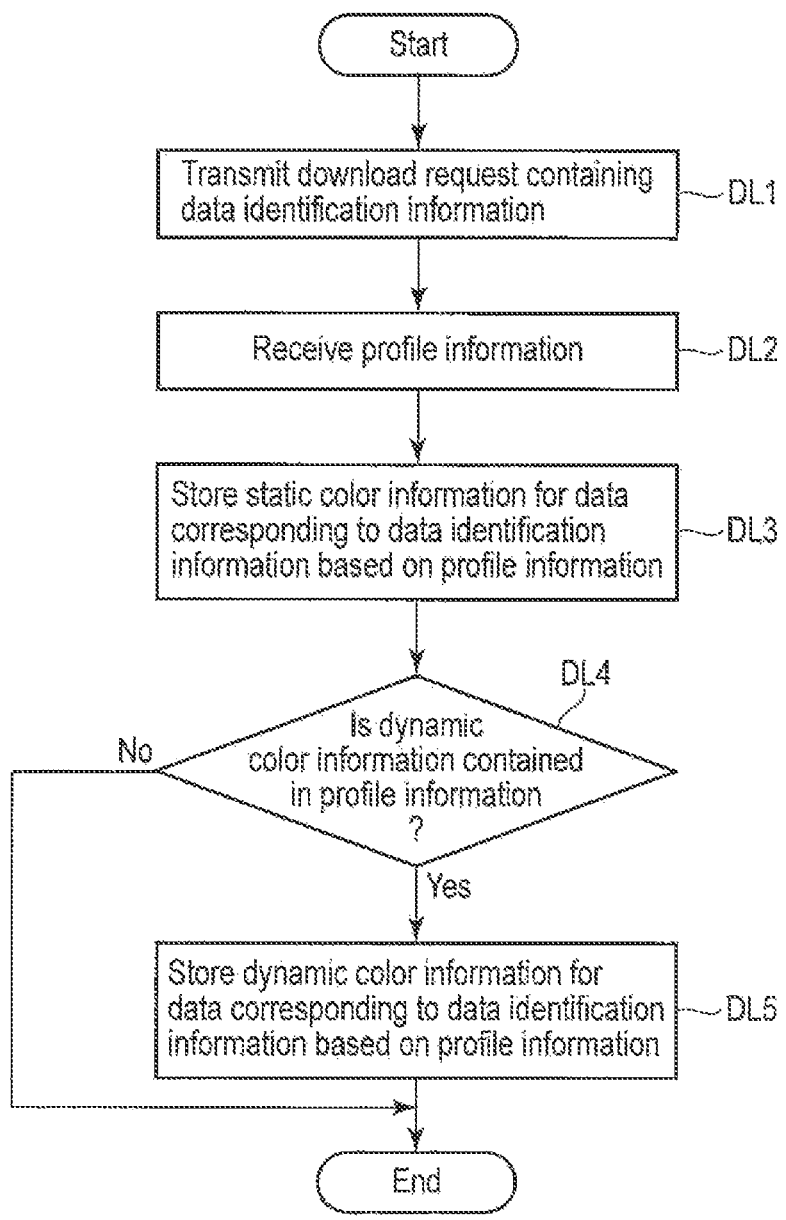
F I G. 88

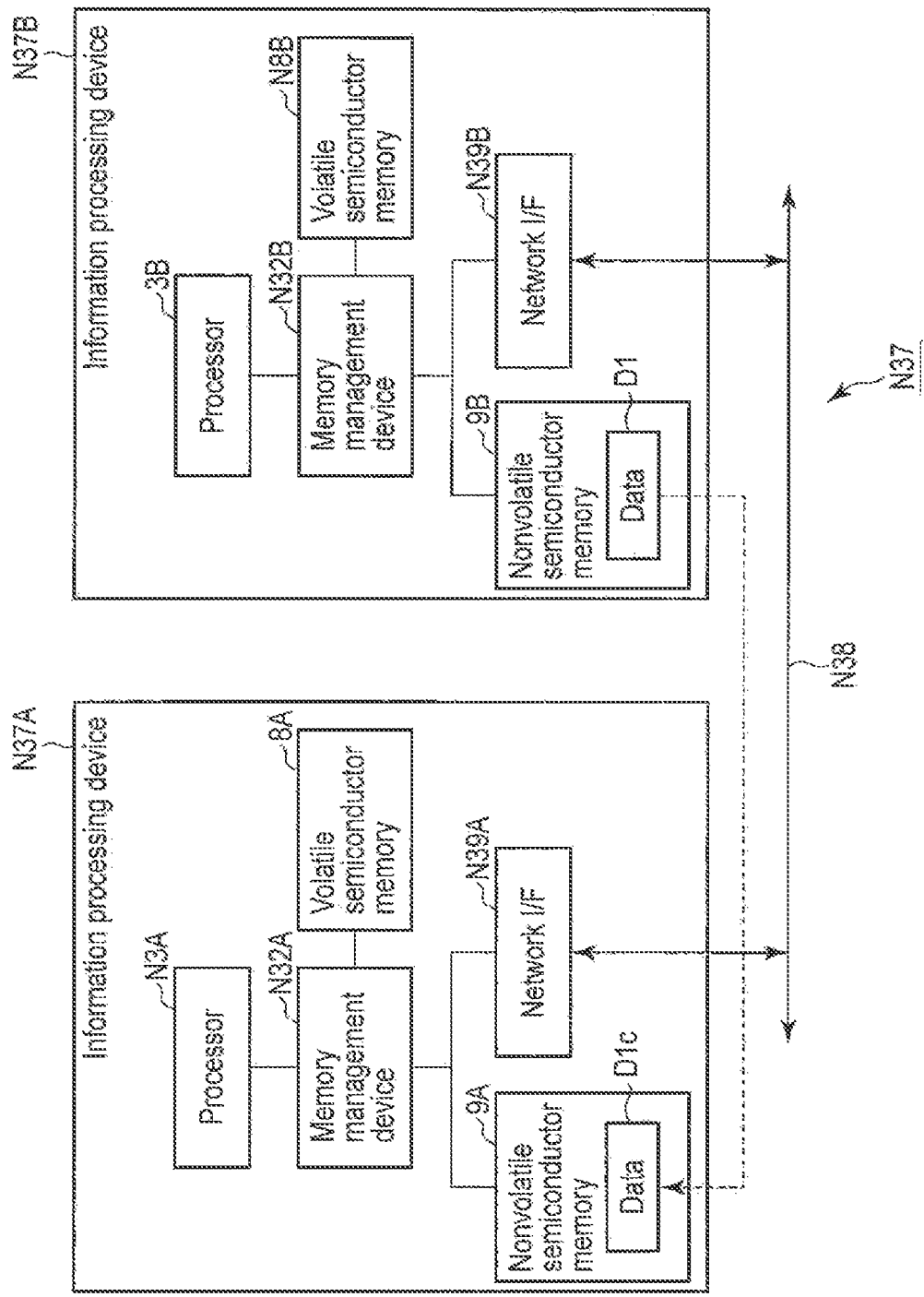
F I G. 89

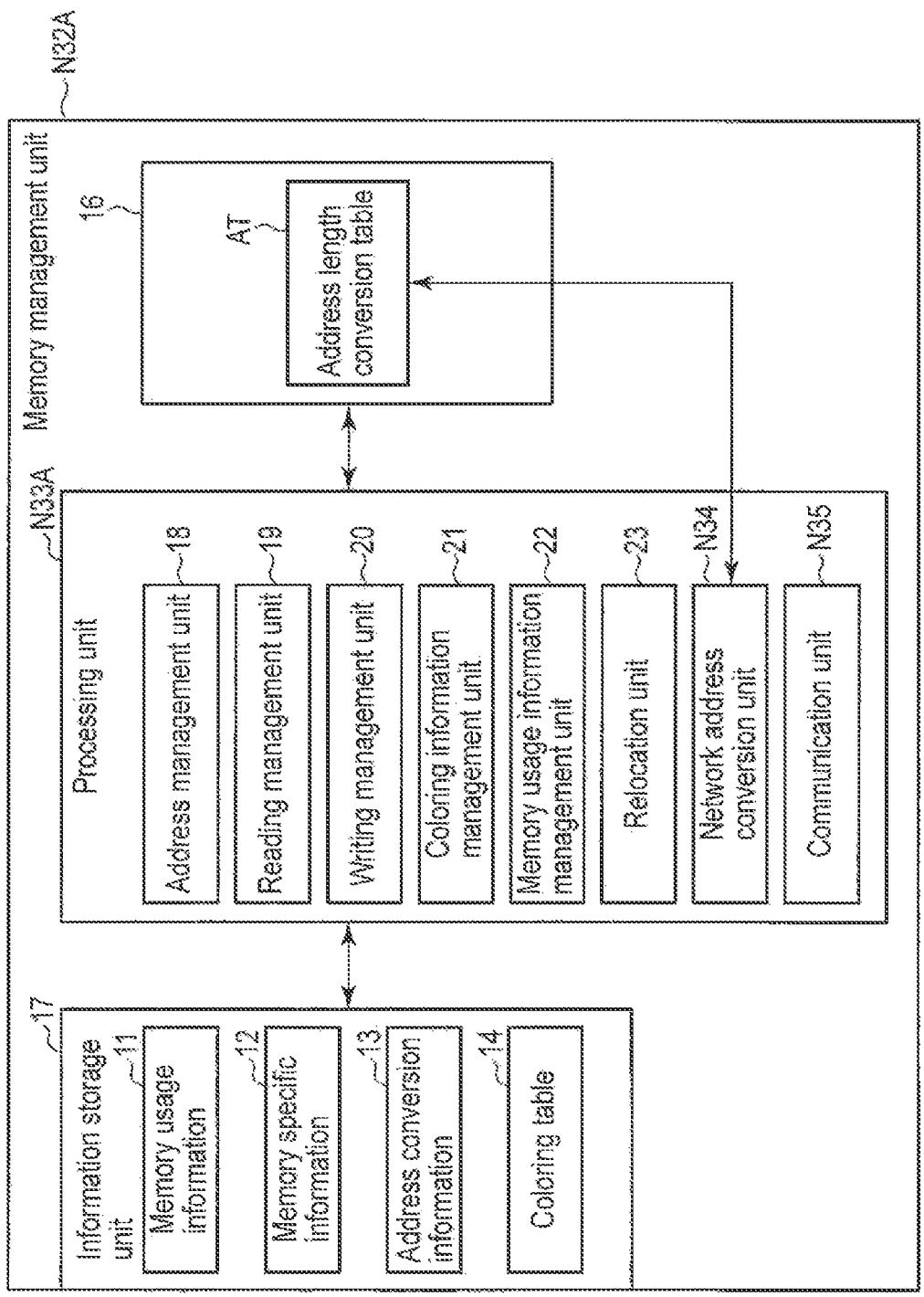
F I G. 90

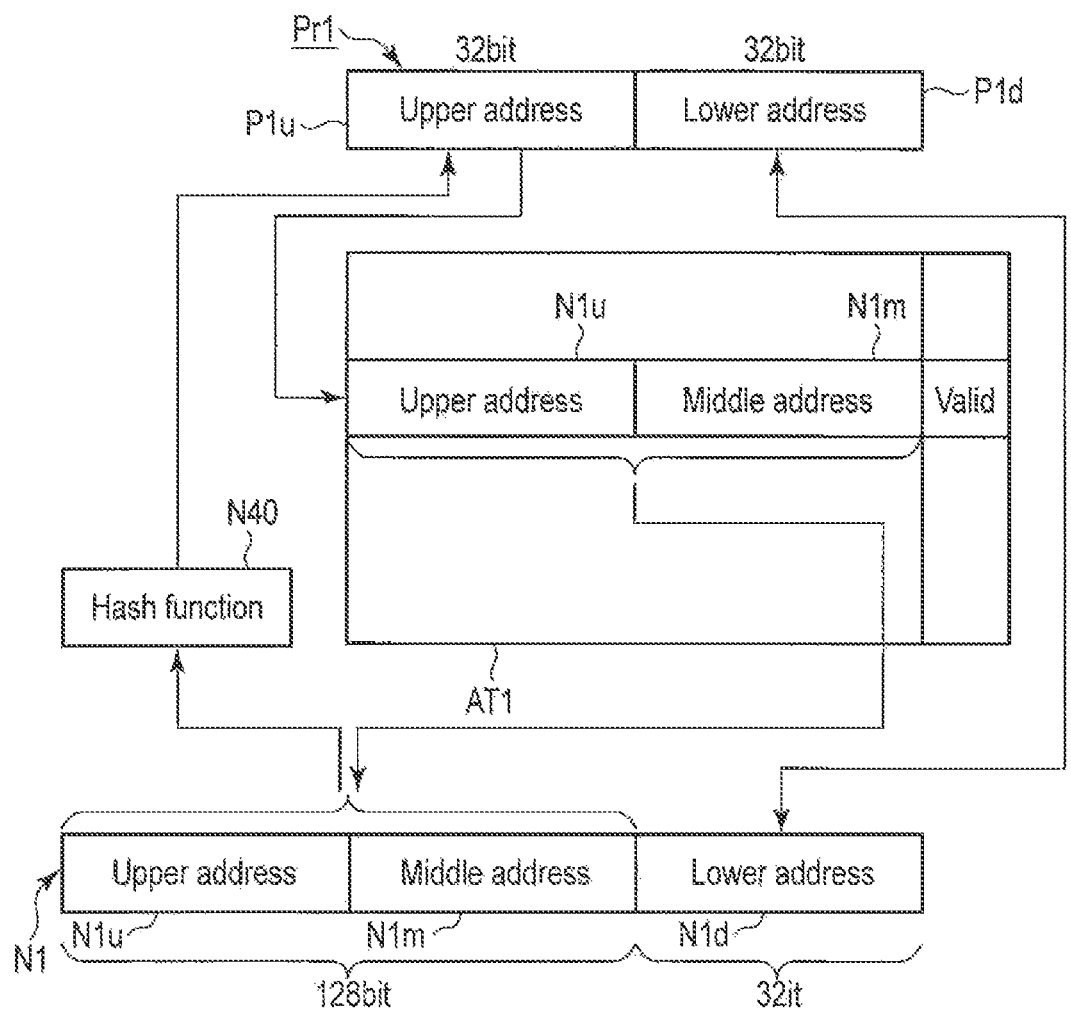
F I G. 91

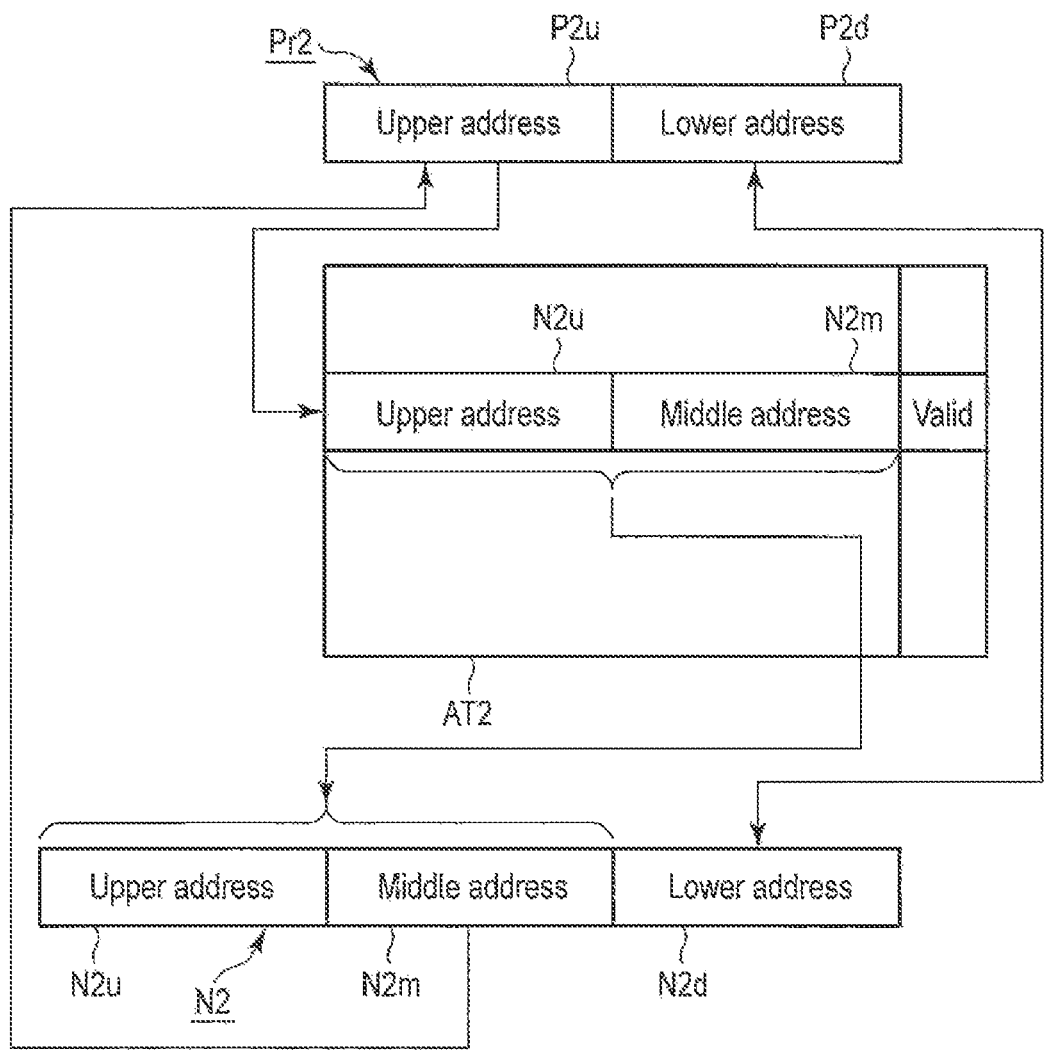
F I G. 92

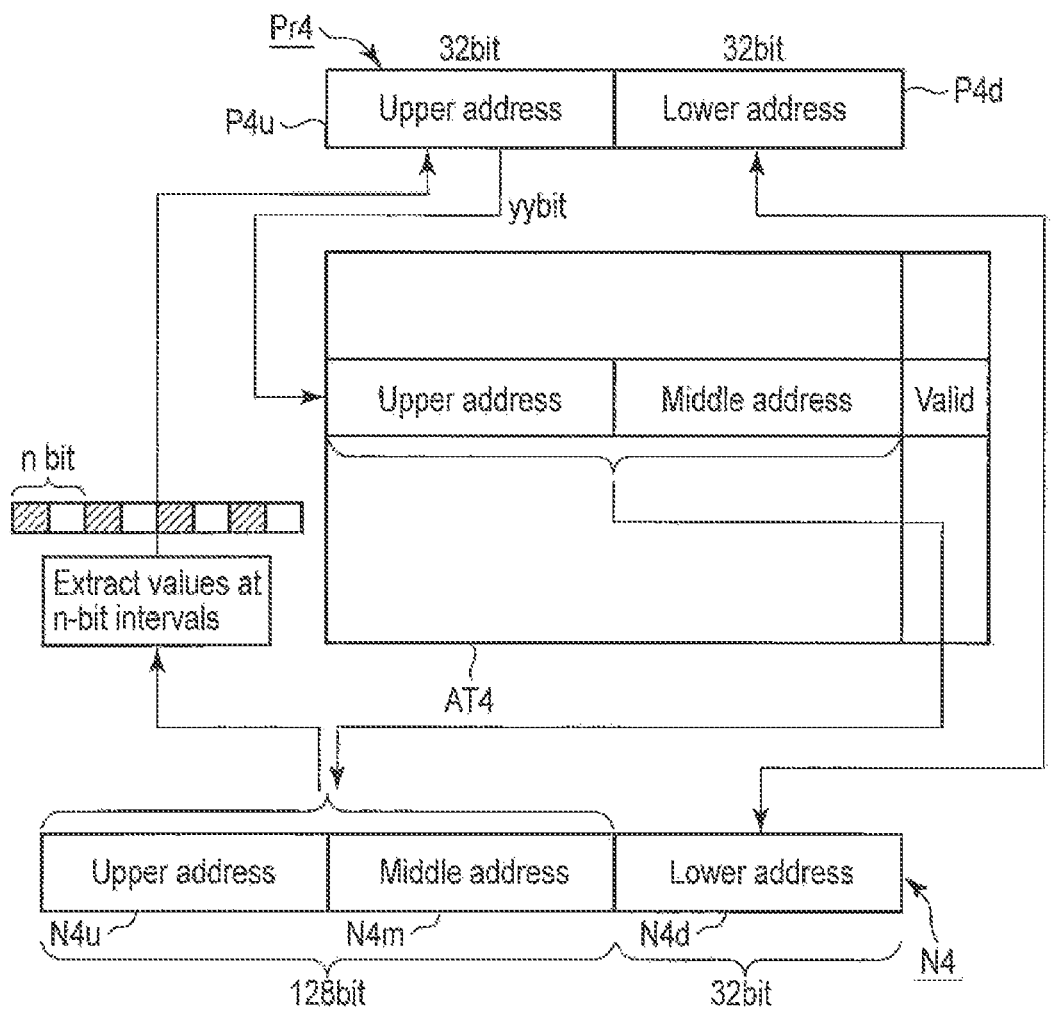
F I G. 94

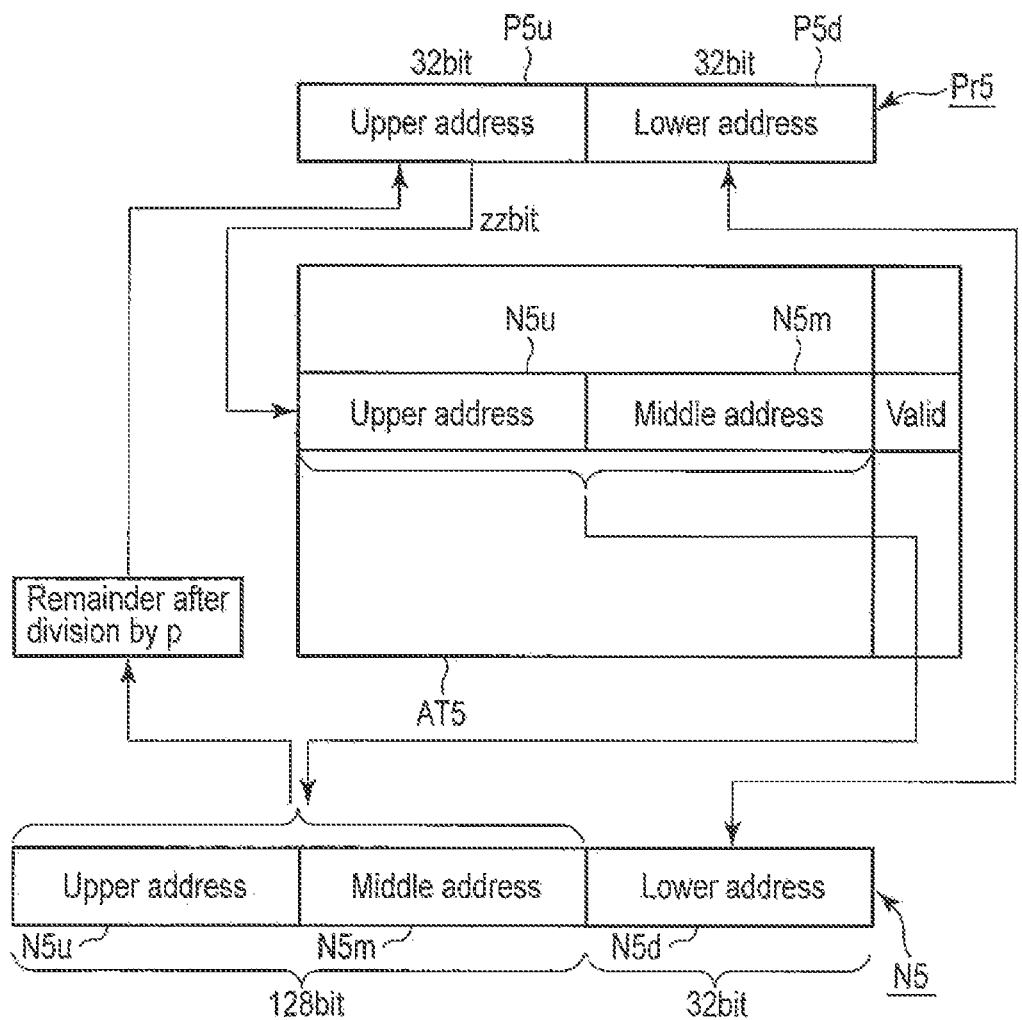
F I G. 9 5

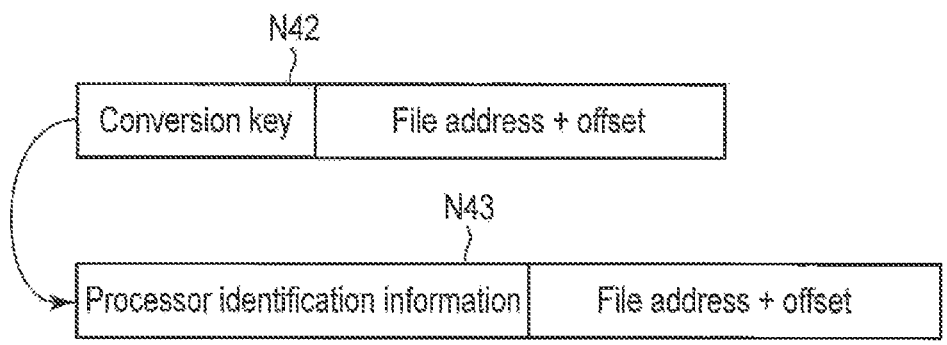
F I G. 97
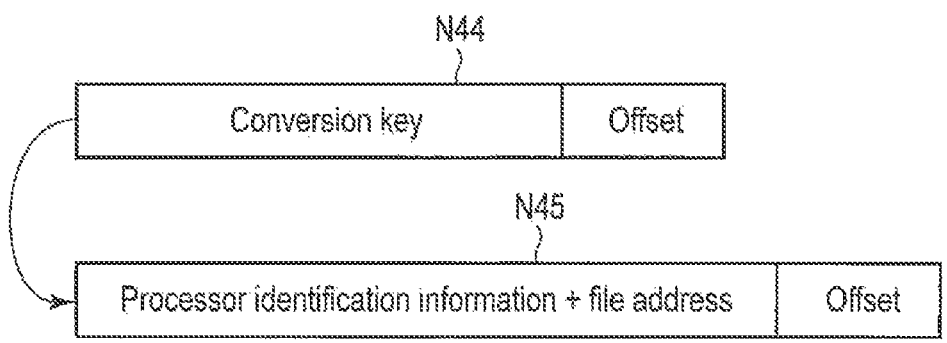
F I G. 98
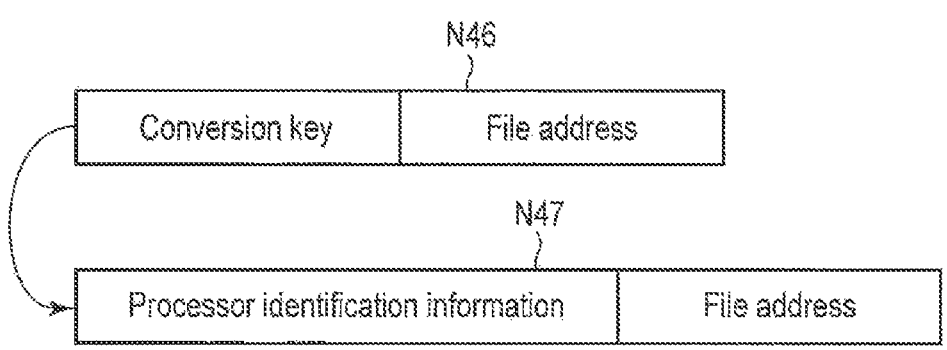
F I G. 99

- Assume that 1 MB is recorded per second
- 4 GB per hour
- 50 GB per day (daytime)
- 15 TB per year
- 750 TB to 1 pB in 50 years (lifetime)
- 1028 for 10 billion people (worldwide)
- On the order of $(2^3)^{28}$
- On the order of $2^{84}$
- With 84 bits, any information is accessible
- 128 bits correspond to all above $2^{44}$ generations (including people who will newly be born)
- 96 (64+32) bits correspond to $2^{12}$ generations

F I G. 1 0 0

MEMORY MANAGEMENT DEVICE PREDICTING AN ERASE COUNT

CROSS REFERENCE TO RELATED APPLICATIONS

This application is a Continuation Application of U.S. application Ser. No. 13/351,582 filed. Jan. 17, 2012, which is a Continuation Application of PCT Application No. PCT/JP2010/053817, filed Mar. 8, 2010 and based upon and claiming the benefit of priority from prior Japanese Patent Applications No. 2009-169:371, filed Jul. 17, 2009; No. 2010-048328, filed Mar. 4, 2010; No. 2010-048329, filed Mar. 4, 2010; No. 2010-048331, filed Mar. 4, 2010; No. 2010-048332, filed Mar. 4, 2010; No. 2010-048333, filed Mar. 4, 2010; No. 2010-048334, filed Mar. 4, 2010; No. 2010-048335, filed Mar. 4, 2010; No. 2010-048337, filed. Mar. 4, 2010; No. 2010-048338, filed Mar. 4, 2010; and No. 2010-048339, filed Mar. 4, 2010, the entire contents of all of which are incorporated herein by reference.

BACKGROUND OF THE INVENTION

1. Field of the Invention

The present invention relates to a memory management device that manages access to a memory.

2. Description of the Related Art

In a conventional information processing device, a volatile semiconductor memory, for example, a DRAM (Dynamic Random Access Memory) is used as a main memory device of a processor. Further, in a conventional information processing device, a nonvolatile semiconductor memory is used as a secondary storage device in combination with the volatile semiconductor memory.

Jpn. Pat. Appln. KOKAI Publication No. 2008-242944 (Patent Literature 1) proposes an integrated memory management device. In the integrated memory management device, a NAND flash memory is used as a main memory for an MPU. Further, in Patent Literature 1, a primary cache memory of the MPU, a secondary cache memory, and the NAND flash memory, which is the main memory, are handled in the same memory layer. A cache controller of the integrated memory management device implements, in addition to memory management of the primary cache memory and the secondary cache memory, memory management of the main memory.

Jpn. Pat. Appln. KOKAI Publication No. 7-146820 (Patent Literature 2) discloses a technology that adopts a flash memory as the main memory device of an information processing device. According to Patent Literature 2, a flash memory is connected to a memory bus of a system via a cache memory, which is a volatile memory. The cache memory is provided with an address array that records information such as addresses and an access history of data stored in the cache memory. A controller references an access destination address to supply data in the cache memory or the flash memory to the memory bus or to store data in the memory bus.

Jpn. Pat. Appln. KOKAI Publication No. 2001-266580 (Patent Literature 3) discloses an invention allowing different kinds of semiconductor memory devices to connect to a common bus.

A semiconductor memory device according to Patent Literature 3 includes a random access memory chip and a package including the random access memory chip. The package has a plurality of pins to electrically connect the random access memory chip to an external device. The plurality of pins provides a memory function commonly to the random access memory chip and a nonvolatile semiconductor memory that can electrically be erased and programmed. Each of the plurality of pins is arranged in the position of a corresponding pin of the nonvolatile semiconductor memory.

BRIEF SUMMARY OF THE INVENTION

Technical Problem

The present invention provides a memory management device capable of efficiently using a nonvolatile semiconductor memory.

Solution to Problem

A memory management device according to an embodiment of the present invention controls writing into and reading from a main memory including a nonvolatile semiconductor memory and a volatile semiconductor memory in response to a writing request and a reading request from a processor. The memory management device includes a coloring information storage unit that stores coloring information generated based on a data characteristic of write target data to be written into at least one of the nonvolatile semiconductor memory and the volatile semiconductor memory, and a writing management unit that references the coloring information to determine a region into which the write target data is written from the nonvolatile semiconductor memory and the volatile semiconductor memory.

Advantageous Effects of Invention

According to the present invention, a memory management device capable of efficiently using a nonvolatile semiconductor memory can be provided.

BRIEF DESCRIPTION OF THE SEVERAL VIEWS OF THE DRAWING

FIG. 1 is a block diagram showing an example of a structure of a memory management device and an information processing device according to a first embodiment of the present invention.

FIG. 6 is a diagram illustrating an example of static color information according to the first embodiment.

FIG. 8 is a diagram showing an example of a configuration of the coloring table according to the first embodiment.

FIG. 9 is a diagram showing a first example of a setting of static color information to various kinds of data.

FIG. 10 is a diagram showing a second example of settings of static color information to various kinds of data.

FIG. 13 is a diagram showing a first example of an alignment of entries of the coloring table according to the first embodiment.

FIG. 16 is a flow chart showing an example of reading processing of data according to the first embodiment.

FIG. 20 is a diagram illustrating decision processing of a block into which data is to be written according to the first embodiment.

FIG. 21 is a graph showing an example of a change of an erasure count in an arbitrary block region of the nonvolatile semiconductor memory.

FIG. 22 shows graphs showing an example of a change when a threshold for a difference of an erasure count is set small for wear leveling.

FIG. 23 is a graph showing an example of grouping of a block region in accordance with the erasure count.

FIG. 24 is a diagram showing determination criteria for grouping the block region in accordance with the erasure count.

FIG. 26 is a block diagram showing an example of a memory management device further including a cache memory in the memory management device.

FIG. 27 is a block diagram showing implementation examples of the memory management device, the mixed main memory, and a processor.

FIG. 28 is a block diagram showing of an example of another structure aspect of the memory management device and the information processing device according to the first embodiment of the present invention.

FIG. 30 shows a physical address space of a volatile semiconductor memory according to a second embodiment.

FIG. 31 shows an example of a relationship between the coloring information and areas of the volatile semiconductor memory.

FIG. 32 shows another example of the relationship between the coloring information and the areas of the volatile semiconductor memory.

FIG. 33 shows an example of a data structure for managing a free space and a used space of the volatile semiconductor memory according to the second embodiment.

FIG. 35 shows an example of an erasure processing to the volatile semiconductor memory according to the second embodiment.

FIG. 36 is diagram showing a truth value of a valid/invalid flag of nonvolatile semiconductor memory in the address conversion information according to the third embodiment of the present invention.

FIG. 37 is diagram showing a state transition of the valid/invalid flag of the nonvolatile semiconductor memory.

FIG. 47 is a diagram showing an example of a logical/physical conversion table (NAND logical/physical conversion table) of the nonvolatile semiconductor memory.

FIG. 48 is a data structure diagram showing an example of a reservation list.

FIG. 50 is a diagram showing an example of a state transition of the address conversion information according to the fourth embodiment.

FIG. 53 is a diagram showing the coloring table applied in the fifth embodiment.

FIG. 54 is a flow chart showing setting processing of pre-reading hint information according to the fifth embodiment.

FIG. 56 is a block diagram showing an example of a relationship between a virtual address region in a virtual address space and attribute information according to a sixth embodiment.

FIG. 58 is a diagram showing an example of a setting of static color information based on the virtual address region data.

FIG. 59 is a diagram showing an example of a dependence relationship between commands and libraries.

FIG. 60 is a diagram showing an example of scores of the commands and scores of the libraries.

FIG. 61 is a diagram showing another calculation example of the scores of the libraries based on the scores of commands.

FIG. 63 is a diagram showing an example of variables or functions brought together by a compiler.

FIG. 66 is a block diagram showing an example of configurations of a memory management device, information processing device, and memory device according to a seventh embodiment of the present invention.

FIG. 71 is a flow chart showing an example of notifying the memory device of the usage state based on the reading occurrence count of the memory device H32a.

FIG. 74 is a flow chart showing processing after the memory management device receives a removal notification from the memory device until the memory device becomes removable.

FIG. 78 is a diagram showing an example of a configuration of a memory management device according to an eighth embodiment of the present invention.

FIG. 81 is a state transition diagram showing a first example of switching control of a memory region by a switching control unit according to the eighth embodiment.

FIG. 82 is a state transition diagram showing a second example of switching control of a memory region by a switching control unit according to the eighth embodiment.

FIG. 83 is a block diagram showing an example of a relationship between a memory management device according to a ninth embodiment of the present invention and a address space.

FIG. 85 is a diagram showing an example of a configuration of an information processing device and a network system according to a tenth embodiment of the present invention.

FIG. 86 is a flow chart showing an example of processing of a profile information management unit according to the tenth embodiment.

FIG. 88 is a flow chart showing an example of download processing of the profile information by the user terminal according to the tenth embodiment.

FIG. 89 is a block diagram showing an example of a network system according to an eleventh embodiment of the present invention.

FIG. 90 is a block diagram showing an example of a configuration of a memory management device according to the eleventh embodiment.

FIG. 91 is a block diagram showing a first relationship between a processor logical address and a network logical address according to the eleventh embodiment.

FIG. 92 is a block diagram showing a second relationship between a processor logical address and a network logical address according to the eleventh embodiment.

FIG. 94 is a block diagram showing a fourth relationship between a processor logical address and a network logical address according to the eleventh embodiment.

FIG. 95 is a block diagram showing a fifth relationship between a processor logical address and a network logical address according to the eleventh embodiment.

FIG. 97 is a block diagram showing a first example of a configuration of the processor logical address and the network logical address according to the eleventh embodiment.

FIG. 98 is a block diagram showing a second example of a configuration of the processor logical address and the network logical address according to the eleventh embodiment.

FIG. 99 is a block diagram showing a third example of a configuration of the processor logical address and the network logical address according to the eleventh embodiment.

FIG. 100 is a diagram showing an example of calculation to estimate the number of bits of an address needed to access data stored in a large number of devices connected to a network.

DETAILED DESCRIPTION OF THE INVENTION

Figure 2:
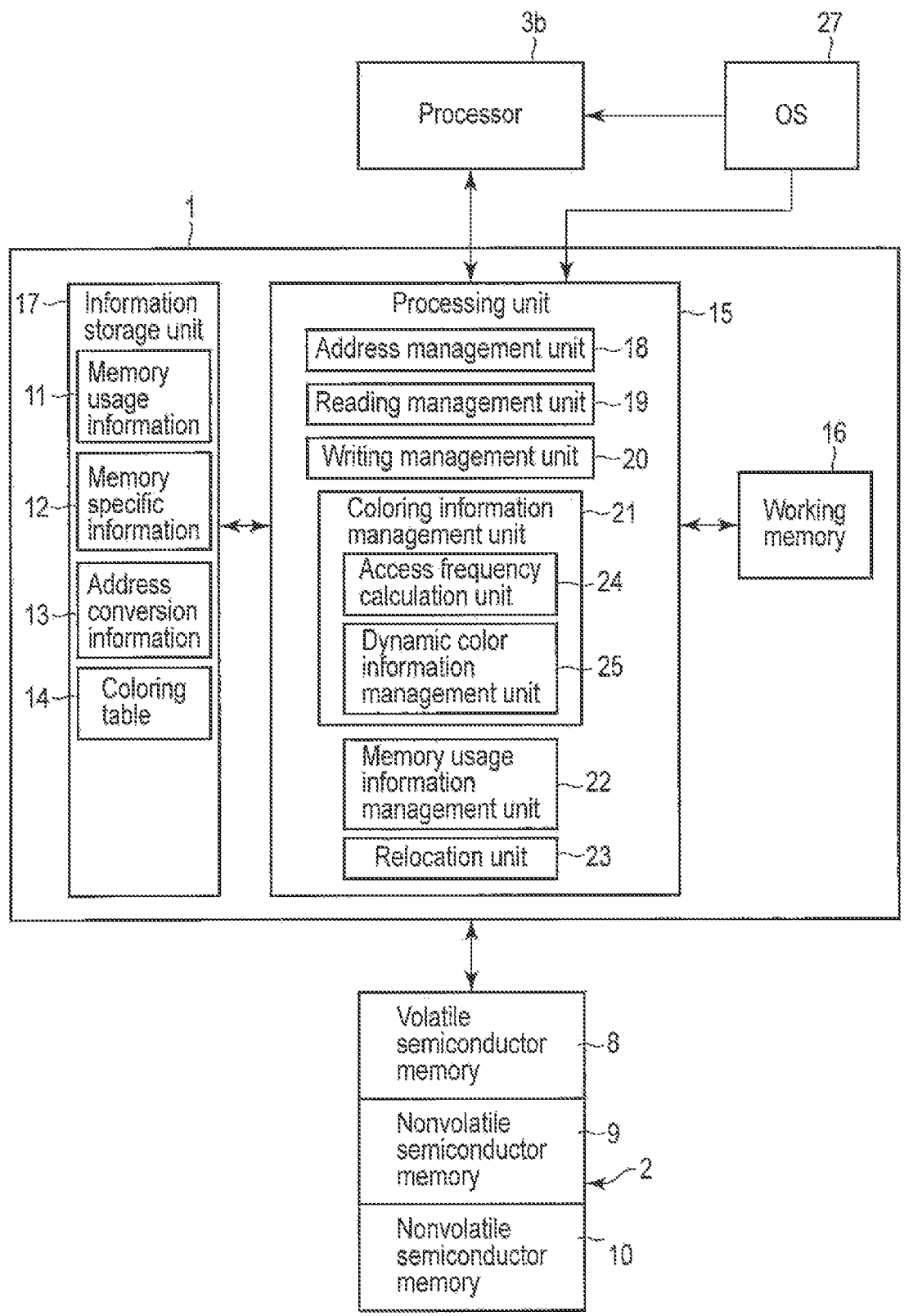
FIG. 2 is a block diagram showing an example of a structure of the memory management device and the information processing device according to the first embodiment.

Each embodiment of the present invention will be described below with reference to drawings. In the description that follows, the same reference numerals are attached to substantially or essentially the same functions and elements and a description thereof is provided if necessary.

First Embodiment

A memory management device 1 and an information processing device 100 according to a first embodiment of the present invention will be described. FIG. 1 is a block diagram showing an example of the memory management device and the information processing device according to the present embodiment.

The information processing device 100 includes the memory management device 1, a mixed main memory 2, and processors 3a, 3b, 3c.

The processor 3a, 3b, or 3c is, for example, a MPU (Micro Processor Unit) or GPU (Graphical Processor Unit). The processors 3a, 3b, 3c include primary cache memories 4a, 4b, 4c and secondary cache memories 5a, 5b, 5c respectively. The processors 3a, 3b, 3c execute processes 6a, 6b, 6c to process various kinds of data respectively. In the execution of the processes 6a, 6b, 6c, the processors 3a, 3b, 3c specify data by using a virtual address.

To write data (write target data) into the mixed main memory 2, the processors 3a, 3b, 3c generate a writing request. To read data (read target data) from the mixed main memory 2, the processors 3a, 3b, 3c generate a reading request.

Each of the processors 3a, 3b, 3c includes a page table (not shown) for converting a virtual address into a physical address (logical address for the mixed main memory 2) of the MPU or GPU. To write data into the primary cache memories 4a, 4b, 4c, the secondary cache memories 5a, 5b, 5c, or the mixed main memory 2, the processors 3a, 3b, 3c convert a virtual address into a logical address based on the page table to specify write target data by the logical address. Similarly, to read data from the primary cache memories 4a, 4b, 4c, the secondary cache memories 5a, 5b, 5c, or the mixed main memory 2, the processors 3a, 3b, 3c convert a virtual address into a logical address based on the page table to specify read target data by the logical address.

Incidentally, writing into and reading from the primary cache memories 4a, 4b, 4c, the secondary cache memories 5a, 5b, 5c, or the mixed main memory 2 will genetically be expressed as "access" below.

The memory management device 1 manages access (writing, reading) to the mixed main memory 2 by the processors 3a, 3b, 3c. The memory management device 1 includes a processing unit 15, a working memory 16, and an information storage unit 17. The memory management device 1 stores memory usage information 11, memory specific information 12, address conversion information 13, and a coloring table 14 described later in the information storage unit 17. The coloring table 14 stored in the information storage unit 17 of the memory management device 1 may be a portion of the coloring table 14 stored in nonvolatile semiconductor memories 9, 10. For example, data of the coloring table 14 used frequently of the coloring table 14 stored in the nonvolatile semiconductor memories 9, 10 may be stored in the information storage unit 17 of the memory management device 1. The memory management device 1 references the coloring table 14 and the like to manage access to the mixed main memory 2 by the processors 3a, 3b, 3c. Details thereof will be described later.

The mixed main memory 2 includes a first memory, a second memory, and a third memory. The first memory has a greater accessible upper limit count than the second memory. The second memory has a greater accessible upper limit count than the third memory. Note that the accessible upper limit count is a statistically expected value and does not mean that the relationship is always guaranteed. In addition, the first memory may have a faster data transfer speed (access speed) than the second memory.

In the present embodiment, the first memory is assumed to be a volatile semiconductor memory 8. As the volatile semiconductor memory 8, for example, a memory commonly used in a computer as the main memory such as a DRAM (Dynamic Random Access Memory), FPM-DRAM, EDO-DRAM, or SDRAM is used. A nonvolatile semiconductor memory such as an MRAM (Magnetoresist Random Access Memory) or FeRAM (Ferroelectric Random Access Memory) may also be adopted if accessed at high speed just as fast as the DRAM with essentially no accessible upper limit count.

The second memory is assumed to be the nonvolatile semiconductor memory 9. As the nonvolatile semiconductor memory 9, for example, an SLC (Single Level Cell)-type NAND flash memory is used. When compared with an MLC (Multi Level Cell), the SLC can be read and written into faster and has higher reliability. However, the SLC has higher bit costs than the MLC and is not suitable for increased capacities.

The third memory is assumed to be the nonvolatile semiconductor memory 10. As the nonvolatile semiconductor memory 10, for example, an MLC-type NAND flash memory is used. When compared with the SLC, the MLC can be read and written into more slowly and has lower reliability. However, the MLC has lower bit costs than the SLC and is suitable for increased capacities.

In the present embodiment, the nonvolatile semiconductor memory 9 is an SLC-type NAND flash memory and the nonvolatile semiconductor memory 10 is an MLC-type NAND flash memory, but, for example, the nonvolatile semiconductor memory 9 may be a 2-bit/Cell MLC-type NAND flash memory and the nonvolatile semiconductor memory 10 may be a 3-bit/Cell MLC-type NAND flash memory.

Reliability means the degree of resistance to an occurrence of data corruption (durability) when data is read from a storage device. Durability of the SLC is higher than durability of the MLC. High durability means a greater accessible upper limit count and lower durability means a smaller accessible upper limit count.

The SLC can store 1-bit information in one memory cell. On the other hand, the MLC can store 2-bit information or more in one memory cell. That is, the mixed main memory 2 according to the present embodiment has decreasing order of durability of the volatile semiconductor memory 8, the nonvolatile semiconductor memory 9, and the nonvolatile semiconductor memory 10.

When compared with the volatile semiconductor memory 8, the nonvolatile semiconductor memories 9, 10 such as NAND flash memories are cheap and can be increased in capacity. As the nonvolatile semiconductor memories 9, 10, instead of NAND flash memories, for example, other kinds of flash memory such as NOR flash memories, PRAM (Phase change memory), or ReRAM (Resistive Random access memory) can be used.

Incidentally, an MLC may be adopted as the third memory and an MLC in which a pseudo SLC mode that writes data by using only lower pages of the MLC may be adopted as the second memory. In this case, the second memory and the third memory can be configured by a common chip only, which is advantageous in terms of manufacturing costs.

Comparison of a case when the nonvolatile semiconductor memories 9, 10 are used as the main memory and a case when the nonvolatile semiconductor memories 9, 10 are used as the secondary storage device shows that the frequency of access to the nonvolatile semiconductor memories 9, 10 increases when the nonvolatile semiconductor memories 9, 10 are used as the main memory. In the present embodiment, the information processing device including the mixed main memory 2 formed by mixing the volatile semiconductor memory 8, the nonvolatile semiconductor memory 9 of SLC, and the nonvolatile semiconductor memory 10 of MLC as a main memory is realized. The mixed main memory 2 is a heterogeneous main memory in which arrangement of data is managed by the memory management device 1.

The memory usage information 11, the memory specific information 12, the address conversion information 13, and the coloring table 14 are stored in predetermined regions of the nonvolatile semiconductor memories 9, 10.

The memory usage information 11 includes the number of times of writing occurrences and the number of times of reading occurrences of each page region of the nonvolatile semiconductor memories 9, 10, the number of times of erasure of each block region, and the size of the region being used.

The memory specific information 12 includes the memory size of the volatile semiconductor memory 8, the memory sizes of the nonvolatile semiconductor memories 9, 10, the page sizes and block sizes of the nonvolatile semiconductor memories 9, 10, and the accessible upper limit counts (the writable upper limit count, readable upper limit count, and erasable upper limit count) of each region. The page size is the unit of data size for writing into or reading from the nonvolatile semiconductor memories 9, 10. The block size is the unit of data erasure size of the nonvolatile semiconductor memories 9, 10. In the nonvolatile semiconductor memories 9, 10, the block size is larger than the page size.

The address conversion information 13 is information used to convert a logical address provided by the processors 3a, 3b, 3c into a physical address corresponding to the logical address. Details of the address conversion information 13 will be described later.

The coloring table 14 is a table to hold coloring information for each piece of data. The coloring information includes static color information and dynamic color information. Details thereof will be described later.

Next, the memory management device according to the present embodiment and an operating system will further be described with reference to FIG. 2. FIG. 2 is a block diagram showing an example of the configuration of the memory management device 1 and the information processing device 100 according to the present embodiment. In FIG. 2, the processor 3b of the processors 3a, 3b, 3c in FIG. 1 is selected as the processor to be described, but the description that follows also applies to the other processors 3a, 3c.

An operating system 27 is executed by the processor 3b. The operating system 27 is executed by the processor 3b and has a right to access the coloring table 14 stored in the information storage unit 17.

The processing unit 15 of the memory management device 1 includes an address management unit 18, a reading management unit 19, a writing management unit 20, a coloring information management unit 21, a memory usage information management unit 22, and a relocation unit 23. Further, the coloring information management unit 21 includes an access frequency calculation unit 24 and a dynamic color information management unit 25.

The processing unit 15 performs various kinds of processing based on information stored in the information storage unit 17 while using the working memory 16.

The working memory 16 is used, for example, as a buffer and is used as a working region for various data conversions and the like.

The functional blocks included in the processing unit 15 can be realized by one of hardware and software (for the example, the operating system 27, firmware or the like) or a combination of both. Whether the functional blocks are realized as hardware or software depends on the concrete embodiment or design limitations imposed on the whole information processing device 100. A person skilled in the art can realize these functions by various methods for each concrete embodiment and determining such an embodiment is included in the scope of the present invention. This also applies to the functional blocks used in the description that follows.

The address management unit 18 allocates a physical address to a logical address and stores the allocated physical address and the logical address into the address conversion information 13. Accordingly, the processing unit 15 can acquire a physical address corresponding to a logical address with reference to the address conversion information 13.

The reading management unit 19 manages read processing of read target data to be read from the mixed main memory 2 when the processors 3a, 3b, 3c issue a reading request.

The writing management unit 20 manages write processing of write target data into the mixed main memory 2 when the processors 3a, 3b, 3c issue a writing request.

The coloring information management unit 21 manages the coloring table 14.

The memory usage information management unit 22 manages the memory usage information 11 of the mixed main memory 2.

The relocation unit 23 relocates data arranged at a physical address corresponding to any logical address based on coloring information included in the coloring table 14 asynchronously to the operations of the processors 3a, 3b, 3c. The relocation unit 23 periodically relocates data included in the nonvolatile semiconductor memory 10 whose reading frequency or writing frequency is high into the nonvolatile semiconductor memory 9 based on, for example, dynamic color information described later. Also, the relocation unit 23 periodically relocates data included in the nonvolatile semiconductor memory 9 whose reading frequency or writing frequency is low into the nonvolatile semiconductor memory 10 based on, for example, the dynamic color information. Similarly, the relocation unit 23 can relocate data between the volatile semiconductor memory 8 and the nonvolatile semiconductor memories 9, 10. Write processing by the writing management unit 20 described later relocates data by performing determination processing of a writing destination memory region and determination processing of a writing destination block region each time an update of data occurs. In contrast, the relocation unit 23 periodically relocates data. When the relocation unit 23 relocates data, the writing management unit 20 and the reading management unit 19 do not operate until the relocation is complete. The trigger of starting the operation of the relocation unit 23 may be a period set by the developer or the period that can be set through the user interface. The relocation unit 23 may operate when the information processing device 100 pauses.

The access frequency calculation unit 24 calculates access frequency information (a dynamic writing frequency DW_color and a dynamic reading frequency DR_color) of data based on coloring information included in the coloring table 14.

The dynamic color information management unit 25 manages dynamic color information included in the coloring table 14.

Figure 3:
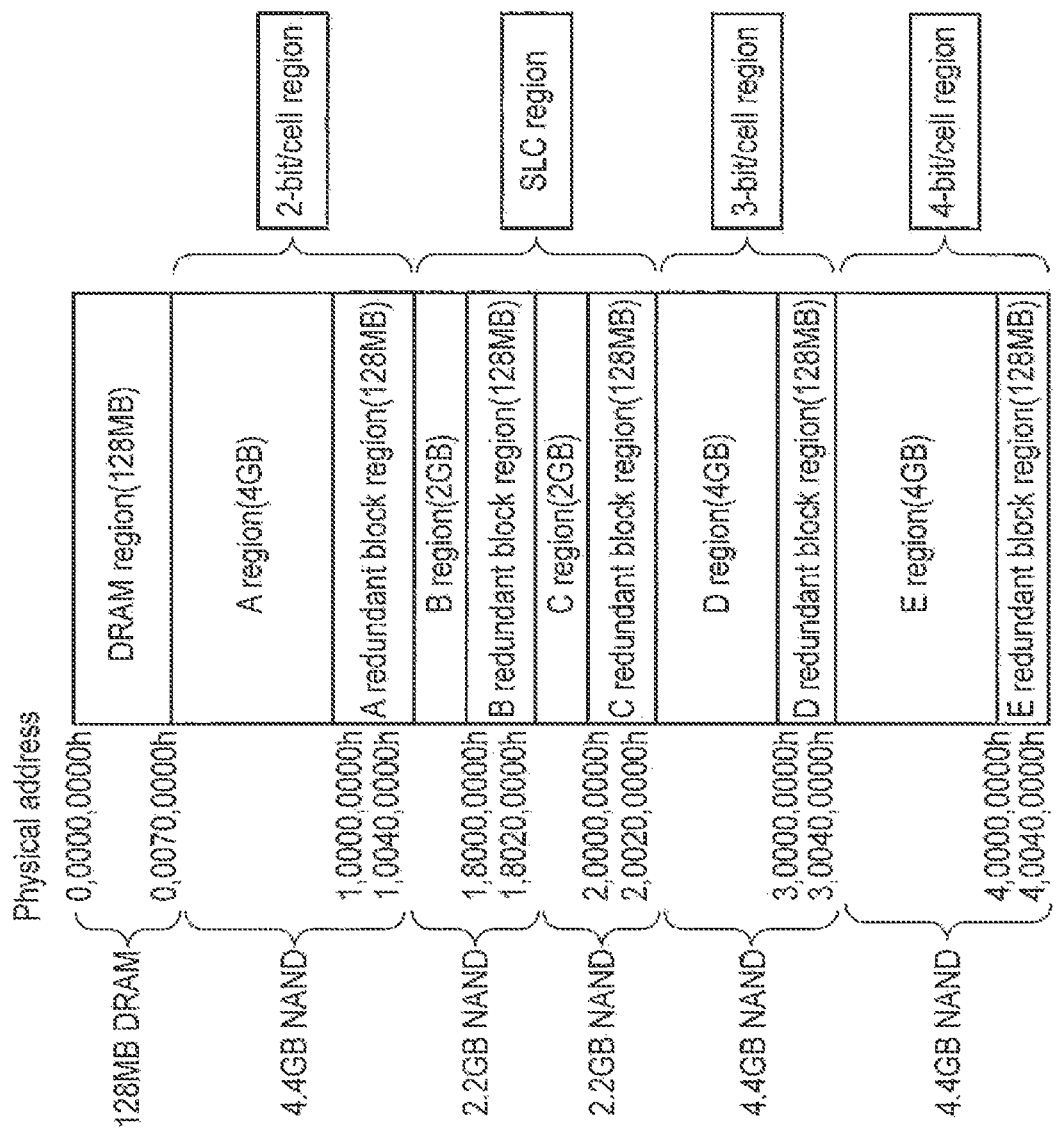
FIG. 3 is a diagram showing an example of a memory map of a mixed main memory according to the first embodiment.

Next, a mixed main memory according to the present embodiment will be described with reference to FIG. 3. FIG. 3 is a diagram showing an example of a memory map of the mixed main memory 2 according to the present embodiment.

The mixed main memory 2 includes the volatile semiconductor memory 8 (DRAM region), the nonvolatile semiconductor memory 9 (SLC region), and the nonvolatile semiconductor memory 10 (2-bit/Cell region, 3-bit/Cell region, 4-bit/Cell region). The 2-bit/Cell region, 3-bit/Cell region, and 4-bit/Cell region constitute an MLC region. The DRAM region, SLC region, 2-bit/Cell region, 3-bit/Cell region, and 4-bit/Cell region are called a memory region by the gross.

The volatile semiconductor memory 8 is composed of, for example, a 128-Mbyte DRAM region.

The nonvolatile semiconductor memory 9 is composed of, for example, a 2-Gbyte B region, a 128-Mbyte B redundant block region, a 2-Gbyte C region, and a 128-Mbyte C redundant block region. Each memory region of the nonvolatile semiconductor memory 9 is an SLC-type NAND flash memory.

The nonvolatile semiconductor memory 10 is composed of, for example, a 2-bit/Cell region composed of a 4-Gbyte A region and a 128-Mbyte A redundant block region, a 3-bit/Cell region composed of a 4-Gbyte D region and a 128-Mbyte D redundant block region, and a 4-bit/Cell region composed of a 4-Gbyte E region and a 128-Mbyte E redundant block region. Each memory region of the nonvolatile semiconductor memory 10 is an MLC-type NAND flash memory. As shown in FIG. 3, a physical address is allocated to each memory region.

If the mixed main memory 2 is configured as described above, the memory specific information 12 includes 1) the memory size of the volatile semiconductor memory 8 (DRAM region) in a memory space of the mixed main memory 2, 2) the memory sizes of the nonvolatile semiconductor memories 9, 10 in the memory space of the mixed main memory 2, 3) the block size and page size of the NAND flash memory constituting the memory space of the mixed main memory 2, 4) memory space information (containing the erasable upper limit count, readable upper limit count, and writable upper limit count) allocated as an SLC region (binary region) in the nonvolatile semiconductor memory 9, 5) memory space information (containing the erasable upper limit count, readable upper limit count, and writable upper limit count) allocated to the 2-bit/Cell region, 6) memory space information (containing the erasable upper limit count, readable upper limit count, and writable upper limit count) allocated to the 3-bit/Cell region, and 7) memory space information (containing the erasable upper limit count and readable upper limit count) allocated to the 4-bit/Cell region.

Figures 4, 5:
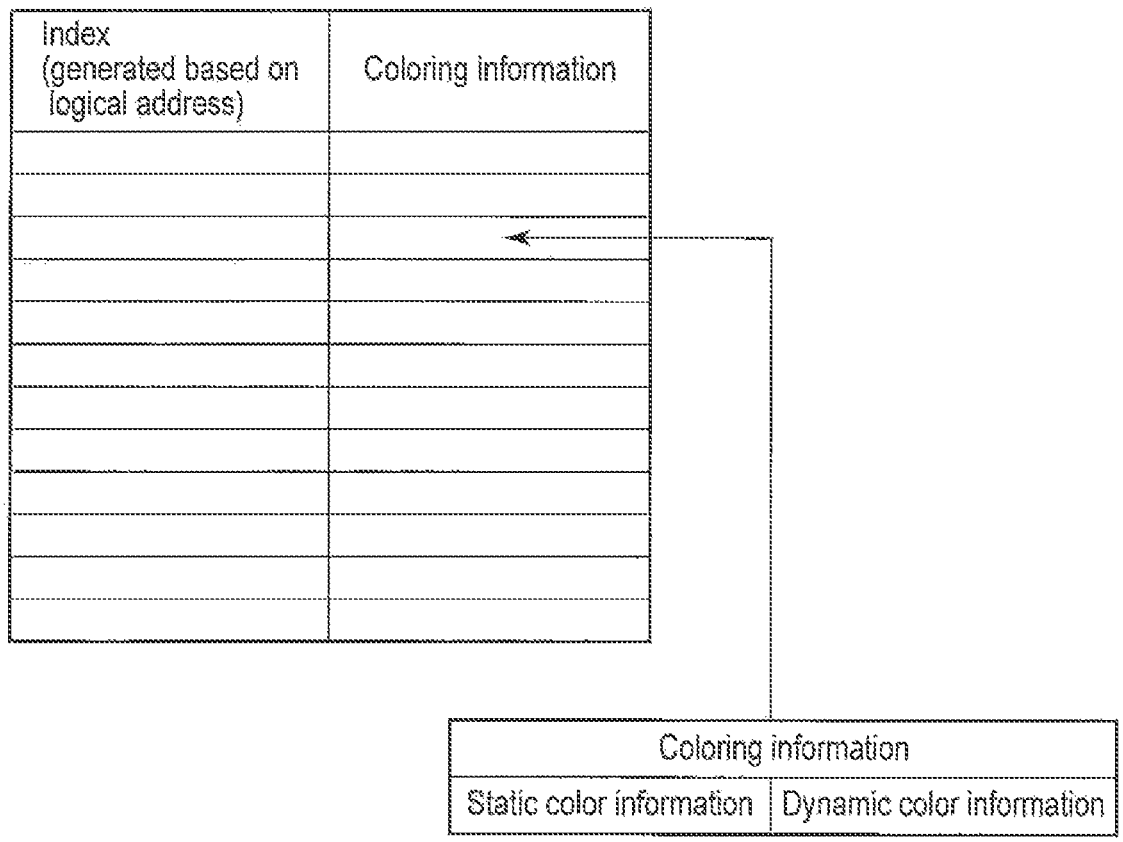
FIG. 4 is a diagram showing an example of address conversion information according to the first embodiment.
FIG. 5 is a diagram showing an example of a coloring table according to the first embodiment.

Next, the address conversion information (address conversion table) 13 according to the present embodiment will be described with reference to FIG. 4. FIG. 4 is a diagram showing an example of the address conversion information 13 according to the present embodiment.

In the address conversion information 13, the logical address, physical address of the volatile semiconductor memory 8, physical address of the nonvolatile semiconductor memories 9, 10, and valid/invalid flag are managed in tabular form.

In each entry of the address conversion information 13, a logical address, at least one of physical addresses of the volatile semiconductor memory 8 and the nonvolatile semiconductor memories 9, 10 corresponding to the logical address, and the valid/invalid flag are registered.

The valid/invalid flag is information indicating whether or not each entry is valid. 1 of the valid/invalid flag indicates valid and 0 of the valid/invalid flag indicates invalid. The initial value of the valid/invalid flag of each entry is 0. An entry whose valid/invalid flag is 0 is an entry to which no logical address is mapped or an entry whose logical address is erased after being mapped thereto. An entry whose valid/invalid flag is 1 has a logical address mapped thereto and a physical address corresponding to the logical address is present at least in one of the volatile semiconductor memory 8 and the nonvolatile semiconductor memories 9, 10.

In the example of the address conversion information 13 shown in FIG. 4, the logical address, the physical address of the volatile semiconductor memory 8, and the physical address of the nonvolatile semiconductor memories 9, 10 are managed by one entry of the address conversion information 13. However, the logical address and the physical address of the volatile semiconductor memory 8 may be managed by the address conversion information 13 so that the logical address and the physical address of the nonvolatile semiconductor memories 9, 10 are managed by another tag RAM. In this case, when a logical address is converted into a physical address, the tag RAM is first referenced and if no physical address corresponding to the logical address is found in the tag RAM, the address conversion information 13 is referenced.

Next, the coloring table 14 according to the present embodiment will be described with reference to FIG. 5. FIG. 5 is a diagram showing an example of the coloring table 14 according to the present embodiment.

In the present embodiment, coloring information is provided for each piece of data. The unit of data size of data to which coloring information is provided is, for example, the minimum unit of reading and writing. For example, the minimum unit of reading and writing is the page size of a NAND flash memory. The coloring table 14 associates coloring information for each piece of data and stores the coloring information in units of entry. An index is attached to each entry of the coloring table 14. The index is a value generated based on a logical address. When a logical address specifying data is given to the reading management unit 19, the writing management unit 20, the coloring information management unit 21, the relocation unit 23, and so forth of the memory management device 1, the entry managed by the index corresponding to the logical address is referenced to acquire coloring information of the data.

The coloring information includes static color information and dynamic color information. The static color information is information generated based on property of the data to which the coloring information is attached and is a kind of hint information offering a hint to determine an arrangement (writing) region of the data in the mixed main memory 2. The dynamic color information is information containing at least one of the number of times and the frequency of reading and writing data. The dynamic color information may be used as hint information.

Next, static color information will be described with reference to FIG. 6. FIG. 6 is a diagram illustrating an example of static color information according to the present embodiment.

The static color information includes at least one piece of information of "importance", "reading frequency/writing frequency", and "data life" of the data. The reading frequency described with reference to FIG. 6 corresponds to a static reading frequency described later and the writing frequency corresponds to a static writing frequency.

"Importance" is a value set by estimating the importance of data based on the type of the data or the like.

"Reading frequency/writing frequency" is a value set by estimating the frequency with which data is read or written based on the type of the data or the like.

"Data life" is a value set by estimating a period (data life) in which data is used without being erased based on the type of the data or the like.

"Importance", "reading frequency/writing frequency", and "data life" are estimated from, for example, a property of a file held by a file system or a property of a region temporarily used for a program.

A property of a file held by a file system is a property determined based on a data attribute added to the file of file data containing the data to which coloring information is attached. A Data attribute added to the file include header information of the file, a file name, a file position, or file management data (information held in inodd). If, for example, the file is positioned in the Trash of the file system as the file position, it is estimated that the importance of the property of data contained in the file is low, the reading frequency/writing frequency is low, and the data life is short. Based on the property, a low writing frequency, a low reading frequency, and a short data life are estimated for coloring information of the data.

A property of a region temporarily used for a program includes a property determined based on the data type when program execution of a program in which the data to which coloring information is attached is handled and a property determined based on the data type when generation of a program file.

The data type when program execution is the data type classified based on, for example, which region of a stack region, a heap region, and a text region the data is mapped to when program execution. For example, a property of data mapped to the stack region or heap region are estimated that the writing frequency is high, the reading frequency is high, the importance is high, and the data life is short. Based on the property, a high writing frequency, a high reading frequency, high importance, and a short data life are estimated for static coloring information of the data. For example, A property of data mapped to the text region are estimated that the writing frequency is low, the reading frequency is high, the importance is high, and the data life is long because the data is read-only data. Based on the property, a high writing frequency, a high reading frequency, high importance, and a long data life are estimated for static coloring information of the data.

The data type estimation when generation of a program file is to estimate the importance, reading frequency, and writing frequency of data handled by a program when the program is generated.

The static color information may be directly set by the user through the user interface.

Figure 7:
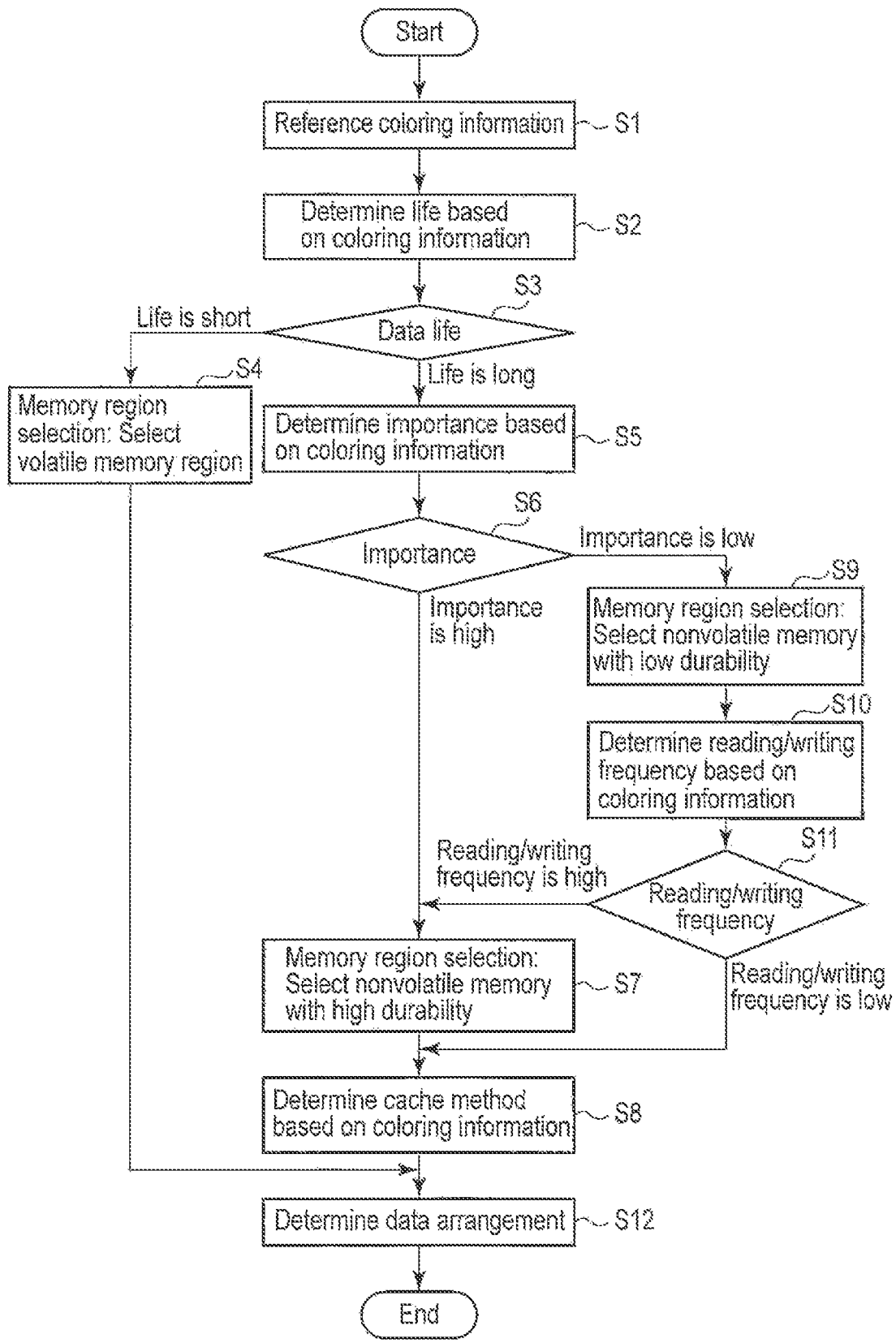
FIG. 7 is a flow chart showing an example of data arrangement processing according to the first embodiment.

Next, an example of write processing of data based on coloring information will be shown with reference to FIG. 7. FIG. 7 is a flow chart showing an example of data arrangement processing.

In the present embodiment, as described above, the mixed main memory 2 includes the volatile semiconductor memory 8 and the nonvolatile semiconductor memories 9, 10. When data is arranged in the mixed main memory 2, the memory region of the volatile semiconductor memory 8 or the nonvolatile semiconductor memories 9, 10 is determined as an arrangement destination.

First, when a writing request of data (write target data) occurs, the writing management unit 20 references coloring information attached to the write target data (step S1).

Next, the writing management unit 20 references "data life" of the coloring information to determine the data life of the write target data (step S2).

If the data life of the write target data is determined to be short (step S3), the writing management unit 20 selects the volatile semiconductor memory 8 as a memory region in which the write target data is arranged (step S4) and determines the memory region in which the write target data is arranged in favor of the volatile semiconductor memory 8 (step S12).

If the data life of the write target data is determined to be long (step S3), the writing management unit 20 references "importance" of the coloring information of the write target data to determine the importance of the write target data (step S5).

If the importance of the write target data is determined to be high (step S6), the writing management unit 20 selects the nonvolatile semiconductor memory 9 with high durability (reliability) as a memory region in which the write target data is arranged (step 37). Further, the writing management unit 20 determines whether to cache the write target data in the volatile semiconductor memory 8 based on the coloring information of the write target data (cache method based on coloring information) (step S8) and determines the nonvolatile semiconductor memory 9 as the memory region in which the write target data is arranged (step S12).

If the importance of the write target data is determined to be low (step S6), the writing management unit 20 selects the nonvolatile semiconductor memory 10 with low durability as a memory region in which the write target data is arranged (step S9). Further, the writing management unit 20 determines the reading frequency and the writing frequency of the write target data based on the coloring information (dynamic color information, static color information) of the write target data (step S10).

If the reading frequency and the writing frequency of the write target data are determined to be high (step S11), the writing management unit 20 selects the nonvolatile semiconductor memory 9 as a memory region in which the write target data is arranged (step 37). Further, the writing management unit 20 determines whether to cache the write target data in the volatile semiconductor memory 8 based on the coloring information of the write target data (cache method based on coloring information) (step S8) and determines the nonvolatile semiconductor memory 9 as the memory region in which the write target data is arranged (step S12).

If the reading frequency and the writing frequency of the write target data are determined to be low (step S11), the writing management unit 20 determines whether to cache the write target data in the volatile semiconductor memory 8 based on the coloring information of the write target data (cache method based on coloring information) (step S8) and determines the nonvolatile semiconductor memory 10 as the memory region in which the write target data is arranged (step S12).

Next, a configuration example of the coloring table 14 according to the present embodiment will be described with reference to FIG. 8. FIG. 8 is a diagram showing an example of the configuration of the coloring table 14 according to the present embodiment. In the coloring table 14 shown in FIG. 8, a case when particularly the reading frequency, writing frequency, and data life of the coloring information shown in FIGS. 5 and 6 are used as the coloring information will be described.

As the coloring information, one of "importance", "reading frequency/writing frequency", and "data life" may be used, any two may be combined, or all may be combined. Further, other coloring information that is not shown in FIG. 6 may be separately defined and used.

The coloring table 14 is a table that associates coloring information with each piece of data and holds the coloring information in units of entry. The data size of data associated with the coloring information by the coloring table 14 is, for example, the minimum unit of reading or writing. For example, the minimum data size of reading or writing is the page size of a NAND flash memory. It is assumed below that the data size of data associated with the coloring information by the coloring table 14 is the page size, but the present embodiment is not limited to such an example.

An index is attached to each entry of the coloring table 14.

Coloring information held by the coloring table 14 includes static color information and dynamic color information.

The index is a value generated based on a logical address. When a logical address specifying data is given to the reading management unit 19, the writing management unit 20, the coloring information management unit 21, the relocation unit 23, and so forth of the memory management device 1, the entry managed by the index corresponding to the logical address is referenced to acquire coloring information of the data.

The static color information includes a value SW_color indicating the static writing frequency, SR_color indicating the static reading frequency, a data life SL_color, a time ST_color at which data is generated.

The static writing frequency SW_color is a value set by estimating the frequency with which data is written based on the type of the data or the like. The static reading frequency SR_color is a value set by estimating the frequency with which data is read based on the type of the data or the like. For example, an increasing value is set to the static writing frequency SW_color with estimated data having an increasing writing frequency. For example, an increasing value is set to the static reading frequency SR_color with estimated data having an increasing reading frequency.

The data life SL_color is a value set by estimating a period (data life) in which data is used without being erased based on the type of the data or the like.

The static color information is a statically predetermined value by a program (process) that generates data. The operating system 27 executed in the information processing device 100 may predict static color information based on a file extension, a file header of data, or the like.

The dynamic color information includes a writing count DWC_color of data and a reading count DRC_color of data. The writing count DWC_color of data is the number of times the data is written into the mixed main memory 2. The reading count DRC_color of data is the number of times the data is read from the mixed main memory 2. The dynamic color information management unit 25 manages for each piece of data the number of times the data is written into the mixed main memory 2 based on the writing count DWC_color. The dynamic color information management unit 25 manages for each piece of data the number of times the data is read from the mixed main memory 2 based on the reading count DRC_color. As described above, the mixed main memory 2 is used as a main memory. Thus, data processed by the processors 3a, 3b, 3c is written into the mixed main memory 2 or read from the mixed main memory 2. The dynamic color information management unit 25 increments the writing count DWC_color of data each time the data is written. The dynamic color information management unit 25 also increments the reading count DRC_color of data each time the data is read.

As will be described later, the access frequency calculation unit 24 calculates the dynamic writing frequency DW_color from the writing count DWC_color of data. The access frequency calculation unit 24 calculates the dynamic reading frequency DR_color from the reading count DRC_color of data.

The dynamic writing frequency DW_color is a value indicating the frequency with which the data is written into the mixed main memory 2. The dynamic reading frequency DR_color is a value indicating the frequency with which the data is read from the mixed main memory 2. The calculation method of the dynamic writing frequency DW_color and the dynamic reading frequency DR_color will be described later.

As will be described later, when a writing request or a reading request occurs from the processors 3a, 3b, 3c to the mixed main memory 2, the memory management device 1 determines the write region, reading method and the like by referencing coloring information.

Next, static color information according to the present embodiment will be described with reference to FIGS. 9 and 10. FIG. 9 is a diagram showing a first example of a setting of static color information (the static writing frequency SW_color, the static reading frequency SR_color, and the data life SL_color) to various kinds of data. FIG. 10 is a diagram showing a second example of a setting of static color information (the static writing frequency SW_color, the static reading frequency SR_color, and the data life SL_color) to various kinds of data.

The reading frequency of the text region of a kernel is normally high and the writing frequency thereof is low. The operating system 27 sets the static reading frequency SR_color of the text region in which the operating system 27 operates to 5 and the static writing frequency SW_color to 1. The operating system 27 predicts that the data life SL_color of the text region of the kernel is long.

On the other hand, both the reading frequency and the writing frequency of the data region of the kernel are normally high. Thus, the operating system 27 sets the static reading frequency SR_color to 5 and the static writing frequency SW_color to 5 for the data region of the kernel.

Because the data region dynamically secured in the kernel is deleted when data is no longer needed, the data life SL_color is assumed to be SHORT.

The reading frequency of the text region of a user program, when compared with the kernel reenterably invoked by all processes, is low. However, when a process is active, like the kernel, the reading frequency is high. Thus, the static writing frequency SW_color is set to 1 and the static reading frequency SR_color is set to 4 for the text region of the user program. The data life SL_color for the text region of the user program is commonly long because the data life SL_color is a period until the program is uninstalled. Thus, the data life SL_color for the text region of the user program is set to LONG.

A region dynamically secured for a program is roughly divided into two regions. One type of the region is data (including the stack region) discarded when execution of a program ends. Such data has the short data life SL_color and the reading frequency and writing frequency thereof are high. Thus, the static reading frequency SR_color is set to 4 and the static writing frequency SW_color is set to 4 for data discarded when execution of a program ends. Another region dynamically secured for the program is a region generated by the program for a new file. Data generated by the program has the long data life SL_color and the read and write frequencies thereof depend on the type of a generated file.

The data life SL_color of a file is set to be long for data handled as a file to be referenced by a process.

A case when a system file whose file extension is, for example, SYS, dll, DRV and the like is read will be described. Data having such an extension is a file read when the operating system 27 performs various kinds of processing. When the operating system 27 is installed on the mixed main memory 2, data having such an extension is rarely updated after being written once. A file having such an extension is predicted that the access frequency thereof is, among files, relatively high, but when compared with the text region of a program (kernel), the access frequency thereof is low. Therefore, the operating system 27 sets the static writing frequency SW_color having such an extension to 1 and the static reading frequency SR_color to 3. This setting shows that the writing frequency predicted from data is extremely low and the predicted reading frequency is high. That is, data having such an extension is predicted that the data may be rewritten several times when the operating system 27 is updated or another program is installed and thus is handled almost like read-only data.

The number of users who use a program to edit an audio file is small. Thus, the frequency of writing music data compressed by, for example, MP3 is considered to be low. The frequency of reading music data is considered to be higher than the frequency of writing music data. Thus, the static writing frequency SW_color of music data compressed by MP3 or the like is set to 1 and the static reading frequency SW_color thereof to 2.

The number of users who use a video editing program is small. Thus, the frequency of writing video data compressed by, for example, MPEG is considered to be low. The frequency of reading video data is considered to be higher than the frequency of writing video data. Thus, the static writing frequency SW_color of video data compressed by MP3 or the like is set to 1 and the static reading frequency SW_color thereof to 2.

The number of users who use an editing program of text data is large. Thus, for example, the writing frequency and reading frequency of a text file is considered to be high. Therefore, the static writing frequency SW_color of the text file is set to 3 and the static reading frequency SW_color thereof to 3.

The number of users who use a Web browser is large. Thus, the reading frequency and writing frequency of a browser cache file are considered to be equal to or higher than those of a media file of music data or video data. Therefore, the static writing frequency SW_color of the browser cache file is set to 1 and the static reading frequency SW_color thereof to 3.

The static writing frequency SW_color of a file arranged in a directory whose access frequency is low such as the Trash is set to 1 and the static reading frequency SW_color thereof to 1.

Photo data whose extension is typically JPEG and movie data whose extension is typically MOV are rarely rewritten after being written once. The predicted frequency with which such photo data or movie data is accessed from a program is low. Thus, the operating system 27 sets a small value to the static writing frequency SW_color and the static reading frequency SR_color of photo data and movie data.

Figure 11:
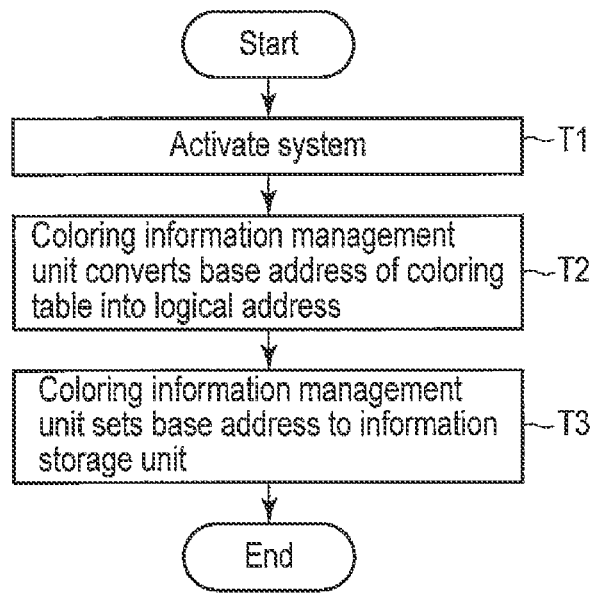
FIG. 11 is a flow chart showing an example of generation processing of the coloring table according to the first embodiment.

Next, generation processing of the coloring table 14 according to the present embodiment will be described with reference to FIG. 11. FIG. 11 is a flow chart showing an example of generation processing of the coloring table 14. The coloring table 14 is generated when the system is initially activated. The coloring table 14 is arranged in any region of the nonvolatile semiconductor memories 9, 10. The address at which the coloring table 14 is arranged may be determined by the implementation of the memory management device 1.

In step T1, the information device 100 is turned on and activated.

In step T2, the coloring information management unit 21 converts a base address of the coloring table 14 to a logical address and generates an index for each piece of data.

In step T3, the coloring information management unit 21 sets the base address of the coloring table 14 to the information storage unit 17. The information storage unit 17 is composed of, for example, registers. The base address of the coloring table 14 is set to, for example, a coloring table register.

Figure 12:
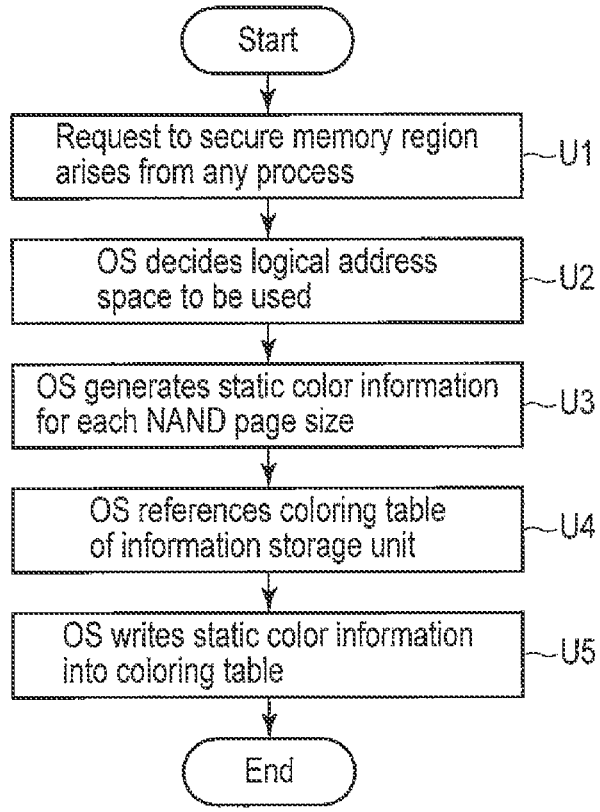
FIG. 12 is a flow chart showing an example of generation processing of an entry of the coloring table according to the first embodiment.

Next, generation processing of an entry of the coloring table 14 according to the present embodiment will be described with reference to FIG. 12. FIG. 12 is a flow chart showing an example of generation processing of an entry of the coloring table 14.

The processors 3a, 3b, 3c secure regions in a logical address space used for executing the processes 6a, 6b, 6c. When a region in the logical address space is secured, 0 is set to the valid/invalid flag of the address conversion information 13 of the secured logical address. A physical address is allocated to the logical address when the processes 6a, 6b, 6c access (read or write) the secured logical address within the range of the logical address space. When a physical address is allocated to the logical address, static color information for the data corresponding to the logical address is registered with the coloring table 14 and also 1 is set to the valid/invalid flag of the address conversion information 13 of the logical address.

First, the processes 6a, 6b, 6c executed by the processors 3a, 3b, 3c issue a request to secure a region in the logical address space to arrange new data (step U1). Unused regions in the logical address space are managed by the operating system 27 and the logical address is determined by the operating system 27 (step U2).

Next, when new data is generated by the processes 6a, 6b, 6c, the operating system 27 generates static color information based on the type of the newly generated data or the like (step U3). The static color information is generated for each page size of the generated data. If, for example, the data size of the generated data is larger than the page size, the data is divided into the page size and static color information is generated for each divided page size. It is assumed below that the data size of the write target data is equal to the page size, but the present embodiment is not limited to such an example.

Next, the operating system 27 references the coloring table 14 based on the base address set to the information storage unit 17 (step U4).

Next, the operating system 27 registers the generated static color information with an entry of the coloring table 14 to which the index corresponding to the secured logical address is attached (step U5).

After the logical address space being successfully secured by the operating system 27, the processes 6a, 6b, 6c executed by the processors 3a, 3b, 3c issue a reading request or writing request to the secured logical address space. At this point, the address management unit 18 determines the physical address for the logical address to which data is written and this processing will be described later.

When, with the processing described above, new data is generated and written into the mixed main memory 2 after the processes 6a, 6b, 6c being executed by the processors 3a, 3b, 3c, coloring information is generated for the newly generated data and registered with a new entry of the coloring table 14. Accordingly, new data can be written into the mixed main memory 2.

Figure 14:
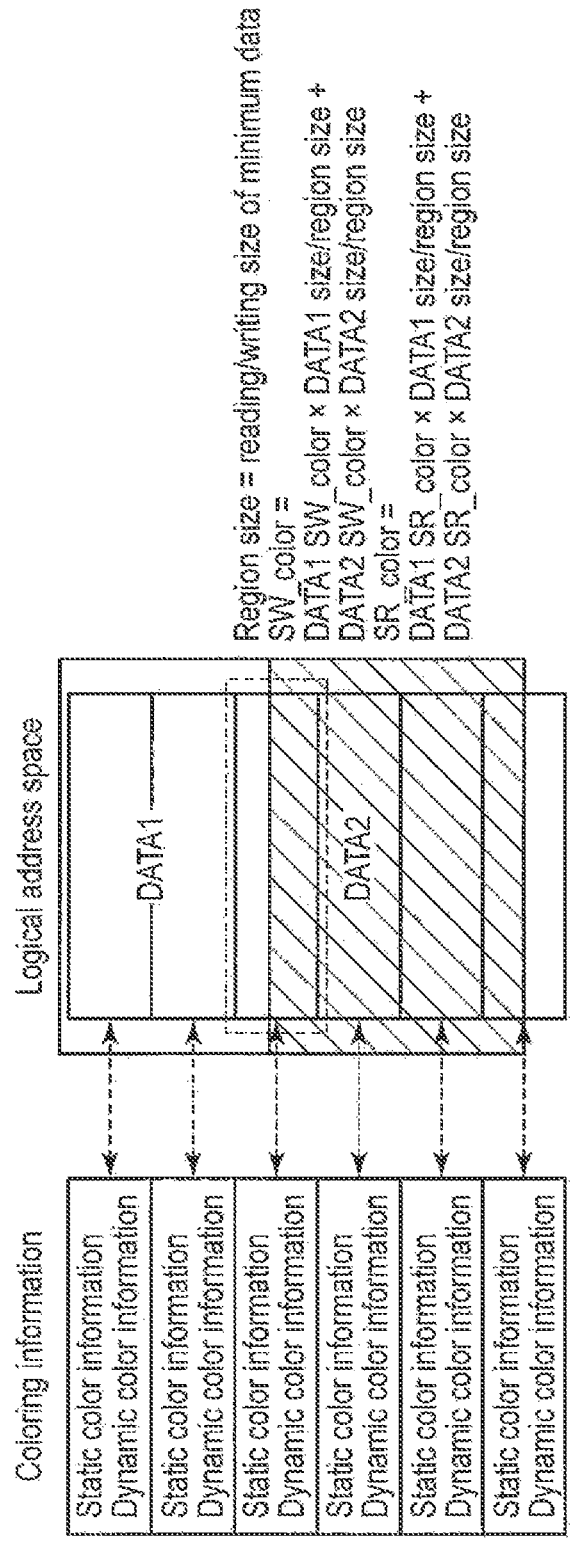
FIG. 14 is a diagram showing a second example of the alignment of entries of the coloring table according to the first embodiment.

Next, the alignment of entries of the coloring table 14 will be described with reference to FIGS. 13 and 14. FIG. 13 is a diagram showing a first example of an alignment of entries of the coloring table 14. FIG. 14 is a diagram showing a second example of an alignment of entries of the coloring table 14.

Entries of the coloring table 14 are compatible with the minimum read size of data (for example, the page size of a NAND flash memory), but the processes 6a, 6b, 6c are not forced to map after entries being aligned to the minimum read size of data when data is mapped to the logical address space. Thus, there is the possibility that a plurality of pieces of data corresponds to one entry of the coloring table 14.

In such a case, as shown in FIG. 13, the operating system 27 causes, among the plurality of pieces of data corresponds to one entry, the data whose reading frequency and writing frequency are estimated to be the highest to represent.

Alternatively, as shown in FIG. 14, the operating system 27 sets weighted average values of the static writing frequency SW_color and the static reading frequency SR_color of each piece of data with the size of data occupying one entry set a weight.

The static writing frequency SW_color and the static reading frequency SR_color shown in the coloring table 14 are embedded in source code such as the operating system 27 by a program developer or predicted by the operating system 27. However, a file or photo data may be used for another purpose than intended by the program developer. Generally, data such as photo data is accessed almost exclusively for reading and content of photo data is rarely rewritten. However, when a program to process photo data processes specific photo data, the photo data being processed may frequently be rewritten. In such a case, if the static writing frequency SW_color and the static reading frequency SR_color of the coloring table 14 can be rewritten by the user, a specific file can be moved to a region that allows for a more number of times of rewrite at a higher speed.

To realize such an operation, it is preferable to design the file system of the operating system 27 so that coloring information of each piece of data can be rewritten by software of the operating system 27. For example, it is preferable to design the information processing device 100 in such a way that An attribute corresponding to the coloring table 14 can be viewed on the GUI screen by opening property of a file by a common browser and to design the operating system 27 so that initial data thereof can be changed by the user on the GUI.

Figure 15:
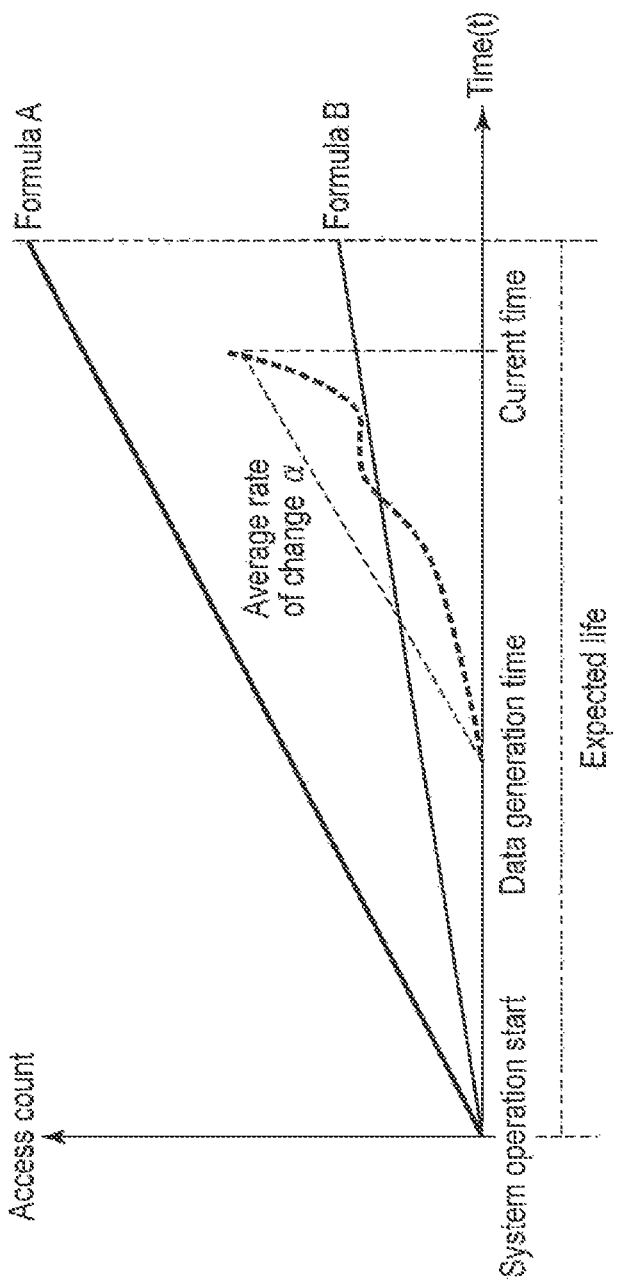
FIG. 15 is a diagram showing an example of a method of calculating a dynamic writing frequency DW_color and a dynamic reading frequency DR_color based on dynamic color information and static color information.

Next, the method of calculating the dynamic writing frequency DW_color and the dynamic reading frequency DR_color based on dynamic color information and static color information will be described with reference to FIG. 15. FIG. 15 is a diagram showing an example of the method of calculating the dynamic writing frequency DW_color and the dynamic reading frequency DR_color based on dynamic color information and static color information. In FIG. 15, the horizontal axis represents the time and the vertical axis represents the number of times of access (the reading count DWC_color or the writing count DRC_color).

If new data is generated at a data generation time, coloring information (including the data generation time) is generated for the newly generated data and registered with a new entry of the coloring table 14 and then, the data is written into the mixed main memory 12. With an occurrence of access (read or write) to the data after the data generation time, the number of times of access (the writing count DWC_color and the reading count DRC_color) increases with the passage of time. The number of times of access is increased by the dynamic color information management unit 25. The access frequency calculation unit 24 of the memory management device 1 calculates the dynamic writing frequency DW_color and the dynamic reading frequency DR_color based on the number of times of access.

The writing count DWC_color of the data and the reading count DRC_color of the data at the current time can be determined by referencing the coloring table 14. The dynamic writing frequency DW_color at the current time is determined by a time average (average rate of change $\alpha$) of the writing count DWC_color from the data generation time ST_color to the current time. The dynamic reading frequency DR_color at the current time is determined by a time average (average rate of change $\alpha$) of the reading count DRC_color from the data generation time ST_color to the current time. Accordingly, the dynamic writing frequency DW_color and the dynamic reading frequency DR_color of the data are calculated based on the dynamic color information (the writing count DWC_color and the reading count DRC_color).

Next, high or low of the frequency of access to the data is determined based on the calculated dynamic writing frequency DW_color and dynamic reading frequency DR_color. High or low of frequency of access is determined based on, for example, the memory specific information 11 of the mixed main memory 2 into which the data is written and the calculated dynamic writing frequency DW_color and dynamic reading frequency DR_color.

In FIG. 15, "accessible upper limit count×weight 1/data life" is set as the inclination of Formula A and "accessible upper limit count×weight 2/data life" is set as the inclination of Formula B, where weight 1>weight 2 holds. Weight 1 and weight 2 can arbitrarily be set in accordance with the mixed main memory 2 into which the data from which the dynamic writing frequency DW_color and the dynamic reading frequency DR_color are calculated is written.

If the average rate of change $\alpha <$ the inclination of Formula A holds, the dynamic access frequency of the data is determined to be high.

If the inclination of Formula B< the average rate of change $\alpha \leq$ the inclination of Formula A holds, the dynamic access frequency of the data is determined to be medium.

If the average rate of change $\alpha \leq$ the inclination of Formula B holds, the dynamic access frequency of the data is determined to be low.

Next, processing to read data from the mixed main memory 2 will be described with reference to FIG. 16. FIG. 16 is a flow chart showing an example of the processing to read the data.

First, the processes 6a, 6b, 6c executed by the processors 3a, 3b, 3c cause a reading request of data (read target data) (step W1).

Next, a virtual address specifying the read target data is converted into a logical address based on a page table (not shown) included in the processors 3a, 3b, 3c (step W2).

Next, the reading management unit 19 references the valid/invalid flag of the entry of the logical address corresponding to the read target data of the address conversion information 13 (step W3).

If the valid/invalid flag of the address conversion information 13 is 0 (step W3a), data is undefined because writing for the logical address has not occurred at once. In this case, the reading management unit 19 behaves as if to read 0 data for the size of the reading request (step W8) before proceeding to processing in step W10.

If the valid/invalid flag of the address conversion information 13 is 1 (step W3a), data writing for the logical address has occurred at least once. In this case, the reading management unit 19 references the address conversion information 13 to determine whether data corresponding to the logical address is stored in the volatile semiconductor memory 8 (step W4).

If the reading management unit 19 determines that data corresponding to the logical address is stored in the volatile semiconductor memory 8 (step W4a), the processing proceeds to step W10 to read the data from the volatile semiconductor memory 8.

If the reading management unit 19 determines that data corresponding to the logical address is not stored in the volatile semiconductor memory 8 (step W4a), the reading management unit 19 determines the method of reading the read target data from the nonvolatile semiconductor memories 9, 10 by referencing the coloring table 14 (step W5). Decision processing of the reading method will be described later.

Next, the reading management unit 19 determines whether the read target data needs to be moved (rewritten) by referencing the memory specific information 11 and the memory usage information 12 of the nonvolatile semiconductor memories 9, 10 in which the read target data is stored (step W6).

If the reading management unit 19 determines that the read target data does not need to be moved (step W6a), the processing proceeds to step W9.

If the reading management unit 19 determines that the read target data needs to be moved (step W6a), the reading management unit 19 moves the read target data to another region of the nonvolatile semiconductor memories 9, 10 (step W7) and then the processing proceeds to step W9.

In step W9, the memory usage information management unit 22 increments the reading count of the memory usage information 11 when data is read from a nonvolatile memory region. In step W10, the dynamic color information management unit 25 increments the reading count DRC_color of data of the coloring table 14 when the data is read. In step W11, the reading management unit 19 reads data based on a physical address obtained from a logical address and the address conversion information 13.

Figure 17:
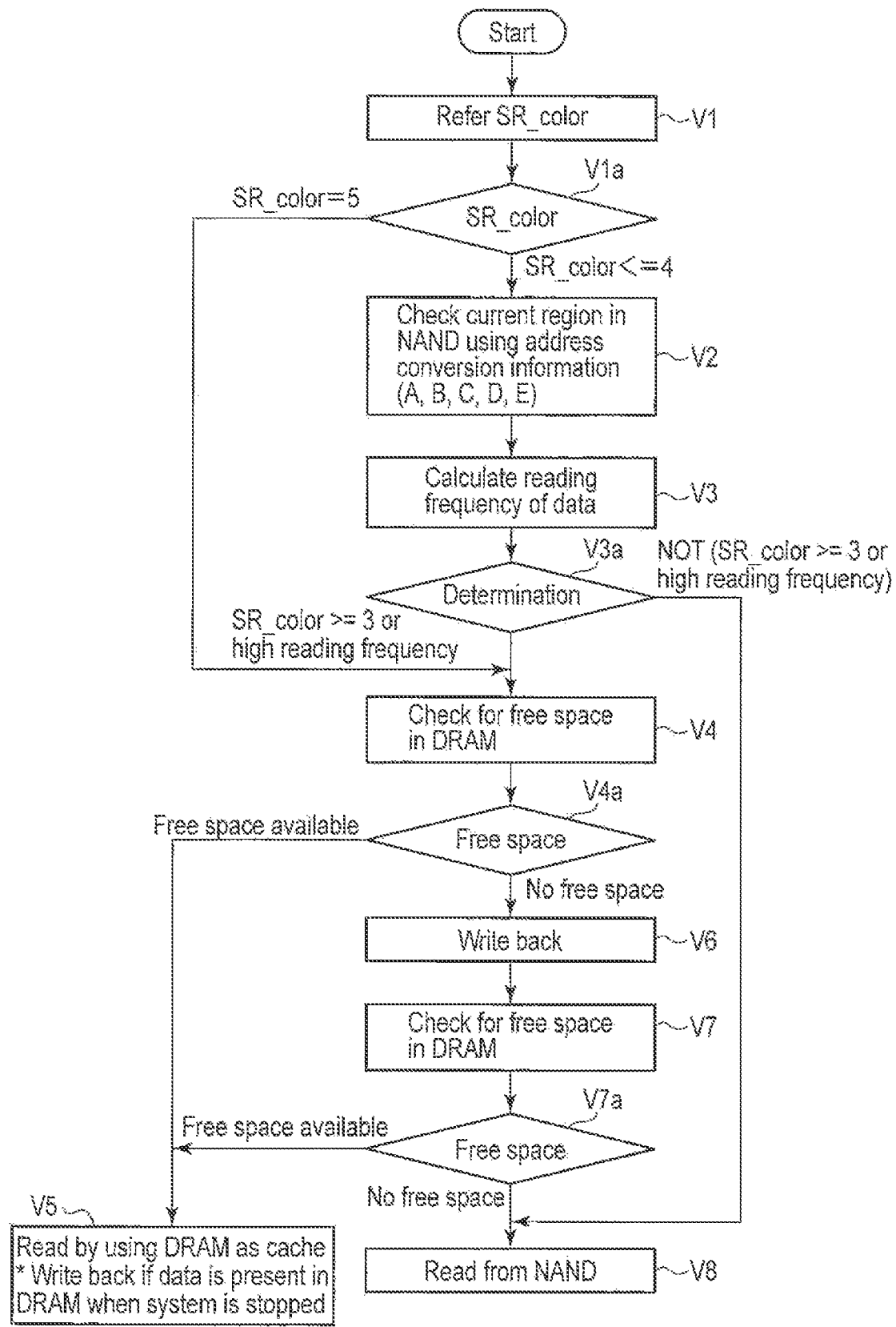
FIG. 17 is a flow chart showing an example of decision processing of reading method of data according to the first embodiment.

Next, decision processing of the reading method of data will be described with reference to FIG. 17. FIG. 17 is a flow chart showing an example of decision processing of the reading method of data. The decision processing of the reading method is processing to determine whether to use a memory region of the volatile semiconductor memory 8 as a cache when data is read from a memory region of the nonvolatile semiconductor memories 9, 10. This processing corresponds to step W5 in FIG. 16.

The mixed main memory 2 includes, as described above, the volatile semiconductor memory 8 and the nonvolatile semiconductor memories 9, 10. In the present embodiment, a portion of the volatile semiconductor memory 8 can be used as a cache memory. When data is read from the nonvolatile semiconductor memories 9, 10 of the mixed main memory 2, data whose reading frequency is high is read after being cached in the volatile semiconductor memory 8. On the other hand, data whose reading frequency is low is read directly from the nonvolatile semiconductor memories 9, 10 without being cached in the volatile semiconductor memory 8.

First, the reading management unit 19 references the static reading frequency SR_color of the read target data by referencing the coloring table 14 (step V1). If the static reading frequency SR_color is large (for example, SR_color=5) (step V1a), the processing proceeds to step V4 to cache the read target data in the volatile semiconductor memory 8 (DRAM region) from the nonvolatile semiconductor memories 9, 10.

If the static reading frequency SR_color of the read target data is small (for example, SR_color<=4) (step V1a), the reading management unit 19 checks the region into which the read target data is written by referencing the address conversion information 13 (step V2) and further, the access frequency calculation unit 24 calculates the dynamic reading frequency DR_color of the read target data (step V3).

If "SR_color 2≥3 or DR_color is high" holds for both the static reading frequency SR_color and the dynamic reading frequency DR_color of the read target data (step V3a), the reading management unit 19 checks whether there is free space into which the read target data can be written in the volatile semiconductor memory 8 (DRAM region) (step V4). If there is free space in the volatile semiconductor memory 8 (step V4a), the reading management unit 19 caches the read target data in the volatile semiconductor memory 8 (DRAM region) from the nonvolatile semiconductor memories 9, 10 (step V5). If there is no free space in the volatile semiconductor memory 8 (step V4a), the reading management unit 19 secures free space by writing data stored in the volatile semiconductor memory 8 back to the nonvolatile semiconductor memories 9, 10 to erase the data stored in the volatile semiconductor memory 8 (step V6). After the write-back processing, the reading management unit 19 checks for free space of the volatile semiconductor memory 8 again (step V7). The processing proceeds to step V5 if free space is present in the volatile semiconductor memory 8 (step V7a) and the processing proceeds to step V8 if free space is not present in the volatile semiconductor memory 8 (step V7a).

If "SR_color 2≥3 or DR_color is high" does not hold for the static reading frequency SR_color and the dynamic reading frequency DR_color of the read target data (step V3a), the reading management unit 19 does not cache the read target data in the volatile semiconductor memory 8 and reads the read target data directly from the nonvolatile semiconductor memories 9, 10 (step V8).

The reading method is determined, as described above, by referencing the static reading frequency SR_color and the dynamic reading frequency DR_color.

In FIG. 17, a determination of the data life SL_color is not executed. The reason therefor will be described. As will be described later, data whose data life SL_color is short is arranged in the volatile semiconductor memory 8 when the data is written. Thus, data whose valid/invalid flag is 1 and whose data life SL_color indicates a short life will be stored in the volatile semiconductor memory 8. As a result, the determination based on the data life SL_color is not needed in FIG. 17.

Next, the reading method of data shown in FIGS. 9 and 10 will be described more concretely. The reading method of the data shown in FIGS. 9 and 10 is determined as described below by following the flow chart of the decision processing of the reading method of data illustrated in FIG. 17.

First, a high reading frequency and a low writing frequency are estimated for the text region of the kernel for which 5 is set to the static reading frequency SR_color and 1 is set to the static writing frequency SW_color. First data in the text region of the kernel is read when the operating system 27 performs various kinds of processing and thus, the reading count increases and it becomes necessary to read the first data still faster.

The memory management device 1 writes the first data read from the nonvolatile semiconductor memories 9, 10 into the secondary cache memory 5b or the primary cache memory 4b of the processor 3b and also transfers the read first data to the memory region of the volatile semiconductor memory 8 of the mixed main memory 2 in parallel.

When the same first data is read again, the first data is read from the secondary cache memory 5b or the primary cache memory 4b of the processor 3b or, if no cache hit occurs, from the memory region of the volatile semiconductor memory 8 of the mixed main memory 2. The first data stored in the memory region of the volatile semiconductor memory 8 of the mixed main memory 2 is held in the volatile semiconductor memory 8 till power-off as long as the memory region of the volatile semiconductor memory 8 is not exhausted.

Next, the data region of the kernel for which 5 is set to the static reading frequency SR_color and 5 is set to the static writing frequency SW_color is a region that is newly generated and initialized each time the system (the information processing device 100) is activated. Thus, a second data life SL_color in the data region of the kernel is estimated to be short. The memory management device 1 first references the second data life SL_color. Second data is present in the volatile semiconductor memory 8 as long as the memory region of the volatile semiconductor memory 8 is not exhausted and is erased from the volatile semiconductor memory 8 at power-off.

Next, the reading frequency for the region of a user program for which 4 is set to the static reading frequency SR_color and 1 is set to the static writing frequency SW_color is lower than the reading frequency of the kernel that is reenterably invoked by all processes. Third data in the region of user program is arranged in the memory region of the volatile semiconductor memory 8, but if the memory region of the volatile semiconductor memory 8 of the mixed main memory 2 is fully occupied, the third data is to be written back from the volatile semiconductor memory 8 to the memory region of the nonvolatile semiconductor memories 9, 10. The order of third data to be written back is determined based on information of the coloring table 14. When written back, the third data is moved from the volatile semiconductor memory 8 to the nonvolatile semiconductor memories 9, 10 in ascending order of reading count.

Fourth data whose data life SL_color is set to be short of fourth data in a region for which 4 is set to the static reading frequency SR_color and 4 is set to the static writing frequency SW_color and which is dynamically secured by a program is present, like in the data region of the kernel, in the volatile semiconductor memory 8 as long as the memory region of the volatile semiconductor memory 8 is not exhausted and is erased from the volatile semiconductor memory 8 at power-off.

On the other hand, fourth data whose data life SL_color is set to be long is arranged in the memory region of the volatile semiconductor memory 8, but if the memory region of the volatile semiconductor memory 8 of the mixed main memory 2 is fully occupied, the fourth data is to be written back from the volatile semiconductor memory 8 to the memory region of the nonvolatile semiconductor memories 9, 10.

Next, data handled as a file to be referenced by a process will be described. In FIG. 10, the data life SL_color of all data handled as a file to be referenced by the process is set to be long.

An extremely low writing frequency and a high predicted reading frequency are estimated by the operating system 27 for fifth data included in a file class for which 1 is set to the static writing frequency SW_color and 3 is set to the static reading frequency SR_color. In this case, the memory management device 1 arranges the fifth data in the memory region of the volatile semiconductor memory 8, but if the memory region of the volatile semiconductor memory 8 of the mixed main memory 2 is fully occupied, the fifth data is to be written back from the volatile semiconductor memory 8 to the memory region of the nonvolatile semiconductor memories 9, 10.

The extremely low static writing frequency SW_color and the low predicted static reading frequency SR_color are estimated by the operating system 27 for sixth data included in a file class for which 1 is set to the static writing frequency SW_color and 2 is set to the static reading frequency SR_color. If the static reading frequency SR_color is not determined to be high like in this case, the memory management device 1 directly accesses the nonvolatile semiconductor memories 9, 10 without passing through a cache of the volatile semiconductor memory 8 when reading data.

The extremely low static writing frequency SW_color and the extremely low predicted static reading frequency SR_color are estimated by the operating system 27 for seventh data included in a file class for which 1 is set to the static writing frequency SW_color and 1 is set to the static reading frequency SR_color. If the static reading frequency is not determined to be high like in this case, the memory management device 1 directly accesses the nonvolatile semiconductor memories 9, 10 without passing through a cache of the volatile semiconductor memory 8 when reading data.

The reading method of the read target data is determined, as described above, based on coloring information of the read target data. Accordingly, the reading method suited to the characteristic of the read target data (the static reading frequency SR_color, the static writing frequency SW_color, and the data life SL_color) can be used, improving efficiency to read data.

Figure 18:
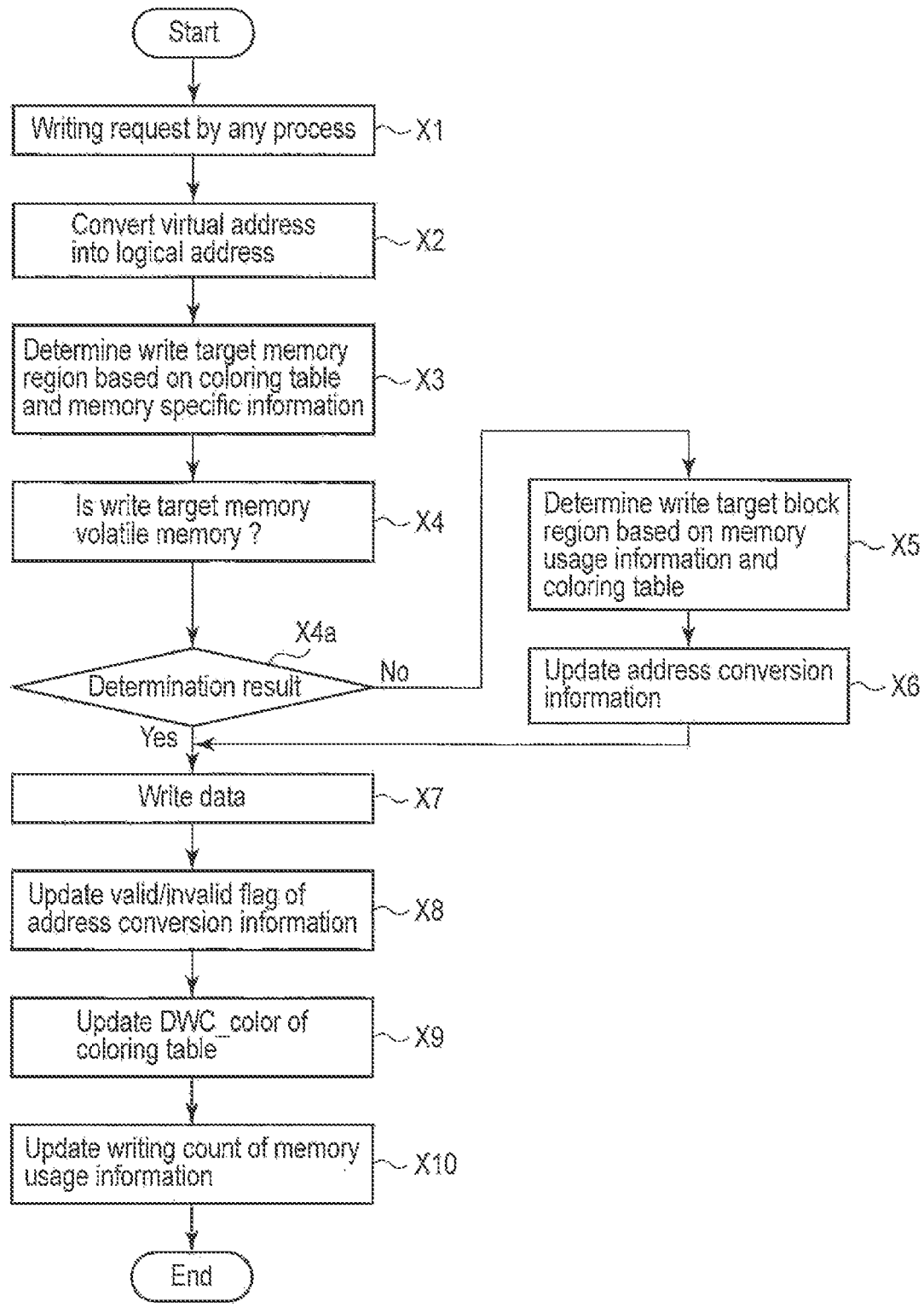
FIG. 18 is a flow chart showing an example of writing processing of data according to the first embodiment.

Next, write processing of data into the mixed main memory 2 will be described with reference to FIG. 18. FIG. 18 is a flow chart showing an example of write processing of data.

First, the processes 6a, 6b, 6c executed by the processors 3a, 3b, 3c cause a writing request of data (write target data) (step X1).

Next, a virtual address specifying the write target data is converted into a logical address based on a page table (not shown) included in the processors 3a, 3b, 3c (step X2).

Next, the writing management unit 20 determines a write target memory region of the mixed main memory 2 by referencing the coloring table 14 (step X3). The selection of the write target memory region will be described later.

The writing management unit 20 determines whether the write target memory selected in step X3 is the volatile semiconductor memory 8 (step X4). If, as a result of the determination, the selected write target memory is the volatile semiconductor memory 8 (step X4*a*), processing in step X7 is performed and, if the selected write target memory is a nonvolatile semiconductor memory (step X4*a*), processing in step X5 is performed.

In step X5, the writing management unit 20 determines a write target block region in the memory region of the nonvolatile semiconductor memories 9, 10 by referencing the memory usage information 11 and the coloring table 14. In step X6, the address management unit 18 updates the address conversion information 13 based on the physical address of a page in the write target block. If the nonvolatile semiconductor memories 9, 10 are NAND flash memories, the same physical address is not overwritten and thus, an update of the physical address accompanying the writing is needed.

After the physical address of writing destination is being determined, the writing management unit 20 performs write processing of data (step X7). Subsequently, the address management unit 18 sets the valid/invalid flag of the address conversion information 13 to 1 (step X8). The dynamic color information management unit 25 increments the writing count DWC_color of the coloring table 14 (step X9) and the memory usage information management unit 22 increments the writing count of the memory usage information 11 (step X10).

Figure 19:
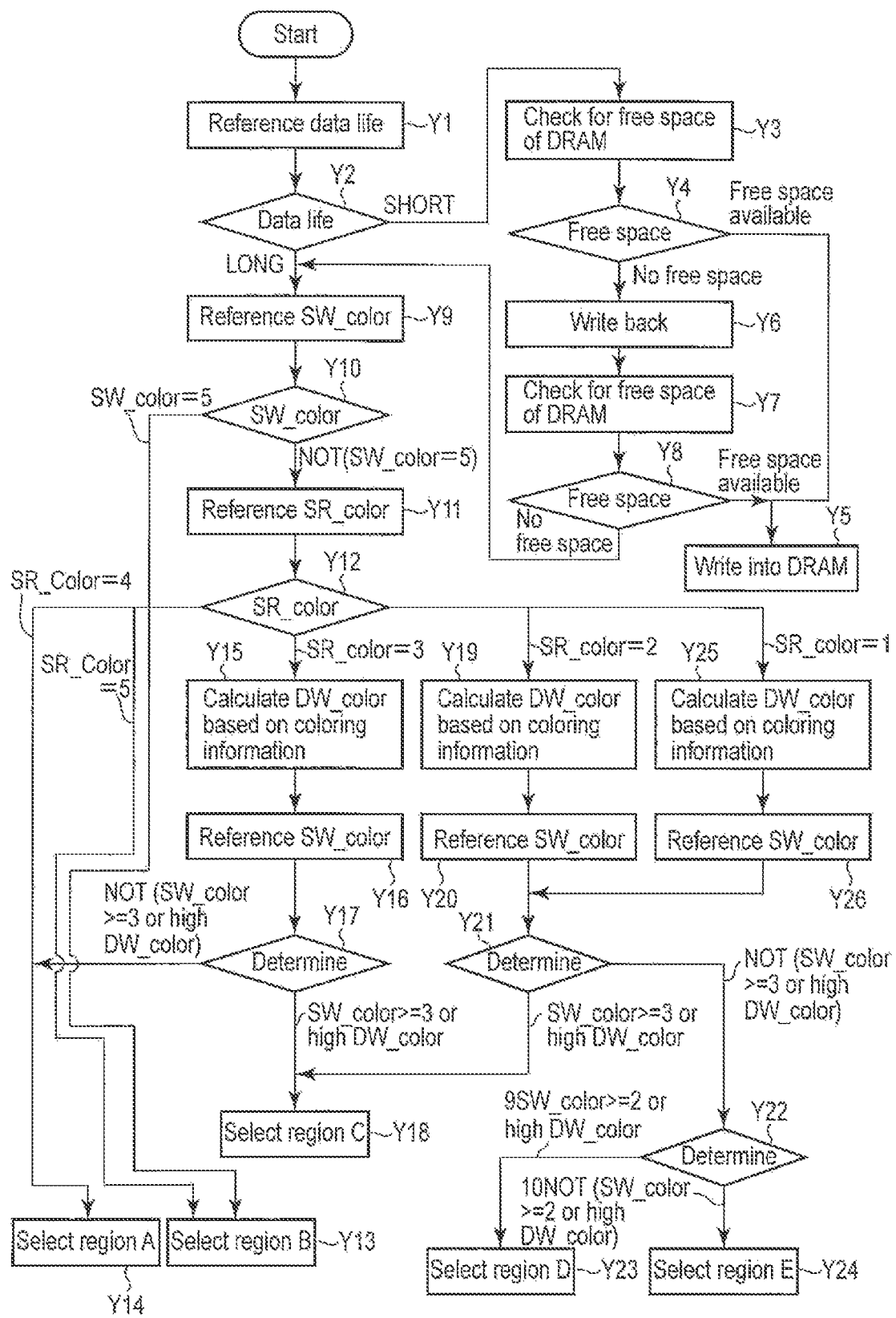
FIG. 19 is a flow chart showing an example of decision processing of writing destination region of data according to the first embodiment.

Next, decision processing of the write target memory region of data will be described with reference to FIG. 19. FIG. 19 is a flow chart showing an example of decision processing of the writing destination region of data.

In step Y1, the writing management unit 20 references the data life SL_color of the write target data.

In step Y2, the writing management unit 20 determines whether or not the data life SL_color is longer than a predetermined value. If the data life SL_color is equal to or longer than the predetermined value, the processing proceeds to step Y9.

If the data life is shorter than the predetermined value, in step Y3, the writing management unit 20 checks for free space of the DRAM region and, in step Y4, the writing management unit 20 determines whether there is free space in the DRAM region.

If there is free space in the DRAM region, in step Y5, the writing management unit 20 writes the write target data into the DRAM region.

If there is no free space in the DRAM region, in step Y6, the writing management unit 20 performs write-back processing from the DRAM region to the other nonvolatile semiconductor memory. Then, in step Y7, the writing management unit 20 checks for free space of the DRAM region and, in step Y8, the writing management unit 20 determines whether there is free space in the DRAM region.

If there is free space in the DRAM region, the processing returns to step Y5 and the writing management unit 20 writes the write target data into the DRAM region.

If there is no free space in the DRAM region, the processing proceeds to step Y9.

In step Y9, the writing management unit 20 references the static writing frequency SW_color of the write target data managed by the coloring table 14.

In step Y10, the writing management unit 20 determines whether 5 is set to the static writing frequency SW_color (whether or not the static writing frequency SW_color of the write target data is high).

If 5 is set to the static writing frequency SW_color, the processing proceeds to Y13 and the writing management unit 20 selects the B region as the writing destination of the write target data.

If a value which is not 5 (value less than 5) is set to the static writing frequency SW_color, in step Y11, the memory management device 1 references the static reading frequency SR_color of the write target data managed by the coloring table 14.

In step Y12, the writing management unit 20 determines to which of 1 to 5 the static reading frequency SR_color is set.

If, in step Y12, 5 is set to the static reading frequency SR_color, in step Y13, the writing management unit 20 selects the B region as the writing destination of the write target data.

If, in step Y12, 4 is set to the static reading frequency SR_color, in step Y14, the writing management unit 20 selects the A region as the writing destination of the write target data.

If, in step Y12, 3 is set to the static reading frequency SR_color, in step Y15, the writing management unit 20 calculates the dynamic writing frequency DW_color of the data based on coloring information of the data. Next, in step Y16, the writing management unit 20 references the static writing frequency SW_color of the write target data managed by the coloring table 14.

In step Y17, the writing management unit 20 determines whether or not "the static writing frequency SW_color is equal to or more than 3 or the dynamic writing frequency DW_color of data is at a high level" holds.

If, in step Y17, "SW_color is equal to or more than 3 or the dynamic writing frequency DW_color of data is at a high level" does not hold, the processing proceeds to step Y14 and the writing management unit 20 selects the A region.

If, in step Y17, "SW_color is equal to or more than 3 or the dynamic writing frequency DW_color of data is at a high level" holds, the processing proceeds to step Y18 and the writing management unit 20 selects the C region.

If, in above step Y12, 2 is set to the static reading frequency SR_color, in step Y19, the writing management unit 20 calculates the dynamic writing frequency DW_color of the data based on coloring information of the data.

In step Y20, the writing management unit 20 references the static writing frequency SW_color of the write target data managed by the coloring table 14.

In step Y21, the writing management unit 20 determines whether or not "SW_color is equal to or more than 3 or the calculated dynamic writing frequency DW_color is at a high level" holds.

If, in step Y21, "SW_color is equal to or more than 3 or the calculated dynamic writing frequency DW_color is at a high level" holds, the processing proceeds to step Y18 and the writing management unit 20 selects the C region.

If, in step Y21, "SW_color is equal to or more than 3 or the calculated dynamic writing frequency DW_color is at a high level" does not hold, the processing proceeds to step Y22.

In step Y22, the writing management unit 20 determines whether or not "SW_color is equal to or more than 2 or the calculated dynamic writing frequency DW_color is at a medium level" holds.

If, in step Y22, "SW_color is equal to or more than 2 or the calculated dynamic writing frequency DW_color is at a medium level" holds, the processing proceeds to step Y23 and the writing management unit 20 selects the D region.

If, in step Y22, "SW_color is equal to or more than 2 or the calculated dynamic writing frequency DW_color is at a medium level" does not hold, the processing proceeds to step Y24 and the writing management unit 20 selects the E region.

If, in step Y12, 1 is set to the static reading frequency SR_color, in step Y25, the writing management unit 20 calculates the dynamic writing frequency DW_color of the data based on coloring information of the data.

In step Y26, the writing management unit 20 references the static reading frequency SR_color of the write target data managed by the coloring table 14. Then, the processing returns to step Y21.

In the example of FIG. 19, the writing destination region of data is determined by using the static color information and the dynamic color information, but the writing destination region of data may be determined by using only static color information. That is, a portion of the flow chart in the example of FIG. 19 may be diverted to determine the writing destination region of data based on the static color information.

For example, the developer of the operating system 27 makes settings as shown in FIGS. 9 and 10 for implementation of the data reading method of the reading management unit 19 and the data writing method of the writing management unit 20.

For example, the number of times the first data is read from the text region of the kernel for which 5 is set to SR_color and 1 is set to SW_color is estimated to be large and the number of times the first data is written thereinto is estimated to be small. The first data is moved to the volatile semiconductor memory 8 during system operation before being read or written based on the decision operation of the reading method shown in FIG. 17. Thus, the frequency with which the first data is actually written into the nonvolatile semiconductor memories 9, 10 is low. However, the importance of the first data is high and thus, in FIG. 19, the writing management unit 20 writes the first data into the B region of the nonvolatile semiconductor memory 9, which is an SLC.

Next, the data region of the kernel for which 5 is set to SR_color and 5 is set to SW_color is a region that is newly generated and initialized each time the information processing device 100 is activated and thus, the data life of the second data in the data region of the kernel is estimated to be short. The writing management unit 20 first references the data life SL_color of the second data. The second data is always present in the volatile semiconductor memory 8 during operation of the information processing device 100 and is erased from the volatile semiconductor memory 8 at power-off. Therefore, the second data is not written into the nonvolatile semiconductor memories 9, 10.

Next, the reading frequency for the region of the user program for which 4 is set to SR_color and 1 is set to SW_color is lower than the reading frequency of the kernel that is reenterably invoked by all processes. The third data in the region of the user program is written into the memory region of the nonvolatile semiconductor memories 9, 10 only if not accessed for a long time by the reading method shown in FIG. 16. Thus, the frequency with which the third data is written into the nonvolatile semiconductor memories 9, 10 is low. The third data is low in importance when compared with data in the text region of the kernel and so is written into the A region, which is an MLC region in FIG. 19.

The fourth data whose data life SL_color is set to be short of fourth data in a region for which 4 is set to SR_color and 4 is set to SW_color and which is dynamically secured by a program is always present, like in the data region of the kernel, in the volatile semiconductor memory 8 during operation of the information processing device 100. The writing management unit 20 first references the data life SL_color of the second data. The fourth data is always present in the volatile semiconductor memory 8 during system operation, is erased from the volatile semiconductor memory 8 at power-off and thus is not written into the nonvolatile semiconductor memories 9, 10.

On the other hand, the fourth data whose data life SL_color is set to be long is arranged in the memory region of the volatile semiconductor memory 8, but if the memory region of the volatile semiconductor memory 8 of the mixed main memory 2 is fully occupied, the fourth data is to be written back from the volatile semiconductor memory 8 to the memory region of the nonvolatile semiconductor memories 9, 10. The text region of the program is high in importance of data and thus, data in the text region of the program is written into the C region, which is an SLC.

Next, data handled as a file to be referenced by a process will be described. In FIG. 10, the data life SL_color of all files referenced by the process is set to be long.

An extremely low writing frequency and a high predicted reading frequency are estimated by the operating system 27 for the fifth data in a system file class for which 1 is set to SW_color and 3 is set to SR_color. In this case, the writing management unit 20 arranges the fifth data in the memory region of the volatile semiconductor memory 8, but if the memory region of the volatile semiconductor memory 8 of the mixed main memory 2 is fully occupied, the fifth data is to be written back from the volatile semiconductor memory 8 to the memory region of the nonvolatile semiconductor memories 9, 10. The writing frequency of the fifth data is determined to be low and thus, the writing management unit 20 arranges the fifth data in the MLC region.

An extremely high writing frequency and a high predicted reading frequency are estimated by the operating system 27 for a file class for which 3 is set to SW_color and 3 is set to SR_color. Thus, the writing management unit 20 arranges data in the file class for which 3 is set to SW_color and 3 is set to SR_color in the SLC region.

An extremely low writing frequency and a low predicted reading frequency are estimated by the operating system 27 for the sixth data included in a file class for which 1 is set to SW_color and 2 is set to SR_color. The sixth data is determined to be low in importance as a file and thus, the writing management unit 20 arranges the sixth data in the MLC region.

An extremely low writing frequency and an extremely low predicted reading frequency are estimated by the operating system 27 for the seventh data included in a file class for which 1 is set to SW_color and 1 is set to SR_color. The seventh data is determined to be low in importance as a file and thus, the writing management unit 20 arranges the seventh data in the MLC region.

If a write target memory region is determined by the above processing, the writing management unit 20 determines the physical address of writing destination. In this case, the writing management unit 20 suppresses an occurrence of wear leveling to reduce unnecessary erasure processing by referencing the coloring table 14 to appropriately select the physical address of writing destination.

The wear leveling means interchanging (exchanging) data between blocks so that, for example, a difference between the maximum erasure count of a block and the minimum erasure count of a block is within a predetermined threshold. For example, data in a NAND flash memory cannot be overwritten without erasure processing and thus, a data movement destination needs to be an unused block and erasure processing of a block that has stored data arises.

Next, decision processing of the block into which data is to be written will be described with reference to FIG. 20. FIG. 20 is a diagram illustrating decision processing of a write target block for data.

Data in the nonvolatile semiconductor memories 9, 10 is erased in units of block. An erasure count EC for each block region of the nonvolatile semiconductor memories 9, 10 can be acquired by referencing the memory usage information 11. The ratio of the erasure count EC to the upper limit of the erasure count (erasable upper limit count) of a block region is set as a wear-out rate.

If the erasure count EC of a block region reaches the erasable upper limit count of the block region, the wear-out rate is 100%. If the wear-out rate is 100%, data is not written into the block region.

If the erasure count EC of a block region is close to the upper limit of the erasure count of the block region (for example, 90%), data writing for the block region is decreased. The writing management unit 20 writes write target data whose writing frequency (the static writing frequency SW_color, the dynamic writing frequency DW_color) is low (for example, SW_color is 1 and DW_color is "medium") into a block region with a high wear-out rate (for example, the wear-out rate is less than 90%) by referencing the coloring table 14.

On the other hand, the erasure count EC of a block region is lower than the upper limit of the erasure count of the block region (for example, 10%), numbers of data writing for the block region may be executed. The writing management unit 20 writes write target data whose writing frequency (the static writing frequency SW_color, the dynamic writing frequency DW_color) is high (for example, SW_color is 5 and DW_color is "high") into a block region with a low wear-out rate (for example, the wear-out rate is less than 10%) by referencing the coloring table 14.

The block region into which the write target data is written is determined, as described above, based on coloring information of the write target data and the wear-out rate of the block region. Accordingly, the write target block region suited to properties (writing frequency) of the write target data can be selected, improving reliability of data. Moreover, as will be described below, the life of a mixed main memory can be prolonged.

Next, details and effects of processing to determine the block region into which the write target data is written based on coloring information, the memory usage information 11, and the memory specific information 12 of the write target data with reference to FIGS. 21 to 25.

FIG. 21 is a graph showing an example of a change of the erasure count in an arbitrary block of the nonvolatile semiconductor memories 9, 10. In FIG. 21, the vertical axis represents the erasure count and the horizontal axis represents the time.

With the passage of time, an ideal erasure count of each block region changes. In the information processing device 1 using the nonvolatile semiconductor memories 9, 10 such as a NAND flash memory, the nonvolatile semiconductor memories 9, 10 will deteriorate in the future, which makes replacement of the nonvolatile semiconductor memories 9, 10 necessary. To use many block regions of the nonvolatile semiconductor memories 9, 10 before memory replacement, it is necessary to level out the erasure count through wear leveling. FIG. 21 shows a change of the erasure count of an arbitrary block region of the nonvolatile semiconductor memories 9, 10. It is preferable for the erasure count of a block region to reach the erasable upper limit count when the life expected of the block region is reached.

For example, in order for all block regions to follow the change of the erasure count shown in FIG. 21, the threshold for a difference of the erasure count of each block region can be set small for wear leveling.

FIG. 22 shows graphs showing an example of a change when the threshold for a difference of the erasure count is set small for wear leveling.

Broken lines in FIG. 22 show the range of a variation of the erasure count of each block region. As shown in FIG. 22, the variation of the erasure count of each block region is made smaller by reducing the threshold, but an occurrence count of erasure processing for wear leveling increases, which could result in a shorter life of the whole nonvolatile semiconductor memories 9, 10.

To reduce dispersion of the erasure count and suppress the occurrence count of erasure processing by wear leveling, the writing management unit 20 makes a selection of the erasure block region based on the memory usage information 11, the memory usage information 12, and the coloring information 14 when data is written.

FIG. 23 is a graph showing an example of grouping of block regions in accordance with the erasure count.

FIG. 24 is a diagram showing determination criteria for grouping block regions in accordance with the erasure count.

In the present embodiment, each block region is grouped based on the erasure count. Information showing a result of grouping a block region is stored as the memory usage information 11. Incidentally, the information showing the result of grouping the block region may also be stored as the memory specific information 12.

A thick line in FIG. 23 shows a change of a minimum erasure count and a broken line shows a threshold of wear leveling. As shown in FIG. 23, each block region is classified into a group of a respective erasure count within a range of the threshold (within a range of a variation) of wear leveling.

When one block region becomes writable again after data being erased, the memory usage information management unit 22 determines to which group the block region belongs based on a determination table as shown in FIG. 24 and stores the group in the memory usage information 11.

In the determination table shown in FIG. 24, an interval between a minimum erasure count of erasure counts of all block regions and a value obtained by adding the threshold for determining whether to implement wear leveling to the minimum erasure count is divided by the number of groups. The groups are set as h, g, f, e, d, c, b, a upward in the divided range. In the determination table, the upper limit of the erasure count and the lower limit of the erasure count are set for each group.

Figure 25:
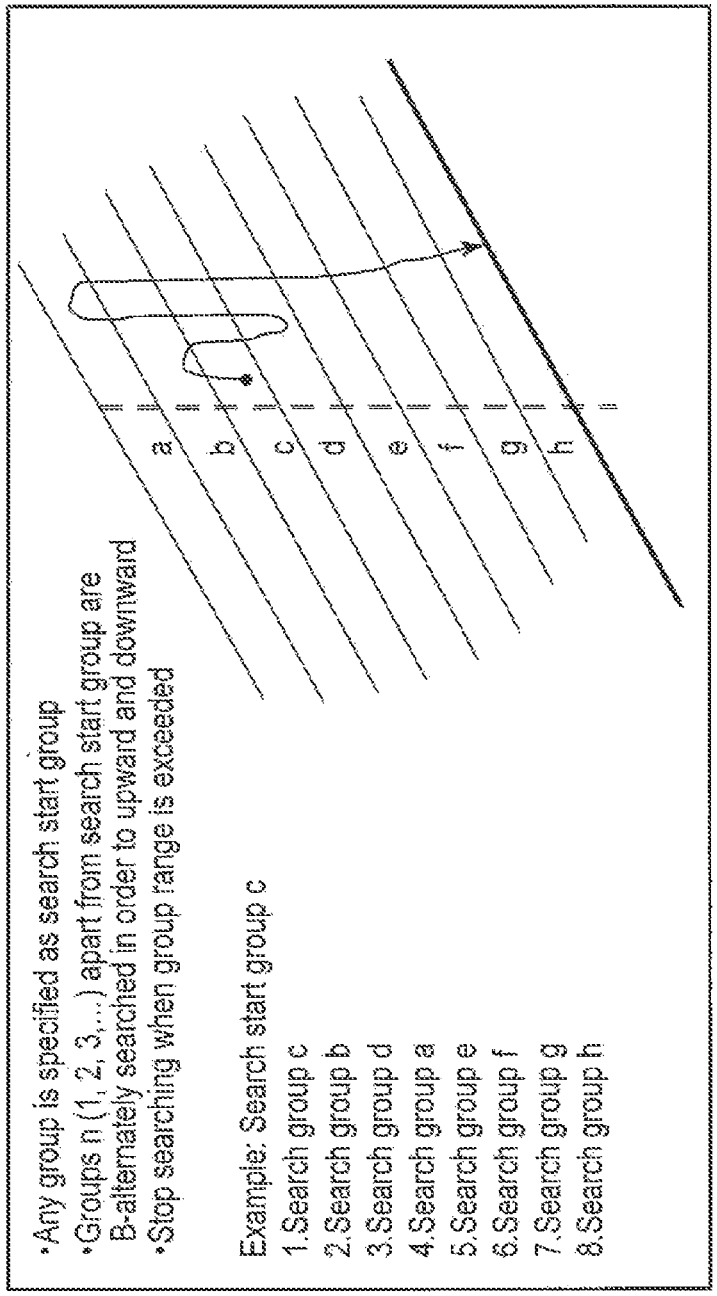
FIG. 25 is a diagram showing an example of a search of the block region for wear leveling.

FIG. 25 is a diagram showing an example of a search of block regions for wear leveling.

The writing management unit 20 determines the group serving as a reference to search for the block region of write target data based on information of the coloring table 14. If, for example, the access frequency of the write target data is high, a group whose erasure count is small is determined as the reference and if the access frequency of the write target data is low, a group whose erasure count is large is determined as the reference. It is assumed below that the group c is determined for the write target data.

When the group c is determined as a search reference for the write target data, as shown in FIG. 25, the writing management unit 20 searches for a block region belonging to the determined group c of the write target data based on the memory usage information 11.

If a block region belonging to the determined group c of the write target data is present, the block region is determined as the writing destination of the write target data.

On the other hand, if no block region belonging to the determined group c of the write target data is present, the writing management unit 20 searches for a block region belonging to the group b in the neighborhood of the determined group c of the write target data.

If a block region belonging to the neighboring determined group b of the write target data is present, the block region belonging to the neighboring group b is selected as the writing destination of the write target data.

If no block region belonging to the neighboring determined group b of the write target data is present, a search of the neighboring group d of the group c for the write target data is further performed similarly until the block region is determined. When a physical address of the block region into which the data is written is determined by the search processing, the writing management unit 20 writes the data and the address management unit 18 updates the address conversion information 13.

Incidentally, the writing management unit 20 may determine an address of the writing destination by using another search method of a block region. For example, the writing management unit 20 manages writable block regions (erasure processed) as a tree structure (such as B-Tree, B+Tree, RB-Tree, or the like) in which the erasure count is used as a key and an erasure block region is used as a node and stores the tree structure in the memory specific information 12 or the memory usage information 11. The writing management unit 20 searches the tree by using a reference erasure count as a key to extract a block region with the closest erasure count.

When data is erased by the arbitrary process 3b, the operating system 27 erases content of the coloring table 14 about the data. When content of the coloring table 14 is erased, the address management unit 18 erases a physical address corresponding to a logical address of the erased data in the address conversion information 13.

If data is present in the volatile semiconductor memory 8, the data in the volatile semiconductor memory 8 is erased.

Next, a configuration including a cache memory in the memory management device 1 according to the present embodiment will be described with reference to FIG. 26. FIG. 26 is a block diagram showing an example of the memory management device further including a cache memory in the memory management device 1 according to the present embodiment. In FIG. 26, the processor 3b of the processors 3a, 3b, 3c will representatively be described, but the other processors 3a, 3c can also be described in the same manner.

The memory management device 1 further includes a cache memory 28.

The processor 3b can directly access the primary cache memory 4b the secondary cache memory 5b, and further the cache memory 28.

When page-in or page-out occurs in one of the primary cache memory 4b, the secondary cache memory 5b, and the cache memory 28, the memory management device 28 accesses the mixed main memory 2.

An implementation example of the memory management device 1, the mixed main memory 2, and the processor 3 will be described based on an example in FIG. 27.

FIG. 27A is a block diagram showing a first implementation example of the memory management device 1, the mixed main memory 2, and the processor 3a. In FIG. 27A, a case when the volatile semiconductor memory 8 is a DRAM and the nonvolatile semiconductor memories 9, 10 are NAND flash memories will be described, but the present embodiment is not limited to such an example.

The processor 3a includes a memory controller (MMU) 3ma, the primary cache memory 4a, ands the secondary cache memory 4b. The memory management device 1 includes a DRAM controller. The processor 3a and the memory management device 1 are formed on the same board (for example, SoC).

The volatile semiconductor memory 8 is controlled by the DRAM controller included in the memory management device 1. The nonvolatile semiconductor memories 9, 10 are controlled by the memory management device 1. In the implementation example in FIG. 27A, the memory module on which the volatile semiconductor memory 8 is mounted and the memory module on which the nonvolatile semiconductor memories 9, 10 are mounted are separate modules.

FIG. 27B is a block diagram showing a first implementation example of the memory management device 1, the mixed main memory 2, and the processor 3a. In FIG. 27B, a case when the volatile semiconductor memory 8 is a DRAM and the nonvolatile semiconductor memories 9, 10 are NAND flash memories will be described, but the present embodiment is not limited to such an example. The description of the same elements as those in FIG. 27A is omitted.

In the example of FIG. 27B, the memory management device 1 is electrically connected to the chip on which the processor 3a is mounted from outside. Also, the volatile semiconductor memory 8 is connected to the memory management device 1. The memory management device 1 includes the DRAM controller (not shown).

Next, another configuration mode of the memory management device 1 and the information processing device 100 according to the present embodiment will be described with reference to FIG. 28. In the memory management device 1 and the information processing device 100 shown in FIG. 1, counting (incrementing) for the writing count DWC_color and the reading count RWC_color of data are managed by the dynamic color information management unit 22 of the memory management device 1. In the memory management device 1 and the information processing device 100 shown in FIG. 28, by contrast, the writing count DWC_color and the reading count RWC_color of data are counted by memory controllers 3ma, 3mb, 3mc included in the processors 3a, 3b, 3c. In the description that follows, the memory controller 3ma of the memory controllers 3ma, 3mb, 3mc will representatively be described, but the other memory controllers 3mb, 3mc are also described in the same manner.

The memory controller 3ma included in the processor 3a includes a counter cta that counts the writing count DWC_color and the reading count DRC_color of data. Further, the memory controller 3ma includes count information cia that manages the writing count DWC_color and the reading count DRC_color of data.

When, for example, the processor 3a causes a load instruction on data, the counter cta counts (increments) the reading count DRC_color of the data and updates the count information cia. Also when, for example, the processor 3a causes a store instruction on data, the counter cta counts (increments) the writing count DWC_color of the data and updates the count information cia.

The writing count DWC_color and the reading count DRC_color of data managed by the count information cia are periodically reflected in the writing count DWC_color and the reading count DRC_color of the coloring table 14 of the memory management device 1 of the data.

In the configuration mode in FIG. 28, the following effect is gained. That is, if the operating frequency of the memory management device 1 is on the order of MHz while the operating frequency of the processor 3a is on the order of GHz, a case when it is difficult for the memory management device 1 to count writing and reading caused by the processor 3a can be considered. In the configuration mode in FIG. 28, by contrast, writing and reading are counted by the counter cta of the processor 3a and thus, the writing count and reading count at high operating frequency can be counted.

Figure 29:
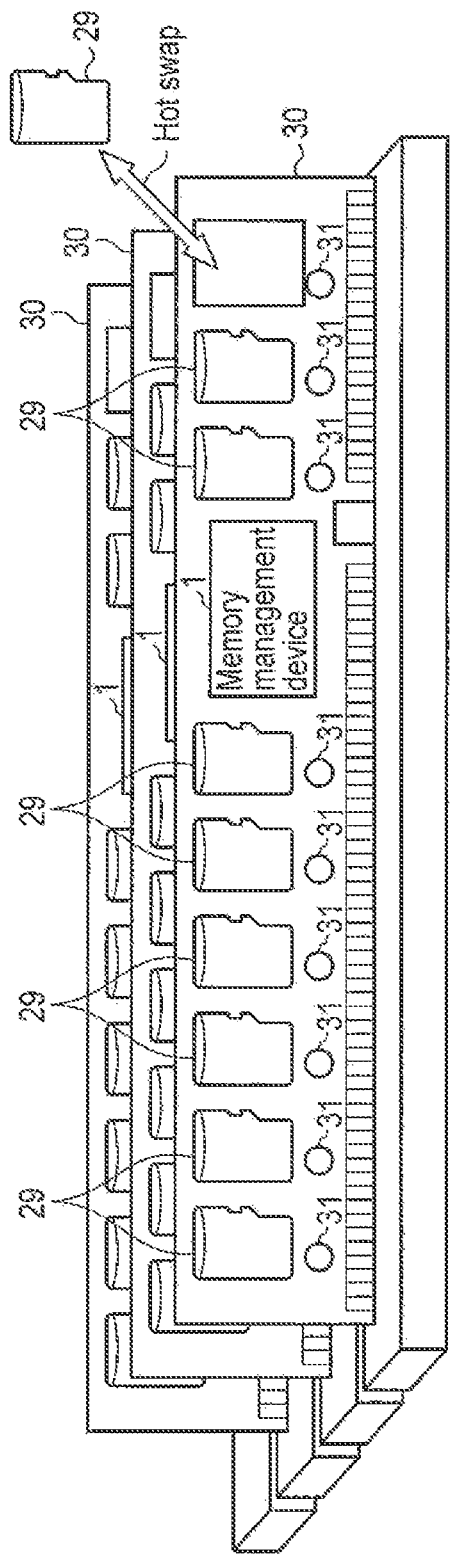
FIG. 29 is a perspective view showing an example of the plurality of memory management devices managing the plurality of nonvolatile semiconductor memories.

Next, a configuration in which a plurality of nonvolatile semiconductor memories is managed by a plurality of the memory management devices 1 will be described with reference to FIG. 29. FIG. 29 is a perspective view showing an example of the plurality of memory management devices managing the plurality of nonvolatile semiconductor memories.

In FIG. 29, one memory module 30 is formed from the one memory management device 1 and a plurality of NAND flash memories 29. In the example of FIG. 29, the three memory modules 30 are formed.

The plurality of nonvolatile semiconductor memories 29 is, for example, a NAND flash memory and is used as the nonvolatile semiconductor memories 9, 10 described above.

The memory management device 1 manages access to the plurality of nonvolatile semiconductor memories 29 belonging to the same memory module 30.

Further, the plurality of the memory management devices 1 included in a plurality of the memory modules 30 operates like one memory management device in cooperation with each other.

The memory management device 1 of the memory module 30 includes an ECC function and a RAID function for the plurality of nonvolatile semiconductor memories 29 in the memory module 30 and performs mirroring and striping.

Even when the memory module 30 is conducting (operating), each of the nonvolatile semiconductor memories 29 can be hot-swapped (exchanged). A button 31 is associated with each of the plurality of nonvolatile semiconductor memories 29.

The button 31 includes a warning output unit (for example, an LED). If, for example, the warning output unit is in a first color (green), the normal state is indicated and if the warning output unit is in a second color (red), a state requiring swapping is indicated.

If the button 31 is pressed, a notification is sent to the processes 6a, 6b, 6c and the operating system 27 and if it is safe to dismount such as when no access occurs, the button 31 turns to a third color (blue) and the nonvolatile semiconductor memory 29 corresponding to the button 31 becomes hot-swappable.

In executing hot-swapping, a lamp indicating that the nonvolatile semiconductor memory 29 is hot-swappable is lit when write-back is completed after the button 31 requesting hot-swapping being pressed and then, the nonvolatile semiconductor memory 29 is swapped.

The processing unit 15 of the memory management device 1 determines whether or not the writing count or reading count of each of the nonvolatile semiconductor memories 29 has reached a predetermined ratio of the accessible upper limit count written in the memory specific information 12 by referencing the memory usage information 11 and the memory specific information 12 stored in the information storage unit 17. If the writing count or reading count is reached the predetermined ratio of the writable upper limit count or readable upper limit count, the processing unit 15 issues a notification or warning of memory swapping.

In the present embodiment, if the page size or block size of the nonvolatile semiconductor memories 29 is large, pre-loading is effective.

If pre-loading is implemented, the processing unit 15 of the memory management device 1 pre-loads data likely to be accessed frequently in the cache memory 28 in advance by referencing coloring information corresponding to data stored in the nonvolatile semiconductor memories 29.

Alternatively, the processing unit 15 pre-loads periodic data that is likely to be accessed in a predetermined time prior to the predetermined time.

In the present embodiment, the arrangement of data is determined based on durability of each memory in the mixed main memory 2 so that the life of the mixed main memory 2 can be prolonged. Moreover, fast access to the mixed main memory 2 can be realized.

Because data is arranged based on durability of each memory in the mixed main memory 2 in the present embodiment, fatal data losses in the mixed main memory 2 can be prevented.

Swapping can be eliminated by using the memory management device 1 and the mixed main memory 2 according to the present embodiment.

In the present embodiment, the nonvolatile semiconductor memories 9, 10 are used as a main memory. Accordingly, the storage capacity of the main memory can be increased and a second storage device using a hard disk or SSD (Solid State Disk) does not have to be used.

Because the nonvolatile semiconductor memories 9, 10 are used as a main memory in the present embodiment, instant-on can be made faster.

Second Embodiment

The basic type of computer architecture, the Neumann architecture, has a problem called the von Neumann bottleneck caused by a difference between the CPU's frequency and main memory's speed. When a volatile memory is used as the main memory, this problem has been mitigated by installing a high-speed cache memory (such as an SRAM) between the main memory and CPU core.

Recently, a technology to use a nonvolatile semiconductor memory slower than a volatile semiconductor memory as the main memory has been developed. In this case, the above problem manifests itself more markedly. Thus, it is necessary to improve the hit rate of the cache memory.

In the present embodiment, a memory management device capable of improving the hit rate of the cache memory when a nonvolatile semiconductor memory is used as the main memory will be described.

The present embodiment uses the nonvolatile semiconductor memories 9, 10 as the main memory and a portion of the volatile semiconductor memory 8 as the cache memory. In the present embodiment, the volatile semiconductor memory 8 used as the cache memory will be described.

FIG. 30 shows a physical address space of the volatile semiconductor memory (hereinafter, simply called the cache memory) 8.

In the present embodiment, the physical address space of the cache memory 8 is divided into a plurality of areas (L0 to L5). Each area does not have to be contiguous in the physical address space. The size of each area is set in such a way that, for example, the physical address space increases from lower to upper areas. Further, an upper area is enabled to expand the area thereof to the adjacent lower area. The maximum expansion size of each area is managed by an area limit ELM.

An upper area has a larger area size and thus, data in the area is likely to be held for a long period of time. On the other hand, a lower area is a smaller area size and thus, data in the area is likely to be held for only a short period of time.

In the present embodiment, data whose write out priority is low is arranged in an upper area and data whose write out priority is high is arranged in a lower area. The arrangement processing is performed by, for example, the writing management unit 20 in FIG. 1. The write out priority is determined by using coloring information. "Write out" means movement of data from the volatile semiconductor memory 8 to the nonvolatile semiconductor memories 9, 10.

The cache memory 8 includes a cache header CHD. The cache header CHD stores management information of each area. That is, the area limit ELM, a free cache line list FCL, and an area cache line list ECL of each area are stored in the cache header CHD.

The free cache line list FCL is a data structure that manages free space of the cache memory 8 and stores a plurality of nodes as management information corresponding to cache lines belonging to no area.

The area cache line list ECL is a data structure that manages used space of the cache memory 8 and stores nodes acquired from the free cache line list FCL for each area.

A content of the cache header CHD is initialized by reading from a nonvolatile semiconductor memory when the information processing device 100 is activated. When the information processing device 100 is terminated, the content of the cache header CHD is saved in the nonvolatile semiconductor memory.

When the information processing device 100 is activated (when cold boot), a content set by the operation system is recorded in the cache header CHD to generate basic information of each area.

Incidentally, the area limit ELM can be set by the user to fit to the usage form of the user and an interface to enable the setting may be provided.

Details of the free cache line list FCL, the area cache line list ECL, and the node will be described later.

Data written into the mixed main memory 2 includes, as described above, coloring information as hint information to determine an arrangement (writing) region in the mixed main memory 2. Thus, by controlling data writing into each area of the cache memory 8 by using the coloring information, the hit rate of the cache can be improved. Accordingly, the frequency with which data is read to the nonvolatile semiconductor memories 9, 10 can be reduced so that the nonvolatile semiconductor memories 9, 10 can be protected.

FIGS. 31A and 31B and FIGS. 32A and 32B show examples of tables (CET) showing a correspondence relationship between coloring information of the coloring table 14 and each area of the cache memory 8 shown in FIG. 30.

FIG. 31A gives a higher priority to read access to enable improvement of the hit rate of reading. More specifically, FIG. 31A shows the correspondence relationship among the data life SL_color as coloring information, the static reading frequency information SR_color, and the dynamic reading frequency DR_color, and the area of the volatile semiconductor memory 8. As shown in FIG. 31A, data having an increasing reading frequency with an increasing value of the static reading frequency information SR_color is arranged in an increasingly upper area of the volatile semiconductor memory 8. That is, to give a higher priority to read access, the static reading frequency information SR_color and the dynamic reading frequency DR_color are referenced to arrange the static reading frequency information SR_color and the dynamic reading frequency DW_color in an upper area with a larger area size. The upper area has a larger area size and data in the area is likely to be held for a long period of time. Thus, the cache hit rate of read access can be improved.

Data whose data life is "S" is arranged in area L5 regardless of other coloring information. For example, data in the process of operation has a short data life and the need for writing the data into the nonvolatile semiconductor memories 9, 10 is low. However, a large number of pieces of such data exist. Thus, such data is arranged in area L5 with the largest size in the cache memory 8.

FIG. 31B gives a higher priority to write access to enable improvement of the hit rate of writing. More specifically, FIG. 31B shows the correspondence relationship among the data life SL_color as coloring information, the static writing frequency information SW_color, and the dynamic writing frequency information DW_color, and the area of the volatile semiconductor memory 8. That is, to give a higher priority to write access, the static writing frequency information SW_color and the dynamic writing frequency information DW_color are referenced to arrange the static writing frequency information SR_color and the dynamic writing frequency SW_color in an upper area with a larger area size. Accordingly, the cache hit rate of write access can be improved.

Data whose data life is "S" is arranged, like in FIG. 31A, in area L5.

FIG. 32A takes both of the reading frequency and the writing frequency into consideration and improvement of the hit rate is enabled if at least one of the reading frequency and the writing frequency is high. More specifically, FIG. 32A shows the correspondence relationship among the data life SL_color as coloring information, the sum of the value of the static reading frequency information SR_color and the value of the static writing frequency information SW_color, and the area of the volatile semiconductor memory 8.

FIG. 32B is a modification of FIG. 32A, the reading frequency and writing frequency are weighted, and enables improvement of the hit rate by setting weights to the reading frequency and writing frequency. In contrast to FIG. 32A, the area of the volatile semiconductor memory 8 is associated with the value of SR_color*W+SW_color*(1-W).

In FIGS. 32A and 32B, data whose data life is "S" is arranged, like in FIGS. 31A and 31B, in area L5.

One of the tables CET showing relationships between coloring information and areas shown in FIGS. 31A and 31B and FIGS. 32A and 32B is stored in, for example, the information storage unit 17.

Relationships between coloring information and areas are not limited to examples shown in FIGS. 31A and 31B and FIGS. 32A and 32B and can be changed in response to a user's request. Thus, areas of the volatile semiconductor memory 8 are set to be expandable to have expandability.

Next, an example of a management method of a cache area will be described with reference to FIG. 33. FIG. 33 shows an example of the free cache line list FCL and the area cache line list ECL stored in the cache header CHD of the cache memory 8.

The free cache line list FCL is, as described above, a data structure showing a free space of the cache memory 8 and is composed of a plurality of nodes ND corresponding to cache lines. Each node ND is composed of a physical address of a cache line, a belonging area, and an update flag.

The cache line corresponds to the page size (I/O size) of the nonvolatile semiconductor memories 9, 10. Each node ND stores the physical address of a cache line.

The belonging area is one of areas L0 to L5 set to the cache memory.

The update flag is a flag indicating whether or not an update of data of the cache line has occurred. "0" of the update flag indicates that data has been erased or data has been written into the volatile semiconductor memory 8 and the written data has not been updated.

"1" of the update flag indicates that data in a cache line has been updated and the update of the data has not been reflected in the nonvolatile semiconductor memories 9, 10.

The update flag is controlled by, for example, the processing unit 15. The processing unit 15 sets the corresponding update flag to "0" when data is written from the nonvolatile semiconductor memories 9, 10 into the cache memory 8 and sets the update flag to "1" when the written data is updated in the cache memory 8. The processing unit 15 also sets the corresponding update flag to "0" when data in the cache memory 8 is erased and further sets the corresponding update flag to "0" when an update of data of the cache memory 8 is reflected in the nonvolatile semiconductor memories 9, 10.

Incidentally, the update flag may not be arranged in each node and, for example, a content of a field indicating a dirty bit stored in the information storage unit 17 may be referenced.

On the other hand, the area cache line list ECL is, as described above, a data structure that manages a used space of the cache memory 8 and stores the node corresponding to the cache line contained in each area.

That is, when data read from the nonvolatile semiconductor memories 9, 10 is written into the cache memory 8, a belonging area of each node of the free cache line list FCL is searched based on coloring information attached to the data and if free space is available, the node thereof is acquired and arranged in the corresponding area of the area cache line list ECL. If write data is data to be written into area L5, each node of the free cache line list FCL is searched and one node of area L5 or lower areas L4 to L0 as an expansion region is acquired. The acquired node is connected to the area cache line list ECL corresponding to area L5.

The data is also written into the cache memory 8 according to the physical address of the cache line of the acquired node. Further, the update flag of the node ND is set to "0".

The area cache line list ECL is managed based on an algorithm such as FIFO (First-in/First-out) and LRU (Least Recently Used). Thus, if, for example, nodes are acquired from the free cache line list FCL corresponding to each area, the acquired nodes are sorted based on a set algorithm.

The cache line corresponding to the node positioned, for example, at the head of the area cache line list ECL is always a write out target of the area.

The number of nodes arranged corresponding to each area in the area cache line list ECL is managed by the area limit ELM so that the length of the list of each area should not exceed the area limit ELM.

In FIG. 33, the management by software processing using the cache header is described as the management method of the cache area, but a management by hardware using a configuration in which the cache line is managed by a cache tag may also be used.

Figure 34:
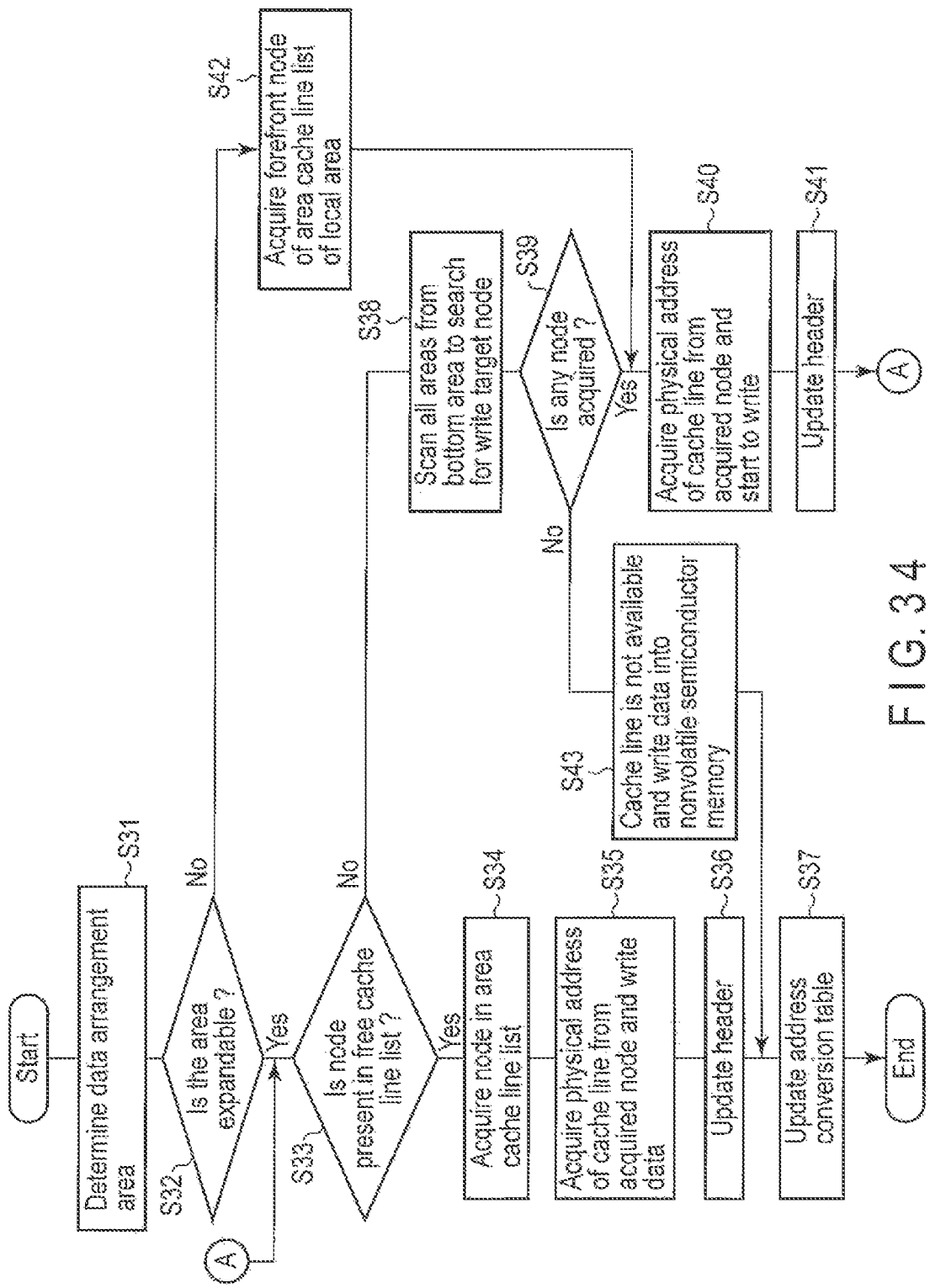
FIG. 34 shows an example of write processing to the volatile semiconductor memory according to the second embodiment.

FIG. 34 shows write processing of data by, for example, the processing unit 15. That is, FIG. 34 shows a flow of processing when data is newly read from the nonvolatile semiconductor memories 9, 10 and an arrangement of the data in the volatile semiconductor memory 8 is determined. The size of each area is variable in the present embodiment and thus, the process until data is written changes depending on whether or not an area is expandable.

In FIG. 34, when data is to be arranged in the cache memory 8, first a data arrangement area of the cache memory 8 is determined (step S31). That is, an area of the cache memory 8 to arrange the read data is determined based on the correspondence relationships shown in FIGS. 31A and 31B and FIGS. 32A and 32B.

More specifically, for example, the table CET shown in FIG. 31A is referenced based on coloring information attached to data read from the nonvolatile semiconductor memories 9, 10. If the data life of the coloring information attached to data is "L", the value of the static reading frequency information SR_color is "1", and the reading frequency is "high", the data is arranged in the area L0. If the data life of the coloring information attached to data is "L", the value of SR_color is "4", and the reading frequency is "high", the data is arranged in the area L4.

Next, whether or not the area is expandable is determined (step S32). The current size of the area can be recognized from, for example, the number of nodes of the area cache line list. Thus, the current size compares with the value of the area limit ELM written in the cache header CHD. If, as a result, the current size is smaller than the value of the area limit ELM, the area is determined to be expandable.

If the area is expandable, whether or not the node ND corresponding to the area is present in the free cache line list FCL is determined (step S33). That is, belonging areas of nodes in the free cache line list FCL are searched to determine whether the corresponding area is present. In this case, if data is data to be written into the area L4, the area L4 is expandable to a portion of the area L3 and thus, the area L4 and area L3 are searched.

If, as a result, the corresponding node ND is present, the node ND is acquired from the free cache line list (step S34).

The physical address of the cache line is acquired from the acquired node ND. Based on the physical address, the data read from the nonvolatile semiconductor memories 9, 10 is written into the cache memory 8 (step S35).

Then, the cache header CHD is updated (step S36). That is, the node ND acquired from the free cache line list FCL is moved to the area cache line list ECL and the update flag is set to "0".

Next, the address conversion table is updated (step S37). That is, the physical address of the nonvolatile semiconductor memories 9, 10 corresponding to the data written into the cache memory 8 is written into the address conversion table.

On the other hand, if, in step S33, the corresponding node ND is determined not to be present in the free cache line list FCL, the area cache line list ECL is searched from the bottom area (step S38). That is, to generate the new node ND, it is necessary to transfer any one piece of data in the cache memory 8 to the nonvolatile semiconductor memories 9, 10 to generate a free area. Thus, all areas from the bottom area L0 to area L5 of the area cache line list ECL shown in FIG. 33 are searched.

If, for example, data read from the nonvolatile semiconductor memories 9, 10 is data to be written into the area L4, the area L4 is expandable to a portion of the lower area. Thus, the node ND of the lower area of the area cache line list ECL is acquired.

Next, whether the node ND has been acquired is determined (step S39). When, as a result, the node ND is acquired, the physical address of the cache line is acquired from the acquired node ND and the data in the cache memory 8 is written into the nonvolatile semiconductor memories 9, 10 based on the physical address (step S40).

Then, the cache header CHD is updated (step S41). That is, the free node ND is generated by the data corresponding to the node ND of the area cache line list ECL being written into the nonvolatile semiconductor memories 9, 10. The node ND is moved to the free cache line list FCL and the update flag is set to data "0".

Next, the control is moved to step S33. In this case, the free node ND is present in the free cache line list FCL and thus, the node ND is acquired and the data is written to the physical address specified by the node (steps S33 to S35). Next, the cache header CHD and the address conversion table are updated (steps S36 and S37).

If, in step 332, the area expansion is determined to be difficult, the nodes ND of the area in the area cache line list ECL are searched and the first node ND is acquired (step S42). The acquired node ND is a node of an area whose priority is low.

Then, like the operation described above, the physical address of the cache line is acquired from the acquired node, and the data in the cache memory 8 is written into the nonvolatile semiconductor memories 9, 10 based on the physical address (step S40). Then, the cache header is updated (step S41).

Further, if, in the step S39, the node ND cannot be acquired as a result of searching the area cache line list ECL, the cache memory 8 cannot be used and thus, the data is written into the nonvolatile semiconductor memories 9, 10 (step S43). Then, the address conversion table is updated (step S37).

(Erasure of the Cache Memory)

FIG. 35 shows an example of an erasure operation of the cache memory 8. The cache memory 8 is assumed to be erasable by software.

If, as shown in FIG. 35, an erasure request of data stored in the cache memory 8 is issued (step S51), update flags of each node ND are searched to detect data not yet updated to the nonvolatile semiconductor memories 9, 10 (step S52). That is, for example, a node whose update flag is data "1" in the area cache line list ECL is detected. As a result, if there is no update flag with the data "1", the processing ends.

If an update flag with the data "1" is detected, the data in the cache memory 8 is written into the nonvolatile semiconductor memories 9, 10 based on the physical address of the cache line of the node ND (step S53).

Then, the cache header CHD is updated (step S54). That is, the node of the area cache line list ECL is moved to the free cache line list FCL and the update flag is set to data "0". Next, the control is moved to step S52. Such an operation is repeated until there is no longer an update flag with the data "1".

According to the second embodiment, data whose importance is high is stored in an upper area of the volatile semiconductor memory 8 based on the relationship between coloring information attached to data and areas of the cache memory 8. Therefore, the hit rate of the cache memory 8 can be improved.

Because the hit rate of the cache memory 8 is high, the number of times of accessing the nonvolatile semiconductor memories 9, 10 can be reduced so that the nonvolatile semiconductor memories 9, 10 can be protected.

Moreover, upper areas have an expansion region and data can be written thereinto until the expansion region is full. If the area is small, data whose importance is high but is not accessed frequently is likely to be written back from the cache memory 8 based on, for example, an algorithm of LRU. However, data infrequently accessed can be left in the cache memory by making an upper area expandable to lower areas to secure a wide area including the expansion region. Therefore, the hit rate of the cache memory 8 can be improved.

The cache memory 8 is divided into the areas of L0 to L5 for each piece of coloring information. When, for example, the area L5 as an upper area stores data equal to or more than a specified size, the area can be expanded to a portion of the area L4 thereunder. If data is written into an expansion region and the area cannot be further expanded, data in the cache memory 8 is written back to the nonvolatile semiconductor memories 9, 10 based on an algorithm such as FIFO, LRU, or the like. The bottom area L0 has no expansion region and if the area becomes full, data in the cache memory 8 is written back based on an algorithm such as FIFO, LRU, or the like. Thus, data whose writing frequency is high can be stored in the cache memory for a long period of time. Therefore, the nonvolatile semiconductor memories 9, 10 whose erasure count is limited can be protected.

Third Embodiment

Next, the memory management device according to the third embodiment and the control method thereof will be described with reference to FIGS. 36 to 42. The present embodiment is a modification of the first embodiment. The present embodiment relates to an example capable of reducing the number of times of accessing the nonvolatile semiconductor memories (NAND flash memories) 9, 10 so that the memory life can be prolonged. In the description, a detailed description overlapping with the description in the first embodiment is omitted.

<Truth Value of the Valid/Invalid Flag of Address Conversion Information>

First, the truth value of the valid/invalid flag indicating presence/absence of data in the nonvolatile semiconductor memories 9, 10 held by the address conversion information 13 in FIG. 4 will be described using FIG. 36.

As illustrated in FIG. 36, the initial value of the flag is "0".

The flag "0(invalid)" indicates that the corresponding logical address is not mapped to the nonvolatile semiconductor memories 9, 10 or has been erased after being mapped.

The flag "1(valid)" indicates that the corresponding logical address is mapped to at least one of the nonvolatile semiconductor memories 9, 10.

The flag "0(invalid)" indicates that when all pages in a block in the nonvolatile semiconductor memories 9, 10 has the flag "0(invalid)", all data in the block can be erased. Even a page having the flag "0(valid)" makes the block non-erasable.

<State Transition of the Valid/Invalid Flag>

Next, a state transition of the valid/invalid flag of the nonvolatile semiconductor memories 9, 10 will be described using FIG. 37.

As illustrated, when mapped to the nonvolatile semiconductor memories 9, 10, the valid/invalid flag makes a state transition from the flag "0" to "1". On the other hand, when data in the nonvolatile semiconductor memories 9, 10 is to be erased, the valid/invalid flag makes a state transition from the flag "1" to "0".

<1. Processing Flow of a Memory Release Request>

Next, the processing flow of a memory release request of the mixed main memory 2 will be described along FIG. 38.

(S001)

As illustrated, in step S001, for example, an operating system OS (corresponding to the operating system 27 in the first embodiment) of the processor 3a sends a memory release request (argument: logical address) of the volatile semiconductor memory 8 to the memory management device 1.

(S002)

Subsequently, in step S002, the memory management device 1 that has received the memory release request references the address conversion information (address conversion table) 13 to examine whether a physical address in the volatile semiconductor memory 8 corresponding to the logical address as the argument of the memory release request has a value that is not undefined and also the valid/invalid bit of the nonvolatile semiconductor memories 9, 10 to check whether or not an applicable data is in the volatile semiconductor memory 8 or the nonvolatile semiconductor memories 9, 10.

That is, if the valid/invalid bit of the nonvolatile semiconductor memories 9, 10 in the address conversion information 13 is "0", the memory management device 1 determines that the logical address as the argument is not mapped to the nonvolatile semiconductor memories 9, 10 and if the valid/invalid bit of the nonvolatile semiconductor memories 9, 10 is "1", the memory management device 1 determines that the logical address as the argument is mapped to the nonvolatile semiconductor memories 9, 10.

Then, if the valid/invalid bit of the nonvolatile semiconductor memories 9, 10 is "1", the memory management device 1 references the physical address of the volatile semiconductor memory 8 and the physical addresses of the nonvolatile semiconductor memories 9, 10 to check presence/absence of the data in the volatile semiconductor memory 8 and the nonvolatile semiconductor memories 9, 10 and exercises the following control:

Case 1 (the Data is Present in the DRAM 8 and the NAND 9, 10)

(S003)

Subsequently, in step S003, if the data is present in the volatile semiconductor memory 8 and the nonvolatile semiconductor memories 9, 10, the memory management device 1 erases data at the physical address in the volatile semiconductor memory 8 corresponding to the logical address requested to release to form explicit free space in the volatile semiconductor memory 8 and sets a dirty bit of the volatile semiconductor memory 8 to "0". The dirty bit of the volatile semiconductor memory 8 is a bit indicating that data in the volatile semiconductor memory 8 has been rewritten and is present, for example, in a header region or the like of the volatile semiconductor memory 8.

(S004)

Subsequently, in step S004, the memory management device 1 sets a valid/invalid bit of a physical address in the nonvolatile semiconductor memories 9, 10 corresponding to a logical address requested to release to "0" for invalidation as an erasure target, for the nonvolatile semiconductor memories 9, 10. At this point, a data erasure operation actually is not performed on the nonvolatile semiconductor memories (NAND) 9, 10 in a strict sense and only the valid bit is removed as an erasure target.

Case 2 (the Data is Present Only in the DRAM 8)

(S005)

Subsequently, in step S005, if the data is present only in the volatile semiconductor memory 8, the memory management device 1 similarly erases data at the physical address in the volatile semiconductor memory 8 corresponding to the logical address requested to release to form explicit free space and sets a dirty bit of the volatile semiconductor memory 8 to "0".

In the present example, there is no need to consider a case when the specified data is present only in the nonvolatile semiconductor memories (NAND) 9, 10 (the data is not cached) because the reduction of the number of times of accessing the nonvolatile semiconductor memories (NAND) 9, 10 is intended by forming free space in the volatile semiconductor memory (DRAM) 8. If the data corresponding to the logical address requested to release is not present in the volatile semiconductor memory 8 and is present only in the nonvolatile semiconductor memories 9, 10, it is only necessary to set the valid/invalid flag to "0" (invalidate).

<1-2. Explicit Space Region in the Volatile Semiconductor Memory 8 by a Memory Release Request>

As described above, the memory management device 1 according to the present example receives a logical address specifying a release position for the mixed main memory 2 including the volatile semiconductor memory (first memory) 8 and the nonvolatile semiconductor memories (second memory) 9, 10 from the processor 3 and examines the specified logical address, the physical address of the volatile semiconductor memory (first memory) 8, the physical addresses of the nonvolatile semiconductor memories (second memory) 9, 10, and the valid/invalid flag of data at a physical address of the nonvolatile semiconductor memories (second memory) 9, 10 by referencing the address conversion information 13 to check the physical address at which data corresponding to the logical address requested to release is present. Then, if the corresponding data is present in the volatile semiconductor memory (first memory) 8, the memory management device 1 erases the data to form explicit free space and if the corresponding data is also present in the nonvolatile semiconductor memories (second memory) 9, 10, the memory management device 1 does not actually perform an erasure operation of the data, but invalidates the valid/invalid flag by setting the flag to "0". In other words, the memory management device 1 forms explicit free space in the volatile semiconductor memory (DRAM) 8 for the logical address specified by the memory release request.

Figure 38:
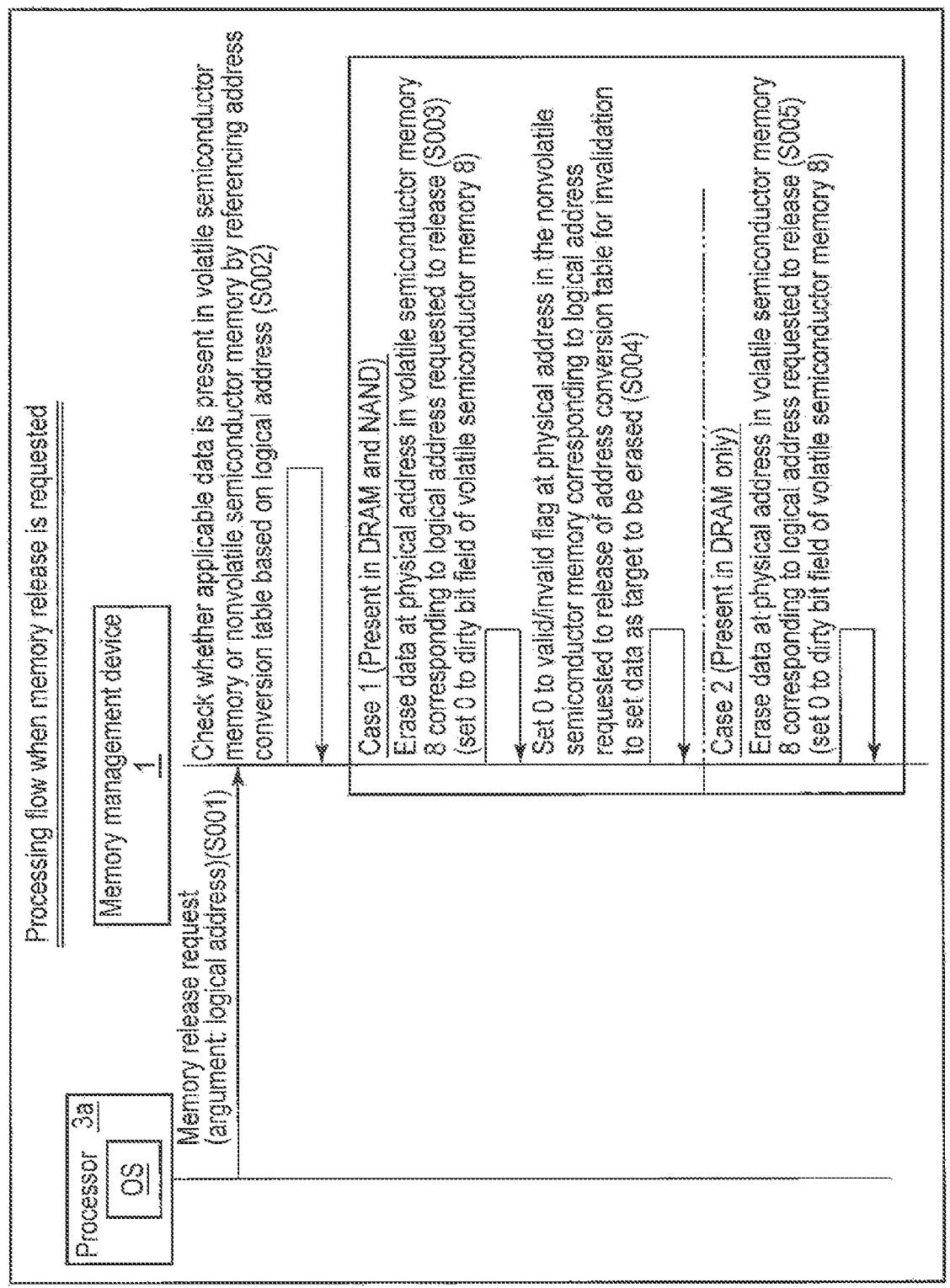
FIG. 38 is a flow diagram showing processing when a release of the mixed main memory is requested, according to the third embodiment.
Figure 39:
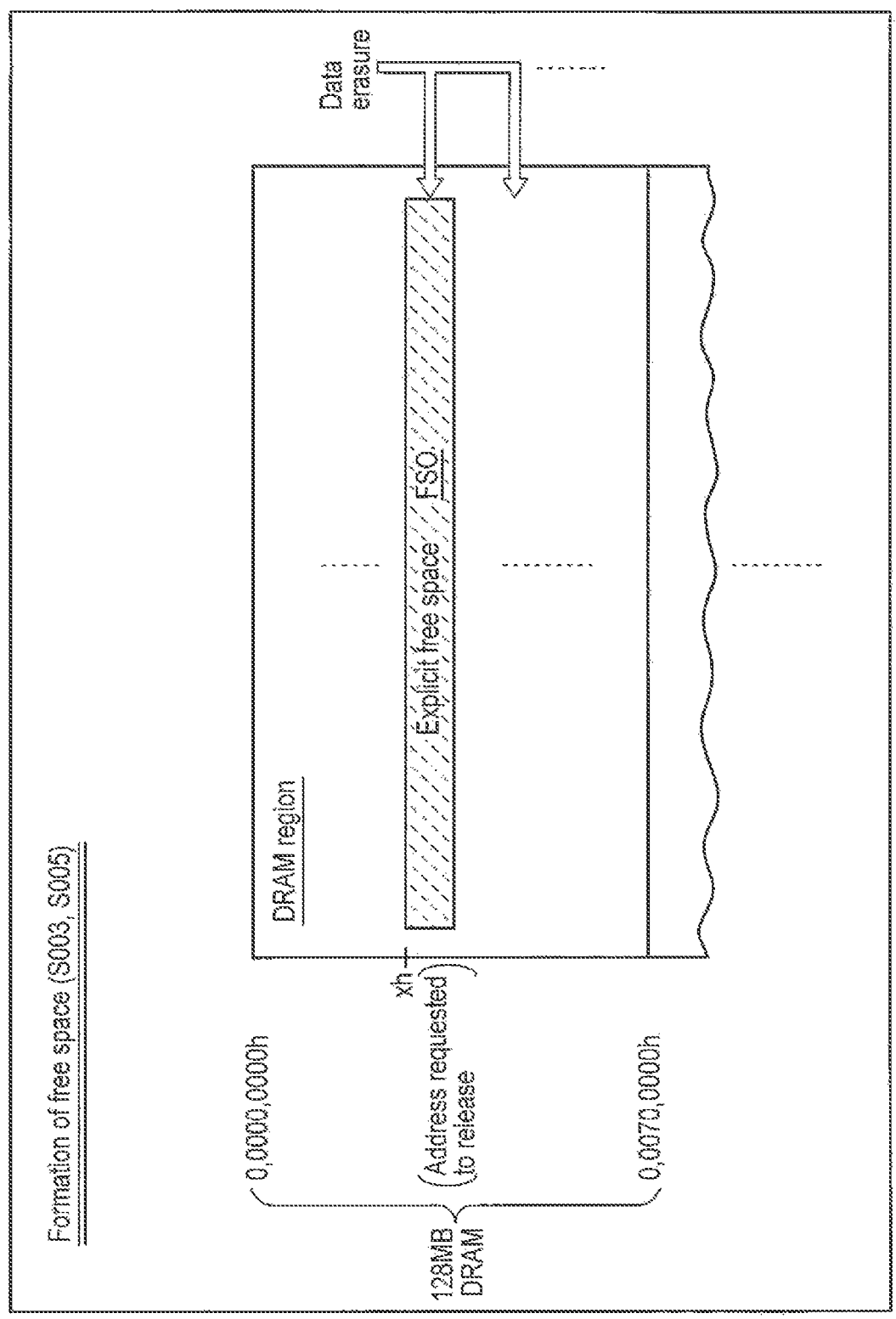
FIG. 39 is a diagram illustrating a formation of explicit free space in the volatile semiconductor memory when the release of a memory in FIG. 38 is requested.

FIG. 39 is a diagram illustrating a formation of explicit free space in the volatile semiconductor memory when a release of a memory in FIG. 38 is requested. For example, as illustrated, erased explicit free space FSO can be formed at a physical address xh corresponding to the logical address specified by a memory release request in memory space of the volatile semiconductor memory (DRAM) 8.

Accordingly, the amount of data of the volatile semiconductor memory 8 can be reduced and thus, the number of times of accessing the nonvolatile semiconductor memories 9, 10 can advantageously be reduced to prolong the memory life of the nonvolatile semiconductor memories 9, 10.

<2. Processing Flow of a Memory Acquisition Request>

Figure 40:
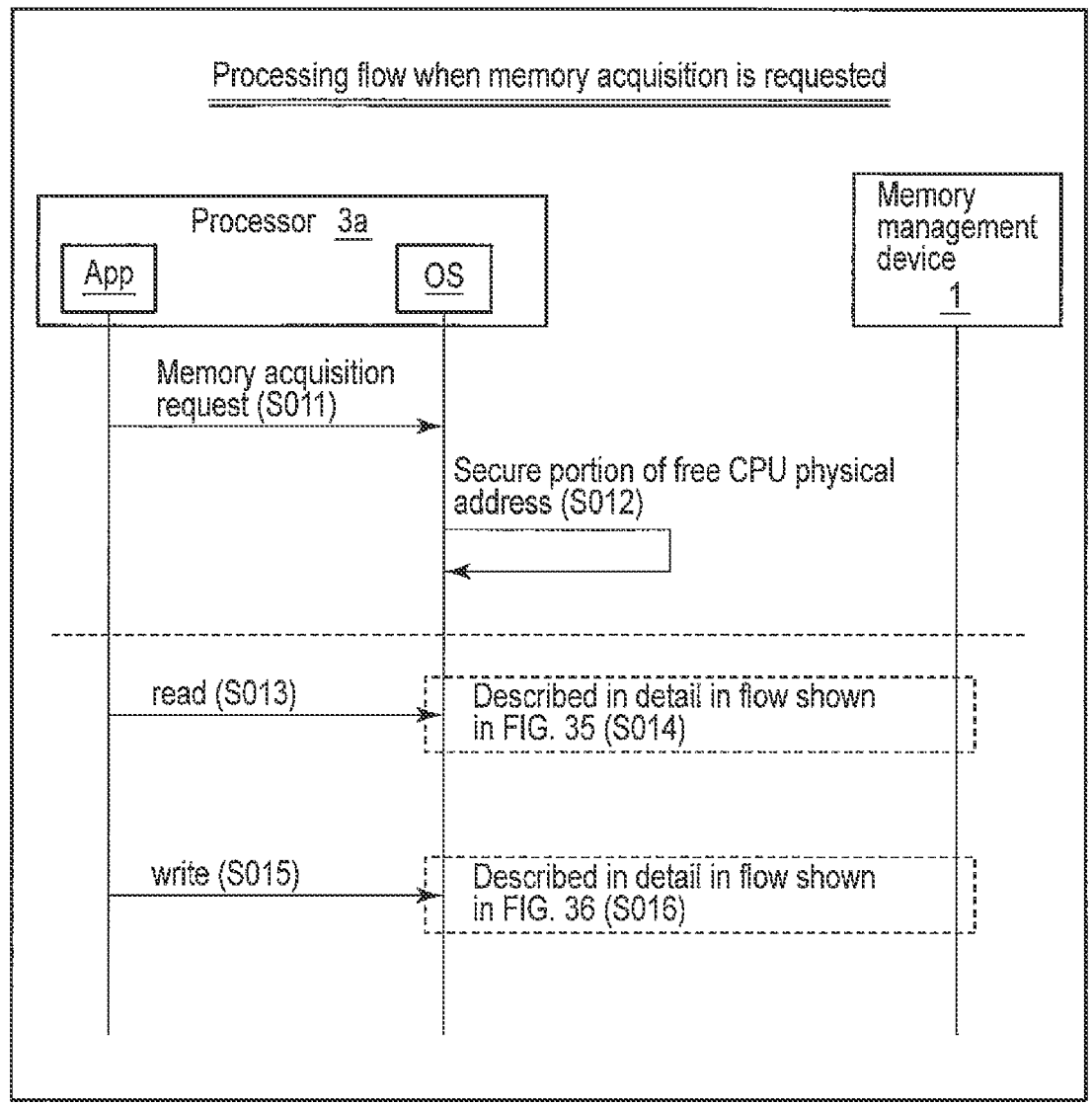
FIG. 40 is a flow diagram showing processing when acquisition of the mixed main memory is requested, according to the third embodiment.

Next, the processing flow of a memory acquisition request of the mixed main memory 2 will be described along FIG. 40.

(S011)

As illustrated, in step S011, for example, an application App in the processor 3a sends a memory acquisition request to the operating system OS.

(S012)

Subsequently, in step S012, the operating system OS secures a portion of a free (any) logical address. In this stage, the secured logical address is not yet mapped to a physical address in the volatile semiconductor memory or the nonvolatile semiconductor memory and will be mapped only when a writing request is received. In the present example, a memory region can be secured based on coloring information (hint information) before data reading and data writing described below. Thus, the present example is advantageous in that the memory life of the nonvolatile semiconductor memories 9, 10 can be prolonged.

(S013 (Data Reading Request))

Subsequently, in step S013, the application App requests data reading for the operating system OS.

(S014)

Subsequently, in step S014, the operating system OS requests data reading for the memory management device 1.

Then, the memory management device 1 searches for an entry corresponding to the logical address for which a data reading request is made by referencing the address conversion information 13.

If mapped, data at the physical address in the volatile semiconductor memory 8 or the nonvolatile semiconductor memories 9, 10 corresponding to the logical address for which a data reading request is made is returned. On the other hand, if not yet mapped and an undefined value is at the physical address, data cleared to zero is instead returned.

Figure 41:
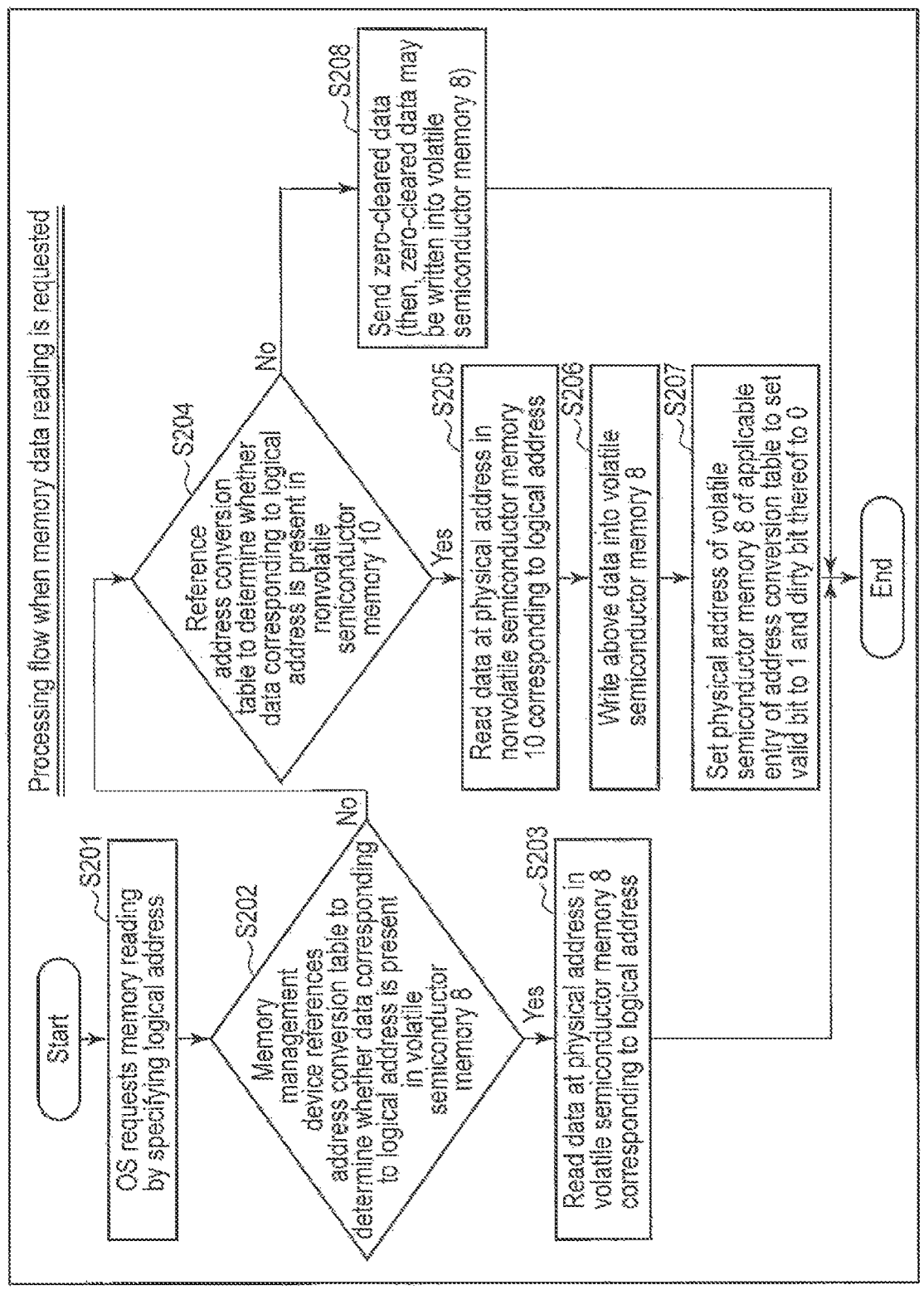
FIG. 41 is a flow chart diagram showing processing when memory data reading is requested in FIG. 40.

Details thereof will be described later along the flow in FIG. 41.

(S015 (Data Writing Request))

Subsequently, in step S015, the application App requests data writing for the operating system OS.

(S016)

Subsequently, in step S016, the operating system OS requests data writing for the memory management device 1.

Then, the memory management device 1 references the address conversion information 13 to enter a mapping result for the secured logical address (the physical address in the volatile semiconductor memory or the nonvolatile semiconductor memory). If mapped to the nonvolatile semiconductor memories 9, 10, the valid/invalid flag indicating presence/absence of data in the nonvolatile semiconductor memories 9, 10 is validated by setting the flag to "1".

Details thereof will be described later along the flow in FIG. 42.

<2-1. Processing Flow when a Memory Data Read is Requested>

The processing flow of a memory data reading request in step S014 will be described in detail along FIG. 41.

(S201)

As illustrated, in step S201, for example, the application App of the processor 3a first requests reading for the operating system OS and the operating system OS requests a memory data reading for the memory management device 1 by specifying the logical address.

(S202)

Subsequently, in step S202, the memory management device 1 that is received a memory data reading request determines whether data corresponding to the logical address is present in the volatile semiconductor memory 8 by referencing the address conversion information (table) 13.

(S203)

Subsequently, in step S203, if a determination is made in step S202 that data corresponding to the logical address is present in the volatile semiconductor memory 8 (Yes), the operating system OS reads the data at the physical address in the volatile semiconductor memory 8 corresponding to the logical address by the memory management device 1 and terminates the operation (End).

(S204)

Subsequently, in step S204, if a determination is made in step S202 that data corresponding to the logical address is not present in the volatile semiconductor memory 8 (No), the memory management device 1 determines whether data corresponding to the logical address is present in the nonvolatile semiconductor memories 9, 10 by referencing the address conversion information (table) 13 again.

(S205)

Subsequently, in step S205, if a determination is made in step 3204 that corresponding data is present in the nonvolatile semiconductor memories 9, 10 (Yes), the operating system OS reads the data stored in the nonvolatile semiconductor memories 9, 10 corresponding to the logical address by the memory management device 1.

(S206)

Subsequently, in step S206, the operating system OS writes the data read from the nonvolatile semiconductor memories 9, 10 in step S205 into the volatile semiconductor memory 8 by the memory management device 1.

(S207)

Subsequently, in step S207, the memory management device 1 sets the physical address in the volatile semiconductor memory 8 of an entry of the address conversion information 13, sets the valid/invalid bit in the address conversion information 13 to "1", sets a dirty bit to "0", and terminates the operation (End).

(S208)

Subsequently, in step S208, if a determination is made in step S204 that a corresponding address is not present in the nonvolatile semiconductor memories 9, 10 (No), the operating system OS sends zero-cleared data created by the memory management device 1 to the processor 3a side, terminates the operation (End).

"Sending zero-cleared data to the processor 3a side" essentially means that if the data is actually present in at least one of the volatile semiconductor memory and nonvolatile semiconductor memories, a content of the data present at the physical address corresponding to the logical address is sent. In this case, however, the data is not yet mapped and there is no corresponding data and thus, instead of actually sending the content of the data, data padded with zeros for the size is sent as data.

Thereafter, the zero-cleared data may be written into the volatile semiconductor memory 8.

<2-2. Processing Flow when a Memory Data Writing is Requested>

The processing flow when a memory data writing is requested in step S016 will be described in detail along FIG. 42.

(S301)

Figure 42:
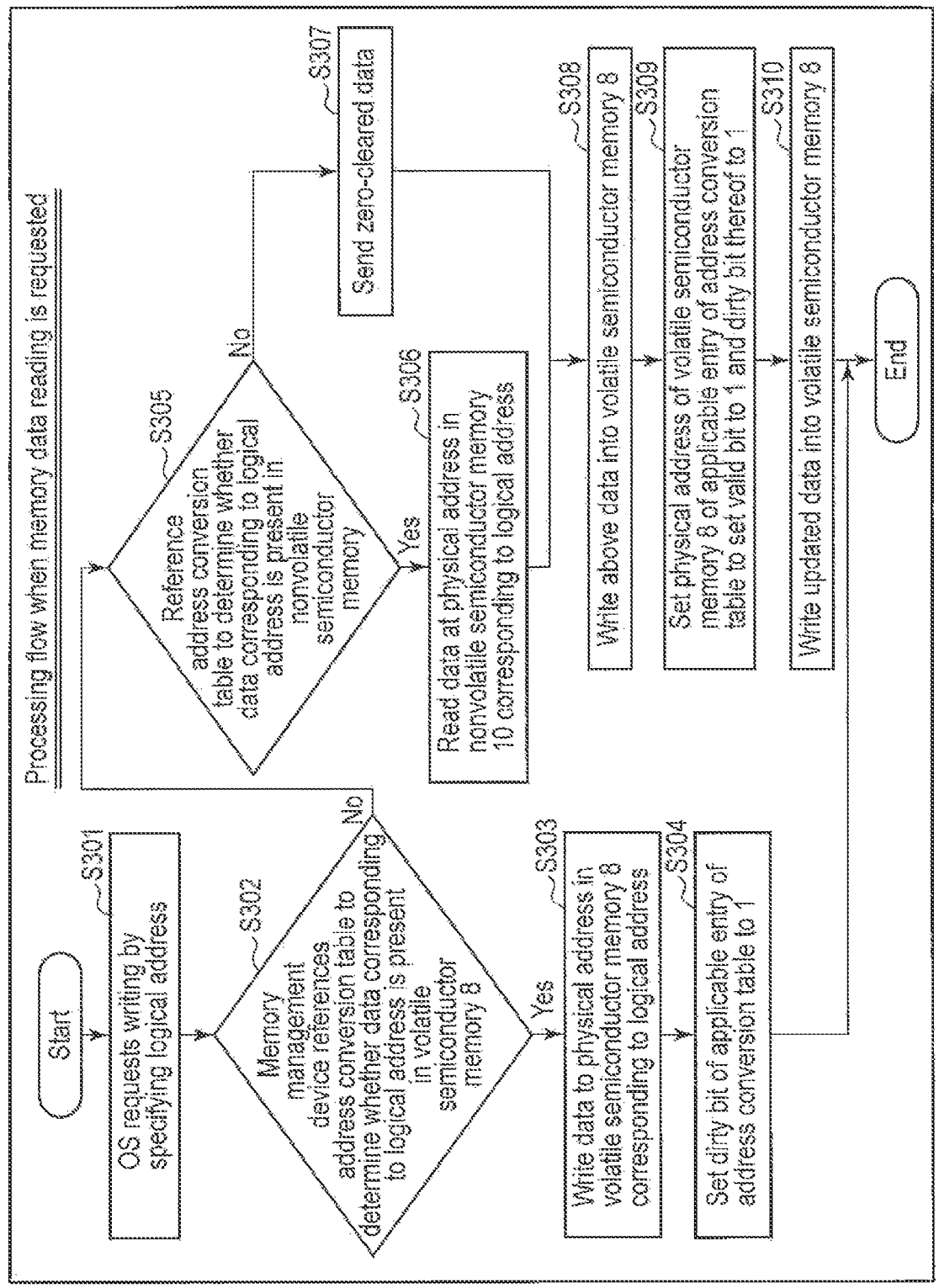
FIG. 42 is a flow chart showing processing when memory data writing is requested in FIG. 40.

As illustrated in FIG. 42, in step S301, for example, the application App of the processor 3a first requests writing request for the operating system OS and the operating system OS requests memory data writing for the memory management device 1 by specifying the logical address.

(S302)

Subsequently, in step S302, the memory management device 1 that receives a memory data writing request determines whether data corresponding to the logical address is present in the volatile semiconductor memory 8 by referencing the address conversion information (table) 13.
(S303)

Subsequently, in step S303, if a determination is made in step S302 that data corresponding to the logical address is present in the volatile semiconductor memory 8 (Yes), the operating system OS writes the data to the physical address in the volatile semiconductor memory 8 corresponding to the logical address by the memory management device 1.
(S304)

Subsequently, in step S304, the memory management device 1 references the address conversion information 13 to set a dirty bit of an entry in the volatile semiconductor memory 8 corresponding to the address to "1" (End).
(S305)

Subsequently, in step S305, if a determination is made in step S302 that data corresponding to the logical address is not present in the volatile semiconductor memory 8 (No), the memory management device 1 determines whether data corresponding to the logical address is present in the nonvolatile semiconductor memories 9, 10 by referencing the address conversion information 13 again.
(S306)

Subsequently, in step S306, if a determination is made in step S305 that corresponding data is present in the nonvolatile semiconductor memories 9, 10 (Yes), the operating system OS reads the data at the physical address in the nonvolatile semiconductor memories 9, 10 corresponding to the logical address by the memory management device 1.
(S307)

Subsequently, in step S307, if a determination is made in step S305 that corresponding data is not present in the nonvolatile semiconductor memories 9, 10 (No), the operating system OS sends data zero-cleared by the memory management device 1 to the processor 3a side, and proceeds to next step S308.
(S308)

Subsequently, in step S308, the memory management device 1 writes the data read from the nonvolatile semiconductor memory or the zero-cleared data into the volatile semiconductor memory 8.
(S309)

Subsequently, in step S309, the memory management device 1 sets the physical address in the volatile semiconductor memory 8 of a corresponding entry of the address conversion information (table) 13, sets a valid/invalid bit in the address conversion information 13 to "1", and sets a dirty bit to "0".
(S310)

Subsequently, in step S310, the memory management device 1 writes an updated data into the volatile semiconductor memory 8, and terminates the operation (End).

In the present example, as described above, data present in the nonvolatile semiconductor memories 9, 10 is once read into the volatile semiconductor memory 8 and then, the data is overwritten with the updated data. This is intended to prevent the number of times of access from increasing (because reading+writing are needed) if the data is rewritten in the nonvolatile semiconductor memories 9, 10 when the data is written.

<2-3. Operation and Effect>

In the memory management device 1 according to the present example, as described above, in step S012, the operating system OS that receives the memory acquisition request from an application secures a portion of a free logical address. Then, when a writing request occurs, the operating system OS secures a memory region of the more appropriate memory of the volatile semiconductor memory 8 and the nonvolatile semiconductor memories 9, 10 in accordance with the coloring information accompanying the logical address writing count or the like.

Further, the memory management device 1 according to the present example creates explicit free space in the volatile semiconductor memory 8 and thus, data in the volatile semiconductor memory 8 to be written into the nonvolatile semiconductor memories 9, 10 is reduced so that the number of times of accessing the nonvolatile semiconductor memories including NAND flash memories whose accessible count is limited can be reduced.

Therefore, the memory life of the nonvolatile semiconductor memories 9, 10 including NAND flash memories can advantageously be prolonged.

In the present example, it is assumed that the volatile semiconductor memory 8 and the nonvolatile semiconductor memories 9, 10 are managed, as shown in FIG. 4, by a common address conversion table, but the present embodiment is not limited to such an example and the volatile semiconductor memory 8 and the nonvolatile semiconductor memories 9, 10 may be managed separately. For example, the volatile semiconductor memory 8 may be managed by a cache tag (table). The cache tag does not necessarily need to include coloring information.

Fourth Embodiment

A NAND flash memory is generally used as a secondary storage device. In such a case, data stored in a NAND flash memory mostly has a data size equal to or more than a physical block size. Thus, when a NAND flash memory is used as a secondary storage device, one block region rarely has a plurality of pieces of data with different erasure frequencies.

In contrast, when a NAND flash memory is used as a main memory, as described above, the size of data read from the NAND flash memory and the size of data written into the NAND flash memory are frequently estimated to be less than the physical block size of the NAND flash memory.

The present embodiment is a modification of the first embodiment and the memory management device 1 that classifies a plurality of pieces of write target data into a plurality of groups (color groups) based on coloring information and configures data of the block size by putting the plurality of pieces of write target data belonging to the same group together will be described.

As the coloring information, for example, at least one of static color information and dynamic color information described in the first embodiment may be adopted. As the static color information, for example, at least one of "importance", "reading frequency/writing frequency", and "data life" may be adopted. As the dynamic color information, for example, at least one of numbers of times of reading and writing data and frequencies of reading and writing data may be adopted.

In the present embodiment, a case when the nonvolatile semiconductor memories 9, 10 are NAND flash memories is taken as an example, but the type of the nonvolatile semiconductor memories 9, 10 is not limited to this example. An overwrite method will briefly be described here. The overwrite method is one writing method of a memory system using a NAND flash memory.

In a NAND flash memory, a page once written cannot be rewritten unless a whole block including the page is erased. In other words, in a NAND flash memory, the same physical address (the physical address of the NAND flash memory, hereinafter, referred to as the NAND physical address) cannot be overwritten unless the physical address is erased.

According to the overwrite method, on the other hand, the correspondence relationship between the logical address (the logical address of the NAND flash memory, hereinafter, referred to as the NAND logical address) and the NAND physical address is managed by a logical/physical conversion table and the correspondence relationship can dynamically be changed. If the overwrite method is adopted, a memory system including a NAND flash memory behaves as if any logical address were overwritable from an upper layer.

In the logical/physical conversion table of a NAND flash memory, the correspondence relationship between the NAND logical address in units of blocks (hereinafter, referred to the NLBA) and the NAND physical address in units of blocks (hereinafter, referred to the NPBA) is managed. Because the logical/physical conversion table of a NAND flash memory is managed in units of blocks, even if only data of the size equal to or less than the block size, for example, data for one page is updated, erasure processing of the whole block including the data is needed.

More specifically, if data corresponding to a portion of an NLBA is updated, a new NPBA is allocated to the NLBA. Update data is written into the region corresponding to the new NPBA and at this point, non-updated data stored in the old NPBA is copied to the region corresponding to the new NPBA (involved relocation). Incidentally, a plurality of NPBAs may be allocated to one NLBA for data exchange to execute the data exchanging involved in updating therebetween.

In the present embodiment, a case when write target data is grouped based on, for example, the static writing frequency SW_color as coloring information will be described. However, write target data may also be grouped based on various criteria, for example, the static reading frequency SR_color, the dynamic writing frequency DW_color, or the dynamic reading frequency DW_color, or further a combination of a plurality of criteria.

In the present embodiment, the management size to group a plurality of pieces of write target data is less than the block size of a NAND flash memory. For example, a page equal to the management unit of the coloring table 14 in size is used as a unit of the management size.

Figure 43:
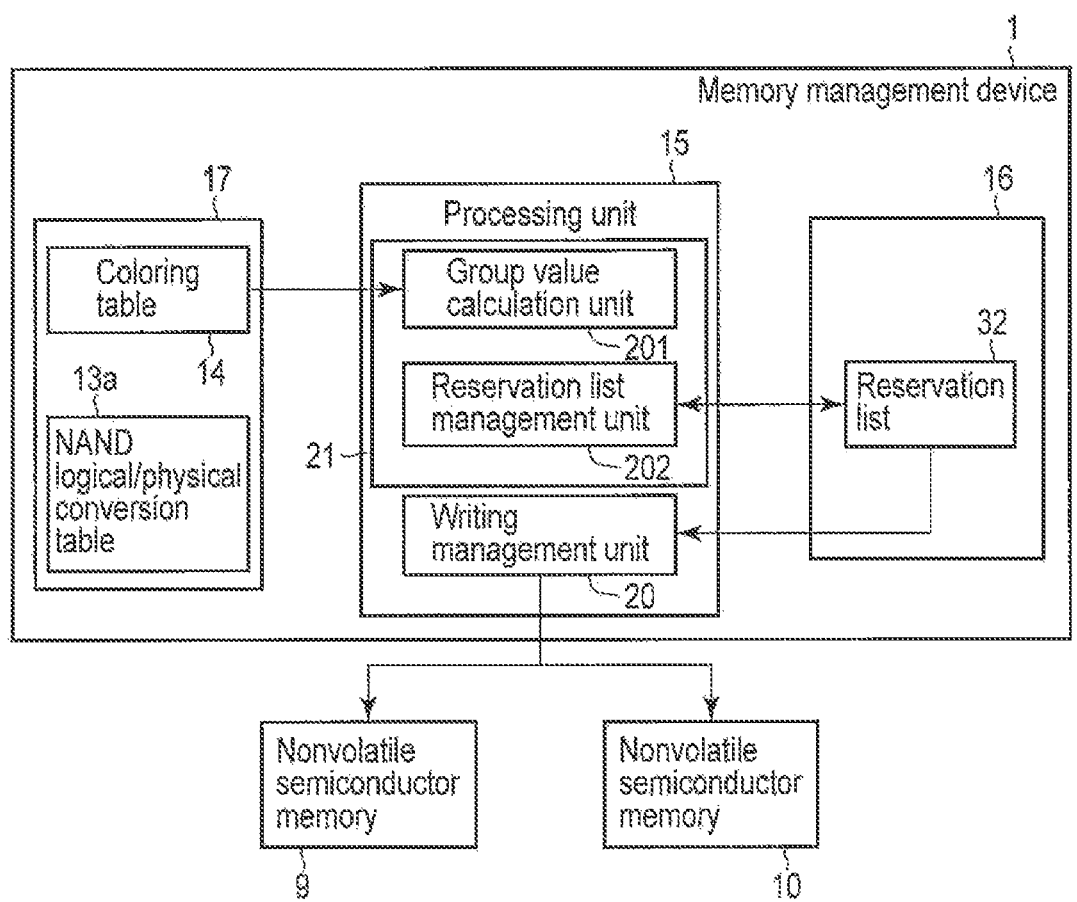
FIG. 43 is a block diagram showing an example of a principal portion of a functional configuration of a memory management device according to a fourth embodiment of the present invention.

FIG. 43 is a block diagram showing an example of principal portions of a functional configuration of the memory management device 1 according to the present embodiment. The coloring information management unit 21 includes, in addition to the access frequency calculation unit 24 and the dynamic color information management unit 25 described with reference to FIG. 2, a group value calculation unit 201 and a reservation list management unit 202.

The memory management device 1 further includes the writing management unit 20, the coloring table 14 stored in the information storage unit 17, and a reservation list 32 stored in the working memory 16. Other functional blocks contained in the memory management device 1 are the same as those described with reference to FIG. 2 and thus, an illustration and description thereof are omitted.

The group value calculation unit 201 references the coloring table 14 to calculate a color group value based on the static writing frequency SW_color of write target data. The color group value is a value indicating to which color group of color groups determined in accordance with the static writing frequency SW_color the write target data belongs. The color group value is calculated based on coloring information of the coloring table 14 and shows a grouping result of the write target data.

The group value calculation unit 201 calculates a color group value by using coloring information for each piece of data as an input value, but the calculation method can be changed in various ways. For example, the group value calculation unit 201 may use the static writing frequency SW_color or the dynamic writing frequency DW_color of data directly as a color group value.

In this case, if the range of the static writing frequency SW_color or the dynamic writing frequency DW_color is wide, the group value calculation unit 201 divides color groups so that the number of color groups should not be too many. For example, the group value calculation unit 201 may calculate a color group value based on at least one of the static writing frequency SW_color or the dynamic writing frequency DW_color of data.

The reservation list management unit 202 manages the reservation list 32 indicating a reservation state of write target data into a block allocated to each color group. The reservation list 32 is stored in, for example, the working memory 16, but may also be stored in another storage unit, for example, the information storage unit 17. Details of the reservation list management unit 202 and the reservation list 32 will be described later.

The writing management unit 20 references the reservation list 32 to write data of the block size allocated to a reservation node and putting a plurality of pieces of write target data together into the block corresponding to the reservation node in the nonvolatile semiconductor memories 9, 10.

Differences between writing to a common NAND flash memory and writing by the memory management device 1 according to the present embodiment will be described using FIGS. 44 and 45.

Figure 44:
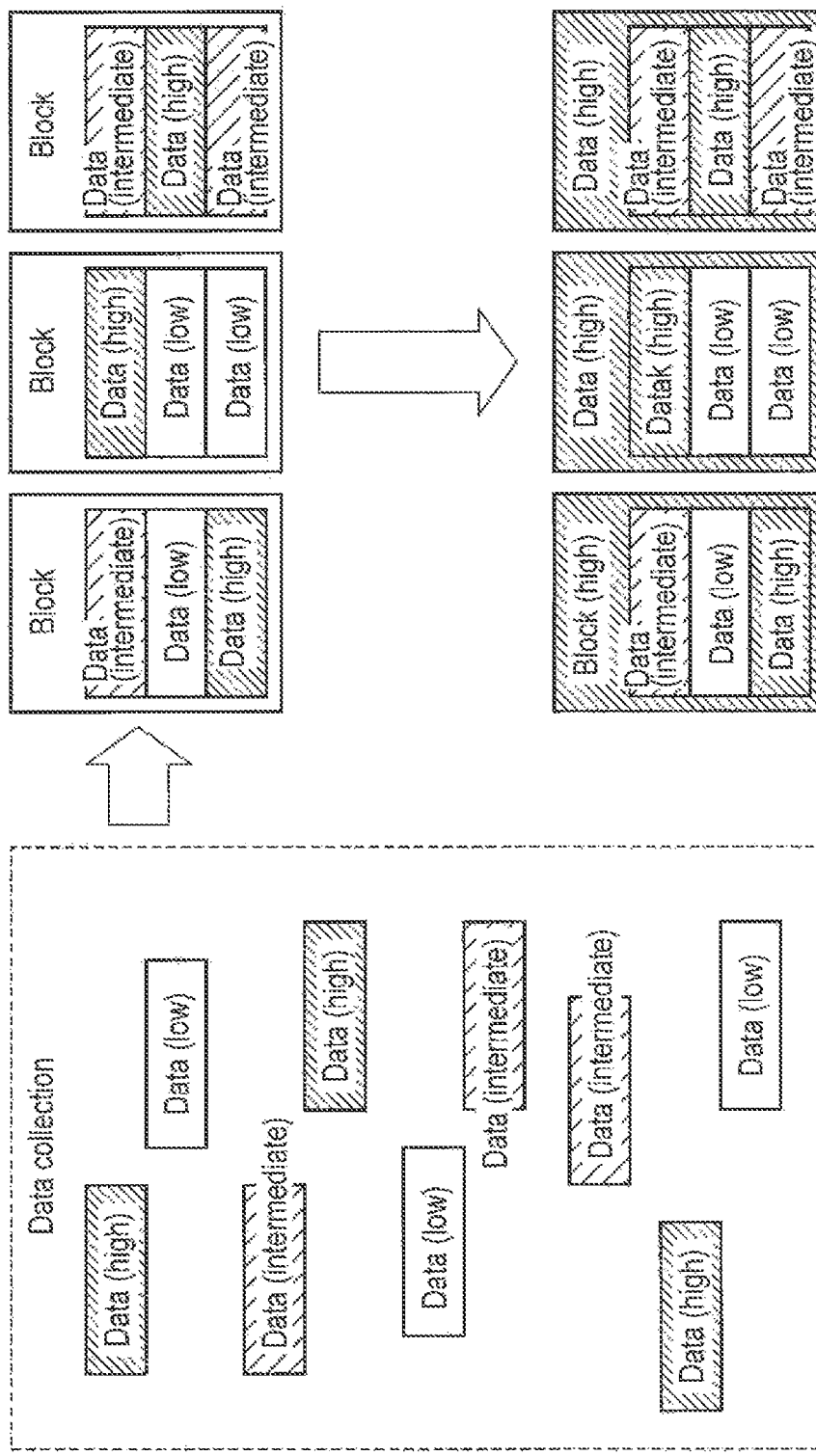
FIG. 44 is a diagram showing an example of a data structure of a block size when write target data is not classified based on the coloring information.

FIG. 44 is a diagram showing an example of a data configuration of the block size when write target data is not classified based on coloring information.

In a NAND flash memory adopting the overwrite method, even if only a portion of data in a block is updated, it is necessary to erase the whole block. Thus, the erasure frequency of the block is proportional to data with the highest access frequency (for example, the static writing frequency SW_color) of data in the block.

If data with an extremely high access frequency is distributed in various blocks, block erasure involved in data update work occurs frequently, resulting in an increase in the number of blocks with a high erasure frequency and a shorter life of the NAND flash memory.

Figure 45:
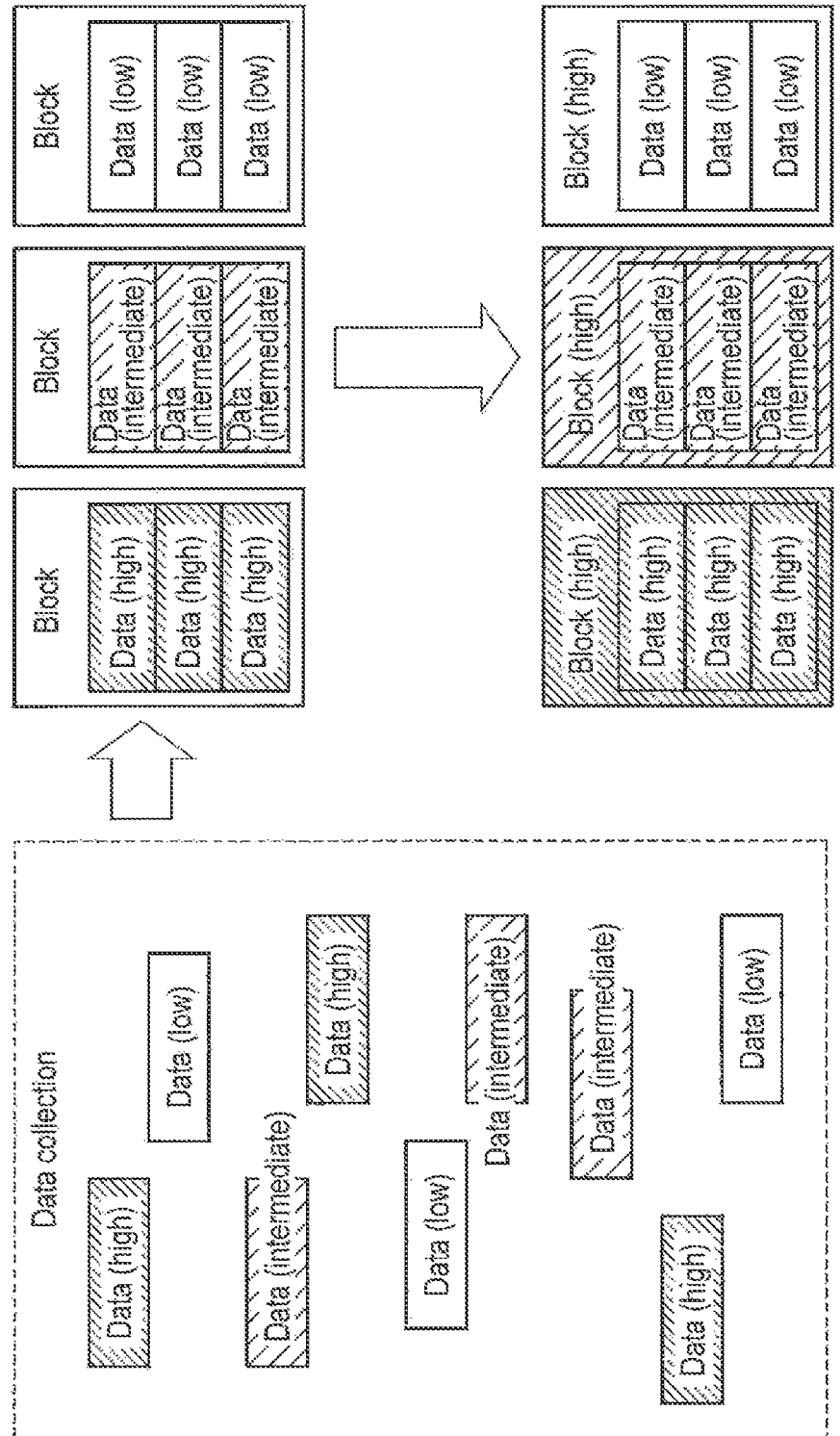
FIG. 45 is a diagram showing an example of a data structure of a block size when write target data is classified based on the coloring information.

In contrast, FIG. 45 is a diagram showing an example of a data configuration of the block size when write target data is classified based on coloring information.

In the present embodiment, as described in the first embodiment, coloring information can be obtained based on the coloring table 14 and thus, write target data can be grouped in accordance with the access frequency (for example, the static writing frequency SW_color).

The group value calculation unit 201 classifies write target data less than the block size of a NAND flash memory as a color group having a comparable access frequency based on the coloring table 14.

The reservation list management unit 202 puts write target data belonging to the same color group for the block size together to package the write target data for a block.

Accordingly, data with a high access frequency can be concentrated in a portion of blocks. Then, it becomes possible to decrease the number of blocks with a high erasure frequency and prolong the life of the NAND flash memory.

Figure 46:
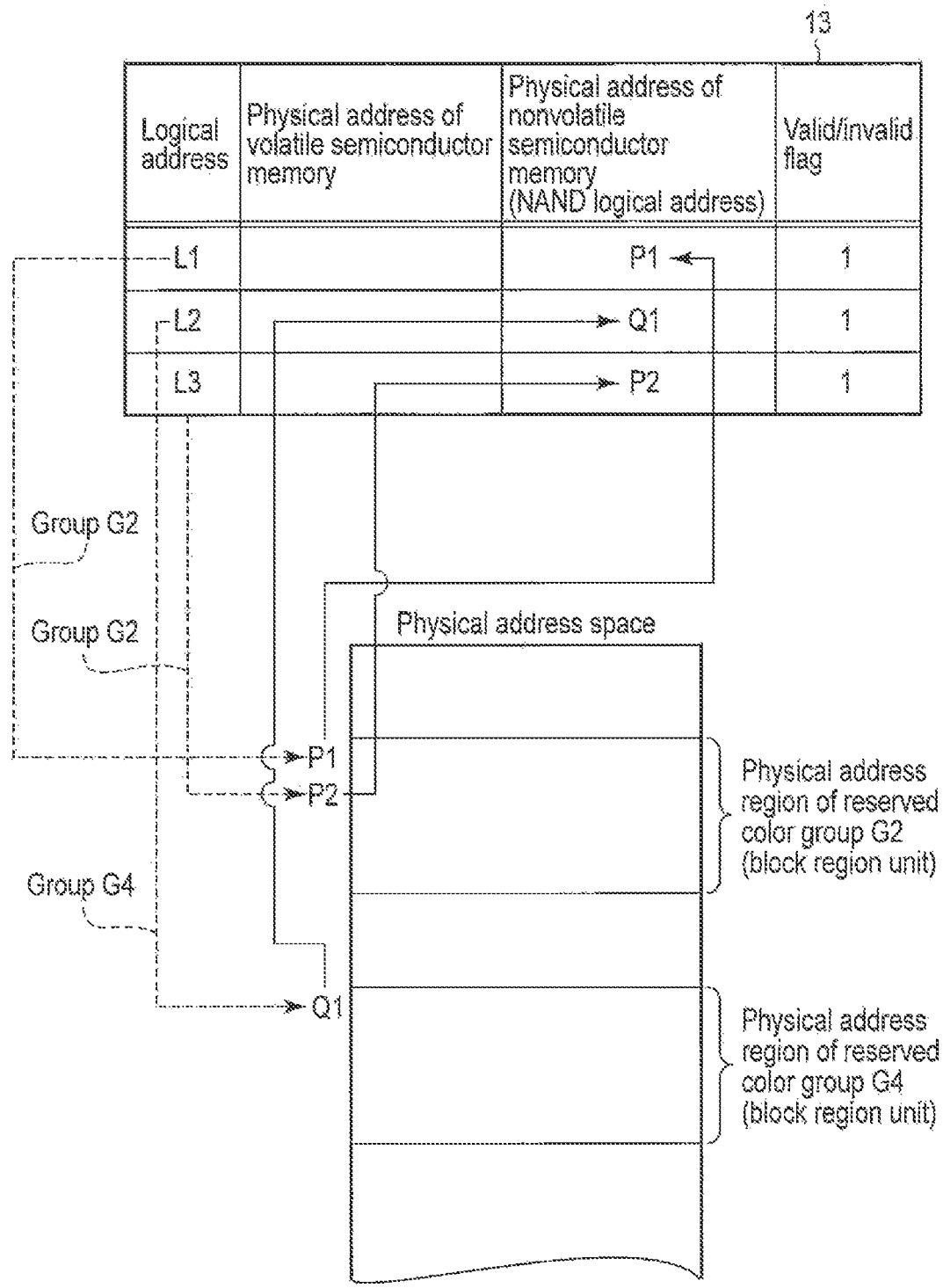
FIG. 46 is a diagram showing an example of a relationship between the address conversion information the physical address space (NAND logical address) of the nonvolatile semiconductor memory according to the fourth embodiment.

FIG. 46 is a diagram showing an example of a relationship between the address conversion information 13 according to the present embodiment and the physical address space of the nonvolatile semiconductor memories 9, 10, that is, the NAND logical address.

The address conversion information 13 includes the logical address, the physical address of the volatile semiconductor memory 8, the physical addresses (NAND logical addresses) of the nonvolatile semiconductor memories 9, 10, and valid/invalid flag as items.

If data is stored in the volatile semiconductor memory 8, the physical address of the volatile semiconductor memory 8 is stored by associating with the logical address of the data in the address conversion information 13.

If data is stored in the nonvolatile semiconductor memories 9, 10, the physical address (NAND logical addresses) of the nonvolatile semiconductor memories 9, 10 is stored by associating with the logical address of the data. The valid/invalid flag is a flag indicating whether or not each entry is valid.

It is assumed that write target data D1 of a color group G2 is first stored in the nonvolatile semiconductor memories 9, 10. In this case, one block of a physical address (NAND logical address) region of the nonvolatile semiconductor memories 9, 10 is reserved for the color group G2.

Further, a physical address (NAND logical address) P1 of one of a logical address L1 of the write target data D1 and the physical address (NAND logical address) region reserved for the color group G2 and the valid/invalid flag 1 indicating validity are stored in the address conversion information 13.

Next, it is assumed that write target data D2 of a color group G4 is stored in the nonvolatile semiconductor memories 9, 10. In this case, one block of a physical address region in the nonvolatile semiconductor memories 9, 10 is reserved for the color group G4.

Then, a physical address Q1 of the logical address of the write target data D2 or the physical address region reserved for the color group G4 and the valid/invalid flag 1 indicating validity are stored in the address conversion information 13.

It is assumed here that write target data D3 belonging to the same color group G2 as the write target data D1 previously stored in the physical address space of the nonvolatile semiconductor memories 9, 10 is stored in the nonvolatile semiconductor memories 9, 10. In this case, the logical address of the write target data D3, another physical address P2 of the physical address region reserved for the color group G2, and the valid/invalid flag 1 indicating validity are stored in the address conversion information 13.

FIG. 47 is a diagram showing an example of a logical/physical conversion table (NAND logical/physical conversion table) 13a of the nonvolatile semiconductor memories 9, 10. The NAND logical/physical conversion table 13a is stored in, for example, the information storage unit 17. The NAND logical/physical conversion table 13a shows the correspondence between the NAND logical block address NLBA and the NAND physical block address NPBA.

In FIG. 47, for example, NPBA2 is allocated to NLBA0, NPBA1 is allocated to NLBA1, and NPBA0 is allocated to NLBA2. NLBA0 corresponds to, for example, physical addresses P1, P2, ..., Pn in the nonvolatile semiconductor memories 9, 10.

FIG. 48 is a data structure diagram showing an example of the reservation list 32.

The reservation list 32 manages reservation nodes 321 to 326 representing physical address regions in units of reserved block regions. The reservation list 32 has a management section structure to prevent data with a high access frequency and data with a low access frequency from being included in the same block. A reservation node is managed by, for example, a list structure so that an increase/decrease of the number thereof can be handled flexibly.

Each of the reservation nodes 321 to 326 includes the color group value allocated to the respective reservation node, the reserved physical address (reserved NAND logical address), and the free space size.

The reserved physical address is, among physical addresses (NAND logical addresses) allocated to reservation nodes, a physical address (NAND logical address) that is not used and in which data is next to be arranged.

The free space size indicates the size of an unused region of physical address (NAND logical address) regions allocated to reservation nodes.

When new data arises in the logical address space, the reservation list management unit 202 scans the reservation list 32. Next, the reservation list management unit 202 searches for a reservation node having the same color group value as the color group value of the new data and whose free space size is larger than the size of the new data.

If such a reservation node is searched for, the reserved physical address of the searched reservation node is used as the physical address of the new data.

The reservation list management unit 202 selects an unused address region from the physical address region allocated to the searched reservation node to update the reserved physical address of the searched reservation node. The reservation list management unit 202 also reduces the free space size by the size of the new data to update the free space size of the searched reservation node.

If no reservation node is searched for, the reservation list management unit 202 secures a new physical address region of the block size and adds a new reservation node to the reservation list 32. The reservation list management unit 202 sets the color group value of the new data as the color group value of the new reservation node, sets an unused physical address of the newly secured physical address region as the reserved physical address of the new reservation node, and sets the size of free space of the newly secured physical address region as the free space size of the new reservation node.

Figure 49:
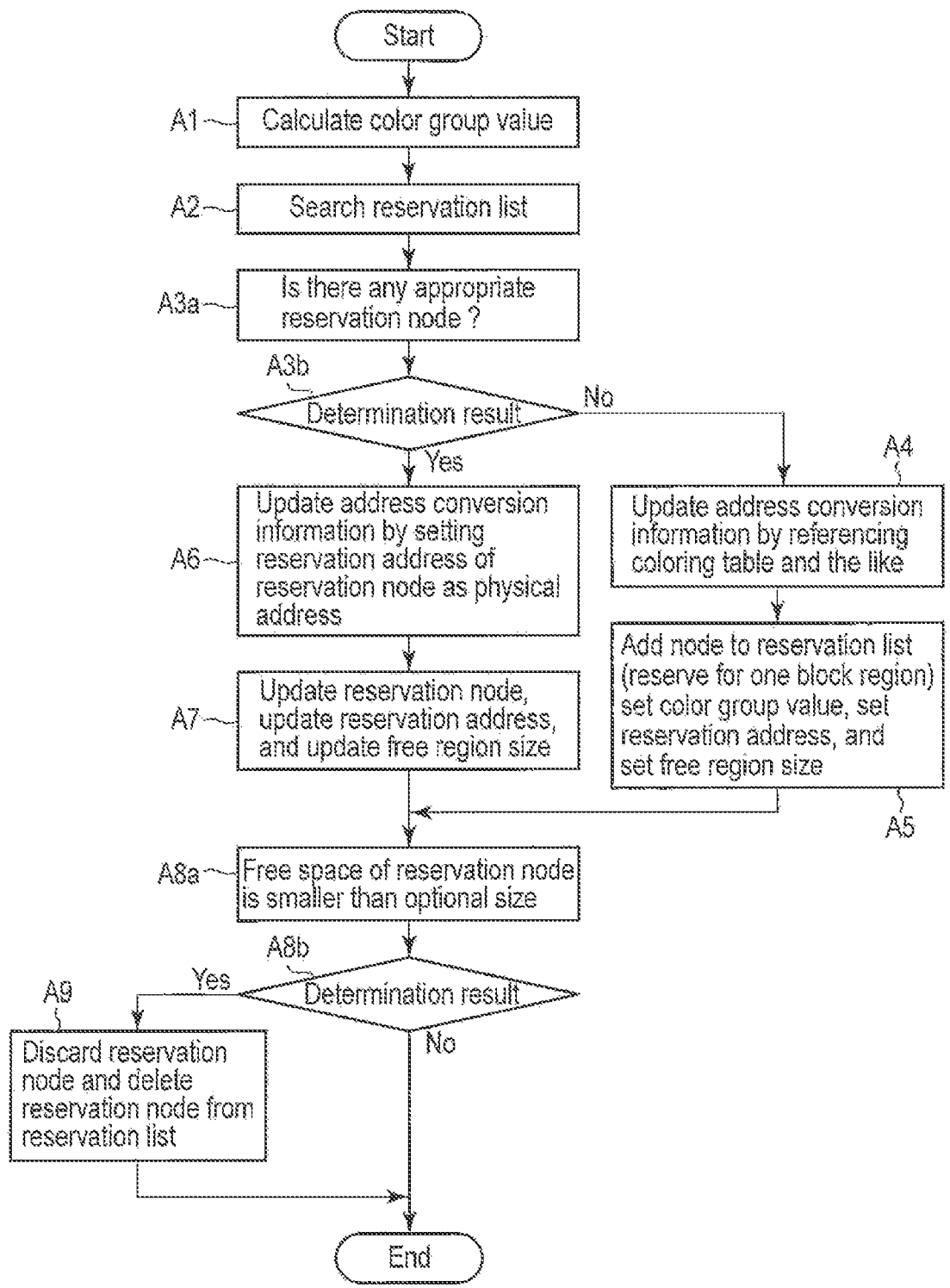
FIG. 49 is a flow chart showing an example of processing of a group value calculation unit and a reservation list management unit according to the fourth embodiment.

FIG. 49 is a flow chart showing an example of processing of the group value calculation unit 201 and the reservation list management unit 202 according to the present embodiment.

In step A1, the group value calculation unit 201 calculates a color group value of the write target data.

In step A2, the reservation list management unit 202 searches the reservation list 32 based on the color group value of the write target data.

In steps A3a and A3b, the reservation list management unit 202 determines whether or not there is an appropriate reservation node having the color group value of the write target data and having free space equal to or more than the size of the write target data.

If no appropriate reservation node is detected, in step A4, the reservation list management unit 202 references the memory usage information 11, the memory specific information 12, and the coloring table 12 to reserve a new physical address region of the block size from the physical address (NAND logical address) space. The reservation list management unit 202 also updates the address conversion information 13 by associating the logical address of the write target data with one of the physical addresses (for example, the top physical address) of the reserved physical address region via the address management unit 18.

In step A5, the reservation list management unit 202 adds a reservation node of the reserved one block region to the reservation list 32 and sets the color group value, reservation address, and free space size to the reservation node. Then, the processing proceeds to step A8a.

If an appropriate reservation node is detected, in step A6, the reservation list management unit 202 sets the reservation address of the appropriate reservation node as the physical address and updates the address conversion information 13 by associating the logical address of the write target data with the physical address via the address management unit 18.

In step A6, the reservation list management unit 202 updates the reservation address of the appropriate reservation node and the free space size. Then, the processing proceeds to step A8a.

In steps A8a and A8b, the reservation list management unit 202 determines whether or not the updated free space size of the appropriate reservation node is smaller than an optional size.

If the free space size is equal to or larger than the optional size, the processing ends.

If the free space size is smaller than the optional size, in step A9, the reservation list management unit 202 discards the appropriate reservation node from the reservation list 32, and then the processing ends.

FIG. 50 is a diagram showing an example of a state transition of the address conversion information 13 in the present embodiment.

In state 1, data for a logical address "0x0010_0000" occurs and the logical address "0x0010_0000" is registered in the address conversion information 13.

The group value calculation unit 201 references the coloring table 14 based on the logical address "0x0010_0000" to calculate a color group value for the logical address "0x0010_0000". The reservation list management unit 202 searches the reservation list 32 based on the color group value.

In this example, it is assumed that no reservation node (range of the physical address region) corresponding to the color group value is detected. If no reservation node is found, the reservation list management unit 202 determines a physical address "0x0030_0000" for the logical address "0x0010_0000" based on the memory usage information 11, the memory specific information 12, and the coloring table 12.

In state 2, the physical address "0x0030_0000" for the logical address "0x0010_0000" is registered in the address conversion information 13 by the address management unit 18.

The group value calculation unit 201 reserves an address region for one block region from the physical address "0x0030_0000".

The group value calculation unit 201 adds a reservation node corresponding to the reserved address region to the reservation list 32. The group value calculation unit 201 sets the color group value calculated in state 1 to the reservation node.

In state 3, data for a logical address "0x0030_0000" occurs and the logical address "0x0030_0000" is registered in the address conversion information 13 by the address management unit 18.

The group value calculation unit 201 references the coloring table 14 based on the logical address "0x0030_0000" to calculate a color group value for the logical address "0x0030_0000". The reservation list management unit 202 searches the reservation list 32 based on the color group value. In this example, it is assumed that a reservation node corresponding to the color group value is detected. The reservation list management unit 202 determines a reserved physical address "0x0040_0000" of the detected reservation node as the physical address for the logical address "0x0030_0000".

In state 4, the physical address "0x0040_0000" for the logical address "0x0030_0000" is registered in the address conversion information 13 by the address management unit 18.

In the present embodiment described above, data of the block size is configured by a plurality of pieces of write target data belonging to a group of the same access frequency based on coloring information of the plurality of pieces of write target data.

Therefore, data with a high access frequency can be concentrated in a specific block so that in the memory management device 1 adopting the overwrite method, it becomes possible to decrease the number of blocks with a high erasure frequency and prolong the life of the nonvolatile semiconductor memories 9, 10.

Fifth Embodiment

Generally, the MPU uses a DRAM as a main memory. If such a system is shut down, execution code and data in the main memory and a context of a process are stored in the secondary storage device. Thus, when the system is reactivated, it is necessary to reload necessary execution code and data into the memory from the secondary storage device via an I/O interface. Further, each program is initialized again. Thus, the activation time of the system is frequently long.

To solve this problem, (a) the method (for example, suspend to swap) of shutting down the system after saving a storage state of the main memory and the context of process in a swap region (synonymous with the secondary storage device) and (b) the method (for example, suspend to RAM) to pause in a state without totally turning off the system so that data does not disappear from the volatile memory have been proposed.

However, in the case of (a), it is difficult to optimize execution code, data and so forth to be saved in the swap region and the activation time becomes longer in proportion to the size of execution code, data, or the like.

In the case of (b), data is in a volatile memory and thus, a current-carrying state needs to be maintained. Therefore, a problem that it is difficult to pause for a long period of time is posed.

In the present embodiment, the memory management device capable of reducing the time needed for shutdown and activation and storing data with a high level of safety in consideration of properties of a nonvolatile memory will be described.

<Movement of Data when the Information Processing Device 100 is Shut Down>

The fifth embodiment relates to data movement from the volatile semiconductor memory 8 to the nonvolatile semiconductor memories 9, 10 when the information processing device 100 is shut down.

In the memory management device 1, the memory map of the mixed main memory 2 is as shown in FIG. 3. When the information processing device 100 is operating, data cached by data reading or writing is present in the volatile semiconductor memory 8 (DRAM region). When the information processing device 100 is shut down, for example, dirty data that is updated in the volatile semiconductor memory 8 and is not updated in the nonvolatile semiconductor memories 9, 10 is present. Thus, it is necessary to select and transfer such dirty data to the nonvolatile semiconductor memories 9, 10.

Figures 51, 52:
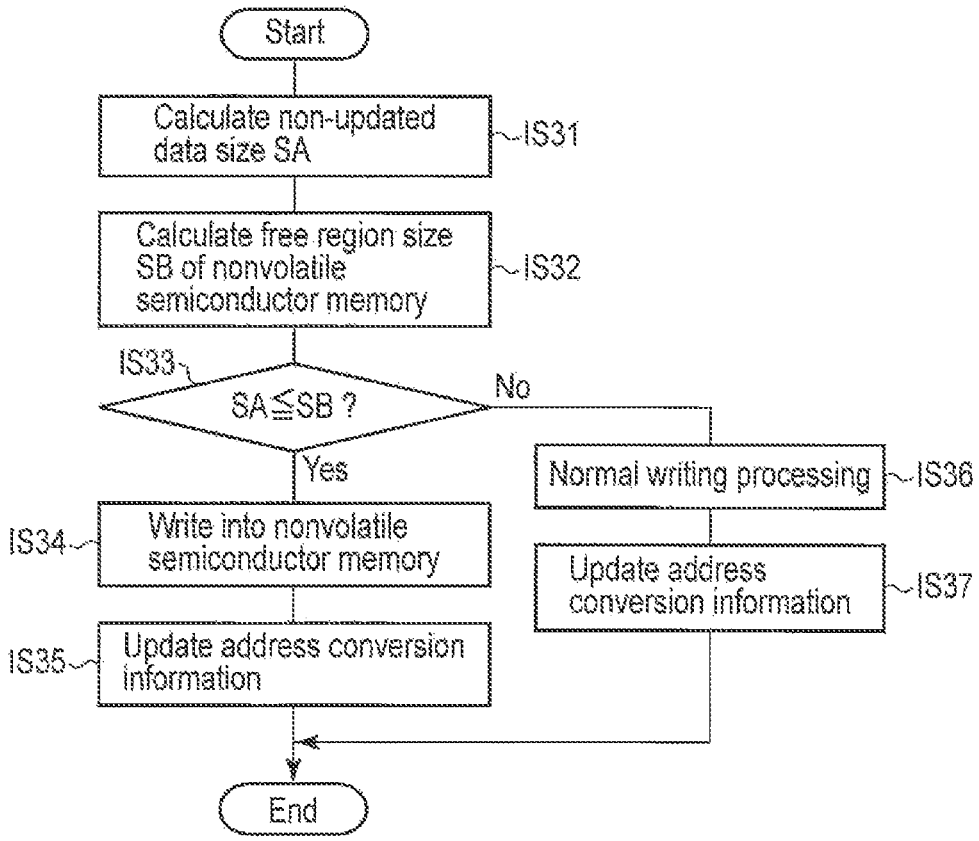
FIG. 51 is a diagram showing an example of a dirty bit field according to a fifth embodiment.
FIG. 52 is a flow chart showing shut down processing according to the fifth embodiment.

FIG. 51 shows an example of a dirty bit field DBF of the volatile semiconductor memory 8 provided in the information storage unit 17. Each column of the dirty bit field DBF corresponds to index information set based on a physical address and has flag data indicating whether data thereof is dirty set thereto. Flag data "0" indicates that data corresponding to the entry thereof has been erased or data thereof has been read into the volatile semiconductor memory 8, but has not yet been updated (synchronized) and flag data "1" indicates that the corresponding data is updated in the volatile semiconductor memory 8 and is not updated in the nonvolatile semiconductor memories 9, 10 (not synchronized). That is, data corresponding to the entry of the data "1" needs to be transferred to the nonvolatile semiconductor memories 9, 10 when shutdown and data corresponding to the entry of the data "0" need not be transferred to the nonvolatile semiconductor memories 9, 10.

When data read from the nonvolatile semiconductor memories 9, 10 is written into the volatile semiconductor memory 8, data is erased from the volatile semiconductor memory 8, or an update of data in the volatile semiconductor memory 8 is reflected in the nonvolatile semiconductor memories 9, 10, the memory management device 1 sets the flag data of the corresponding entry to "0".

When data in the volatile semiconductor memory 8 is updated, the memory management device 1 sets the flag data of the corresponding entry to "1".

The number of entries of the dirty bit field DBF is equal to a value obtained by dividing the size of the volatile semiconductor memory 8 by the I/O unit (cache line size=page size).

FIG. 52 shows an example of processing when the information processing device 100 is shut down. This processing is performed by, for example, the processing unit 15.

When the information processing device 100 is shut down, first a total size SA of data not updated in the nonvolatile semiconductor memories 9, 10 is calculated (step IS31). That is, entries of the dirty bit field DBF are searched to detect data whose flag data is "1". The size of the detected data whose flag data is "1" is totaled to calculate a non-updated data size SA.

Each entry of the dirty bit field DBF is set, as described above, for each page size of the nonvolatile semiconductor memory. Thus, the updated data size SA can be determined by counting the number of entries whose flag data is "1" and multiplying the counted value by the page size.

Next, a free space size SB of the nonvolatile semiconductor memory is calculated (step IS32). In the present embodiment, when data in the volatile semiconductor memory 8 is written into the nonvolatile semiconductor memory when shutdown, the data is written into an SLC region of the nonvolatile semiconductor memory 9 in consideration of faster writing and reading and the possibility that the data may be stored for a long period of time. More specifically, the data is preferentially written into, for example, a B region of the SLC region shown in FIG. 3.

As described above, the memory management device 1 manages writing into the nonvolatile semiconductor memories 9, 10 based on information of the coloring table 14.

However, shutdown processing according to the present embodiment ignores the principle and causes, for example, the B region of the nonvolatile semiconductor memory 9 to preferentially store data for storage of data by maintaining, for example, high speed and high reliability.

Thus, the free space size of the B region is calculated. The calculation of the free space size is determined based on, for example, the content of the memory usage information 11.

Then, the calculated non-updated data size SA and the free space size SB of the B region are compared (step IS33). If, as a result, the calculated non-updated data size SA is equal to or less than the free space size SB of the B region, non-updated data in the volatile semiconductor memory 8 is written into the B region of the nonvolatile semiconductor memory (step IS34). Next, based on the writing into the B region, the address management information shown in FIG. 4 is updated (step IS35).

On the other hand, if, in step IS33, the calculated non-updated data size SA is determined to be larger than the free space size SB of the B region, normal write processing is performed. That is, according to the principle, data is written by referencing the coloring table 14 (step IS36). Then, the address management information is updated (step IS37).

According to the present embodiment, the dirty bit field DBF is provided in the information storage unit 17, whether or not data in the volatile semiconductor memory 8 is updated is managed based on flag data, and data in the volatile semiconductor memory 8 is transferred to the nonvolatile semiconductor memory 9 based on flag data of the dirty bit field DBF when the information processing device 100 is shut down. Therefore, non-updated data can reliably be transferred to the nonvolatile semiconductor memory 9 when the shutdown is executed.

Moreover, non-updated data output from the volatile semiconductor memory 8 when the shutdown is executed is written into the SLC region of the nonvolatile semiconductor memory 9. Thus, it becomes possible to make write processing faster and also maintain reliability for long-term storage.

<Faster Activation of the Information Processing Device 100>

The fifth embodiment is intended to make activation of the information processing device 100 faster.

If, for example, an animation player and a browser are operating when shut down and the priority is set so that the animation player is likely to be scheduled next when the browser is operating, it is considered possible to cause the information processing device 100 to operate faster if code of the animation player with a higher priority has been transferred to the volatile semiconductor memory 8 after the information processing device 100 being activated.

Thus, in the present embodiment, pre-reading (look-ahead) hint information is added to the coloring table 14 for the purpose of making activation faster and the information processing device 100 is activated by using the pre-reading hint information. The pre-reading hint information is set to the coloring table 14 when the shutdown is executed. That is, the operating system 27 can reduce memory access overheads at activation to enable faster activation by storing the pre-reading hint information in the coloring table 14 in a shutdown process.

FIG. 53 shows an example of the coloring table 14 applied in the present embodiment. A field of pre-reading hint information is added to each entry for the coloring table 14 shown in FIG. 8. The pre-reading hint information is, for example, flag data provided in a field of the static color information. The flag data is "0" indicates that data corresponding to the entry thereof is not read ahead and the flag data is "1" indicates that data corresponding to the entry thereof is read ahead. The flag data is not limited to binary data and may be multi-valued data.

When the information processing device 100 is shut down, the flag data as the pre-reading hint information is set to the coloring table 14 in, for example, a shutdown process of the operating system 27.

FIG. 54 shows setting processing of pre-reading hint information. This processing is performed by, for example, the processing unit 15.

When the information processing device 100 is shut down, pre-reading hint information is first added to the address at which code data needed for activation is stored (step IS41). That is, the flag data "1" is set to the corresponding entry of the coloring table 14 as the pre-reading hint information.

Then, the pre-reading hint information is added to the context of the process with the highest priority (step IS42). That is, the flag data "1" is set to the entry corresponding to the context of the process with the highest priority of the coloring table 14 as the pre-reading hint information. Data with a high priority includes, for example, initialization code data of a device, the context of a process with a high priority when shut down or the like.

The flag data "0" as pre-reading hint information is set to data whose static color information, for example, the static reading frequency (SR_color) is low, even if related to a process with a high priority. For example, an address space to which MPEG data is mapped corresponds to such data and the address space is set so that no pre-reading occurs.

Next, whether pre-reading hint information is added to data of the set size is determined (step IS43). That is, whether pre-read data exceeds the size of the volatile semiconductor memory 8 in which the data read ahead is stored is determined. The usage size of the volatile semiconductor memory 8 is set by, for example, the user. Thus, whether the set size is exceeded is determined. If, as a result, the set size is not exceeded, the processing proceeds to step IS42 to perform the above operation. If, as a result of the determination, the set size is determined to be exceeded, the processing ends. In this manner, pre-reading hint information is set to the coloring table 14 when shutdown.

If the information processing device 100 is activated, execution code executed always and data to be read are present in an activation process of the information processing device 100. The operating system 27 can know execution code executed in an early stage of activation and the data region.

When the information processing device 100 is activated, data is transferred from the nonvolatile semiconductor memory to the volatile semiconductor memory in parallel with the activation process by using pre-reading hint information set to the coloring table 14.

Figure 55:
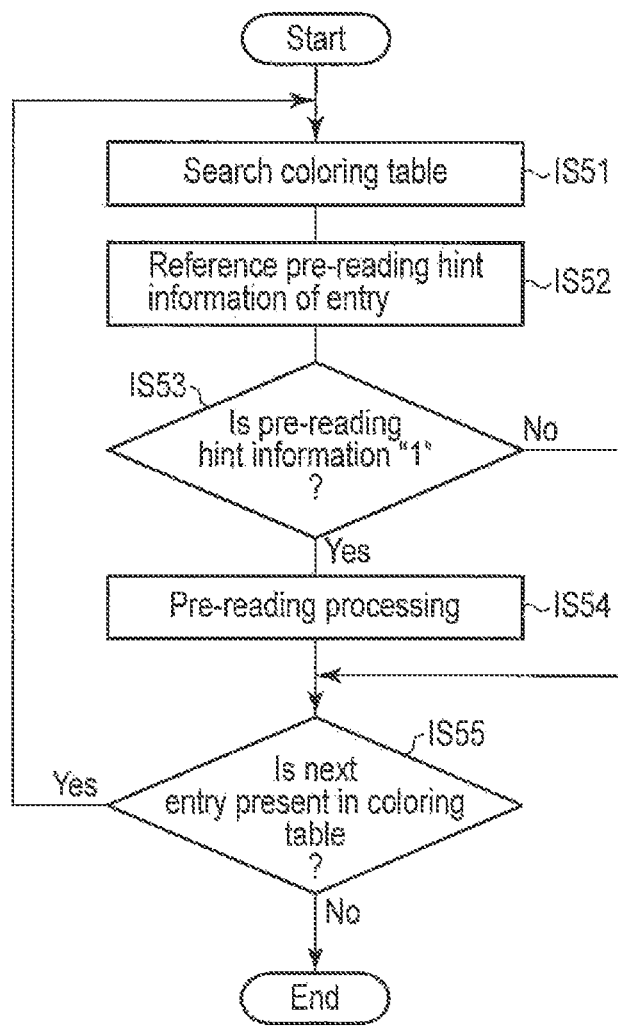
FIG. 55 is a flow chart showing an example of processing of an operating system when activation according to the fifth embodiment.

FIG. 55 shows processing of the operating system 27 when activation.

First, the coloring table 14 is searched (step IS51) to read flag data as pre-reading hint information of entries (step IS52). Next, whether the flag data is "1" is determined (step IS53). If, as a result, the flag data is "1", data corresponding to the entry thereof is read from the nonvolatile semiconductor memories 9, 10 (step IS54). That is, data to which pre-reading hint information is attached and having a priority over other data is transferred from the volatile semiconductor memory 8 to the nonvolatile semiconductor memories 9, 10.

If the flag data is "0" in the determination in step IS53, data corresponding to the entry thereof is not read.

Then, whether the next entry is present in the coloring table 14 is determined (step IS55). If, as a result, the next entry is present, the control is moved to step IS51 to repeat the above operation. If the next entry is not present, the processing ends.

The end condition of processing is not limited to the case when there is no next entry and the processing can be set to end if a write size when the volatile semiconductor memory 8 is activated is preset, the write size is reached. By setting the write size in this manner, free space can be secured in the volatile semiconductor memory 8.

According to the present embodiment, pre-reading hint information is added to the entry of the coloring table corresponding to data likely to be executed immediately after activation when the information processing device 100 is shut down and the pre-reading hint information is searched to preferentially transfer data from the nonvolatile semiconductor memories 9, 10 to the volatile semiconductor memory 8 when activation. Thus, overheads when activation when reading occurs frequently can be reduced so that the information processing device 100 can be activated at high speed.

Moreover, only data with a high priority is transferred to the volatile semiconductor memory 8 and thus, compared with a case when all data present in the volatile semiconductor memory 8 when shutdown is saved and recovered when activation, the content in the volatile semiconductor memory 8 can be sorted out and execution processing after activation can be made faster.

Sixth Embodiment

In the present embodiment, a concrete example of settings of static color information for the coloring table 14 by the memory management device 1 according to the first embodiment will be described.

The operating system 27 sets static color information of the coloring table 14 shown in FIGS. 5 and 8 to each piece of data.

Setting methods of static color Information for the coloring table 14 include [1] a setting based on an extension or a name of a file, [2] a setting based on a name of a directory, [3] a setting based on a shadow file, [4] a setting using an extension attribute of a file system, [5] a setting based on a header attached to a file of software (for example, an application) or data (for example, video compressed data of MPEG2 or the like), [6] a setting based on attribute information of a virtual address space, [7] a setting based on a usage frequency of a dynamic link library, [8] a setting based on a compiler, [9] a setting based on a dynamically generated memory region, and [10] a setting using a profiler. Each of the setting methods will be described below.

[1] The Setting Based on the Extension or the Name of the File

For example, the operating system 27 receives a setting of the relationship between the extension of the file using a kernel command line and static color information from the user (including the program developer). When, for example, static color information "1", "2" is set to the extensions "jpeg", "mpeg" respectively, the operating system 27 receives a command like "coloring_ext=jpeg:1,mpeg:2".

Accordingly, the relationship between the extension of the file and the static color information is set to the operating system 27. The operating system 27 determines the static color information of data based on the extension of the file corresponding to the data (the file in which the data is arranged) and sets the static color information to the coloring table 14.

Incidentally, for example, the operating system 27 manages mapping data associating the data with the file.

For example, the operating system 27 may reference a table associating the extension of the file with the static color information.

Also, instead of the relationship between the extension of the file and the static color information, the relationship between the name of the file and the static color information may be set.

[2] The Setting Based on the Name of the Directory

For example, the operating system 27 receives a setting of the relationship between the name of the directory and the static color information using a kernel command line from the user. When, for example, static color information "3", "4" is specified to directories "/tmp", "/var/log" respectively, the operating system 27 receives a command like "coloring_dir=/tmp:3,/var/log:4".

Accordingly, the relationship between the name of the directory and the static color information is set to the operating system 27. The operating system 27 determines the static color information of data based on the name of the directory in which the file corresponding to the data is arranged and sets the static color information to the coloring table 14.

Incidentally, for example, the operating system 27 may reference a table associating the name of the directory with the static color information.

[3] The Setting Based on the Shadow File

The relationship between the static color information and the file or the relationship between the static color information and the directory may be individually set by the user in the file system.

For example, the user generates a shadow file for a file. The shadow file is generated by changing an extension of the file corresponding to the shadow file. For a file ".foo.ext", for example, a shadow file ".foo.ext.s_color" is generated in the same directory.

Then, the user causes the shadow file to hold the relationship between the static color information and the file. For example, The static color information of the file ".foo.ext" is set into the shadow file ".foo.ext.s_color".

The operating system 27 determines the static color information of data based on the shadow file of the file corresponding to the data and sets the static color information to the coloring table 14.

Incidentally, the shadow file may be generated for a directory so that the relationship between the static color Information and the directory is held in the shadow file.

[4] The Setting Using the Extension Attribute of the File System

The relationship between the static color information and the file or the relationship between the static color information and the directory set by the user in the file system is set by using, for example, the extension attribute of the file system.

The extension attribute is a function to connect metadata that is not interpreted by the file system with a file or directory by the user. The static color information of the file or directory is set into metadata connected with the file or directory.

The operating system 27 determines the static color information of the data based on the metadata connected with the file corresponding to the data and sets the static color information to the coloring table 14.

The operating system 27 also determines the static color information of the data based on the metadata connected with the directory in which the data is arranged and sets the static color information to the coloring table 14.

[5] The Setting Based on the Header Attached to the File of the Software or Data The user modifies the header of a software file or data file and sets the static color information to the header of the file.

The operating system 27 determines the static color information of the data based on the header of the file corresponding to the data and sets the static color information to the coloring table 14.

Incidentally, instead of modifying the header of the file, the static color information may be set by using the above shadow file or extension attribute.

An application file may be divided into a plurality of sections to set static color information to each of the plurality of sections.

Control similar to the control of the memory management device 1 can also be realized for an SSD by generating a SATA vendor extension command used for the SSD and delivering data and static color information to the SSD.

[6] The Setting Based on the Attribute Information of the Virtual Address Space

FIG. 56 is a block diagram showing an example of a relationship between a virtual address region in a virtual address space and attribute information.

An Application uses virtual address regions J34*a* to J34*f* in a virtual address space J32.

The operating system 27 includes a virtual storage function. The operating system 27 manages each of the virtual address regions J34*a* to J34*f* by using virtual address region data corresponding to each of the virtual address regions J34*a* to J34*f*. Information J33 is information about the virtual address space J32 and includes the virtual address region data.

The virtual address region data corresponding to each of the virtual address regions J34*a* to J34*f* has a data structure including the start address, end address, first attribute information, and second attribute information. For example, at least one piece of virtual address region data is used for one process.

The start address and end address of each piece of virtual address region data show the start address and end address of the corresponding virtual address region.

The first attribute information of each piece of virtual address region data indicates whether the corresponding virtual address region is readable "r", writable "w", executable "x", or an occupied region "p" or a shared region "s".

The second attribute information of each piece of virtual address region data indicates whether the corresponding virtual address region is a heap region, stack region, or file map region.

In the present embodiment, of the virtual address region data corresponding to the virtual address regions J34*a* to J34*f*, the virtual address region data J35*c*, J35*d* corresponding to the virtual address regions J34*c*, J34*d* will be selected and described, but other virtual address region data has a similar feature.

The virtual address region J34*c* is readable, writable, and an occupied region and thus, the operating system 27 stores "r", "w", and "p" in the first attribute information of the virtual address region data J35*c*.

The virtual address region J34*c* is a heap region and thus, the operating system 27 stores "1" indicating the heap region in the second attribute information of the virtual address region data J35*c*.

The virtual address region J34d is readable, executable, and an occupied region and thus, the operating system 27 stores "r", "x", and "p" in the first attribute information of the virtual address region data J35d.

The virtual address region J34d is a file map region and thus, the operating system 27 stores "4" indicating the file map region in the second attribute information of the virtual address region data J35d.

Figure 57:
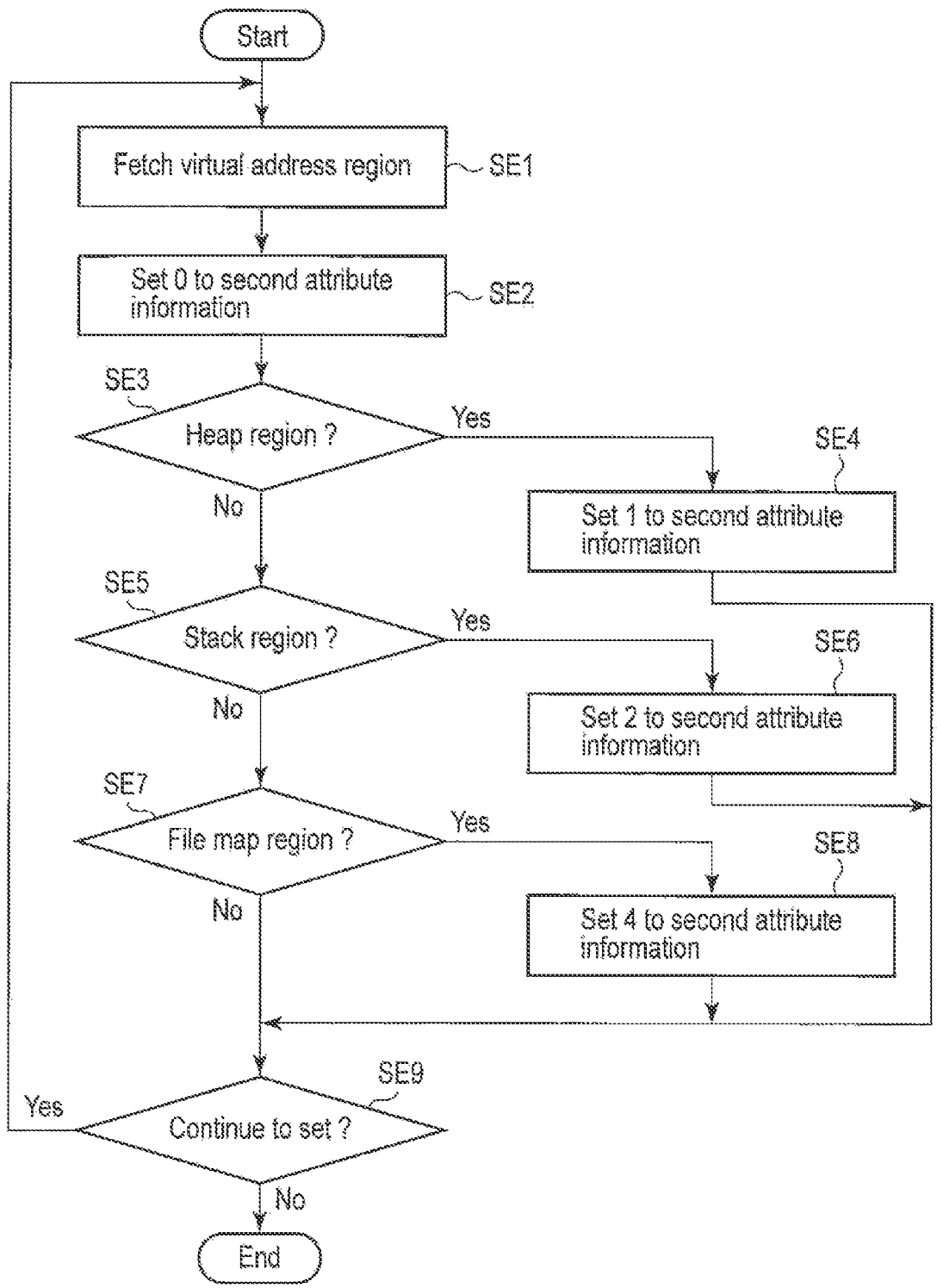
FIG. 57 is a flow chart showing an example of setting processing of second attribute information of virtual address region data by the operating system.

FIG. 57 is a flow chart showing an example of setting processing of the second attribute information of virtual address region data by the operating system 27.

In step SE1, the operating system 27 fetches the virtual address region to be set.

In step SE2, the operating system 27 sets the initial value "0" to the second attribute information.

In step SE3, the operating system 27 determines whether or not the virtual address region is a heap region.

If the virtual address region is a heap region, in step SE4, the operating system 27 sets "1" to the second attribute information.

In step SE5, the operating system 27 determines whether or not the virtual address region is a stack region.

If the virtual address region is a stack region, in step SE6, the operating system 27 sets "2" to the second attribute information.

In step SE7, the operating system 27 determines whether or not the virtual address region is a map file region.

If the virtual address region is a map file region, in step SE8, the operating system 27 sets "4" to the second attribute information.

In step SE9, the operating system 27 determines whether or not to set the second attribute information to another virtual address region.

If the second attribute information should be set to another virtual address region, the processing returns to step SE1.

If the second attribute information should not be set to another virtual address region, the processing ends.

FIG. 58 is a diagram showing an example of a setting of static color information based on the virtual address region data J35c.

FIG. 58 shows a case when static color information of the data arranged in the virtual address region J34c is set to the coloring table 14 based on the virtual address region data J35c managed by the operating system 27.

The operating system 27 generates and sets to the coloring table 14 the static writing frequency SW_color, the static reading frequency SR_color, and the data life SL_color for the data in the virtual address region J34c based on the first attribute and the second attribute of the virtual address region data J35c.

If the data in the virtual address region J34c is allocated to a logical address space, which is a real memory, due to a page fault, the operating system 27 generates a data generation time ST_color for the data in the virtual address region J34c and sets the data generation time ST_color to the coloring table 14.

Incidentally, the writing count and reading count for the data in the virtual address region J34c are updated by the memory management device 1.

[7] The Setting Based on the Usage Frequency of the Dynamic Link Library

Commands and libraries have dependence relationships. For example, when some command is executed, the library on which the command is dependent is used.

Thus, according to the method in [7], the score of a command is determined in advance and the score of a (dynamically linked) library used by the command is determined based on the score of the command. The score is assumed to be a value determined based on the usage frequency. In the example in FIGS. 59 and 60 described later, for example, the value of the score increases with an increasing usage frequency.

The static writing frequency SW_color and the static reading frequency SR_color for the data contained in a library are set based on the score of the library. Incidentally, the score may be determined by using a dynamic linker that dynamically links a library. In this case, for example, the score of each library is incremented each time the library is linked by the dynamic linker. More specifically, if the dynamic linker is used, the score of a library is initialized to 0 in the initial stage and then, each time the library is linked, the score of the linked library is incremented. As a result, a library with an increasing number of times of being linked has an increasing score.

FIG. 59 is a diagram showing an example of the dependence relationships between commands and libraries.

In FIG. 59, a command uses at least one library. The score of a command is preset.

The score of a library is the sum of scores of commands using the library or libraries using the library.

For example, the score of a command "cp" is set to "5". The command "cp" uses libraries "libacl.so.1" and "libselenux.so.1".

The scores of the libraries "libacl.so.1" and "libselenux.so.1" are set to the score "5" of the command "cp" using the libraries "libacl.so.1" and "libselenux.so.1".

The score of a command "bash" is set to "10". The command "bash" uses a library "libncurses.so.5".

The score of the library "libncurses.so.5" is set to the score "10" of the command "bash" using the library "libncurses.so.5".

A library "libdl.so.2" is used by the libraries "libselenux.so.1" and "libncurses.so.5".

The library "libdl.so.2" is set to a sum "15" of the scores of the libraries "libselenux.so.1" and "libncurses.so.5" using the library "libdl.so.2".

The scores are set to other commands and libraries according to similar rules.

Incidentally, the score of each command can be modified. The method of inheriting a score can also be modified in various ways. If, for example, a parent library has a dependence relationship in which the library is branched to a plurality of child libraries (when, for example, the parent library selects and uses one of the plurality of child libraries), the score of a child library may be a value obtained by dividing the score of the parent library by the number of child libraries. If the parent library needs the plurality of child libraries simultaneously, the same score as that of the parent library may be set to the child library.

FIG. 60 is a diagram showing an example of the scores of commands and the scores of libraries. In FIG. 60, the scores of libraries calculated following the dependence relationships in FIG. 59 are shown.

FIG. 61 is a diagram showing another calculation example of the scores of libraries based on the scores of commands. In FIG. 61, the dependence relationship between libraries is not used and the score of each library is calculated as a sum of the scores of commands using the library.

Figure 62:
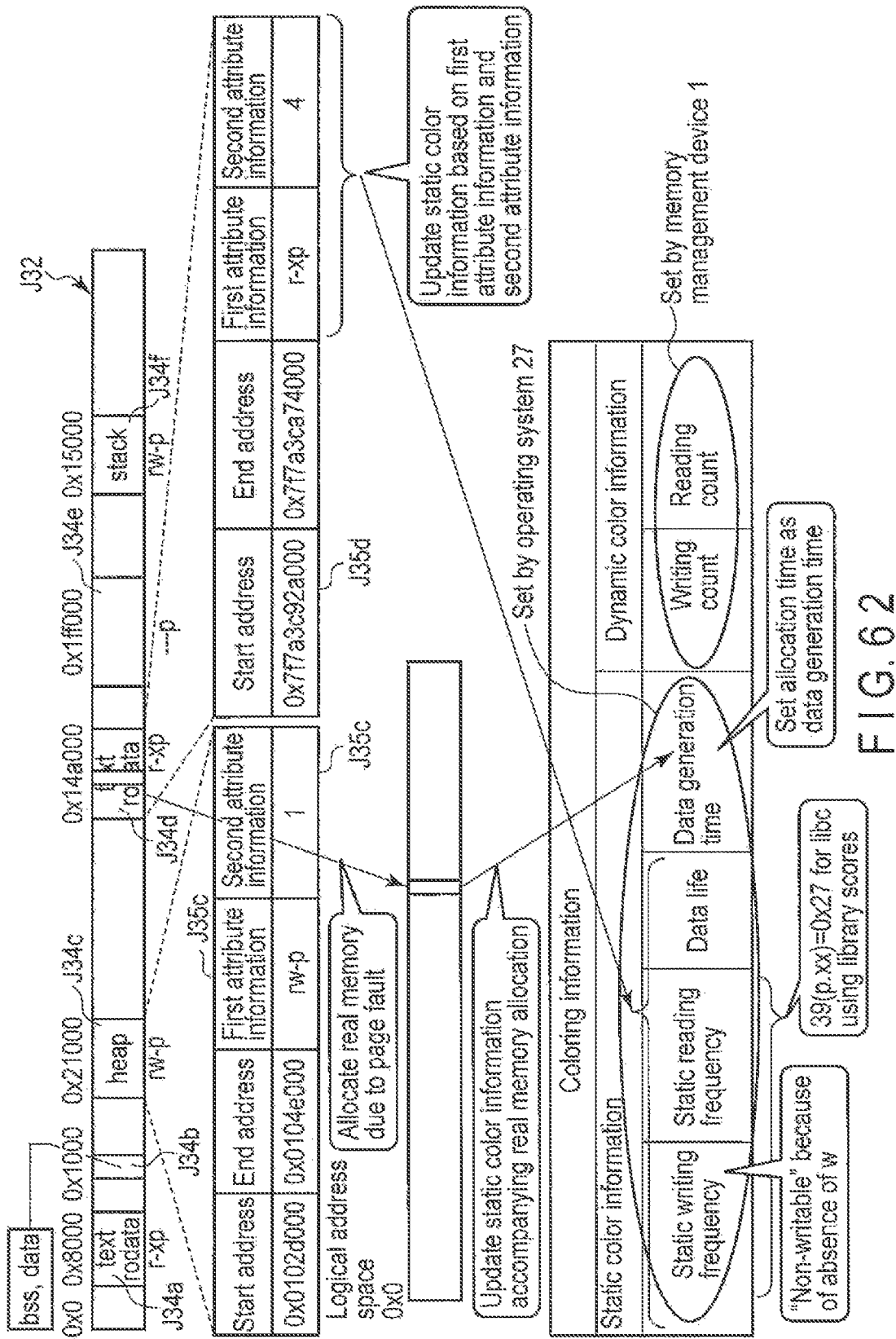
FIG. 62 is a diagram showing an example of a setting of static color information using the scores of the libraries.

FIG. 62 is a diagram showing an example of a setting of static color information using a score of a library.

In FIG. 62, a case when static color information of the data arranged in the virtual address region J34d is set to the coloring table 14 based on the virtual address region data J35*d* managed by the operating system 27 is shown.

The operating system 27 generates and sets to the coloring table 14 the static writing frequency SW_color, the static reading frequency SR_color, and the data life SL_color for the data in the virtual address region J34*d* based on the first attribute and the second attribute of the virtual address region data J35*d* and the scores of libraries.

If the data in the virtual address region J34*d* is allocated to a logical address space due to a page fault, the operating system 27 generates the data generation time ST_color for the data in the virtual address region J34*d* and sets the data generation time ST_color to the coloring table 14.

Incidentally, the writing count and reading count for the data in the virtual address region J34*d* are updated by the memory management device 1.

[8] The Setting Based on the Compiler

A compiler has a function capable of predicting the frequency (usage frequency) of a variable or the frequency of a function.

The user sets static color information to data containing a variable or function based on the frequency of the variable or the frequency of the function predicted by the function of the compiler. Accordingly, the static color information can be set more finely than in units of files.

As shown in FIG. 63, the compiler can bring user-specified variables or functions together in a specific section at compile time.

The user sets static color information to data containing variables and functions brought together by the function of the compiler. Accordingly, variables and functions with a comparable frequency can be brought together in the same write unit.

Figure 64:
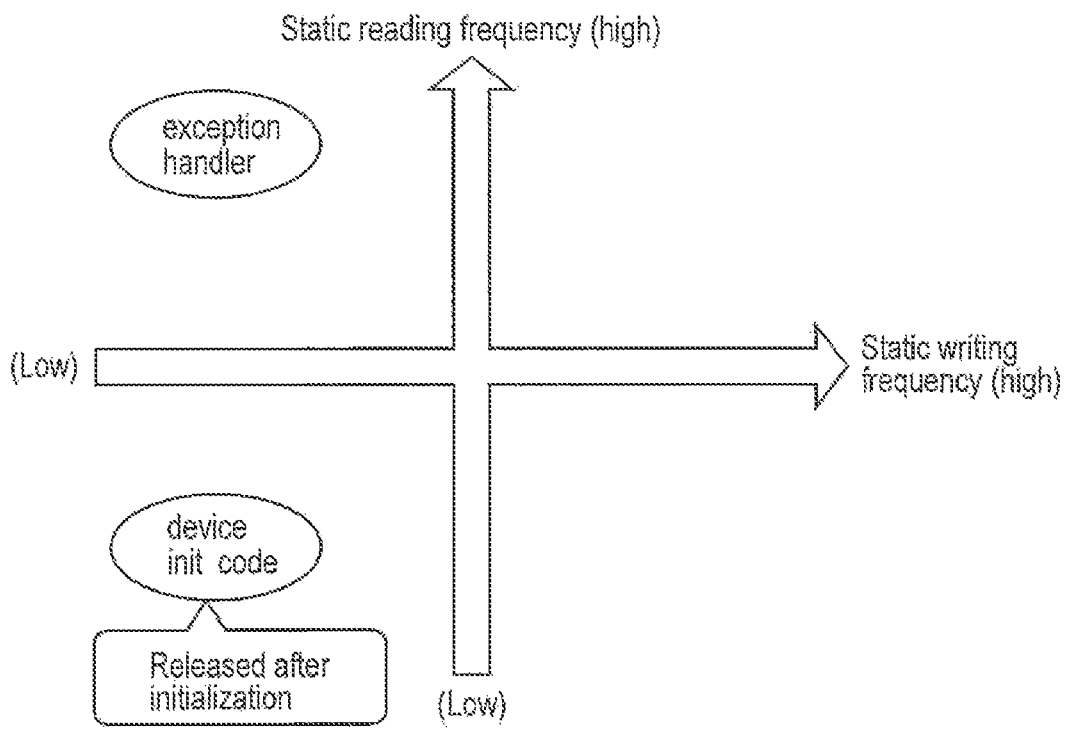
FIG. 64 is a diagram showing an example of a setting of the static color information using the compiler.

FIG. 64 is a diagram showing an example of a setting of static color information using a compiler.

The user predicts the frequency of a variable and the frequency of a function by using a compiler and divides the compiled software into sections to set static color information to each section.

For example, the operating system 27 sets "low" to the static writing frequency SW_color and "high" to the static reading frequency SR_color for the section containing "exception handler".

For example, the operating system 27 sets "low" to the static writing frequency SW_color and "low" to the static reading frequency SR_color for the section containing "exception handler".

[9] The Setting Based on the Dynamically Generated Memory Region

The user sets static color information to a dynamically generated (secured, released) memory region based on the usage frequency obtained from a profiler described later or the predicted usage frequency.

Accordingly, static color information is made settable to data arranged in a dynamically generated memory region.

Figure 65:
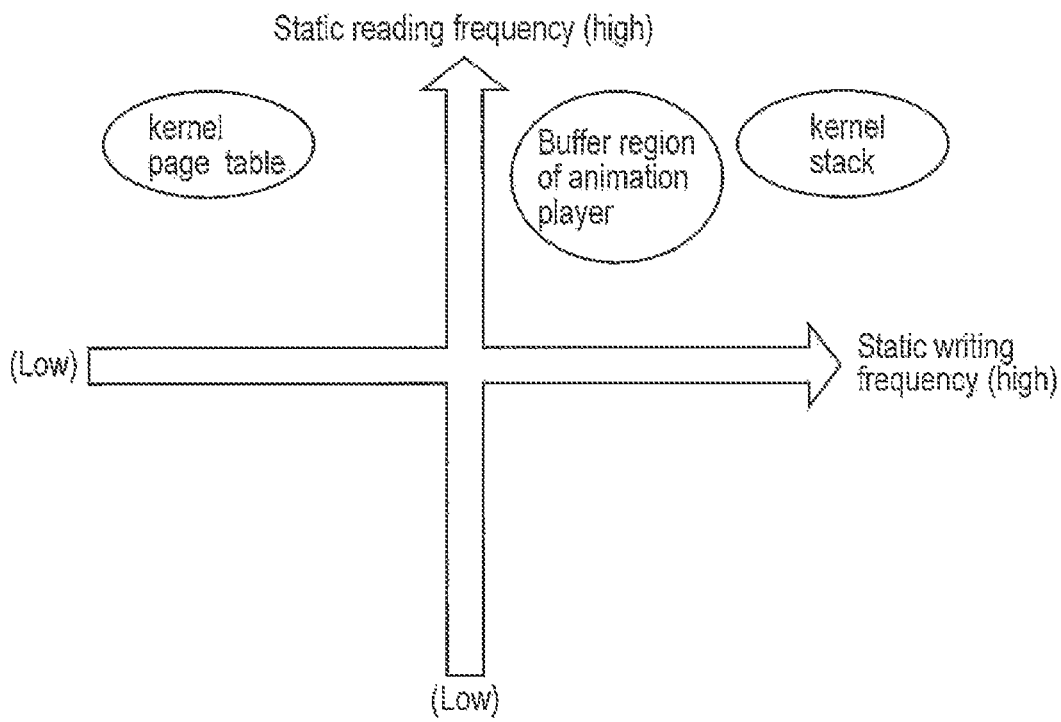
FIG. 65 is a diagram showing an example of a setting of the static color information based on a usage frequency of a dynamically generated memory region.

FIG. 65 is a diagram showing an example of a setting of static color information based on the usage frequency of a dynamically generated memory region.

For example, the operating system 27 sets "low" to the static writing frequency SW_color and "high" to the static reading frequency SR_color for data arranged in a memory region "kernel page table".

For example, the operating system 27 sets "high" to the static writing frequency SW_color and "high" to the static reading frequency SR_color for data arranged in a memory region "kernel stack".

For example, the operating system 27 sets "high" to the static writing frequency SW_color and "high" to the static reading frequency SR_color for data arranged in a buffer region of an animation player.

The operating system 27 directly updates the coloring table 14 when a memory region is acquired and released.

The setting of static color information to data arranged in a heap region or stack region of an application have been described in the first embodiment and thus the description thereof is omitted.

A madvise( ) system call advises the kernel how to handle paging input/output of a memory block of length bytes starting at an address addr. By using the system call, how a mapped memory or shared memory should be handled can be conveyed from the application to the kernel and the kernel can accordingly select an appropriate method such as looking ahead and a cache. A function to set static color information of the specified memory region may be added to the system call. Alternatively, a new system call to set static color information of the specified memory region may be added.

[10] The Setting Using the Profiler

A profiler has a function to acquire, for example, performance information of an application. The performance information contains statistical Information such as the usage frequency.

The user sets static color information to an application based on performance information generated by a profiler.

Accordingly, static color information is not set based on the usage frequency predicted in advance and instead, static color information is set in accordance with an actual usage state.

According to the present embodiment, as described above, setting methods of static color information are described. Accordingly, static color information used by the memory management device 1 is set to the coloring table 14 and based on the static color information, the life of the nonvolatile semiconductor memories 9, 10 can be prolonged.

Seventh Embodiment

The memory management device 1, the information processing device 100, and memory devices H32*a*, H32*b*, H32*c* according to the present embodiment will be described with reference to FIG. 66. FIG. 66 is a block diagram showing an example of the configuration of the memory management device 1, the information processing device 100, and memory devices H32*a*, H32*b*, H32*c* according to the present embodiment. The same reference numerals are attached to the same or similar elements to those in the first embodiment and the description thereof is omitted. In the description in FIG. 66, the processor 3*b* of the processors 3*a*, 3*b*, 3*c* will representatively be described, but the other processors 3*a*, 3*c* can also be described in the same manner.

The processing unit 15 included in the memory management device 1 includes the memory usage information management unit 22, a connection detection unit H33, a determination unit H34, a notification unit 35H, and a replacement control unit H36. The memory management information 11, the memory specific information 12, the address conversion information 13, and the coloring table 14 described above are stored in the information storage unit 17 included in the memory management device. Further, the processing unit 15 of the memory management device 1 is connected to a plurality of connector portions H44*a*, H44*b*, H44*c*.

The memory devices H32a, H32b, H32c include memory units H37a, H37b, H37c, normal notification units H38a, H38b, H38c, warning notification units H39a, H39b, H39c, usage stop notification units H40a, H40b, H40c, and connection operation units H41a, H41b, H41c respectively. Further, the memory devices H32a, H32b, H32c include connector units H42a, H42b, H42c respectively. Management information H43a, H43b, H43c is stored in the memory units H37a, H37b, H37c respectively. Details of the management information H43a, H43b, H43c will be described later.

The connector units H42a, H42b, H42c included in the memory devices H32a, H32b, H32c are connected to connector units H44a, H44b, H44c respectively.

Next, the configuration of the memory management device 1 will be described in more detail. In the description that follows, the memory device H32a of the memory devices H32a, H32b, H32c will representatively be described, but the other memory devices H32b, H32c can also be described in the same manner.

The connection detection unit H33 detects connection between the memory management device 1 and the memory device H32a. When a "mounting notification" described later is received from the connection operation unit H41a of the memory device H32a, the connection detection unit H33 detects that the memory device H32a is electrically connected to the memory management device 1 (a "connected state" is detected). When a "removal notification" described later is received from the connection operation unit H41a of the memory device H32a, the connection detection unit H33 detects that the memory device H32a is electrically removed from the memory management device 1 (a "removal ready state" is detected).

The determination unit H34 determines the usage state of the memory device H32a based on the memory usage information 11. The usage state includes, for example, "normal state", "warning state", and "usage stopped state". The determination unit H34 determines the usage state of the memory device H32a, for example, periodically. The determination unit H34 also determines the usage state of the memory device H32a, for example, each time the memory device H32a is accessed. The method of determining the usage state will be described later.

The notification unit H35 notifies the memory device H32a of the usage state based on the usage state determined by the determination unit H34.

When the connection detection unit H33 detects the "connected state" based on the "mounting notification" from the connection operation unit H41a of the memory device H32a, the replacement control unit H36 reads and stores in the memory usage information 11 the erasure count, writing occurrence count, and reading occurrence count for each predetermined region of the memory unit H37a contained in the management information H43a stored in the memory unit H37a. When the connection detection unit H33 detects the "removal ready state" based on the "removal notification" from the connection operation unit H41a of the memory device H32a, the replacement control unit H36 reads and stores in the management information H43a of the memory unit H37a the erasure count, writing occurrence count, and reading occurrence count for each predetermined region of the memory device H32a contained in the memory usage information 11 stored in the information storage unit 17. Details of the management information H43a will be described later.

If the memory device H32a is, for example, a NAND flash memory, for example, the erasure count is managed in units of block regions and the writing occurrence count and reading occurrence count are managed in units of page regions.

Next, the configuration of the memory devices H32a, H32b, H32c will be described.

The memory unit H37a is an SLC type NAND flash memory or an MLC type NAND flash memory and corresponds to the nonvolatile semiconductor memories 9, 10 in the first embodiment. The memory unit H37a may be an SLC type NAND flash memory (SLC region) in a portion of regions thereof and an MLC type NAND flash memory (MLC region) in the region excluding the SLC region. In this case, the SLC region corresponds to the nonvolatile semiconductor memory 9 and the MLC region corresponds to the nonvolatile semiconductor memory 10.

When a notification of "normal state" is received from the notification unit H35 of the memory management device 1, the normal notification unit H38a displays the normal state. For example, the normal notification unit H38a is an emitter of the first color (blue) and displays the normal state by being lit.

When a notification of "warning state" is received from the notification unit H35 of the memory management device 1, the warning notification unit H39a displays the warning state. For example, the warning notification unit H39a is an emitter of the second color (yellow) and displays the warning state by being lit.

When a notification of "usage stopped state" is received from the notification unit H35 of the of the memory management device 1, the usage stop notification unit H40a displays the stopped state. For example, the usage stop notification unit H40a is an emitter of the third color (red) and displays the usage stopped state by being lit.

When the memory device H32a is electrically disconnected (removed) from the memory management device 1, the connection operation unit H41a notifies the memory management device 1 that the memory device H32a has been removed (removal notification). The connection operation unit H41a includes, for example, an electric or mechanical button and, when the memory device H32a is removed, makes a removal notification to the memory management device 1 by the button being pressed by the user.

When the memory device H32a is electrically connected to the memory management device 1, the connection operation unit H41a notifies the memory management device 1 that the memory device H32a has been connected (mounting notification). When electrically connecting the memory device H32a to the memory management device 1, for example, a mounting notification is made to the memory management device 1 by the button being pressed by the user.

The memory device H32a and the memory management device 1 are electrically connected by the connector unit H42a being connected to the connector unit H44a.

Figure 67:
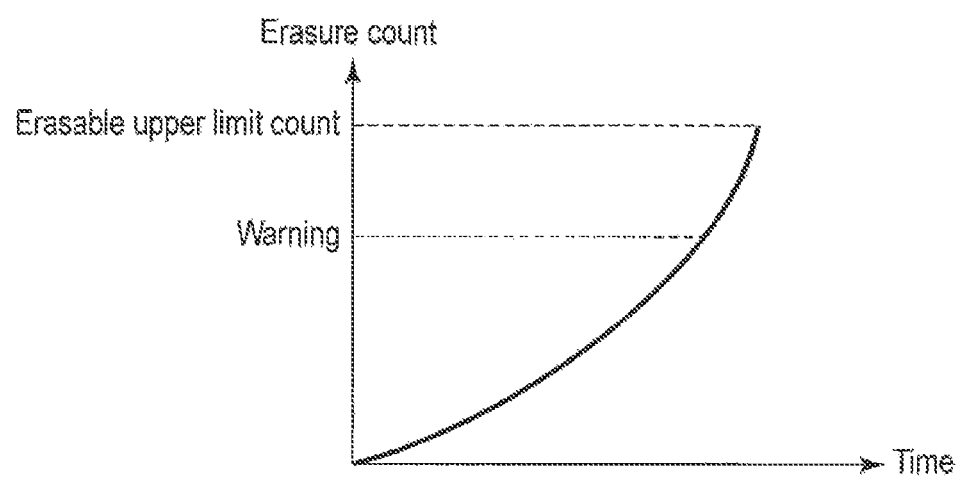
FIG. 67 is a graph showing an example of a change of an erasure count of a memory unit.

Next, changes of the erasure count of the memory unit H37a included in the memory device H32a will be described with reference to FIG. 67. FIG. 67 is a graph showing an example of changes of the erasure count of the memory unit H37a. The horizontal axis thereof represents the time and the vertical axis thereof represents the erasure count.

The memory unit H37a of the memory device H32a is accessed (read, written, erased) by the processor 3b. Thus, the erasure count, writing occurrence count, and reading occurrence count of the memory unit H37a increase with the passage of time and the erasure count reaches the erasable upper limit count of the memory unit H37a at some time. When the erasure count of the memory unit H32a reaches the erasable upper limit count, writing, reading, and erasure of data with respect to the memory unit H32a are not desirable from the viewpoint of reliability.

The memory management device 1 manages, as described above, the erasure count, writing occurrence count, and reading occurrence count of the nonvolatile semiconductor memories 9, 10 (memory device H32a) through the memory usage information 11. In the present embodiment, as will be described below, the memory management device 1 monitors the usage state of the memory device H32a based on the memory usage information 11 and warns the memory device H32a before the erasure count of the memory unit H32a reaches the erasure occurrence upper limit count.

Figure 68:
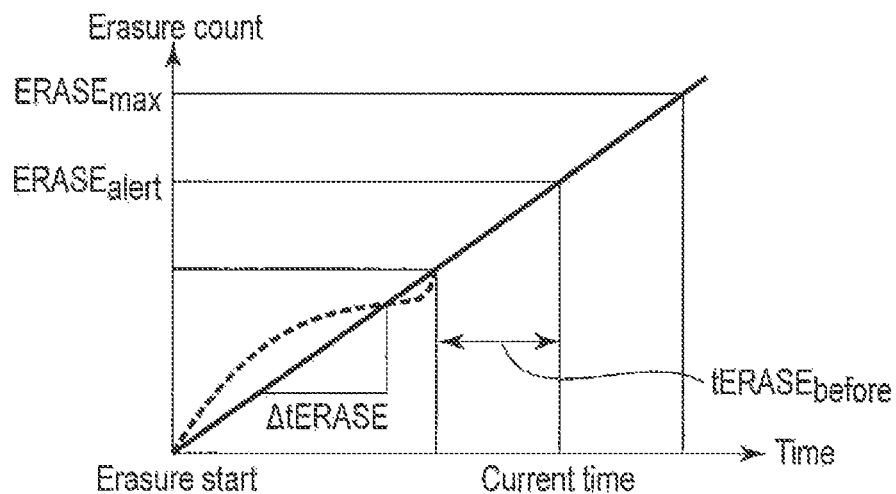
FIG. 68 is a graph showing an example of a usage state of the memory device based on the erasure count of the memory device.

The determination of the usage state of the memory device H32a based on the erasure count of the memory device H32a will be described with reference to FIG. 68. FIG. 68 is a graph showing an example of the usage state of the memory device H32a based on the erasure count of the memory device H32a. The horizontal axis thereof represents the time and the vertical axis thereof represents the erasure count. Incidentally, writing can also be used, like the erasure, for determination of the usage state of the memory device H32a.

FIG. 68 shows an example of changes of the erasure count of the memory unit H37a by a broken line. A regression curve ΔtERASE (for example, a primary regression curve) for the erasure count of the memory unit H37a is shown as a solid line. An erasure count $ERASE_{alert}$ after a predetermined time (warning period) $tERASE_{before}$ from the current time is predicted from the primary regression curve. If $ERASE_{alert}$ exceeds the erasable upper limit count $ERASE_{max}$, the usage state of the memory unit H37a is determined to be "warning state". If $ERASE_{alert}$ does not exceed the erasable upper limit count $ERASE_{max}$, the usage state of the memory unit H37a is determined to be "normal state". If the erasure count at the current time exceeds the erasable upper limit count $ERASE_{max}$, the usage state of the memory unit H37a is determined to be "usage stopped state".

If, as described above, the memory unit H37a is a NAND flash memory, the erasure count of the memory unit H37a is managed in units of block regions. The memory unit H37a contains a plurality of block regions. Variations of the erasure count between the plurality of block regions contained in the memory unit H37a are small due to wear leveling. Thus, for example, the average value of the erasure count of each of the plurality of block regions contained in the memory unit H37a is set as the erasure count of the memory unit H37a. Alternatively, for example, the maximum erasure count of the plurality of block regions contained in the memory unit H37a may be set as the erasure count of the memory unit H37a. This also applies to the reading occurrence count and writing occurrence count.

Figure 69:
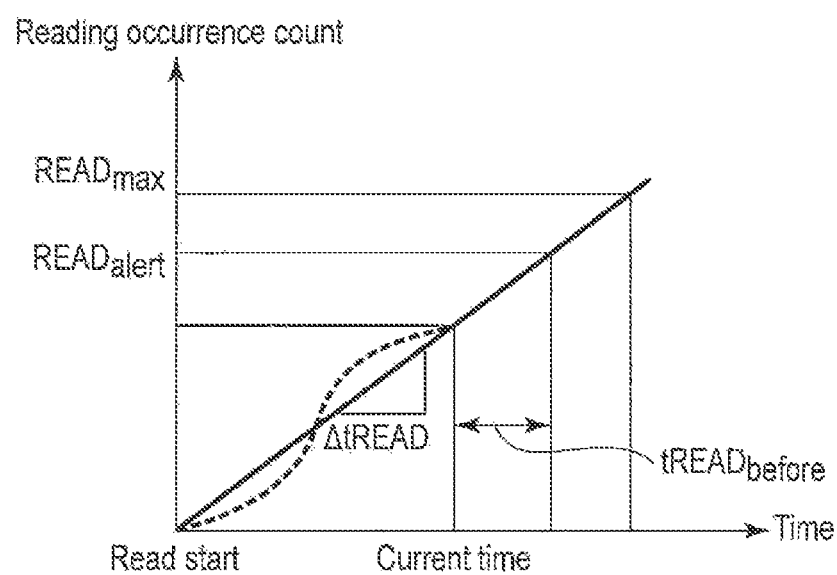
FIG. 69 is a graph showing an example of the usage state of the memory device based on a reading occurrence count of the memory device.

Next, the determination of the usage state of the memory device H32a based on the reading occurrence count of the memory device H32a will be described with reference to FIG. 69. FIG. 69 is a graph showing an example of the usage state of the memory device H32a based on the reading occurrence count of the memory device H32a. The horizontal axis thereof represents the time and the vertical axis thereof represents the reading occurrence count.

FIG. 69 shows an example of changes of the reading occurrence count of the memory unit H37a by a broken line. A regression curve ΔtREAD (for example, a primary regression curve) for the reading occurrence count of the memory unit H37a is shown as a solid line. A reading occurrence count $READ_{alert}$ after a predetermined time (warning period) $tREAD_{before}$ from the current time is predicted from the primary regression curve. If $READ_{alert}$ exceeds the readable upper limit count $REAd_{max}$, the usage state of the memory unit H37a is determined to be "warning state". If $READ_{alert}$ does not exceed the erasable upper limit count $READ_{max}$, the usage state of the memory unit H37a is determined to be "normal state". If the reading occurrence count at the current time exceeds the readable upper limit count $READ_{max}$, the usage state of the memory unit H37a is determined to be "usage stopped state".

Figure 70:
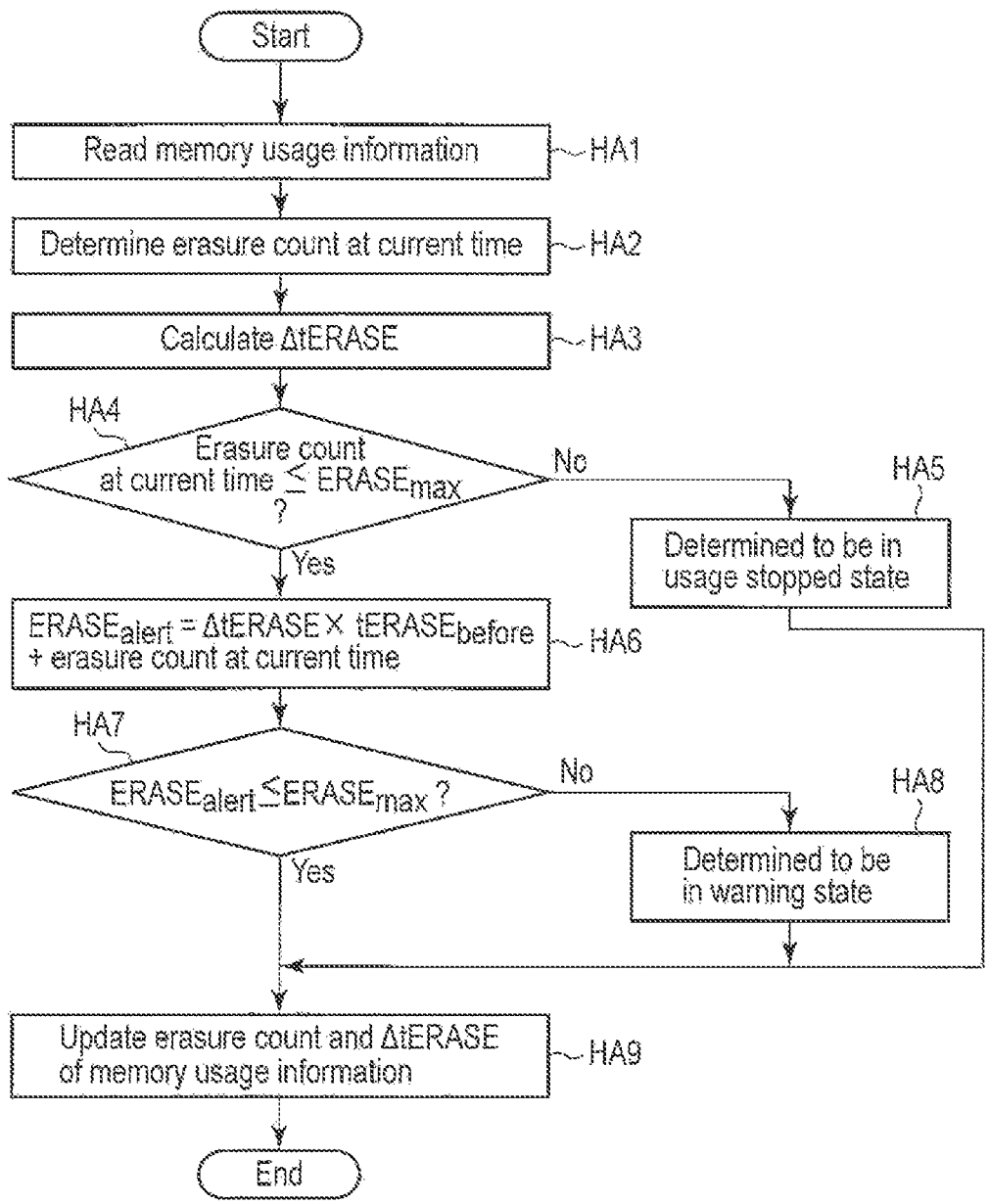
FIG. 70 is a flow chart showing an example of processing notifying the memory device of the usage state based on the erasure count of the memory device.

Next, an example of processing to notify the memory device H32a of the usage state based on the erasure count of the memory device H32a will be described with reference to FIG. 70. FIG. 70 is a flow chart showing an example of notifying the memory device H32a of the usage state based on the erasure count of the memory device H32a.

In step HA1, the memory usage information management unit 22 reads the memory usage information 11.

In step HA2, the memory usage information management unit 22 reads the erasure count of the memory device H32a at the current time from the memory usage information 11.

In step HA3, the determination unit H34 calculates new ΔtERASE based on the current time, a time prior to the current time, the erasure count at the current time, the erasure count at the time prior to the current time, and past ΔtERASE stored in the memory usage information 11. For example, the determination unit H34 calculates ΔtERASE, which is the erasure count per unit time, based on the erasure start time, the current time, and the erasure count at the current time.

In step HA4, the determination unit H34 determines whether the erasure count at the current time is equal to or less than the erasable upper limit count $ERASE_{max}$.

If the erasure count at the current time exceeds the erasable upper limit count $ERASE_{max}$, in step HA5, the determination unit H34 determines that the memory device H32a is in the usage stopped state and the processing proceeds to step HA9.

If the erasure count at the current time is equal to or less than the erasable upper limit count $ERASE_{max}$, in step HA6, the determination unit H34 calculates ΔtERASE×t $ERASE_{before}$+erasure count at the current time to determine a predicted value $ERASE_{alert}$ of the erasure count after $tERASE_{before}$ passes from the current time.

In step HA7, the determination unit H34 determines whether the predicted value $ERASE_{alert}$ is equal to or less than the erasable upper limit count $ERASE_{max}$.

If the predicted value $ERASE_{alert}$ exceeds the erasable upper limit count $ERASE_{max}$, in step HA8, the determination unit H34 determines that the memory device H32a is in the warning state and the processing proceeds to step HA9.

If the predicted value $ERASE_{alert}$ is equal to or less than the erasable upper limit count $ERASE_{max}$, the processing proceeds to step HA9.

In step HA9, the determination unit H34 updates the memory usage information 11 by storing the erasure count at the current time and ΔtERASE.

By notifying the memory device H32a of the usage state based on the erasure count of the memory device H32a, a warning can be given before the usage state of the memory device H32a becomes "usage stopped state".

Next, an example of processing to notify the memory device H32a of the usage state based on the reading occurrence count of the memory device H32a will be described with reference to FIG. 71. FIG. 71 is a flow chart showing an example of notifying the memory device H32a of the usage state based on the reading occurrence count of the memory device H32a.

Steps HB1 to HB9 in FIG. 71 are the same as steps HA1 to HA9 in FIG. 70 whose determination object is the erasure count except that the determination object is the reading occurrence count and thus, the description thereof is omitted.

By notifying the memory device H32a of the usage state based on the reading occurrence count of the memory device H32a as described above, a warning can be given before the usage state of the memory device H32a becomes "usage stopped state".

In the present embodiment described above, if the predicted erasure count $ERASE_{alert}$, $READ_{alert}$ after the predetermined time $tERASE_{before}$, $tREAD_{before}$ from the current time exceeds the erasable upper limit count $ERASE_{max}$, the readable upper limit count $READ_{max}$ respectively, the warning state is set. However, the above determination processing can be modified in various ways. A modification of the determination processing in the present embodiment will be described below.

For example, the determination unit H34 calculates ΔtERASE.

The determination unit H34 determines a time $tERASE_{max}$ at which the erasure count is predicted to reach $ERASE_{max}$ based on the erasure count at the current time, ΔtERASE, and $ERASE_{max}$.

The determination unit H34 determines a time $tERASE_{alert}$ at which the warning state should be set by subtracting $tERASE_{before}$ from $tERASE_{max}$.

Then, if the current time reaches or passes the time $tERASE_{alert}$ at which the warning state should be set, the determination unit H34 determines that the usage state is the warning state. Alternatively, the determination unit H34 determines the erasure count $ERASE_{alert}$ at which the warning state should be set based on the erasure start time, ΔtERASE, and the time $tERASE_{alert}$ at which a warning should be given and determines that the usage state is the warning state when the erasure count becomes equal to or more than the erasure count $ERASE_{alert}$ at which the warning state should be set.

This also applies when, instead of the erasure count, the reading occurrence count is the object of determination.

Figures 72, 73:
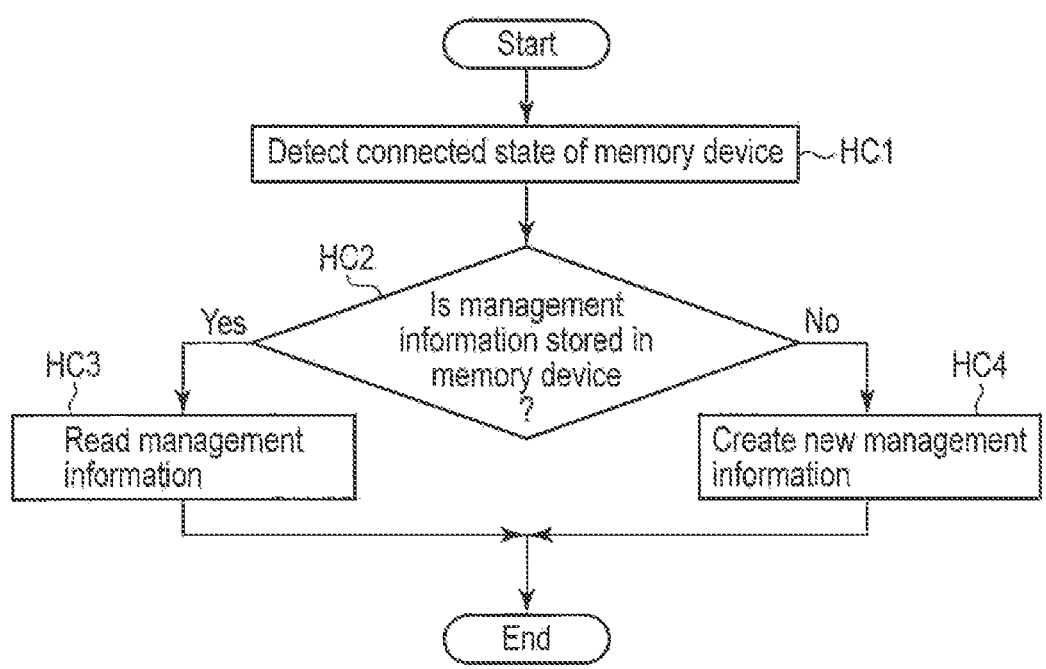
FIG. 72 is a diagram showing an example of data included in management information.
FIG. 73 is a flow chart showing an example of processing after the memory device is electrically connected to the memory management device until access to the memory device is started.

Next, the management information H43a stored in the memory device H32a will be described with reference to FIG. 72. FIG. 72 is a diagram showing an example of data included in the management information H43a.

The management information H43a contains the erasure count for each predetermined region of the memory unit H37a of the memory device H32a, the regression curve ΔtERASE for the erasure count, the erasable upper limit count $ERASE_{max}$, the warning period $tERASE_{before}$, and the erasure start time. Further, the management information H43a contains the reading occurrence count for each predetermined region of the memory unit H37a of the memory device H32a, the regression curve ΔtREAD for the reading occurrence count, the erasable upper limit count $READ_{max}$, the warning period $tREAD_{before}$, and the read start time.

The erasure count, the reading occurrence count, and the regression curves ΔtERASE, ΔtREAD are information managed by the memory usage information 11 of the memory management device 1 and are stored, as will be described later, in the management information H43a when the memory device H32a is removed from the memory management device 1.

Next, processing after the memory device H32a is electrically connected to the memory management device 1 until access to the memory device H32a is started will be described with reference to FIG. 73. FIG. 73 is a flow chart showing an example of processing after the memory device H32a is electrically connected to the memory management device 1 until access to the memory device H32a is started.

First, in step HC1, the connection detection unit H33 of the memory management device 1 detects that the memory device H32a is electrically connected (connected state) to the memory management device 1 by receiving a "mounting notification" from the memory device H32a.

Next, in step HC1, the memory management device 1 determines whether the management information H43a is stored in the memory device H32a. If the management information H43a is stored in the memory device H32a, the processing proceeds to step HC3. If the management information H43a is not stored in the memory device H32a, the processing proceeds to step HC4.

In step HC3, the memory management device 1 reads and stores in the memory usage information 11 the erasure count, writing occurrence count, and reading occurrence count for each predetermined region of the memory unit H37a contained in the management information H43a. The memory management device 1 also reads and stores in the memory specific information 12 the erasable upper limit count $ERASE_{max}$, the readable upper limit count $READ_{max}$, and the warning periods $tERASE_{before}$, $tREAD_{before}$ of the memory unit H37a contained in the management information H43a.

In step HC4, the memory management device 1 generates the new management information H43a, writes the new management information H43a into the memory unit H37a, and stores "0" in the memory usage information 11 as the values of the erasure count, writing occurrence count, and reading occurrence count for each predetermined region.

Access to the memory device H32a is started after the processing in step HC3 or HC4. If access to the memory device H32a occurs, as described above, the erasure count, writing occurrence count, and reading occurrence count for each predetermined region of the memory usage information 11 corresponding to the memory device H32a are updated.

Next, processing after the memory management device 1 receives a "removal notification" from the memory device H32a until the memory device H32a becomes removable with reference to FIG. 74. FIG. 74 is a flow chart showing processing after the memory management device 1 receives a "removal notification" from the memory device H32a until the memory device H32a becomes removable.

First, in step HD1, the connection detection unit H33 of the memory management device 1 receives a "removal notification" from the memory device H32a.

Next, in step HD2, the replacement control unit H36 of the memory management device 1 reads data stored in the memory device H32a from the memory device H32a and writes the data into another memory device (for example, the memory device H32b).

Next, in step HD3, the replacement control unit H36 stores the writing occurrence count, read occurrence count, and erasure count for each predetermined region of the memory device H32a managed by the memory management device 1 in the memory unit H37a of the memory device H32a as the management information H43a.

Next, in step HD4, the notification unit H35 of the memory management device 1 notifies the memory device H32a that the memory device H32a can be removed.

As described above, usage information of the memory device H32a can be acquired by storing the writing occurrence count, reading occurrence count, and erasure count for each predetermined region of the memory device H32a in the memory unit H37a of the memory device H32a as the management information H43*a* when the memory device H32*a* is removed and next, reading the management information H43*a* when the memory device H32*a* is mounted.

Figure 75:
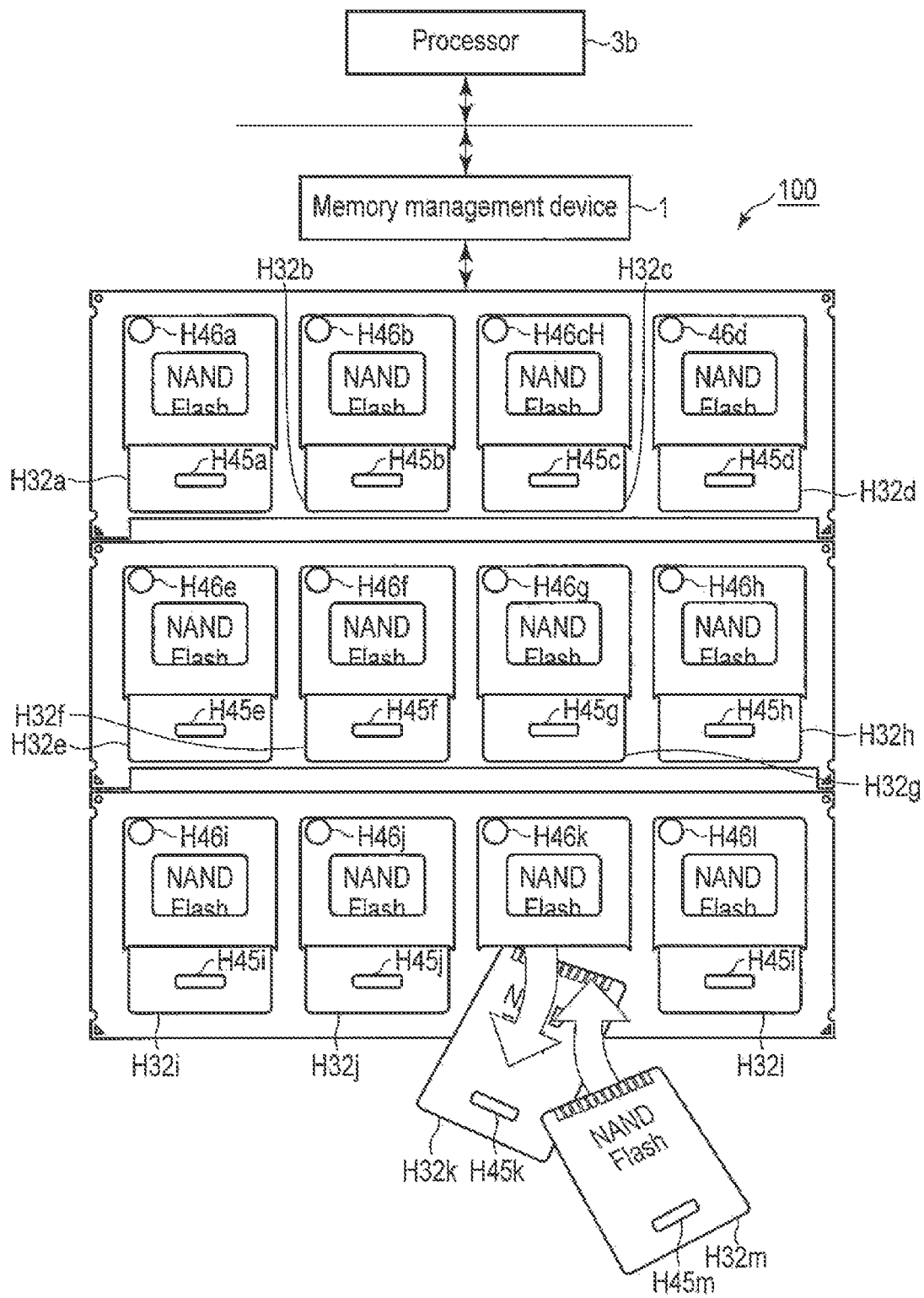
FIG. 75 is a diagram showing an example of removing state of the memory device.

Next, a replacement state of the memory device will be described with reference to FIG. 75. FIG. 75 is a diagram showing an example of the replacement state of the memory device.

The information processing device 100 includes the processor 3*b*, the memory management device 1, and memory devices H32*a* to H32*l*. The information processing device 100 applies RAID technology to the memory devices H32*a* to H32*l*. Further, in the present embodiment, the memory management device 1 that controls access to the memory devices H32*a* to H32*l* supports hot swapping of hardware. The information processing device 100 is assumes to be an device that needs to continuous operation such as a server device.

The memory devices H32*a* to H32*m* have upper limits of the memory reading count and memory erasure count and are replaced when the end of life thereof is reached. The memory devices H32*a* to H32*m* include display units H45*a* to H45*m* respectively. In FIG. 75, the display units H45*a* to H45*m* emit light, for example, in green when the memory devices H32*a* to H32*m* are in a normal state and emit light, for example, in red when the memory devices H32*a* to H32*m* are in a warning state or usage stopped state.

Buttons H46*a* to H46*l* are allocated to the mounted memory devices H32*a* to H32*l* respectively.

By applying RAID technology to the memory management device 1, even if one (the memory device H32*k* in FIG. 75) of the memory devices H32*a* to H32*l* is in a warning state or usage stopped state, the information processing device 100 can be operated normally by the memory devices H32*a* to H32*j* and the memory device H32*l* that remain. Then, the user can remove the memory device H32*k* in the warning state or usage stopped state and mount the spare memory device H32*m* while the information processing device 100 is operating.

If, for example, the memory device H32*k* is used and the reading occurrence count or the erasure count of the memory device H32*k* increases to approach the readable upper limit count or the erasable upper limit count respectively, the display unit H45*k* of the memory device H32*k* emits light in red. To replace the mounted memory device H32*k*, the user presses the corresponding button H46*k*. When the button H46*k* is pressed, a removal notification is sent to the memory management device 1. After the removal notification is received, the memory management device 1 performs processing such as saving data in the memory device H32*k* and turning off the memory device H32*k*.

If only data whose importance is equal to or less than a specific threshold is stored in the memory device H32*k* to be removed, the memory device H32*k* may immediately be replaced without the data being saved.

If the memory device H32*k* becomes removable, the user removes the memory device H32*k* and mounts the new memory device H32*m*.

The memory device H32*k* is used as a main storage device of the information processing device 100, for example, a server device, personal computer, or game machine and even if the memory device H32*k* enters the warning state, the memory device H32*k* can be reused, for example, as a medium like an alternative of CD-R or a photo-recording medium of a digital camera.

In the present embodiment, to make the old memory device H32*k* usable in another Information processing device, management information of the memory device H32*k* is stored in the memory device H32*k* and further, the display unit H45*k* is included in the memory device H32*k*.

Displays units for electronic ink may be used as the display units H45*a* to H45*m*. For example, the determination unit H34 of the memory management device 1 determines the access state (for example, "erasure count/erasable upper limit count", "reading occurrence count/readable upper limit count" and the like) to each of the memory devices H32*a* to H32*l* based on the memory usage information 11 and the memory specific information 12. The notification unit H35 of the memory management device 1 controls the display of the display units H45*a* to H45*l* for electronic ink based on the access state to each of the memory devices H32*a* to H32*l*. For example, the display units H45*a* to H45*l* show the access state as a bar graph.

Display content of the display units H45*a* to H45*l* for electronic ink is maintained even if the memory devices H32*a* to H32*l* are removed from the memory management device 1. Thus, after removing the memory devices H32*a* to H32*l*, the user can mount the memory devices H32*a* to H32*l* on another information processing device for reuse with reference to display content of the display units H45*a* to H45*l* for electronic ink.

Figure 76:
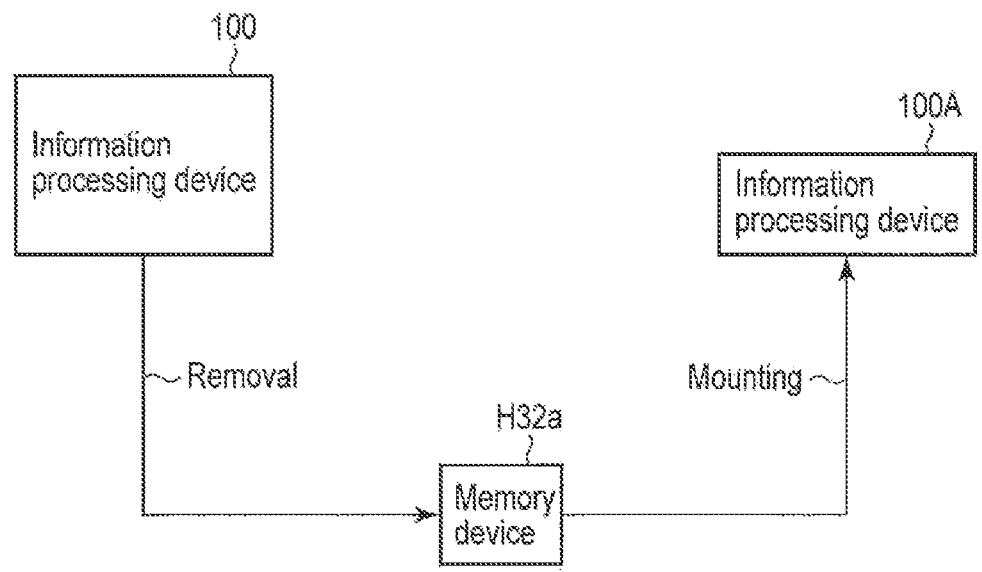
FIG. 76 is a block diagram showing an example of a reuse of the memory device.

Next, the reuse of the memory device H32*a* will be described with reference to FIG. 76. FIG. 76 is a block diagram showing an example of the reuse of the memory device H32*a*.

The memory management device 1 is assumed to be an device like a server device and personal computer from which high reliability is demanded for data storage and access.

For example, an information processing device 100A is assumed to be an device like a digital camera, printer, and mobile phone from which high reliability demanded from the information processing device 100 is not demanded for data storage and access.

Normal operation is desired for the information processing device 100 and thus, the memory device H32*a* is replaced at an early point in time after a warning is issued.

In the information processing device 100A, by contrast, the memory device H32*a* can be used until a usage stop notification arises even after a warning is issued.

When the memory device H32*a* is notified of a warning in the information processing device 100, the user can remove the memory device H32*a* from the information processing device 100 and mount the memory device H32*a* on the information processing device 100A for use. In this manner, the memory device H32*a* can be effectively utilized.

Next, the method of selecting the writing destination from the memory devices H32*a*, H32*b*, H32*c* based on coloring information so that warning periods of the memory devices H32*a*, H32*b*, H32*c* should not be concentrated in a short period of time will be described with reference to FIG. 77.

Figure 77:
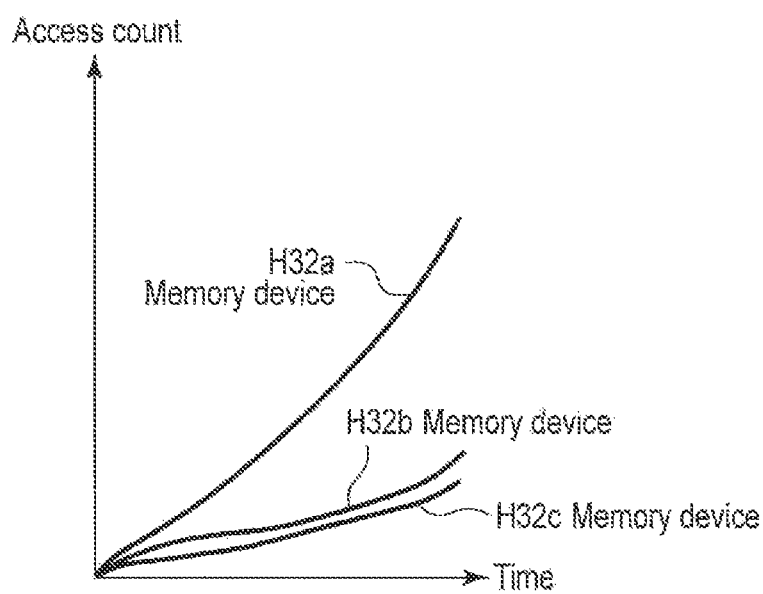
FIG. 77 is a block diagram showing an example of a change of an access count when a control executes so that an access count for one memory device becomes larger than an access count for another memory device, based on the coloring information.

As shown in FIG. 77, the writing management unit 20 exercises control so that data with high static color information or data with high dynamic color information is written into the specific memory device H32*a* of the memory devices H32*a*, H32*b*, H32*c* based on coloring information. Accordingly, the access count (the erasure count, reading occurrence count, and writing occurrence count) to the memory device H32*a* increases earlier than the other memory devices H32*b*, H32*c*.

Accordingly, the specific memory device H32*a* enters the warning state earlier so that concentration of the warning period in a short period of time can be suppressed and an increase in work load such as replacing many memory devices in a short period of time can be prevented.

In the present embodiment described above, the memory devices H32a to H32l whose access count has an upper limit can easily be mounted on the memory management device 1 and further can easily be removed.

Therefore, state monitoring and maintenance of the memory devices H32a to H32l used in the information processing device 100 can easily be implemented.

In the present embodiment, the memory devices H32a to H32l can be swapped while the information processing device 100 being continuously operated.

Further, in the present embodiment, the memory devices H32a to H32l that can be mounted on and removed from the memory management device 1 can be reused.

In the present embodiment, a high-reliability, high-speed, and large-capacity storage device combining the memory devices H32a to H32l can be realized and the memory devices H32a to H32l can easily be replaced so that the utilization rate of the information processing device 100 can be improved.

Eighth Embodiment

The present embodiment is a modification of the first embodiment. A memory management device according to the present embodiment can dynamically switch the SLC region in the nonvolatile semiconductor memories 9, 10 to the MLC region and further can switch the MLC region to the SLC region.

In the present embodiment, the SLC region refers to a memory region used as an SLC type NAND flash memory in the nonvolatile semiconductor memories 9, 10. The MLC region refers to a memory region used as an MLC type NAND flash memory in the nonvolatile semiconductor memories 9, 10.

The nonvolatile semiconductor memories 9, 10 may be an SLC region or an MLC region in the whole memory region of the nonvolatile semiconductor memories 9, 10 or a portion of the memory region of the nonvolatile semiconductor memories 9, 10 may be an SLC region and the memory region that is not the SLC region may be an MLC region.

Information about whether the memory region of the nonvolatile semiconductor memories 9, 10 is an SLC region or an MLC region (hereinafter, referred to as "SLC/MLC region information") is managed by, for example, the memory specific information 12. For example, the memory specific information 12 holds information about whether the memory region specified by a physical address is an SLC region or an MLC region in the nonvolatile semiconductor memories 9, 10. While the SLC/MLC region information for each memory region is assumed to be managed by the memory specific information 12, but may also be managed by the memory usage information 11.

FIG. 78 is a diagram showing an example of the configuration of the memory management device according to the present embodiment.

A memory management device D32 includes a processing unit D33, the working memory 16, and the information storage unit 17.

The processing unit D33 includes a wear-out rate calculation unit D34, a switching determination unit D35, and a switching control unit D36. Further, the processing unit D33 includes, like the processing unit 15 in the first embodiment described above, the address management unit 18, the reading management unit 19, the writing management unit 20, the coloring information management unit 21, the memory usage information management unit 22, and the relocation unit 23, but these units are omitted in FIG. 78.

The memory management device D32 in the present embodiment can switch the SLC region to the MLC region based on information about the wear-out rate of the SLC region in the nonvolatile semiconductor memories 9, 10. Further, the memory management device D32 can switch the MLC region to the SLC region based on information about the wear-out rate of the MLC region in the nonvolatile semiconductor memories 9, 10. The wear-out rate is a ratio of the writing count to the writable upper limit count of the memory region.

The memory management device D32 can similarly switch the SLC region and the MLC region dynamically based on an erasure wear-out rate, which is the ratio of the erasure count to the erasable upper limit count, and a read wear-out rate, which is the ratio of the reading count to the readable upper limit count. Further, the memory management device D32 can switch the SLC and the MLC dynamically based on at least two of the write wear-out rate, erasure wear-out rate, and read wear-out rate.

The wear-out rate calculation unit D34 references the memory usage information 11 and the memory specific information 12 to calculate the write wear-out rate of a memory region based on the writing count and the writable upper limit count of the memory region. Similarly, the wear-out rate calculation unit D34 can calculate the read wear-out rate and the erasure wear-out rate by referencing the memory usage information 11 and the memory specific information 12. The write wear-out rate and the read wear-out rate are calculated, for example, in units of page region or block region. The erasure wear-out rate is calculated, for example, in units of block region.

For a memory region in which, for example, the SLC region and the MLC region are larger than the block region, the write wear-out rate is calculated for each of a plurality of block regions contained in the SLC region or the MLC region. Variations of the write wear-out rate are small between the plurality of block regions contained in the SLC region or the MLC region by wear leveling. Thus, for example, the average value of the write wear-out rates of the plurality of block regions contained in the SLC region or the MLC region is set as the write wear-out rate of the SLC region or the MLC region. Alternatively, for example, the maximum write wear-out rate of the write wear-out rates of the plurality of block regions contained in the SLC region or the MLC region may be set as the write wear-out rate of the SLC region or the MLC region. This also applies to the read wear-out rate and the erasure wear-out rate.

The switching determination unit D35 determines whether the write wear-out rate of the SLC region exceeds the threshold (hereinafter, referred to as the "SLC threshold") of the write wear-out rate set to the SLC region. The switching determination unit D35 also determines whether the write wear-out rate of the MLC region exceeds the threshold (hereinafter, referred to as the "MLC threshold") of the write wear-out rate set to the MLC region. Information of the SLC threshold and the MLC threshold of each memory region is managed by the memory specific information 11.

If the write wear-out rate of the SLC region exceeds the SLC threshold, the switching control unit D36 exercises control to switch the SLC region to the MLC region. If the write wear-out rate of the MLC region exceeds the MLC threshold, the switching control unit D36 exercises control to switch the MLC region to the SLC region. Further, the switching control unit D36 updates "SLC/MLC region information" managed by the memory specific information 11 in accordance with switching of the SLC region and the MLC region.

If switching from the SLC region to the MLC region occurs, the switching control unit D36 exercises control to switch one of MLC regions to the SLC region. If switching from the MLC region to the SLC region occurs, the switching control unit D36 also exercises control to switch one of MLC regions to the SLC region. Accordingly, the switching control unit D36 exercises control to minimize a change in the ratio of the SLC regions and MLC regions before and after switching of memory regions by the switching control unit D36. Incidentally, the SLC region and the MLC region are switched by memory regions to be switched in the nonvolatile semiconductor memories 9, 10 being determined and a command being issued by the switching control unit D36.

Further, if data is stored in memory regions to be switched, the switching control unit D36 moves data and updates the address conversion information 13 in accordance with the movement of data.

Moreover, the memory usage information management unit 22 updates the memory usage information 11 (such as the writing count, erasure count, and reading count) of switched memory regions in accordance with switching of the SLC region and the MLC region by the switching control unit D36.

Figure 79:
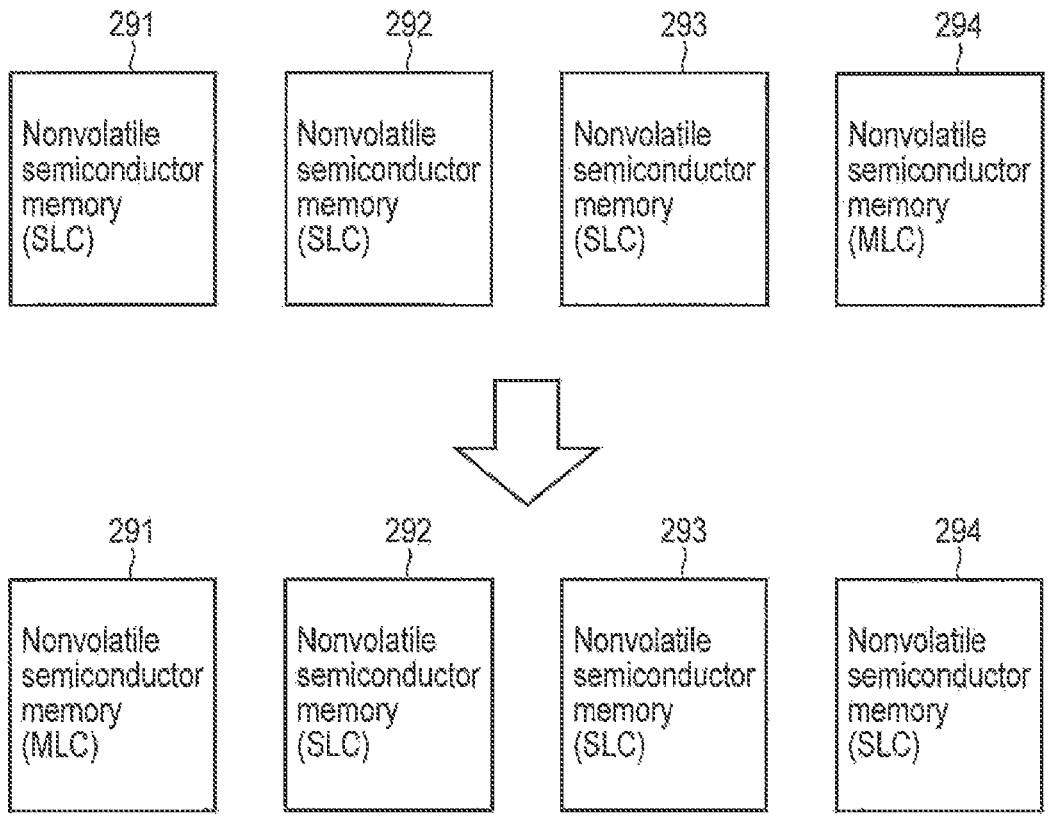
FIG. 79 is a schematic diagram showing a first example of dynamic switching of nonvolatile semiconductor memories according to the eighth embodiment.

FIG. 79 is a schematic diagram showing a first example of dynamic switching of nonvolatile semiconductor memories according to the present embodiment. The nonvolatile semiconductor memories 291 to 294 shown in FIG. 79 correspond to the nonvolatile semiconductor memories 9, 10 and are used as the main memory of the information processing device 100.

In the example shown in FIG. 79, all memory regions of the nonvolatile semiconductor memories 291 to 293 are used as an SLC region (the nonvolatile semiconductor memories 291 to 293 are SLC type NAND flash memories). Moreover, all memory regions of the nonvolatile semiconductor memory 294 are used as an MLC region (the nonvolatile semiconductor memory 294 is an MLC type NAND flash memory). The nonvolatile semiconductor memories 291 to 294 are, for example, memory cards.

As described in the first embodiment, data with a high access frequency is written into the SLC type nonvolatile semiconductor memories 291 to 293. Thus, the write wear-out rate of the SLC type nonvolatile semiconductor memories 291 to 293 increases. On the other hand, data with a low access frequency is written into the MLC type nonvolatile semiconductor memory 294. Thus, the write wear-out rate of the MLC type nonvolatile semiconductor memory 294 decreases.

If the switching determination unit D35 determines that the write wear-out rate of the nonvolatile semiconductor memory 291 has exceeded the SLC threshold of the nonvolatile semiconductor memory 291, the switching control unit D36 switches the nonvolatile semiconductor memory 291 from the SLC type to the MLC type. Further, the switching control unit D36 switches the nonvolatile semiconductor memory 294 with a low write wear-out rate from the MLC type to the SLC type. Accordingly, the nonvolatile semiconductor memory 291 with a high write wear-out rate is used as the MLC type and data with a low access frequency is written thereinto. On the other hand, the nonvolatile semiconductor memory 294 with a low write wear-out rate is used as the SLC type and data with a high access frequency is written thereinto. The life of the MLC type nonvolatile semiconductor memory 291 (period in which the MLC type nonvolatile semiconductor memory 291 can be used as the main memory) can be prolonged by applying strong ECC (Error-Correcting Code) to the MLC type nonvolatile semiconductor memory 291. If strong ECC is applied, the reading speed at which data is read from a nonvolatile semiconductor memory generally falls, but the reading speed from a nonvolatile semiconductor memory may be low in the present embodiment and thus, strong ECC can be used.

Further, if the write wear-out rate of the nonvolatile semiconductor memories 291 to 294 increases to make it difficult to use the memories 291 to 294 as the main memory, the nonvolatile semiconductor memories 291 to 294 may be removed from the information processing device 100 to use the memories 291 to 294 for an application with a low writing frequency such as CD-R use.

Figure 80:
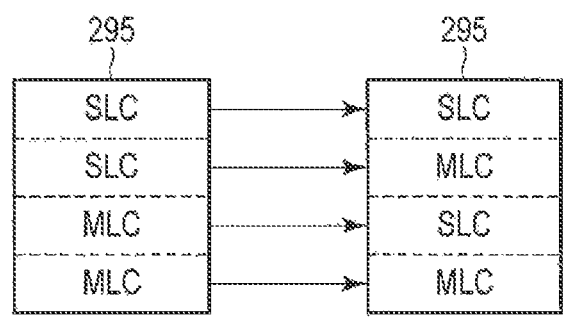
FIG. 80 is a schematic diagram showing a second example of dynamic switching of nonvolatile semiconductor memories according to the eighth embodiment.

FIG. 80 is a schematic diagram showing a second example of dynamic switching of nonvolatile semiconductor memories according to the present embodiment. A nonvolatile semiconductor memory 295 shown in FIG. 80 corresponds to the nonvolatile semiconductor memories 9, 10 and is used as the main memory of the information processing device 100.

In the example shown in FIG. 80, the nonvolatile semiconductor memory 294 is composed of memory regions used as an SLC region and memory regions used as an MLC region.

Also in the example shown in FIG. 80, as described in the example shown in FIG. 79, the SLC region is switched to the MLC region based on wear-out rate information. Accordingly, effects similar to those of the example shown in FIG. 79 are gained.

In FIGS. 79 and 80, processing to switch the SLC region to the MLC region when the write wear-out rate of the SLC region exceeds the SLC threshold is described, but processing to switch the MLC region to the SLC region when the write wear-out rate of the MLC region exceeds the MLC threshold is similar.

Normally, when compared with the SLC region, the MLC region has a lower writable upper limit count set thereto. Thus, even if the write wear-out rate of the MLC region exceeds the MLC threshold, a higher writable upper limit count can be set by switching the MLC region to the SLC region. If, for example, the writable upper limit count of the MLC region is 1000 and the writable upper limit count of the SLC region is 10000, the MLC threshold is reached with 80% of the wear-out rate in the MLC region. By switching the MLC region to the SLC region, for example, the region can be written into as an SLC region 2000 times more. By using the SLC region, like the MLC region, as a memory region into which data with a low access frequency is written, the life of the memory region can further be prolonged.

FIG. 81 is a state transition diagram showing a first example of switching control of memory regions by the switching control unit D36 according to the present embodiment. Incidentally, the processing described as steps OA1 to OA5 in FIG. 81 may be changed in order within the range in which switching of the SLC region and the MLC region, movement of data, and information updates are implemented normally.

In step OA1, a memory region MA of the nonvolatile semiconductor memory is an SLC region and memory regions MB, MC, MD of the nonvolatile semiconductor memory are MLC regions. The memory regions MA, MB, MC store data Da, Db, Dc respectively. The memory region MD is a save region.

In step OA1, it is assumed that the write wear-out rate of the memory region MA exceeds the SLC threshold.

Then, in step OA2, the switching control unit D36 selects one of the memory regions MB, MC (the memory region MB in the example of FIG. 81) in the MLC region and moves the data Db in the selected memory region MB to the save memory region MD. The selection of the memory regions MB, MC in the MLC region may be made by preferentially selecting a memory region in the MLC region in which no data is stored, preferentially selecting a memory region in the MLC region in which data with low importance is stored based on the coloring table 14, or preferentially selecting a memory region in the MLC region with a low write wear-out rate, read wear-out rate, or erasure wear-out rate. This selection may be modified in various ways.

As the movement destination (save destination) of the data Db of the memory region MB, data with a high access frequency of data contained in the data Db may be saved in the SLC region by referencing the color table 14 and data with a low access frequency of data contained in the data Db may be saved in the MLC region.

Next, in step OA3, the switching control unit D36 switches the selected memory MB in the MLC to the SLC and changes SLC/MLC region information of the memory region MB.

Next, in step OA4, the switching control unit D36 moves the data Da of the memory region MA in the SLC to be switched to the memory region MB newly switched to the SLC.

Then, in step OA5, the switching control unit D36 switches the memory region MA in the SLC to be switched to the MLC and changes SLC/MLC region information of the memory region MA.

In each of the above steps, with the movement of data, the address conversion information 13 is updated to associate the physical address of the movement destination of data with the logical address of the data. If data writing, reading, or erasure occurs with the movement of data, the memory usage information 11 is updated.

FIG. 82 is a state transition diagram showing a second example of switching control of memory regions by the switching control unit D36 according to the present embodiment. Incidentally, the processing described as steps OB1 to OB5 in FIG. 82 may be changed in order within the range in which switching of the SLC and the MLC, movement of data, and information updates are implemented normally.

In step OB1, the memory region MA of the nonvolatile semiconductor memory is an SLC and the memory regions MB, MC, MD of the nonvolatile semiconductor memory are MLCs. The memory regions MA, MB, MC store the data Da, Db, Dc respectively. The memory region MD is a save region.

In step OB1, it is assumed that the write wear-out rate of the memory region MA exceeds the SLC threshold.

Then, in step OB2, the switching control unit D36 moves the data Da in the memory region MA to the save memory region MD.

Next, in step OB3, the switching control unit D36 selects one of the memory regions MB, MC (the memory region MB in the example of FIG. 82) in the MLC and moves the data Db in the selected memory region MB to the save memory region MD.

Next, in step OB4, the switching control unit D36 switches the memory region MA in the SLC to the MLC and the memory region MB in the MLC to the SLC. Further, the switching control unit D36 changes SLC/MLC region information of the memory regions MA, MB.

Then, in step OB5, the switching control unit D36 moves the data Da in the save memory region MD to the memory region MB switched to the SLC and the data Db in the save memory region MD to the memory region MA switched to the MLC.

In each of the above steps, with the movement of data, the address conversion information 13 is updated to associate the physical address of the movement destination of data with the logical address of the data. If data writing, reading, or erasure occurs with the movement of data, the memory usage information 11 is updated.

As described above, after the SLC region being changed to the MLC region, as shown in the first embodiment, the coloring table 17 is referenced to write (arrange) data with a high access frequency into the SLC region and write (arrange) data with a low access frequency into the MLC region.

In the present embodiment described above, the SLC region can dynamically be switched to the MLC region in accordance with the usage state of the nonvolatile semiconductor memories 9, 10 and also the MLC region can dynamically be switched to the SLC region. By switching the SLC region to the MLC region, the SLC region with a high write wear-out rate can be used as the MLC region. Further, by switching the MLC region to the SLC region, the MLC region with a low write wear-out rate can be used as the SLC region. Accordingly, the life of the nonvolatile semiconductor memories 9, 10 can be prolonged so that the nonvolatile semiconductor memories 9, 10 can be used efficiently.

Ninth Embodiment

The present embodiment is a modification of the first embodiment. In the present embodiment, a memory expansion device that expands the address space used by the processors 3a, 3b, 3c will be described.

FIG. 83 is a block diagram showing an example of the relationship between the memory expansion device according to the present embodiment and the address space. In FIG. 83, the processor 3b of the processors 3a, 3b, 3c will representatively be described, but the other processors 3a, 3c can also be described in the same manner.

The memory management device 1 described in the first embodiment makes an address conversion between a logical address space E32 of memory and a physical address space E33 of memory and also determines the writing destination of data.

The physical address space E33 of memory contains the physical address space of the mixed main memory 2. The physical address space E33 of memory may further contain the physical address space of another memory.

The logical address space E32 of memory corresponds to a processor physical address space E34 for the processor 3b. In the processor physical address space E34, for example, data management based on file systems E34a, E34b is realized.

The processor 3b includes a memory management device E35. Incidentally, the processor 3b and the memory management device E35 may be separate structures.

The processor 3B executes a plurality of processes Pc1 to Pcn. In the plurality of processes Pc1 to Pcn, processor logical address spaces PLA1 to PLAn are used respectively. If, for example, the processor 3b is a CPU (Central Processing Unit), the processor logical address spaces PLA1 to PLAn are CPU logical address spaces.

The processor logical address spaces PLA1 to PLAn have memory windows MW1 to MWn respectively. Data in a portion of the processor physical address space E34 is mapped (that is, copied or mapped) to the memory windows MW1 to MWn.

Accordingly, the processor 3b can access data in the memory windows MW1 to MWn in parallel in the plurality of processes Pc1 to Pcn so as to be able to execute the plurality of processes Pc1 to Pcn at high speed.

Even if the size of the address space that can be used by the processor 3b is limited, the processor 3b virtually can use a wide address space by using the memory windows MW1 to MWn.

If data that is not mapped to the memory windows MW1 to MWn is needed for the processes Pc1 to Pcn, the processor 3b updates data in the memory windows MW1 to MWn and the needed data is thereby mapped newly to the memory windows MW1 to MWn.

The processor 3b can access the processor physical address space E34 via the memory windows MW1 to MWn.

The memory management device E35 according to the present embodiment has a configuration similar to that of the memory management device 1 described in the first embodiment. In the present embodiment, the memory management device E35 further realizes a function as an MMU of the processor 3b, but the memory management device E35 and the MMU of the processor 3b may be separate structures.

A major feature of the memory management device E35 according to the present embodiment is that address conversions and writing destination decisions of data are made between the processor logical address spaces PLA1 to PLAn and the processor physical address space E34.

The information storage unit 17 of the memory management device E35 stores memory usage information E36, memory specific information E37, a coloring table E38, and address conversion information E39.

The processing unit 15 of the memory management device E35 references or updates the memory usage information E36, the memory specific information E37, the coloring table E38, and the address conversion information E39 in the information storage unit 17 while using the working memory 16 to perform processing similar to the processing described in the first embodiment.

The memory usage information E36 contains, for example, the writing occurrence count and the reading occurrence count of each address region of the processor physical address space E34 and the erasure count of each block region.

The memory usage information E36 indicating the usage state of each address region of the processor physical address space E34 can be calculated based on, for example, the memory usage information 11 and the address conversion information 13 managed by the memory management device 1.

The memory specific information 12 contains, for example, the memory type of each address region of the processor physical address space E34 (for example, whether to correspond to the volatile semiconductor memory 8, the nonvolatile semiconductor memory 9 of SLC, or the nonvolatile semiconductor memory 10 of MLC), the memory size of the volatile semiconductor memory 8, the memory size of the nonvolatile semiconductor memories 9, 10, the page size and block size of the nonvolatile semiconductor memories 9, 10, and the accessible upper limit count (the writable upper limit count, readable upper limit count, and erasable upper limit count) of each address region.

The memory specific information E37 indicating specific information of each address region of the processor physical address space E34 can be calculated based on, for example, the memory specific information 12 and the address conversion information 13 managed by the memory management device 1.

The coloring table E38 associates a processor logical address with coloring information of data indicated by the processor logical address.

The address conversion information E39 is information associating processor logical addresses with processor physical addresses. If the memory windows MW1 to MWn are updated, the address conversion information E39 is updated so as to represent a state after the update.

As described in the first embodiment, the processing unit 15 makes address conversions and writing destination decisions of data between the processor logical address spaces PLA1 to PLAn and the processor physical address space E34 based on the memory usage information E36, the memory specific information E37, the coloring table E38, and the address conversion information E39.

More specifically, for example, the processing unit 15 exercises control so that no write-back processing from the memory windows MW1 to MWn to the processor physical address space E34 is performed on read-only data whose writing frequency of data is 0.

If, for example, the data is of the type to be written and read and the value in the memory windows MW1 to MWn and the value in the processor physical address space E34 are different (dirty data), the processing unit 15 writes back the value in the memory windows MW1 to MWn into the processor physical address space E34.

If, for example, the data is of the type (temporary) to be used temporarily, the processing unit 15 does not write back from the memory windows MW1 to MWn into the processor physical address space E34 even if the data is dirty data.

For example, as described in the first embodiment, the processing unit 15 allocates data to the volatile semiconductor memory 8 and the nonvolatile semiconductor memories 9, 10 based on the static writing frequency SW_color, the static reading frequency SR_color, the static erase frequency SE_color, the dynamic writing frequency DW_color, the dynamic reading frequency DR_color, the dynamic erase frequency DE_color, and the data type.

Figure 84:
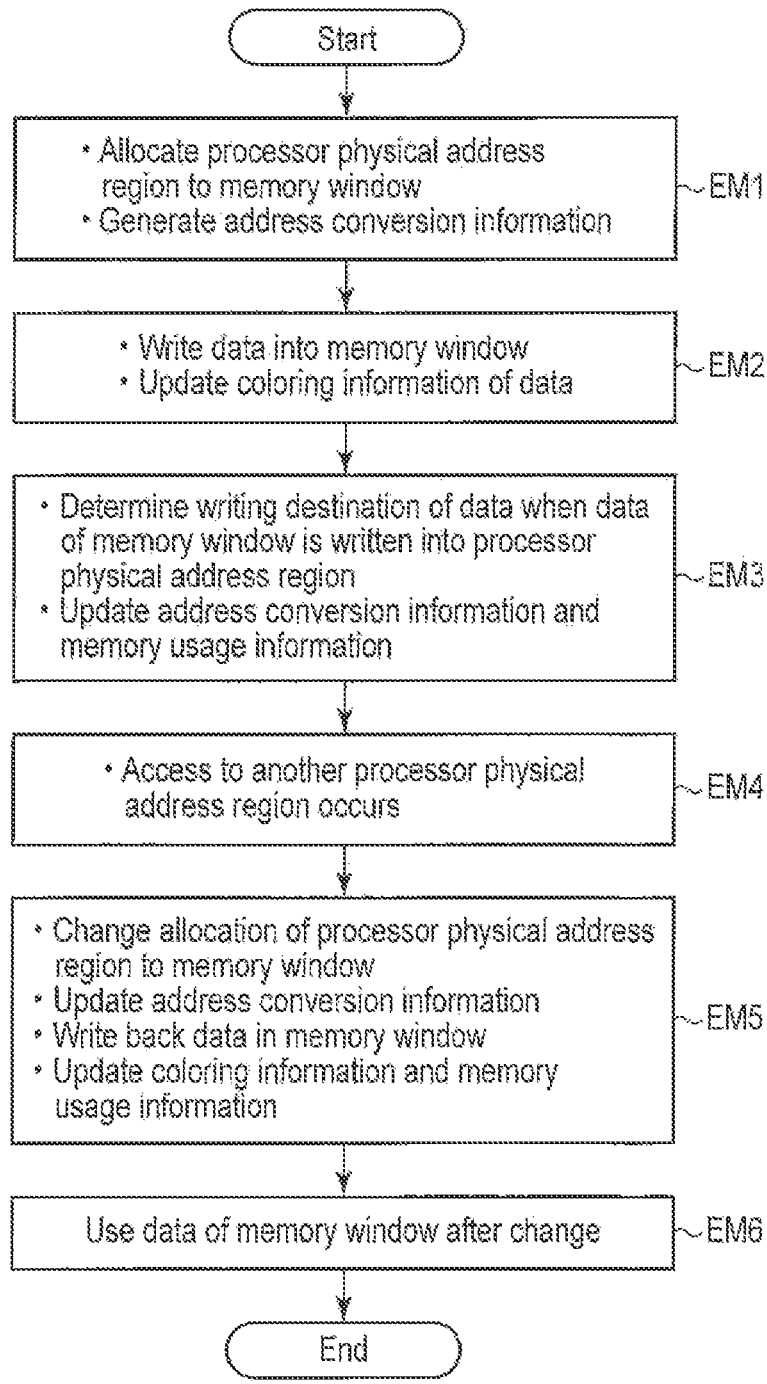
FIG. 84 is a flow chart showing an example of a writing operation by a processor 3b and the memory management device according to the ninth embodiment.

FIG. 84 is a flow chart showing an example of the write operation by the processor 3b and the memory management device E35 according to the present embodiment. In FIG. 84, an example of processing in which data writing to the memory windows MW1 to MWn occurs and then changes of processor physical address regions allocated to the memory windows MW1 to MWn occur is shown.

In step EM1, the memory management device E35 initially allocates one of processor physical address regions to the memory windows MW1 to MWn to generate the address conversion information E39. At this point, the processor physical address region allocated to the memory windows MW1 to MWn corresponds to a memory region in the volatile semiconductor memory 8, a memory region in the nonvolatile semiconductor memory 9 of SLC, or a memory region in the nonvolatile semiconductor memory 10 of MLC.

In step EM2, the processor 3b writes data into the memory windows MW1 to MWn. At the same time, the memory management device E35 updates coloring information (for example, the writing count DWC_color, the dynamic writing frequency DW_color and the like) of the write target data.

In step EM3, if the processor 3b writes data in the memory windows MW1 to MWn into the processor physical address space E34, the memory management device E35 determines the writing destination of the write target data into the processor physical address space E34 based on the memory usage information E36, the memory specific information E37, the coloring table E38, and the address conversion information E39 and also updates the memory usage information E36 and the address conversion information E39. Further, the memory management device E35 writes the write target data into the determined processor physical address region.

For example, the memory management device E35 determines, among a memory region of the volatile semiconductor memory 8, a memory region of the nonvolatile semiconductor memory 9 of SLC, and a memory region of the nonvolatile semiconductor memory 10 of MLC, the memory region into which the write target data should be written.

In step EM4, the processor 3b causes access to data in another processor physical address region not allocated to the memory windows MW1 to MWn.

In step EM5, the memory management device E35 changes the allocation of the processor physical address region to the memory windows MW1 to MWn and updates the address conversion information E39. The allocation of the processor physical address region to the memory windows MW1 to MWn is changed by, for example, a system call of the operating system 27. In the memory management device E35, page addresses are changed. Actually, entries of a processor page table are changed.

In this case, the memory management device E35 writes back data in the memory windows MW1 to MWn before the change to update coloring information of the data and the memory usage information E36.

In step EM6, the processor 3b uses data stored in the memory windows MW1 to MWn after the change.

In the present embodiment, even if the processor logical address spaces PLA1 to PLAn of the processor 3b are small, the processor physical address space E34 larger than the processor logical address spaces PLA1 to PLAn can be used so that the processor physical address space E34 of the processor 3b can be expanded.

In the present embodiment, data can efficiently be mapped between the memory windows MW1 to MWn and the processor physical address space E34 by using coloring information.

Incidentally, in the present embodiment, the writing destination of data into the processor physical address space E34 is determined based on the memory usage information E36, the memory specific information E37, and coloring information of the coloring table E38. However, the writing destination of data into the processor physical address space E34 may be determined by using, for example, at least one of the memory usage information E36, the memory specific information E37, and the coloring table E38.

In the present embodiment, the processor logical address spaces PLA to PLn are formed for each of the plurality of processes Pc1 to Pcn and the memory windows MW1 to MWn are used for each. Accordingly, an operation such as accessing the mixed main memory 2 and the like in parallel is performed so that the plurality of processes Pc1 to Pcn can be executed at high speed.

Tenth Embodiment

The present embodiment is an information processing device (server device) that shares coloring information used by the memory management device 1 in the first embodiment and sends the shared coloring information to the information processing device 100.

When new data is generated by the processes 6a, 6b, 6c being executed by the processors 3a, 3b, 3c in the information processing device 100 respectively as described above, the operating system 27 generates static color information based on the type of the newly generated data to give the static color information to the newly generated data. If the data should be written into the nonvolatile semiconductor memories 9, 10, the memory management device 1 can prolong the life of the nonvolatile semiconductor memories 9, 10 by referencing static color information of the data to determine the write target memory region and the like. Thus, the life of the nonvolatile semiconductor memories 9, 10 can be made still longer by optimizing coloring information including static color information.

In the present embodiment, a system that shares profile information referenced when the operating system 27 generates static color information will be described. By sharing profile information, optimization of coloring information is realized. The profile information will be described later.

FIG. 85 is a diagram showing an example of the configuration of an information processing device and a network system according to the present embodiment.

A network system K32 has a configuration in which an information processing device K33, a profile generation terminal K34, and user terminals 100A, 100B are communicably connected via a network K35.

The network K35 is, for example, a variety of communication media such as the Internet and a LAN (Local Area Network) and may be a wire network or a wireless network.

The configuration of the profile generation terminal K34 will be described. The profile generation terminal K34 is, for example, a terminal of a program developer or a maker. The profile generation terminal K34 includes a setting unit K34a, a storage device K34b, and a communication unit K34c.

The setting unit K34a generates profile information K36 based on, for example, a setting operation of a program developer or the like and stores the profile information K36 in the storage device K34b.

The storage device K34b stores the profile information K36 generated by the setting unit K34a.

The communication unit K34c sends the profile information K36 stored in the storage device K34b to the information processing device K33 via the network K35.

The configuration of the user terminals 100A, 100B will be described. The user terminals 100A, 100B correspond to the information processing device 100 in the first embodiment and include the memory management device 1 and the mixed main memory 2. The coloring table 17 is stored in the information storage unit 17 of the memory management device 1 and the mixed main memory 2 included in the user terminals 100A, 100B.

The user terminals 100A, 100B generate profile information K37, K38 automatically or according to user's instructions respectively. Details of generation of the profile information will be described later. The user terminals 100A, 100B send the profile information K37, K38 to the information processing device K33 via the network K35 respectively.

Further, the user terminals 100A, 100B download (receive) profile information from the information processing device K33 automatically or according to user's instructions. The operating system 27 of the user terminals 100A, 100B references the downloaded profile information when generating coloring information for data. The operating system 27 of the user terminals 100A, 100B generate static color information for data based on profile information and store the static color information in the coloring table 14.

The configuration of the information processing device K33 will be described. The information processing device K33 includes a communication unit K33a, a profile information management unit K33b, and a storage device K33c. The profile information management unit K33 may be realized by hardware or cooperation of software and hardware such as a processor.

The communication unit K33a sends and receives the profile information K36 to K38 between the profile generation terminal K34 and the user terminals 100A, 100B.

The profile information management unit K33b stores profile information received via the communication unit K33a in the storage device K33c. The profile information management unit K33b also sends profile information to the user terminals 100A, 100B and the profile generation terminal K34 via the communication unit K33a.

The storage device K33c stores profile information. Further, the storage device K33c stores service data K40. The service data K40 will be described later.

Next, the profile information will be described. The profile information is, as described above, information referenced by the operating system 27 in the user terminals 100A, 100B when static color information is given (generated) to data.

The profile information is information associating, for example, data identification information, coloring information, and generator identification information.

The data identification information corresponds to, for example, the data format of FIGS. 9 and 10 in the first embodiment. As the data identification information, identification information of a file such as the name of a file and the extension of a file or information of the position (for example, a directory) where data is arranged in a file system is used.

The coloring information contains the static color information described above. The static color information is a value set for each piece of the data identification information and contains, for example, like in FIGS. 9 and 10 in the first embodiment, the static writing frequency SW_color, the static reading frequency SR_color, and the data life SL_color.

The generator identification information is information to identify the generator of the profile information. The generator identification information is additional information and is added if necessary.

Next, the generation of profile information will be described.

The user terminals 100A, 100B hold data identification information and coloring information for the data identification information shown in FIGS. 9 and 10. The user terminals 100A, 100B generate profile information based on the held data identification information and coloring information.

The user terminals 100A, 100B may also generate profile information from the coloring table 14 managed by the memory management device 1. As described above, the coloring table 14 is managed by the index generated based on the logical address specifying data and coloring information of the data in units of entries. The user terminals 100A, 100B identify data specified by the logical address from the index to extract data identification information of the data. Further, the user terminals 100A, 100B calculate static color information and dynamic color information (for example, the dynamic writing frequency DW_color and the dynamic reading frequency DR_color) of the data. Further, if necessary, the user terminals 100A, 100B change the dynamic color information to the data format similar to that of the static color information. While, as described above, the static color information is in the data format like SW_color=5, the dynamic color information is an actual access frequency to data and using, for example, a temporal average value of access frequency can be considered. A conversion to the data format like DW_color=5 is made in accordance with the magnitude of the access frequency of the dynamic color information or the temporal average value of the access frequency. Accordingly, data identification information, and static color information and dynamic color information for the data identification information are determined. The user terminals 100A, 100B generate profile information based on coloring information containing the static color information and dynamic color information, data identification information, and generator identification information.

By generating profile information based on coloring information containing dynamic color information in this manner, the actual access frequency to data can be provided to the user terminals 100A, 100B as profile information. Accordingly, coloring information given to data by the operating system 27 can be optimized.

For example, a software vendor that has developed a new application may register the profile information K36 about a file dedicated to the new application with the information processing device K33 by using the profile generation terminal K34.

Next, the service data K40 will be described. The service data K40 contains explanatory data of various kinds of the profile information K36 to K38 stored in the storage device K33c and various kinds of advertising data.

The service data K40 is sent from the information management unit K33 to the user terminals 100A, 100B. The user terminals 100A, 100B display the service data K40 by using, for example, a browser.

If, for example, the same data identification information is contained in a plurality of pieces of profile information stored in the storage device K33c, the user can determine the profile information to be downloaded by referencing the explanatory data of the service data K40.

By including, for example, advertising data of profile information, advertising data of information devices, and advertising data of nonvolatile semiconductor memories in the service data K40, specific products can be recommended to the user who considers downloading profile information, purchasing a new information device, or purchasing a new nonvolatile semiconductor memory.

For example, the profile information management unit K33b may apply a statistical method to the profile information K36 to K38 stored in the storage device K33c to send resultant profile information to the user terminals 100A, 100B. As the statistical method, for example, a method of calculating an average value or determining a median for coloring information associated with the same data identification information. For example, the profile information management unit K33b generates profile information containing an average value or median of the static writing frequency SW_color, an average value or median of the static reading frequency SR_color, an average value or median of the data life SL_color, an average value or median of the dynamic writing frequency DW_color, an average value or median of the dynamic reading frequency DR_color for a plurality of pieces of coloring information associated with the same data identification information and sends the generated profile information to the user terminals 100A, 100B.

The profile information management unit K33*b* counts the number of downloads of the profile information K36 to K38 by a browser of the user terminals 100A, 100B. The profile information management unit K33*b* calculates a compensation charge for the generator of each piece of profile information K36 to K38 by multiplying the download count of each piece of profile information K36 to K38 by a download charge per download of the profile information K36 to K38. Then, the profile information management unit K33*b* generates compensation information in which compensation charges are assigned for generator identification information of each piece of profile information K36 to K38 and stores the compensation information in the storage device K33*c*.

Further, the profile information management unit K33*b* generates usage charge information in which a usage charge per download of profile information is assigned for identification information (for example, the user ID) that identifies the download request source in response to a download request from the user terminals 100A, 100B and stores the usage charge information in the storage device K33*c*.

FIG. 86 is a flow chart showing an example of processing of the profile information management unit K33*b* according to the present embodiment.

In step C1, the profile information management unit K33*b* determines from which of the profile generation terminal K34 and the user terminals 100A, 100B one piece of the profile information K36 to K38 is received.

If no profile information K36 to K38 is received, the processing proceeds to step C3.

If one piece of the profile information K36 to K38 is received, in step C2, the profile information management unit K33*b* stores the received profile information in the storage device K33*c*.

In step C3, the profile information management unit K33*b* determines from which of the user terminals 100A, 100B a download request is received.

If no download request is received, the processing proceeds to step C6.

If a download request is received, in step C4, the profile information management unit K33*b* reads profile information corresponding to the received download request from the storage device K33*c*.

In step C5, the profile information management unit K33*b* sends the read profile Information to the user terminal of the download request source.

In step C6, the profile information management unit K33*b* determines whether the processing has ended. If the processing has not ended, the processing returns to step C1.

Figure 87:
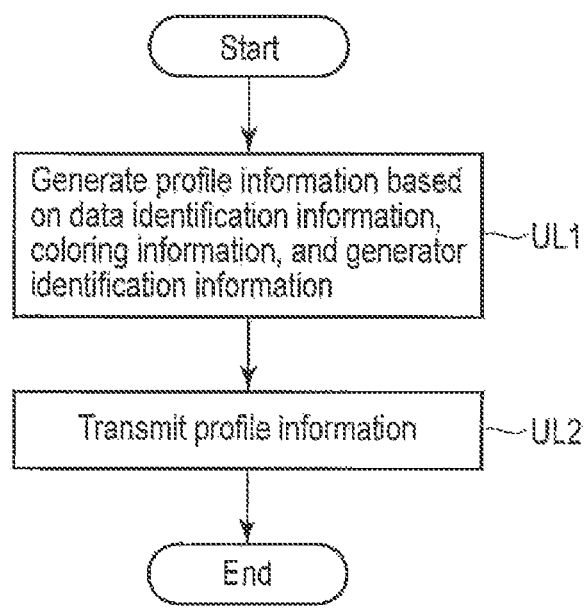
FIG. 87 is a flow chart showing an example of upload processing of profile information by a user terminal according to the tenth embodiment.

FIG. 87*b* is a flow chart showing an example of upload processing of the profile information K37 by the user terminal 100A according to the present embodiment. Upload processing by the user terminal 100B is almost the same as in FIG. 87.

In step UL1, the user terminal 100A generates the profile information K37 by combining data identification information for data, coloring information in the coloring table 14 associated with the data, and generator identification information, for example, automatically or according to user's instructions.

In step UL2, the user terminal 100A sends the generated profile information K37 to the information management unit K33 via the network K35.

FIG. 88 is a flow chart showing an example of download processing of profile information by the user terminal 100A according to the present embodiment. Download processing by the user terminal 100B is almost the same as in FIG. 88 and thus, the description thereof is omitted.

In step DL1, the user terminal 100A sends a download request containing data identification information to the information management unit K33 via the network K35, for example, automatically or according to user's instructions.

In step DL2, the user terminal 100A receives profile information from the information management unit K33 via the network K35 as a response to the download request.

In step DL3, the operating system 27 of the user terminal 100A stores static color information contained in the received profile information for data corresponding to the data identification information of the received profile information in the coloring table 14.

In step DL4, the memory management device 1 of the user terminal 100A determines whether dynamic color information is contained in the received profile information.

If no dynamic color information is contained in the received profile information, the processing ends.

If dynamic color information is contained in the received profile information, in step DL5, the memory management device 1 stores static color information contained in the received profile information for data corresponding to the data identification information of the received profile information in the coloring table 14.

In the present embodiment described above, coloring information used by the memory management device 1 is generated by many such as makers and users and the generated coloring information is shared.

In the present embodiment, charges can be paid to the generator of coloring information in accordance with the number of times the coloring information is browsed or downloaded.

In the present embodiment, the operator of the information management unit K33 can collect many pieces of coloring information and speedily provide various services concerning coloring information.

By using the information management unit K33 according to the present embodiment, coloring information can be shared, the development of the memory management device 1 and the mixed main memory 2 can be hastened, and the memory management device 1 and the mixed main memory 2 can be popularized.

Eleventh Embodiment

The present embodiment is a modification of the first embodiment. In the present embodiment, a memory management device that accesses a memory connected via a network will be described.

FIG. 89 is block diagram showing an example of a network system according to the present embodiment.

A network system N37 includes an information processing device N37A and an information processing device N37B. The information processing device N37A and the information processing device N37B are connected via a network N38. The information processing device N37A and the information processing device N37B have the same function and thus, the information processing device N37A will be described in detail below. Incidentally, the network system N37 may include three information processing devices or more.

The information processing device N37A includes a processor 3A, a memory management device N32A, a volatile semiconductor memory 8A, a nonvolatile semiconductor memory 9A, and a network interface device N39A.

The processor 3A is connected to the volatile semiconductor memory 8A, the nonvolatile semiconductor memory 9A, and the network interface device N39A via the memory management device N32A.

The processor 3A may include an internal memory cache, but a description thereof is omitted in FIG. 89. The information processing device N37A may include a plurality of processors 3A.

The volatile semiconductor memory 8A is similar to the volatile semiconductor memory 8 in the first embodiment. The nonvolatile semiconductor memory 9A is similar to the nonvolatile semiconductor memory 9 or the nonvolatile semiconductor memory 10 in the first embodiment.

In the present embodiment, the volatile semiconductor memory 8A and the nonvolatile semiconductor memory 9A are used as the main memory of the information processing device N37A. However, the volatile semiconductor memory 8A and the nonvolatile semiconductor memory 9A function as cache memories in the information processing device N37A by storing data with a high access frequency or data whose importance is high for the information processing device N37A of data in the other information processing device N37B. In this case, the volatile semiconductor memory 8A is used as the primary cache memory in the information processing device N37A and the nonvolatile semiconductor memory 9A is used as the secondary cache memory in the information processing device N37A.

The network interface device N39A sends/receives network logical addresses or data to/from the network interface device N39A of the other information processing device N37B via the network N38.

The memory management device N32A according to the present embodiment will be described. FIG. 90 is a block diagram showing an example of the configuration of the memory management device N32A according to the present embodiment.

A processing unit N33A of the memory management device N32A includes, in addition to the address management unit 18, the reading management unit 19, the writing management unit 20, the coloring information management unit 21, the memory usage information management unit 22, and the relocation unit 23, a network address conversion unit N34 and a communication unit N35.

The network address conversion unit N34 converts a logical address of short address length used by the processor 3A (hereinafter, referred to as a "processor logical address") into a logical address of long address length used by a plurality of information processing devices connected by a network (hereinafter, referred to as a "network logical address"). In the address conversion, for example, a hash function is used. Incidentally, the processor logical address is a pointer stored in a register.

The working memory 16 has an address length conversion table AT stored therein. The network address conversion unit N34 references the address length conversion table AT to convert a processor logical address into a network logical address.

Incidentally, the address length conversion table AT is stored in the working memory 16, but may also be stored in the information storage unit 17.

The communication unit N35 sends and receives network logical addresses and data specified by network logical addresses via the network N38 by using the network interface device N39A.

In the present embodiment, the memory usage information 11 indicates the usage state of the whole network system N37 (in the example of FIG. 90, the memory usage information 11 includes the volatile semiconductor memory 8A, the nonvolatile semiconductor memory 9A, a volatile semiconductor memory 8B, a nonvolatile semiconductor memory 9B).

Similarly, the memory specific information 12 indicates specific information of memory regions of the whole network system N37.

The address conversion information 13 indicates the relationship between network logical addresses and physical addresses used by the whole network system N37.

The coloring table 14 contains coloring Information of each piece of data in the whole network system N37.

In the network system N37, unique addresses are attached to all data. If a common network logical address space is used throughout the network system N37, the number of bits of needed addresses increases like 128 bits. In the network system N37, however, the processors 3A, 3B are assumed to have 32-bit or 64-bit registers. In this case, it is necessary to convert a processor logical address of the number of bits of the register into the number of bits of a network logical address. The conversion processing is performed by the network address conversion unit N34 included in the memory management devices N32A, N32B.

Data reading by the network system N37 via the network N38 will be described.

The memory management device N32A receives a processor logical address from the processor 3A and converts the processor logical address into a network logical address. Then, if data corresponding to the network logical address is stored in none of the memories (in FIG. 90, the volatile semiconductor memory 8A and the nonvolatile semiconductor memory 9A) of the information processing device N37A, the memory management device N32A sends the network logical address to the other information processing device N37B via the network interface device N39A and the network N38.

The memory management device N32B of the information processing device N37B receives data corresponding to the network logical address from the information processing device N37A via the network N38 and a network interface device N39B.

If the received network logical address is stored in the memory (in FIG. 90, the volatile semiconductor memory 8B or the nonvolatile semiconductor memory 9B) of the information processing device N37B, the memory management device N32B converts the network logical address into a physical address based on the address conversion information 13 to read data.

The memory management device N32B sends the read data to the information processing device N37A via the network interface device N39A and the network N38.

The memory management device N32A of the information processing device N37A receives the read data from the information processing device N37B via the network N38 and the network interface device N39A.

The memory management device N32A returns the read data to the processor 3A.

The memory management device N32A references the coloring table 14 and, if the access frequency or the importance of the read data is equal to or more than a predetermined value, writes the data into the volatile semiconductor memory 8B or the nonvolatile semiconductor memory 9B and updates the address conversion information 13. The writing destination for the writing is determined by the same method as in the first embodiment.

Data writing by the network system N37 via the network N38 will be described.

The memory management device N32A receives a processor logical address and write target data from the processor 3A and converts the processor logical address into a network logical address. Then, if the network logical address indicates the other information processing device N37B, the memory management device N32A sends the network logical address and the write target data to the other information processing device N37B via the network interface device N39A and the network N38.

The memory management device N32B of the information processing device N37B receives the network logical address and the write target data from the information processing device N37A via the network N38 and the network interface device N39B.

The memory management device N32B converts the network logical address into a physical address based on the address conversion information 13 and writes the write target data into the memory region indicated by the physical address.

Copying of the data D1 in the network system N37 shown in FIG. 89 will be described.

The memory management device N32A of the information processing device N37A manages the memory usage information 11 and the memory specific information 12 for the volatile semiconductor memory 8A and the nonvolatile semiconductor memory 9A and further, the volatile semiconductor memory 8B and the nonvolatile semiconductor memory 9B.

Further, the memory management device N32A manages coloring information of each piece of data stored in the volatile semiconductor memory 8A and the nonvolatile semiconductor memory 9A and further, the volatile semiconductor memory 8B and the nonvolatile semiconductor memory 9B by the coloring table 14.

The memory management device N32A determines the writing destination for, in addition to the volatile semiconductor memory 8A and the nonvolatile semiconductor memory 9A, the volatile semiconductor memory 8B and the nonvolatile semiconductor memory 9B based on the memory usage information 11, the memory specific information 12, and the coloring table 14 so that the life of the nonvolatile semiconductor memories 9A, 9B are prolonged.

The memory management device N32A of the information processing device N37A copies the data D1 of the main body with a high access frequency from the information processing device N37A to the other information processing device N37B to the volatile semiconductor memory 8A or the nonvolatile semiconductor memory 9A of the information processing device N37A to store the data as data D1c. For example, the memory management device N32A references the coloring table 14 to store the data D1 stored in the other information processing device N37B and whose access frequency is equal to or more than a predetermined level as the data D1c copied to the volatile semiconductor memory 8A or the nonvolatile semiconductor memory 9A of the information processing device N37A.

If the access frequency to the data D1c copied to the information processing device N37A is larger than the access frequency to the data D1 in the information processing device N37B over the predetermined level, the memory management devices N32A, N32B manage the data D1c copied to the information processing device N37A as the main body.

Further, if a write operation to the copied data D1c occurs in the information processing device N37A, the memory management devices N32A, N32B manage the data D1c in the information processing device N37A as the main body.

Thus, if the data D1c copied to the information processing device N37A is managed as the main body, the data D1 in the information processing device N37B is maintained as it is and mutually different addresses (ID) may be allocated to the data D1, D1c. A different address may be allocated to the original data D1 or to the copied data D1c.

If the data D1c is managed as the main body, the original data D1 may be erased.

The memory management devices N32A, N32B manage the data D1, D1c so that if, for example, a write operation to the data D1c used as a cache occurs, the data D1 as the main body is updated to avoid an occurrence of collision of the data D1, D1c.

FIG. 91 is a block diagram showing a first relationship between the processor logical address and the network logical address according to the present embodiment.

For example, an upper address P1u of a processor address Pr1 is a 32-bit address and a lower address P1d thereof is a 32-bit address.

For example, a combination of an upper address N1u and a middle address N1m of a network logical address N1 is a 128-bit address and a lower address N1d thereof is a 32-bit address.

The upper address N1u of the network logical address N1 is assumed to indicate, for example, an operator and the middle address N1m of the network logical address N1 is assumed to indicate, for example, a processor specific value. The upper address N1u and the middle address N1m of the network logical address N1 are network related addresses and, for example, IP addresses or IPv4.

The combination of the upper address N1u and the middle address N1m of the network logical address N1 is converted by a hash function N40. The upper address P1u of the processor logical address Pr1 having a smaller number of bits than the upper address N1u and the middle address N1m of the network logical address N1 is determined by the conversion. The upper address P1u of the processor logical address Pr1 is used as a key of the conversion from the processor logical address Pr1 into the network logical address N1.

The lower address N1d of the network logical address N1u is used as the lower address P1d of the processor logical address Pr1 as it is.

The upper address N1u and the middle address N1m of the network logical address N1 are stored in the position indicated by the upper address P1u of the processor logical address Pr1 in an address length conversion table AT1.

When converting the processor logical address Pr1 into the network logical address N1, the network address conversion unit N34 references the position indicated by the upper address P1u of the processor logical address Pr1 in the address length conversion table AT1 to determine the upper address N1u and the middle address N1m of the network logical address N1 stored in this position.

Then, the network address conversion unit N34 determines the network logical address N1 by combining the upper address N1u and the middle address N1m of the network logical address N1 determined above with the lower address P1d of the processor logical address Pr1.

Each entry of the address length conversion table AT1 has an address length conversion flag indicating whether or not valid/invalid attached thereto.

When registering an entry with the address length conversion table AT1, the network address conversion unit N34 references the address length conversion flag of the registration destination. If the address length conversion flag is invalid, the network address conversion unit N34 makes an entry registration as it is. If the address length conversion flag is valid, the network address conversion unit N34 performs exception processing. Accordingly, duplicate registration can be prevented.

FIG. 92 is a block diagram showing a second relationship between a processor logical address Pr2 and a network logical address N2 according to the present embodiment.

A middle address N2$m$ of the network logical address N2 is used as an upper address P2$u$ of the processor logical address Pr2. The upper address P2$u$ of the processor logical address Pr2 is used as a key of the conversion from the processor logical address Pr2 into the network logical address N2.

A lower address N2$d$ of the network logical address N2 is used as a lower address P2$d$ of the processor logical address Pr2 as it is.

An upper address N2$u$ and the middle address N2$m$ of the network logical address N2 are stored in the position indicated by the upper address P2$u$ of the processor logical address Pr2 in an address length conversion table AT2.

When converting the processor logical address Pr2 into the network logical address N2, the network address conversion unit N34 references the position indicated by the upper address P2$u$ of the processor logical address Pr2 in the address length conversion table AT2 to determine the upper address N2$u$ and the middle address N2$m$ of the network logical address N2 stored in this position.

Then, the network address conversion unit N34 determines the network logical address N2 by combining the upper address N2$u$ and the middle address N2$m$ of the network logical address N2 determined above with the lower address P2$d$ of the processor logical address Pr2.

Figure 93:
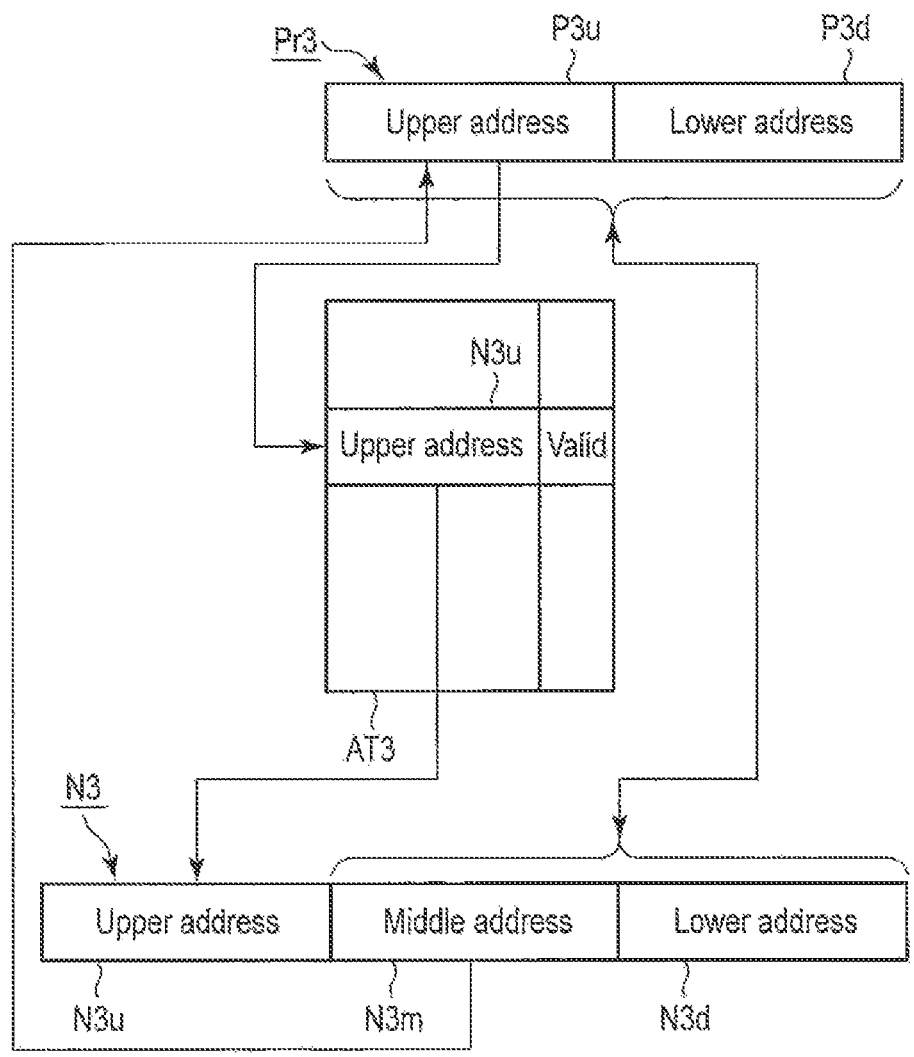
FIG. 93 is a block diagram showing a third relationship between a processor logical address and a network logical address according to the eleventh embodiment.

FIG. 93 is a block diagram showing a third relationship between the processor logical address and the network logical address according to the present embodiment.

A middle address N3$m$ and a lower address N3$d$ of a network logical address N3 are used as an upper address P3$u$ and a lower address P3$d$ of a processor logical address Pr3. The upper address P3$u$ of the processor logical address Pr3 is used as a key of the conversion from the processor logical address Pr3 into the network logical address N3.

An upper address N3$u$ of the network logical address N3 is stored in the position indicated by the upper address P3$u$ of the processor logical address Pr3 in an address length conversion table AT3.

When converting the processor logical address Pr3 into the network logical address N3, the network address conversion unit N34 references the position indicated by the upper address P3$u$ of the processor logical address Pr3 in the address length conversion table AT3 to determine the upper address N3$u$ of the network logical address N3 stored in this position.

Then, the network address conversion unit N34 determines the network logical address N3 by combining the upper address N3$u$ of the network logical address N3 determined above with the upper address P3$u$ and the lower address P3$d$ of the processor logical address Pr3.

FIG. 94 is a block diagram showing a fourth relationship between the processor logical address and the network logical address according to the present embodiment.

The network address conversion unit N34 extracts a value at n-bit intervals from a combination of an upper address N4$u$ and a middle address N4$m$ of a network logical address N4 to set the extracted value as an upper address P4$u$ of a processor logical address Pr4. The upper address P4$u$ of the processor logical address Pr4 having a smaller number of bits than the upper address N4$u$ and the middle address N4$m$ of the network logical address N1 is determined by the conversion. The upper address P4$u$ of the processor logical address Pr4 is used as a key of the conversion from the processor logical address Pr4 into the network logical address N4.

Other relationships between the network logical address N4 and the processor logical address Pr4 and the conversion from the processor logical address Pr4 into the network logical address N4 are the same as those in FIG. 91 and thus, the description thereof is omitted.

FIG. 95 is a block diagram showing a fifth relationship between the processor logical address and the network logical address according to the present embodiment.

The network address conversion unit N34 sets the value of a remainder obtained by dividing a combination of an upper address N5$u$ and a middle address N5$m$ of the network logical address N5 by a value P (for example, a prime number) as an upper address P5$u$ of a processor logical address Pr5. The upper address P5$u$ of the processor logical address Pr5 having a smaller number of bits than the upper address N5$u$ and the middle address N5$m$ of the network logical address N5 is determined by the conversion. The upper address P5$u$ of the processor logical address Pr5 is used as a key of the conversion from the processor logical address Pr5 into the network logical address N5.

Other relationships between the network logical address N5 and the processor logical address Pr5 and the conversion from the processor logical address Pr5 into the network logical address N5 are the same as those in FIG. 91 and thus, the description thereof is omitted.

The network address conversion unit N34 may use, instead of a hash function 40, a conversion table to convert a portion of the network logical addresses N1 to N5 into a portion of the processor logical addresses Pr1 to Pr5 to use the portion of the processor logical addresses Pr1 to Pr5 as keys to convert the address length.

The network address conversion unit N34 may also create a table that registers a portion or all of the network logical addresses N1 to N5 to use the table as a key used for conversion from the processor logical addresses Pr1 to Pr5 into the network logical addresses N1 to N5. According to this conversion method, each of the information processing devices N37A, N37B may manage such a table. Preferably, the information processing devices N37A, N37B connected to the network N38 are caused to share a table so that each of the information processing devices N37A, N37B locally stores a copy of the table in a cache memory or the like.

In the above conversion, the lower addresses N1$d$ to N5$d$ of the network logical addresses N1 to N5 and the lower addresses P1$d$ to P5$d$ of the processor logical addresses Pr1 to Pr5 are used without being converted, but the lower addresses N1$d$ to N5$d$ of the network logical addresses N1 to N5 and the lower addresses P1$d$ to P5$d$ of the processor logical addresses Pr1 to Pr5 may be converted.

Figure 96:
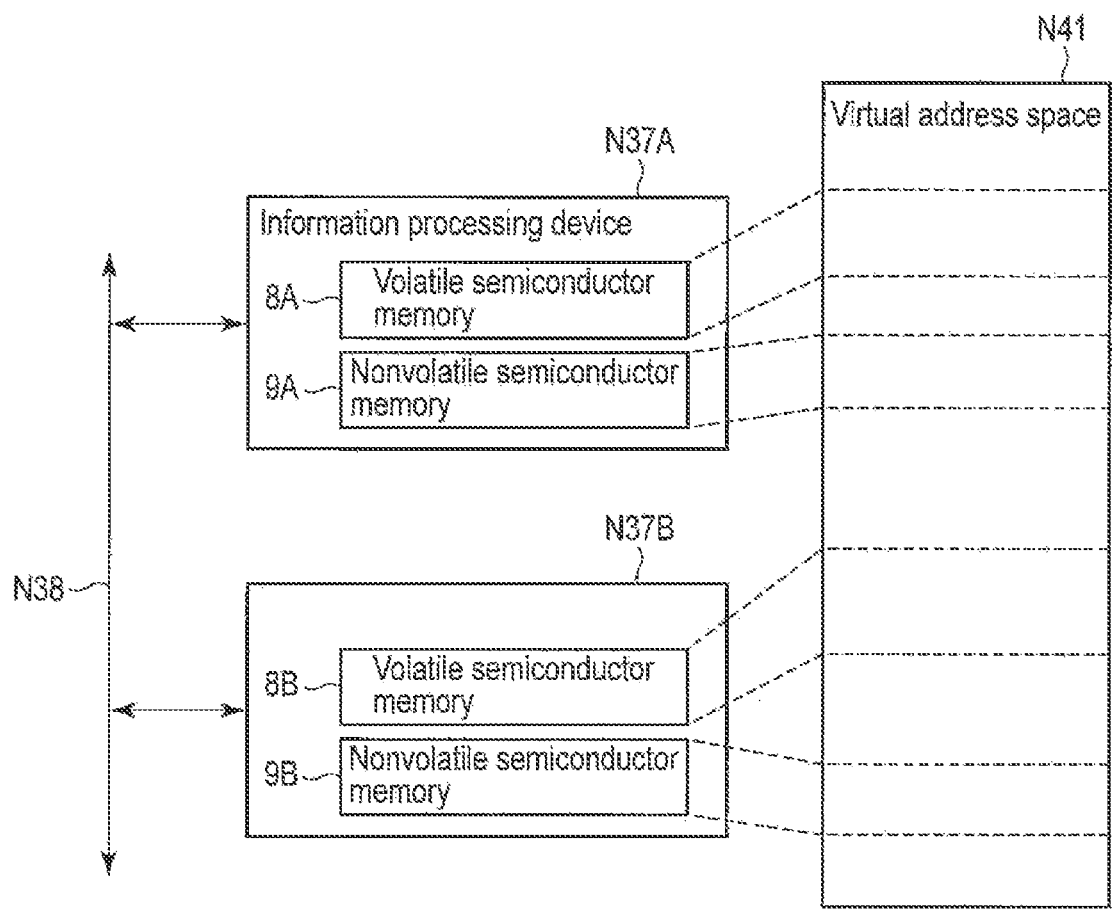
FIG. 96 is a block diagram showing an example of a virtual address space of the network system according to the eleventh embodiment.

FIG. 96 is a block diagram showing an example of a virtual address space of the network system N37 according to the present embodiment.

In the present embodiment, unique network logical addresses are allocated to all data in the network system N37 and thus, a virtual address space N41 common to the information processing devices N37A, N37B can be formed.

FIG. 97 is a block diagram showing a first example of the configuration of a processor logical address and a network logical address according to the present embodiment.

A processor logical address N42 includes a conversion key and a file address+offset.

The network address conversion unit N34 converts the processor logical address N42 into a network logical address N43.

The network logical address N43 includes processor identification information (for example, identification information of the operator and information processing device) and a file address+offset.

The memory management device N32A sends the network logical address N43 to the memory management device N32B via the network N38. Then, the memory management device N32B reads data specified by the file address+offset of the network logical address N43 and returns the data to the memory management device N32A.

FIG. 98 is a block diagram showing a second example of the configuration of a processor logical address and a network logical address according to the present embodiment.

A processor logical address N44 includes a conversion key and an offset.

The network address conversion unit N34 converts the processor logical address N44 into a network logical address N45.

The network logical address N45 includes processor identification information, a file address and an offset.

The memory management device N32A sends the network logical address N45 to the memory management device N32B via the network N38. Then, the memory management device N32B reads data specified by the file address+offset of the network logical address N45 and returns the data to the memory management device N32A.

FIG. 99 is a block diagram showing a third example of the configuration of a processor logical address and a network logical address according to the present embodiment.

A processor logical address N46 includes a conversion key and a file address.

The network address conversion unit N34 converts the processor logical address N46 into a network logical address N47.

The network logical address N47 includes processor identification information and a file address.

The memory management device N32A sends the network logical address N47 to the memory management device N32B via the network N38. Then, the memory management device N32B reads file data specified by the file address of the network logical address N47 and returns the data to the memory management device N32A.

Technical significance of the address conversion as described above will be described below.

For example, an 8-bit CPU (Central Processing Unit) is generally used as the processor 3A. The 8-bit CPU includes 8-bit registers. The number of bits of an address in a generally used 8-bit CPU is 16 bits.

For example, a 16-bit CPU includes 16-bit registers. The number of bits of an address in a generally used 16-bit CPU is 20 bits.

Both numeric values and addresses are stored in a general register. Thus, it is desirable that the number of bits of a numeric value and the number of bits of an address match. However, as described above, the number of bits of a register and the number of bits of an address may not match.

64-bit CPUs are currently in widespread use. 64-bit CPUs can provide sufficient arithmetic precision. Thus, the need for the number of bits of a register to exceed 64 bits is low. Moreover, from the viewpoint of carry processing of a CPU adder, including a register exceeding 64 bits in a CPU is considered to be difficult.

In contrast, the need for the number of bits of an address to increase is considered to be high. As an example thereof, Single Level Store (SLS) will be described.

In the SLS, virtual addresses are allocated to various storage devices including secondary storage devices. In recent years, a local storage device that is not connected via a network has the capacity on the order of Tbytes and thus, 32 bits are not sufficient and 64 bits are sufficient.

However, when a storage device like, for example, (NAS) used in a network environment is used or addresses are allocated to a large number of storage devices connected to a network, it is necessary to increase the size of the virtual address to, for example, 128 bits.

FIG. 100 is a diagram showing an example of calculation to estimate the number of bits of the address needed to access data stored in a large number of devices connected to a network.

If it is assumed, as shown in FIG. 100, that human beings worldwide store a certain level of data, such data can be accessed by using 82-bit network logical addresses.

Therefore, as described above, determining a network logical address for a network having a larger number of bits from a processor logical address having the same number of bits as a register of the processors 3A, 3B in the network system N37 is highly significant.

In the present embodiment, for example, addresses can be allocated to all data in a network system by adopting a 128-bit network logical address.

In the present embodiment described above, addresses can be allocated to all data used in the network system N37.

In the present embodiment, basic memory management such as the address conversion and writing destination decision and the memory access can be implemented by a common method between the volatile semiconductor memory 8A and the nonvolatile semiconductor memory 9A, and the volatile semiconductor memory 8B and the nonvolatile semiconductor memory 9B included in the network system N37. That is, each of the information processing devices N37A, N37B according to the present embodiment does not have to distinguish between a memory included in the local device and a memory connected via the network N38 in management of the access method, access count, access frequency and the like.

In the present embodiment, data with a high frequency of being accessed by the information processing devices N37A, N37B is stored in the respective device and thus, an access delay due to transmission/reception via the network N38 and an access failure caused by a network disconnection can be prevented.

In the present embodiment, the volatile semiconductor memory 8A and the nonvolatile semiconductor memory 9A, and the volatile semiconductor memory 8B and the nonvolatile semiconductor memory 9B in the network system N37 can be used as the main memory. Further, each of the information processing devices N37A, N37B according to the present embodiment can use a memory in the local device as a cache memory to store data stored in the other device.

In the present embodiment, addresses of the number of bits larger than the number of bits of registers of the processors 3A, 3B can be used so that a wide memory space can be used.

In general, access that is not made via a network is reading/writing from/to a storage device and access that is made via a network is made by socket communication. Reading/writing and socket communication use different access methods. For example, a special access method using URL or the like is used for Web access via a network. In the present embodiment, by contrast, access to a storage device is made based on a network logical address regardless of whether accessed via a network so that the same access method is used.

In the present embodiment, the address length conversion flag is attached to the address length conversion tables AT, and AT1 to AT5, which can prevent duplicate registration.

Each element described in each of the above embodiments can freely be combined and divided. For example, any functional block shown in each embodiment can appropriately be combined and divided. Also, for example, only steps of a portion of the flow chart shown in each embodiment can be extracted and executed and any steps can appropriately be combined and divided.

The present invention is not limited to the above embodiments and various modifications can be made in the stage of working without deviating from the scope thereof. Further, the above embodiments contain inventions of various stages and various inventions can be extracted by appropriately combining a plurality of disclosed constituent features.

What is claimed is:

1. A memory management device comprising:
a first management unit which manages first information, the first information including at least a reading occurrence count and an erasing count for each of memory regions of at least one first semiconductor memory being nonvolatile;
a notification unit which notifies warning of the at least one first semiconductor memory before the erasing count of the at least one first semiconductor memory reaches an erasable upper limit count of the at least one first semiconductor memory, based on the first information; and
a control unit which writes the reading occurrence count and the erasing count of the region of the at least one first semiconductor memory into the at least one first semiconductor memory after a removal notification is received from the at least one first semiconductor memory,
wherein, at a first time, the notification unit obtains a predicted erasing count based on a change ratio of an erasing count in a period from a second time to the first time, the second time being before the first time, the predicted erasing count being a predicted value of an erasing count at a third time after the first time,
the notification unit notifies the warning of the at least one first semiconductor memory at the first time when the predicted erasing count exceeds the erasable upper limit count,
a data writing for the at least one first semiconductor memory is decreased when the erasing count reaches a predetermined value which is less than the erasable upper limit count, and
low write frequency data is written in the at least one first semiconductor memory when the erasing count is greater than or equal to the predetermined value.

2. The device according to claim 1, wherein
the at least one first semiconductor memory comprises a plurality of first semiconductor memories,
the memory management device writes data stored in one first semiconductor memory among the plurality of first semiconductor memories into another first semiconductor memory after the warning for the one first semiconductor memory is notified.

3. The device according to claim 1, further comprising:
a second management unit which manages second information, the second information based on a data characteristic of write target data to be written into at least one of the at least one first semiconductor memory and a second semiconductor memory,
wherein
the at least one first semiconductor memory comprises a plurality of first semiconductor memories,
high writing frequency data or high reading frequency data is written into a specific first semiconductor memory among the plurality of first semiconductor memories.

4. The device according to claim 1, further comprising:
a second management unit which manages second information, the second information based on a characteristic of data stored into at least one of a SLC (single level cell) region and an MLC (multi level cell) region of the at least one first semiconductor memory, the second information being a hint for determining an allocated region of each data;
a third management unit which manages third information, the third information indicating memory specific characteristics for the memory regions;
a first determination unit which determines a writing region among the memory regions for write target data based on the first information, the second information of the write target data, and the third information;
a second determination unit which determines whether or not switching between the SLC region and the MLC region is executed for the memory regions based on the first information and the third information; and
a control unit which executes switching between the SLC region and the MLC region for a memory region determined to execute switching between the SLC region and the MLC region by the second determination unit.

5. The device according to claim 4, further comprising:
a calculation unit which calculates at least one of values included in the first information and values included in the third information for each of the memory regions,
wherein
the second determination unit determines to execute switching between the SLC region and the MLC region for a memory region of which the result calculated by the calculation unit exceeds a predetermined threshold.

6. The device according to claim 4, wherein
the control unit refers to the second information when data is stored in a switching target region between the SLC region and the MLC region, removes high access frequency data among data in the switching target region to another SLC region, and removes low access frequency data of the data in the switching target region to another MLC region.

7. The device according to claim 4, wherein
the first information includes information indicating usage states for the memory regions,
the first management unit updates the first information for an accessed memory region when an access for the at least one first semiconductor memory occurs.

8. The device according to claim 1, further comprising:
a second management unit which manages second information of each data, the second information based on a characteristic of data allocated into a memory window in which a part of a first physical address space of a processor is mapped, the second information being a hint for determining an allocated region of each data, the memory window including a first logical address space of the processor, and the first physical address space being larger than the first logical address space;
a determination unit which determines a writing region among the first physical address space for data to be written from the memory window to the first physical address space based on the second information; and
a third management unit which manages third information, the third information associating a first logical address of the processor of the each data with a first physical address of the processor of the each data.

9. The device according to claim 8, wherein
the third management unit updates the third information when data allocated in the memory window is changed from data of a first memory region of the first physical address space among the memory regions to data of a second memory region among the memory regions by the processor.

10. The device according to claim 8, further comprising:
a fourth management unit which manages a fourth information, the fourth information indicating a memory specific characteristic for the each of the memory regions of the first physical address space,
wherein the first information includes information indicating a usage state for the each of the memory regions of the first physical address space,
the first management unit updates the first information for an accessed memory region of the first physical address space when an access for the first physical address space occurs, and
the determination unit determines the writing region in the first physical address space for data to be written from the memory window to the first physical address space based on the first information, the second information, and the fourth information.

11. The device according to claim 1, further comprising:
a storage unit which stores second information associating third information with fourth information, the third information based on a characteristic of data stored into at least one of the at least one first semiconductor memory and a second semiconductor memory, the third information being a hint for determining an allocated region of each data, the fourth information being information to identify data;
a receiving unit which receives a request including the fourth information from a first device accessing to the at least one first semiconductor memory and the second semiconductor memory;
a second management unit which reads the second information from the storage unit based on the fourth information included in the request when the request is received; and
a translating unit which translates a read second information to the first device which issues the request.

12. The device according to claim 11, wherein
the receiving unit receives the second information, and
the second management unit stores the second information in the storage unit when the second information is received.

13. The device according to claim 1, further comprising:
a second management unit which manages second information, the second information based on a characteristic of data in at least one of the at least one first semiconductor memory and a second semiconductor memory on a network system, the second information being a hint for determining an allocated region of each data; and
a conversion unit which converts a first logical address of a processor issued from the processor to a second logical address of the network system, the second logical address being longer than the first logical address and specifying a memory region among the memory regions on the network system.

14. The device according to claim 13, further comprising:
a third management unit which manages third information, the third information indicating a memory specific characteristic for the at least one first semiconductor memory and the second semiconductor memory on the network system, respectively, the third information including at least an erasable upper limit count of the at least one first semiconductor memory;
a determination unit which determines a writing region among the memory regions for write target data based on the first information, the second information corresponding to the write target data, and the third information; and
a fourth management unit which manages fourth information, the fourth information associating the second logical address of the write target data with a physical address of the writing region.

15. The device according to claim 13, further comprising:
a fifth management unit which reads out read target data from one of the at least one first semiconductor memory and the second semiconductor memory based on the second logical address of the read target data and the fourth information; and
a communication unit which translates and receives the second logical address for another device via the network system.

16. The device according to claim 13, wherein
the first information indicates information of a usage state of the each of the memory regions of the at least one first semiconductor memory and the second memory on the network system, and
the first management unit updates the first information corresponding to an accessed memory region when an access for at least one of the at least one first semiconductor memory and the second semiconductor memory occurs.

17. The device according to claim 13, wherein
the first logical address includes a first address section being a conversion key of an address length, and a second address section being a same as a part of the second logical address,
the second logical address includes a third address section being converted based on the conversion key and having a larger number of bits than the conversion key, and a fourth address section being a same as the second address section, and
the conversion unit references a first table associating the first address section with the third address section, and combines the second address section with the third address section to generate the second logical address.

18. The device according to claim 17, wherein a flag indicating a valid or invalid is added to each entry of the first table.

19. The memory management device according to claim 1, further comprising:
a warning notification unit including an emitter which displays a warning state based on the warning.

20. The memory management device according to claim 1, further comprising:
a displaying unit which displays the erasing count as a graph.

21. The device according to claim 1, wherein
the notification unit configures to notify warning of the at least one first semiconductor memory before the reading occurrence count of the at least one first semiconductor memory reaches an readable upper limit count of the at least one first semiconductor memory, based on the first information.

22. A memory management device comprising:
a first management unit which manages first information, the first information including at least a reading occurrence count and an erasing count for each of memory regions of at least one first semiconductor memory being nonvolatile;
a notification unit which notifies warning of the at least one first semiconductor memory before the erasing count of the at least one first semiconductor memory reaches an erasable upper limit count of the at least one first semiconductor memory, based on the first information; and
a control unit which writes the reading occurrence count and the erasing count of the region of the at least one first semiconductor memory into the at least one first semiconductor memory after a removal notification is received from the at least one first semiconductor memory,
wherein, when a current time of the notification unit is a first time, the notification unit predicts a second time at which the erasing count is predicted to reach the erasable upper limit count based on a change ratio of an erasing count in a period from a third time to the first time, the second time being after the first time, the third time being before the first time,
the notification unit notifies the warning of the at least one first semiconductor memory when the current time of the notification unit reaches the second time,
a data writing for the at least one first semiconductor memory is decreased when the erasing count reaches a predetermined value which is less than the erasable upper limit count, and
low write frequency data is written in the at least one first semiconductor memory when the erasing count is greater than or equal to the predetermined value.

23. The device according to claim 22, wherein
the notification unit which notifies warning of the at least one first semiconductor memory before the reading occurrence count of the at least one first semiconductor memory reaches an readable upper limit count of the at least one first semiconductor memory, based on the first information.

24. A memory management device comprising:
a notification unit which notifies warning of the at least one first semiconductor memory based on a predicted erasing count of the at least one first semiconductor memory; and
a control unit which writes a reading occurrence count and the erasing count of the region of the at least one first semiconductor memory into the at least one first semiconductor memory after a removal notification is received from the at least one first semiconductor memory,
wherein, at a first time, the notification unit obtains the predicted erasing count based on a change ratio of an erasing count in a period from a second time to the first time, the second time being before the first time, the predicted erasing count being an erasing count at a third time after the first time,
the notification unit notifies the warning of the at least one first semiconductor memory at the first time when the predicted erasing count exceeds the erasable upper limit count,
a data writing for the at least one first semiconductor memory is decreased when the erasing count reaches a predetermined value which is less than the erasable upper limit count, and
low write frequency data is written in the at least one first semiconductor memory when the erasing count is greater than or equal to the predetermined value.

25. The device according to claim 24, wherein
the notification unit which notifies warning of the at least one first semiconductor memory before the reading occurrence count of the at least one first semiconductor memory reaches an readable upper limit count of the at least one first semiconductor memory, based on the first information.

* * * * *